US012750542B2

(12) United States Patent
Allen et al.

(10) Patent No.: US 12,750,542 B2
(45) Date of Patent: Sep. 29, 2026

(54) TECHNIQUES FOR MANAGING A PLATFORM

(71) Applicant: Apple Inc., Cupertino, CA (US)

(72) Inventors: Matthew J. Allen, Menlo Park, CA (US); Karlin Y. Bark, San Carlos, CA (US); Arian Behzadi, San Francisco, CA (US); David C. Burns, Cupertino, CA (US); Christopher P. Foss, San Francisco, CA (US); Zheng X. Hong, San Jose, CA (US); Sean B. Kelly, San Francisco, CA (US); Andrew S. Kim, Walnut Creek, CA (US); Sara H Kwan, Sunnyvale, CA (US); Jean-Pierre M. Mouilleseaux, San Carlos, CA (US); Sheri R. Smith, Portland, OR (US); Sanjana Wadhwa, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/088,552

(22) Filed: Mar. 24, 2025

(65) Prior Publication Data

US 2025/0380016 A1 Dec. 11, 2025

Related U.S. Application Data

(63) Continuation of application No. PCT/US2023/033566, filed on Sep. 24, 2023.

(60) Provisional application No. 63/409,757, filed on Sep. 24, 2022.

(51) Int. Cl.
*H04N 21/262* (2011.01)

(52) U.S. Cl.
CPC ................................ *H04N 21/262* (2013.01)

(58) Field of Classification Search
CPC .................................................... H04N 21/262
See application file for complete search history.

(56) References Cited

U.S. PATENT DOCUMENTS 6,904,609 B1 * 6/2005 Pietraszak .............. H04N 21/47 725/39
7,076,202 B1 * 7/2006 Billmaier ........... H04N 21/4334 455/66.1
7,370,342 B2 * 5/2008 Ismail .................. H04N 21/252 348/E5.002
7,433,873 B2 * 10/2008 Kang ................. H04N 21/8543
7,484,233 B2 * 1/2009 Pietraszak .............. H04N 21/84 725/39

(Continued)

OTHER PUBLICATIONS

International Preliminary Report on Patentability received for PCT Patent Application No. PCT/US2023/033566, mailed on Apr. 3, 2025, 17 pages.

(Continued)

*Primary Examiner* — Michael B. Pierorazio
(74) *Attorney, Agent, or Firm* — YHE Law LLP

(57) ABSTRACT

The present disclosure generally relates to managing a platform. In some embodiments, movement of a platform, movement of components of a platform, and/or adjustments of configurable elements of a platform are based on one or more factors that facilitate a trip of a platform. Accordingly, the platform can perform trips efficiently, while increasing a comfort, safety, and/or overall experience of a person using the platform.

21 Claims, 51 Drawing Sheets

(56) References Cited

U.S. PATENT DOCUMENTS

| | | | | |
|---|---|---|---|---|
| 7,603,687 | B2 * | 10/2009 | Pietraszak | H04N 21/4782 725/50 |
| 8,051,454 | B2 * | 11/2011 | Krikorian | H04L 65/613 725/95 |
| 8,255,531 | B2 * | 8/2012 | Bose | G06F 3/1462 709/227 |
| 8,280,949 | B2 * | 10/2012 | Bergquist | H04N 21/47202 709/248 |
| 8,302,127 | B2 * | 10/2012 | Klarfeld | H04N 21/4751 705/14.66 |
| 8,458,613 | B2 * | 6/2013 | Oshiro | G06F 3/04842 715/810 |
| 8,495,679 | B2 * | 7/2013 | Labeeb | H04N 21/26283 725/40 |
| 8,612,598 | B1 * | 12/2013 | Chaudhry | H04N 21/2665 709/212 |
| 9,838,728 | B2 * | 12/2017 | Kannan | H04N 21/4532 |
| 10,154,298 | B2 * | 12/2018 | Kannan | H04N 21/25891 |
| 2003/0046689 | A1 * | 3/2003 | Gaos | H04N 21/42203 715/745 |
| 2003/0067554 | A1 * | 4/2003 | Klarfeld | G11B 27/322 725/135 |
| 2003/0093792 | A1 * | 5/2003 | Labeeb | H04N 21/26283 725/38 |
| 2004/0123319 | A1 * | 6/2004 | Kim | H04N 7/165 348/E7.063 |
| 2004/0139480 | A1 * | 7/2004 | Delpuch | H04N 7/17318 348/E7.071 |
| 2005/0097605 | A1 * | 5/2005 | Itou | H04N 7/17336 725/39 |
| 2005/0177849 | A1 * | 8/2005 | Pietraszak | H04N 21/4622 725/39 |
| 2005/0183116 | A1 * | 8/2005 | Pietraszak | H04N 21/47 725/39 |
| 2006/0047668 | A1 * | 3/2006 | Kang | H04N 21/8543 |
| 2006/0206912 | A1 * | 9/2006 | Klarfeld | H04N 21/4823 725/39 |
| 2006/0212900 | A1 * | 9/2006 | Ismail | H04N 21/44224 725/35 |
| 2006/0212904 | A1 * | 9/2006 | Klarfeld | H04N 21/6587 725/45 |
| 2007/0061862 | A1 * | 3/2007 | Berger | H04N 7/163 725/62 |
| 2007/0067808 | A1 * | 3/2007 | DaCosta | H04N 21/6581 348/E7.071 |
| 2007/0112826 | A1 * | 5/2007 | Laksono | G11B 20/00007 707/999.102 |
| 2007/0124775 | A1 * | 5/2007 | DaCosta | H04N 21/6582 348/E7.071 |
| 2008/0114880 | A1 * | 5/2008 | Jogand-Coulomb | H04L 63/10 709/227 |
| 2008/0235587 | A1 * | 9/2008 | Heie | H04N 7/142 709/231 |
| 2008/0235733 | A1 * | 9/2008 | Heie | H04N 21/482 725/46 |
| 2009/0106391 | A1 * | 4/2009 | Wang | H04L 12/1895 709/217 |
| 2009/0133051 | A1 * | 5/2009 | Hildreth | H04N 21/42204 725/28 |
| 2009/0133074 | A1 * | 5/2009 | White | H04N 7/165 725/50 |
| 2009/0248700 | A1 * | 10/2009 | Amano | G06F 16/313 |
| 2009/0260038 | A1 * | 10/2009 | Acton | H04N 21/482 725/49 |
| 2010/0162305 | A1 * | 6/2010 | Downey | H04N 21/47 725/39 |
| 2010/0191860 | A1 * | 7/2010 | Krikorian | H04N 21/47202 709/231 |
| 2010/0205636 | A1 * | 8/2010 | Coburn | H04N 21/44224 725/46 |
| 2010/0223407 | A1 * | 9/2010 | Dong | H04N 21/2402 710/70 |
| 2010/0287588 | A1 * | 11/2010 | Cox | H04N 21/44222 725/40 |
| 2010/0299264 | A1 * | 11/2010 | Berger | G06Q 30/0601 705/59 |
| 2011/0116540 | A1 * | 5/2011 | O'Connor | H04N 21/47 725/54 |
| 2011/0126232 | A1 * | 5/2011 | Lee | H04N 21/6405 707/E17.049 |
| 2011/0161622 | A1 * | 6/2011 | Maeda | G06F 12/1027 711/207 |
| 2011/0185387 | A1 * | 7/2011 | Schein | H04N 7/165 725/46 |
| 2012/0023529 | A1 * | 1/2012 | Azam | H04N 21/2221 725/93 |
| 2015/0189353 | A1 * | 7/2015 | Kannan | H04N 21/482 725/54 |
| 2018/0077441 | A1 * | 3/2018 | Kannan | H04N 21/84 |
| 2020/0408531 | A1 * | 12/2020 | Leary | G05D 1/0278 |
| 2020/0412786 | A1 * | 12/2020 | Loheide | H04L 65/611 |
| 2021/0061224 | A1 * | 3/2021 | Kim | H04W 12/06 |

OTHER PUBLICATIONS

International Search Report and Written Opinion received for PCT Patent Application No. PCT/US2023/033566, mailed on Nov. 23, 2023, 20 pages.

* cited by examiner

TECHNIQUES FOR MANAGING A PLATFORM

CROSS-REFERENCE TO RELATED APPLICATIONS

This application is a continuation of PCT/US2023/033566, entitled "TECHNIQUES FOR MANAGING A PLATFORM," filed Sep. 24, 2023, which claims priority to U.S. Provisional Patent Application No. 63/409,757, entitled "TECHNIQUES FOR MANAGING A PLATFORM," filed Sep. 24, 2022, the contents of each of which are hereby incorporated by reference in their entirety for all purposes.

BACKGROUND

Field

The present disclosure relates generally to techniques for managing a platform.

Description of Related Art

Platforms are configured to move between locations. Existing platforms include various features, such as doors, seats, and displays.

BRIEF SUMMARY

In accordance with some embodiments, a method is described. The method comprises: detecting, via a location detection system, that a platform is at a first destination location; and in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a non-transitory computer-readable storage medium is described. The non-transitory computer-readable storage medium stores one or more programs configured to be executed by one or more processors of a system, the one or more programs including instructions for: detecting, via a location detection system, that a platform is at a first destination location; and in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a transitory computer-readable storage medium is described. The transitory computer-readable storage medium stores one or more programs configured to be executed by one or more processors of a system, the one or more programs including instructions for: detecting, via a location detection system, that a platform is at a first destination location; and in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a system is described. The system comprises: one or more processors; and memory storing one or more programs configured to be executed by the one or more processors, the one or more programs including instructions for: detecting, via a location detection system, that a platform is at a first destination location; and in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a system is described. The system comprises: means for detecting, via a location detection system, that a platform is at a first destination location; and means for, in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a computer program product is described. The computer program product comprises one or more programs configured to be executed by one or more processors of a system, the one or more programs including instructions for: detecting, via a location detection system, that a platform is at a first destination location; and in response to detecting that the platform is at the first destination location, initiating a coordinated re-configuration of the platform that is based on a set of one or more factors, wherein the coordinated re-configuration of the platform includes: moving one or more actuatable closures of the platform to a first position; and adjusting one or more configurable elements of an interior portion of the platform to a first state.

In accordance with some embodiments, a method is described. The method comprises: receiving arrival information associated with a platform; and in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a non-transitory computer-readable storage medium is described. The non-transitory computer-readable storage medium stores one or more programs configured to be executed by one or more processors of a system, the one or more programs including instructions for: receiving arrival information associated with a platform; and in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a transitory computer-readable storage medium is described. The transitory computer-readable storage medium stores one or more programs configured to be executed by one or more processors of a system, the one or more programs including instructions for: receiving arrival information associated with a platform; and in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a system is described. The system comprises: one or more processors; and memory storing one or more programs configured to be executed by the one or more processors, the one or more programs including instructions for: receiving arrival information associated with a platform; and in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a system is described. The system comprises: means for receiving arrival information associated with a platform; and means for, in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a computer program product is described. The computer program product comprises one or more programs configured to be executed by one or more processors of a system, the one or more programs including instructions for: receiving arrival information associated with a platform; and in response to receiving the arrival information: in accordance with a determination that the arrival information indicates a first characteristic of the platform, causing the platform to arrive at a location in a first mode in which the platform has the first characteristic; and in accordance with a determination that the arrival information indicates a second characteristic of the platform, different from the first characteristic of the platform, causing the platform to arrive at the location in a second mode in which the platform has the second characteristic, wherein the second mode is different from the first mode.

In accordance with some embodiments, a method is described. The method comprises: determining that a user is within a predetermined distance of a platform and that the platform is operating in a first mode; after determining that the user is within the predetermined distance of the platform and that the platform is operating in the first mode, obtaining information that indicates a level of user readiness for taking a trip; and in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a non-transitory computer-readable storage medium is described. The non-transitory computer-readable storage medium stores one or more programs configured to be executed by one or more processors of a system, the one or more programs including instructions for: determining that a user is within a predetermined distance of a platform and that the platform is operating in a first mode; after determining that the user is within the predetermined distance of the platform and that the platform is operating in the first mode, obtaining information that indicates a level of user readiness for taking a trip; and in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a transitory computer-readable storage medium is described. The transitory computer-readable storage medium stores one or more programs configured to be executed by one or more processors of a system, the one or more programs including instructions for: determining that a user is within a predetermined distance of a platform and that the platform is operating in a first mode; after determining that the user is within the predetermined distance of the platform and that the platform is operating in the first mode, obtaining information that indicates a level of user readiness for taking a trip; and in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a system is described. The system comprises: one or more processors; and memory storing one or more programs configured to be executed by the one or more processors, the one or more programs including instructions for: determining that a user is within a predetermined distance of a platform and that the platform is operating in a first mode; after determining that the user is within the predetermined distance of the platform and that the platform is operating in the first mode, obtaining information that indicates a level of user readiness for taking a trip; and in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a system is described. The system comprises: means for determining that a user is within a predetermined distance of a platform and that the platform is operating in a first mode; means for, after determining that the user is within the predetermined distance of the platform and that the platform is operating in the first mode, obtaining information that indicates a level of user readiness for taking a trip; and means for, in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a computer program product is described. The computer program product comprises one or more programs configured to be executed by one or more processors of a system, the one or more programs including instructions for: determining that a user is within a predetermined distance of a platform and that the platform is operating in a first mode; after determining that the user is within the predetermined distance of the platform and that the platform is operating in the first mode, obtaining information that indicates a level of user readiness for taking a trip; and in response to obtaining the information: in accordance with a determination that the information indicates a first level of user readiness for taking the trip, transitioning operation of the platform from the first mode to a second mode, different from the first mode; and in accordance with a determination that the information indicates a second level of user readiness for taking the trip, different from the first level of user readiness for taking the trip, maintaining operation of the platform in the first mode.

In accordance with some embodiments, a method is described. The method comprises: obtaining information that is associated with a user of a platform, wherein the information does not include a request for the platform to perform a trip; and in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a non-transitory computer-readable storage medium is described. The non-transitory computer-readable storage medium stores one or more programs configured to be executed by one or more processors of a system, the one or more programs including instructions for: obtaining information that is associated with a user of a platform, wherein the information does not include a request for the platform to perform a trip; and in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a transitory computer-readable storage medium is described. The transitory computer-readable storage medium stores one or more programs configured to be executed by one or more processors of a system, the one or more programs including instructions for: obtaining information that is associated with a user of a platform, wherein the information does not include a request for the platform to perform a trip; and in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a system is described. The system comprises: one or more processors; and memory storing one or more programs configured to be executed by the one or more processors, the one or more programs including instructions for: obtaining information that is associated with a user of a platform, wherein the information does not include a request for the platform to perform a trip; and in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a system is described. The system comprises: means for obtaining information that is associated with a user of a platform, wherein the information does not include a request for the platform to perform a trip; and means for, in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a computer program product is described. The computer program product comprises one or more programs configured to be executed by one or more processors of a system, the one or more programs including instructions for: obtaining information that is associated with a user of a platform, wherein the information does not include a request for the platform to perform a trip; and in response to obtaining the information: in accordance with a determination that the information meets a first criterion that indicates that the user intends to perform the trip within a predetermined amount of time from a current time and in accordance with a determination that the information meets a second criterion that indicates that a confidence level of an intent of the user satisfies a confidence level threshold, causing the platform to be positioned at a staging location that is within a predetermined distance of a location of the user; and in accordance with a determination that the information does not satisfy both the first criterion and the second criterion, forgoing causing the platform to be positioned at the staging location.

In accordance with some embodiments, a method is described. The method comprises: at a computer system that is in communication with a display generation component: displaying, via the display generation component, a user interface, including concurrently displaying: a platform control element that, when selected, causes the computer system to perform a function associated with a platform; and a function control element that, when selected, causes the computer system to perform a function that is not associated with the platform; detecting selection of the platform control element; in response to detecting the selection of the platform control element, initiating a request for the platform to move to a location; and in accordance with a determination that a set of arrival criteria is met, providing a notification indicating that the platform is near the location.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface, including concurrently displaying: a platform control element that, when selected, causes the computer system to perform a function associated with a platform; and a function control element that, when selected, causes the computer system to perform a function that is not associated with the platform; detecting selection of the platform control element; in response to detecting the selection of the platform control element, initiating a request for the platform to move to a location; and in accordance with a determination that a set of arrival criteria is met, providing a notification indicating that the platform is near the location.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a user interface, including concurrently displaying: a platform control element that, when selected, causes the computer system to perform a function associated with a platform; and a function control element that, when selected, causes the computer system to perform a function that is not associated with the platform; detecting selection of the platform control element; in response to detecting the selection of the platform control element, initiating a request for the platform to move to a location; and in accordance with a determination that a set of arrival criteria is met, providing a notification indicating that the platform is near the location.

In accordance with some embodiments, a computer system is described. The computer system is configured to communicate with a display generation component and one or more input devices and comprises: one or more processors; and memory storing one or more programs configured to be executed by the one or more processors, the one or more programs including instructions for: displaying, via the display generation component, a user interface, including concurrently displaying: a platform control element that, when selected, causes the computer system to perform a function associated with a platform; and a function control element that, when selected, causes the computer system to perform a function that is not associated with the platform; detecting selection of the platform control element; in response to detecting the selection of the platform control element, initiating a request for the platform to move to a location; and in accordance with a determination that a set of arrival criteria is met, providing a notification indicating that the platform is near the location.

In accordance with some embodiments, a computer system is described. The computer system is configured to communicate with a display generation component and one or more input devices and comprises: means for displaying, via the display generation component, a user interface, including concurrently displaying: a platform control element that, when selected, causes the computer system to perform a function associated with a platform; and a function control element that, when selected, causes the computer system to perform a function that is not associated with the platform; means for detecting selection of the platform control element; means for in response to detecting the selection of the platform control element, initiating a request for the platform to move to a location; and means for in accordance with a determination that a set of arrival criteria is met, providing a notification indicating that the platform is near the location.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a user interface, including concurrently displaying: a platform control element that, when selected, causes the computer system to perform a function associated with a platform; and a function control element that, when selected, causes the computer system to perform a function that is not associated with the platform; detecting selection of the platform control element; in response to detecting the selection of the platform control element, initiating a request for the platform to move to a location; and in accordance with a determination that a set of arrival criteria is met, providing a notification indicating that the platform is near the location.

In accordance with some embodiments, a method is described. The method comprises: detecting that a set of ingress criteria is met, the set of ingress criteria including a criterion that a user has entered a platform; and in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a non-transitory computer-readable storage medium is described. The non-transitory computer-readable storage medium stores one or more programs configured to be executed by one or more processors of a system, the one or more programs including instructions for: detecting that a set of ingress criteria is met, the set of ingress criteria including a criterion that a user has entered a platform; and in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a transitory computer-readable storage medium is described. The transitory computer-readable storage medium stores one or more programs configured to be executed by one or more processors of a system, the one or more programs including instructions for: detecting that a set of ingress criteria is met, the set of ingress criteria including a criterion that a user has entered a platform; and in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a system is described. The system comprises: one or more processors; and memory storing one or more programs configured to be executed by the one or more processors, the one or more programs including instructions for: detecting that a set of ingress criteria is met, the set of ingress criteria including a criterion that a user has entered a platform; and in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a system is described. The system comprises: means for detecting that a set of ingress criteria is met, the set of ingress criteria including a criterion that a user has entered a platform; and means for in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a computer program product is described. The computer program product comprises one or more programs configured to be executed by one or more processors of a system, the one or more programs including instructions for: detecting that a set of ingress criteria is met, the set of ingress criteria including a criterion that a user has entered a platform; and in response to detecting that the set of ingress criteria is met and in accordance with a determination that a set of content transfer criteria is met, the set of content transfer criteria including a condition that a computer system associated with the user is performing playback of media content, initiating playback of the media content on a media output device of the platform.

In accordance with some embodiments, a method is described. The method comprises: detecting that a person is within a predetermined distance of a platform; and in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a non-transitory computer-readable storage medium is described. The non-transitory computer-readable storage medium stores one or more programs configured to be executed by one or more processors of a system, the one or more programs including instructions for: detecting that a person is within a predetermined distance of a platform; and in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a transitory computer-readable storage medium is described. The transitory computer-readable storage medium stores one or more programs configured to be executed by one or more processors of a system, the one or more programs including instructions for: detecting that a person is within a predetermined distance of a platform; and in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a system is described. The system comprises: one or more processors; and memory storing one or more programs configured to be executed by the one or more processors, the one or more programs including instructions for: detecting that a person is within a predetermined distance of a platform; and in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a system is described. The system comprises: means for detecting that a person is within a predetermined distance of a platform; and means for, in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a computer program product is described. The computer program product comprises one or more programs configured to be executed by one or more processors of a system, the one or more programs including instructions for: detecting that a person is within a predetermined distance of a platform; and in response to detecting that the person is within the predetermined distance of the platform: in accordance with a determination that the platform has received destination information, adjusting one or more configurable elements of an interior portion of the platform to a first state; and in accordance with a determination that the platform has not received destination information, adjusting the one or more configurable elements of the interior portion of the platform to a second state, different from the first state; and prompting the person to provide destination information.

In accordance with some embodiments, a method is described. The method comprises: receiving an indication of a trip to be performed by a platform; in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a non-transitory computer-readable storage medium is described. The non-transitory computer-readable storage medium stores one or more programs configured to be executed by one or more processors of a system, the one or more programs including instructions for: receiving an indication of a trip to be performed by a platform; in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a transitory computer-readable storage medium is described. The transitory computer-readable storage medium stores one or more programs configured to be executed by one or more processors of a system, the one or more programs including instructions for: receiving an indication of a trip to be performed by a platform; in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a system is described. The system comprises: one or more processors; and memory storing one or more programs configured to be executed by the one or more processors, the one or more programs including instructions for: receiving an indication of a trip to be performed by a platform; in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a system is described. The system comprises: means for receiving an indication of a trip to be performed by a platform; means for in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a computer program product is described. The computer program product comprises one or more programs configured to be executed by one or more processors of a system, the one or more programs including instructions for: receiving an indication of a trip to be performed by a platform; in response to receiving the indication of the trip: in accordance with a determination that a set of platform readiness criteria is satisfied and that a set of user readiness criteria is satisfied, causing the platform to depart according to the trip, wherein the set of platform readiness criteria is includes a state of the platform, and wherein the set of user readiness criteria is includes a state that is associated with a user of the platform.

In accordance with some embodiments, a method is described. The method comprises: while a platform is configured to perform a trip along a first route, receiving information that includes a context associated with a user of the platform; and in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a non-transitory computer-readable storage medium is described. The non-transitory computer-readable storage medium stores one or more programs configured to be executed by one or more processors of a system, the one or more programs including instructions for: while a platform is configured to perform a trip along a first route, receiving information that includes a context associated with a user of the platform; and in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a transitory computer-readable storage medium is described. The transitory computer-readable storage medium stores one or more programs configured to be executed by one or more processors of a system, the one or more programs including instructions for: while a platform is configured to perform a trip along a first route, receiving information that includes a context associated with a user of the platform; and in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a system is described. The system comprises: one or more processors; and memory storing one or more programs configured to be executed by the one or more processors, the one or more programs including instructions for: while a platform is configured to perform a trip along a first route, receiving information that includes a context associated with a user of the platform; and in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a system is described. The system comprises: means for while a platform is configured to perform a trip along a first route, receiving information that includes a context associated with a user of the platform; and means for, in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a computer program product is described. The computer program product comprises one or more programs configured to be executed by one or more processors of a system, the one or more programs including instructions for: while a platform is configured to perform a trip along a first route, receiving information that includes a context associated with a user of the platform; and in response to receiving the context: in accordance with a determination that the context satisfies a first set of one or more criteria, causing the platform to perform the trip along a second route, different from the first route; and in accordance with a determination that the context satisfies a second set of one or more criteria, causing the platform to perform the trip along a third route, different from the first route and the second route.

In accordance with some embodiments, a method is described. The method comprises: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a non-transitory computer-readable storage medium is described. The non-transitory computer-readable storage medium stores one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a transitory computer-readable storage medium is described. The transitory computer-readable storage medium stores one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a system is described. The system comprises: one or more processors; and memory storing one or more programs configured to be executed by the one or more processors, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a system is described. The system comprises: means for, while a first person and a second person are positioned within an interior portion of a platform, detecting that a location of the platform satisfies a set of destination criteria, wherein the set of destination criteria includes a criterion that is based on a distance between the platform and a destination location; and means for, in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a computer program product is described. The computer program product comprises one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person and that the destination location corresponds to a destination of the second person, adjusting one or more configurable elements of the interior portion of the platform to a first state; and in accordance with a determination that the destination location corresponds to the destination of the first person and that the destination location does not correspond to the destination of the second person, adjusting the one or more configurable elements of the interior portion of the platform to a second state, wherein the second state is different from the first state.

In accordance with some embodiments, a method is described. The method comprises: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a non-transitory computer-readable storage medium is described. The non-transitory computer-readable storage medium stores one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a transitory computer-readable storage medium is described. The transitory computer-readable storage medium stores one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a system is described. The system comprises: one or more processors; and memory storing one or more programs configured to be executed by the one or more processors, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a system is described. The system comprises: means for, while a first person and a second person are positioned within an interior portion of a platform, detecting that a location of the platform satisfies a set of destination criteria, wherein the set of destination criteria includes a criterion that is based on a distance between the platform and a destination location; and means for, in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a computer program product is described. The computer program product comprises one or more programs configured to be executed by one or more processors of a system, the one or more programs including instructions for: while a first person and a second person are positioned within an interior portion of a platform, detecting that a location of the platform satisfies a set of destination criteria, wherein the set of destination criteria includes a criterion that is based on a distance between the platform and a destination location; and in response to detecting that the location of the platform satisfies the set of destination criteria: in accordance with a determination that the destination location corresponds to a destination of the first person, providing a first indicator to the first person; in accordance with a determination that the destination location does not correspond to the destination of the first person, providing a second indicator, different from the first indicator, to the first person; in accordance with a determination that the destination location corresponds to a destination of the second person, providing the first indicator to the second person; and in accordance with a determination that the location does not correspond to the destination of the second person, providing the second indicator, different from the first indicator, to the second person.

In accordance with some embodiments, a method is described. The method comprises: detecting that a platform is within a predetermined distance of a location; and in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a non-transitory computer-readable storage medium is described. The non-transitory computer-readable storage medium stores one or more programs configured to be executed by one or more processors of a system, the one or more programs including instructions for: detecting that a platform is within a predetermined distance of a location; and in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a transitory computer-readable storage medium is described. The transitory computer-readable storage medium stores one or more programs configured to be executed by one or more processors of a system, the one or more programs including instructions for: detecting that a platform is within a predetermined distance of a location; and in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a system is described. The system comprises: one or more processors; and memory storing one or more programs configured to be executed by the one or more processors, the one or more programs including instructions for: detecting that a platform is within a predetermined distance of a location; and in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a system is described. The system comprises: means for detecting that a platform is within a predetermined distance of a location; and means for, in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a computer program product is described. The computer program product comprises one or more programs configured to be executed by one or more processors of a system, the one or more programs including instructions for: detecting that a platform is within a predetermined distance of a location; and in response to detecting that the platform is within the predetermined distance of the location: in accordance with a determination that an environment associated with the location includes a first set of one or more characteristics, adjusting one or more configurable elements of an interior portion of the platform to a first state based on the first set of one or more characteristics; and in accordance with a determination that the environment associated with the location includes a second set of one or more characteristics, different from the first set of one or more characteristics, adjusting the one or more configurable elements of the interior portion of the platform to a second state, different from the first state, based on the second set of one or more characteristics.

In accordance with some embodiments, a method is described. The method comprises: detecting that a platform is within a predetermined distance of a location; and in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a non-transitory computer-readable storage medium is described. The non-transitory computer-readable storage medium stores one or more programs configured to be executed by one or more processors of a system, the one or more programs including instructions for: detecting that a platform is within a predetermined distance of a location; and in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a transitory computer-readable storage medium is described. The transitory computer-readable storage medium stores one or more programs configured to be executed by one or more processors of a system, the one or more programs including instructions for: detecting that a platform is within a predetermined distance of a location; and in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a system is described. The system comprises: one or more processors; and memory storing one or more programs configured to be executed by the one or more processors, the one or more programs including instructions for: detecting that a platform is within a predetermined distance of a location; and in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a system is described. The system comprises: means for detecting that a platform is within a predetermined distance of a location; and means for, in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a computer program product is described. The computer program product comprises one or more programs configured to be executed by one or more processors of a system, the one or more programs including instructions for: detecting that a platform is within a predetermined distance of a location; and in response to detecting that the platform is within the predetermined distance of the location, causing one or more closures of the platform to open with an opening profile based on a set of one or more criteria, including: in accordance with a determination that a first set of one or more criteria is met, causing the one or more closures of the platform to open with a first opening profile; and in accordance with a determination that a second set of one or more criteria is met, different from the first set of one or more criteria, causing the one or more closures of the platform to open with a second opening profile, different from the first opening profile.

In accordance with some embodiments, a method is described. The method comprises: after a user has disembarked a platform: detecting a state of the user relative to the platform; in response to detecting the state of the user: in accordance with a determination that the state of the user meets a set of adjustment criteria, the set of adjustment criteria including a criterion that is met when a distance of the user relative to the platform satisfies a threshold distance, adjusting one or more settings of the platform; and in accordance with a determination that the state of the user does not meet the set of adjustment criteria, forgoing adjusting the one or more settings of the platform.

In accordance with some embodiments, a non-transitory computer-readable storage medium is described. The non-transitory computer-readable storage medium stores one or more programs configured to be executed by one or more processors of a system, the one or more programs including instructions for: after a user has disembarked a platform: detecting a state of the user relative to the platform; in response to detecting the state of the user: in accordance with a determination that the state of the user meets a set of adjustment criteria, the set of adjustment criteria including a criterion that is met when a distance of the user relative to the platform satisfies a threshold distance, adjusting one or more settings of the platform; and in accordance with a determination that the state of the user does not meet the set of adjustment criteria, forgoing adjusting the one or more settings of the platform.

In accordance with some embodiments, a transitory computer-readable storage medium is described. The transitory computer-readable storage medium stores one or more programs configured to be executed by one or more processors of a system, the one or more programs including instructions for: after a user has disembarked a platform: detecting a state of the user relative to the platform; in response to detecting the state of the user: in accordance with a determination that the state of the user meets a set of adjustment criteria, the set of adjustment criteria including a criterion that is met when a distance of the user relative to the platform satisfies a threshold distance, adjusting one or more settings of the platform; and in accordance with a determination that the state of the user does not meet the set of adjustment criteria, forgoing adjusting the one or more settings of the platform.

In accordance with some embodiments, a system is described. The system comprises: one or more processors; and memory storing one or more programs configured to be executed by the one or more processors, the one or more programs including instructions for: after a user has disembarked a platform: detecting a state of the user relative to the platform; in response to detecting the state of the user: in accordance with a determination that the state of the user meets a set of adjustment criteria, the set of adjustment criteria including a criterion that is met when a distance of the user relative to the platform satisfies a threshold distance, adjusting one or more settings of the platform; and in accordance with a determination that the state of the user does not meet the set of adjustment criteria, forgoing adjusting the one or more settings of the platform.

In accordance with some embodiments, a system is described. The system comprises: after a user has disembarked a platform: means for detecting a state of the user relative to the platform; means for in response to detecting the state of the user: means for in accordance with a determination that the state of the user meets a set of adjustment criteria, the set of adjustment criteria including a criterion that is met when a distance of the user relative to the platform satisfies a threshold distance, adjusting one or more settings of the platform; and means for in accordance with a determination that the state of the user does not meet the set of adjustment criteria, forgoing adjusting the one or more settings of the platform.

In accordance with some embodiments, a computer program product is described. The computer program product comprises one or more programs configured to be executed by one or more processors of a system, the one or more programs including instructions for: after a user has disembarked a platform: detecting a state of the user relative to the platform; in response to detecting the state of the user: in accordance with a determination that the state of the user meets a set of adjustment criteria, the set of adjustment criteria including a criterion that is met when a distance of the user relative to the platform satisfies a threshold distance, adjusting one or more settings of the platform; and in accordance with a determination that the state of the user does not meet the set of adjustment criteria, forgoing adjusting the one or more settings of the platform.

In accordance with some embodiments, a method is described. The method comprises: detecting that a platform has arrived at a drop off location associated with a user; in response to detecting that the platform has arrived at the drop off location: in accordance with a determination that a destination location associated with the user satisfies a set of instruction criteria, providing instructions associated with the destination location, wherein the instructions are provided to a computer system that is separate from the platform; and in accordance with a determination that the destination location associated with the user does not satisfy the set of instruction criteria, forgoing providing the instructions associated with the destination location to the computer system.

In accordance with some embodiments, a non-transitory computer-readable storage medium is described. The non-transitory computer-readable storage medium stores one or more programs configured to be executed by one or more processors of a system, the one or more programs including instructions for: detecting that a platform has arrived at a drop off location associated with a user; in response to detecting that the platform has arrived at the drop off location: in accordance with a determination that a destination location associated with the user satisfies a set of instruction criteria, providing instructions associated with the destination location, wherein the instructions are provided to a computer system that is separate from the platform; and in accordance with a determination that the destination location associated with the user does not satisfy the set of instruction criteria, forgoing providing the instructions associated with the destination location to the computer system.

In accordance with some embodiments, a transitory computer-readable storage medium is described. The transitory computer-readable storage medium stores one or more programs configured to be executed by one or more processors of a system, the one or more programs including instructions for: detecting that a platform has arrived at a drop off location associated with a user; in response to detecting that the platform has arrived at the drop off location: in accordance with a determination that a destination location associated with the user satisfies a set of instruction criteria, providing instructions associated with the destination location, wherein the instructions are provided to a computer system that is separate from the platform; and in accordance with a determination that the destination location associated with the user does not satisfy the set of instruction criteria, forgoing providing the instructions associated with the destination location to the computer system.

In accordance with some embodiments, a system is described. The system comprises: one or more processors; and memory storing one or more programs configured to be executed by the one or more processors, the one or more programs including instructions for: detecting that a platform has arrived at a drop off location associated with a user; in response to detecting that the platform has arrived at the drop off location: in accordance with a determination that a destination location associated with the user satisfies a set of instruction criteria, providing instructions associated with the destination location, wherein the instructions are provided to a computer system that is separate from the platform; and in accordance with a determination that the destination location associated with the user does not satisfy the set of instruction criteria, forgoing providing the instructions associated with the destination location to the computer system.

In accordance with some embodiments, a system is described. The system comprises: means for detecting that a platform has arrived at a drop off location associated with a user; means for in response to detecting that the platform has arrived at the drop off location: means for in accordance with a determination that a destination location associated with the user satisfies a set of instruction criteria, providing instructions associated with the destination location, wherein the instructions are provided to a computer system that is separate from the platform; and means for in accordance with a determination that the destination location associated with the user does not satisfy the set of instruction criteria, forgoing providing the instructions associated with the destination location to the computer system.

In accordance with some embodiments, a computer program product is described. The computer program product comprises one or more programs configured to be executed by one or more processors of a system, the one or more programs including instructions for: detecting that a platform has arrived at a drop off location associated with a user; in response to detecting that the platform has arrived at the drop off location: in accordance with a determination that a destination location associated with the user satisfies a set of instruction criteria, providing instructions associated with the destination location, wherein the instructions are provided to a computer system that is separate from the platform; and in accordance with a determination that the destination location associated with the user does not satisfy the set of instruction criteria, forgoing providing the instructions associated with the destination location to the computer system.

In accordance with some embodiments, a method is described. The method comprises: after a platform has completed a drop off action: detecting a status of the platform; in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; receiving a request to provide a current status of the platform to the computer system; and in response to receiving the request to provide the current status of the platform, causing delivery of the current status of the platform to the computer system.

In accordance with some embodiments, a non-transitory computer-readable storage medium is described. The non-transitory computer-readable storage medium stores one or more programs configured to be executed by one or more processors of a system, the one or more programs including instructions for: after a platform has completed a drop off action: detecting a status of the platform; in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; receiving a request to provide a current status of the platform to the computer system; and in response to receiving the request to provide the current status of the platform, causing delivery of the current status of the platform to the computer system.

In accordance with some embodiments, a transitory computer-readable storage medium is described. The transitory computer-readable storage medium stores one or more programs configured to be executed by one or more processors of a system, the one or more programs including instructions for: after a platform has completed a drop off action: detecting a status of the platform; in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; receiving a request to provide a current status of the platform to the computer system; and in response to receiving the request to provide the current status of the platform, causing delivery of the current status of the platform to the computer system.

In accordance with some embodiments, a system is described. The system comprises: one or more processors; and memory storing one or more programs configured to be executed by the one or more processors, the one or more programs including instructions for: after a platform has completed a drop off action: detecting a status of the platform; in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; receiving a request to provide a current status of the platform to the computer system; and in response to receiving the request to provide the current status of the platform, causing delivery of the current status of the platform to the computer system.

In accordance with some embodiments, a system is described. The system comprises: after a platform has completed a drop off action: means for detecting a status of the platform; means for in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; means for receiving a request to provide a current status of the platform to the computer system; and means for in response to receiving the request to provide the current status of the platform, causing delivery of the current status of the platform to the computer system.

In accordance with some embodiments, a computer program product is described. The computer program product comprises one or more programs configured to be executed by one or more processors of a system, the one or more programs including instructions for: after a platform has completed a drop off action: detecting a status of the platform; in response to detecting the status of the platform: in accordance with a determination that the status of the platform satisfies a set of atypical status criteria, causing delivery of a notification to a computer system of a person associated with the drop off action, wherein the notification includes content that is based on the status of the platform; and in accordance with a determination that the status of the platform does not satisfy the set of atypical status criteria, forgoing causing delivery of the notification; receiving a request to provide a current status of the platform to the system; and in response to receiving the request to provide the current status of the platform, causing delivery of the current status of the platform to the system.

In some embodiments, executable instructions for performing these functions are included in a non-transitory computer-readable storage medium or other computer program product configured for execution by one or more processors. In some embodiments, executable instructions for performing these functions are included in a transitory computer-readable storage medium or other computer program product configured for execution by one or more processors.

BRIEF DESCRIPTION OF THE FIGURES

To better understand the various described embodiments, reference should be made to the Description of Embodiments below, along with the following drawings in which like reference numerals refer to corresponding parts throughout the figures.

DESCRIPTION OF EMBODIMENTS

The following description sets forth exemplary methods, parameters, and the like. However, such description is not intended as a limitation on the scope of the present disclosure but is instead provided as a description of exemplary embodiments.

Although the following description uses terms "first," "second," etc. to describe various elements, these elements should not be limited by the terms. In some embodiments, these terms are used to distinguish one element from another. For example, a first item could be termed a second item, and, similarly, a second item could be termed a first item, without departing from the scope of the various described embodiments. In some embodiments, the first item and the second item are two separate references to the same item. In some embodiments, the first item and the second item are both the same type of item, but they are not the same item.

The terminology used in the description of the various described embodiments herein is for the purpose of describing particular embodiments only and is not intended to be limiting. The singular forms "a," "an," and "the" are intended to include the plural forms as well, unless the context clearly indicates otherwise. The term "and/or" refers to and encompasses any and all possible combinations of one or more of the associated listed items. The terms "includes," "including," "comprises," and/or "comprising" specify the presence of stated features, steps, operations, elements, and/or components, but do not preclude the presence or addition of one or more other features, steps, operations, elements, components, and/or groups thereof.

Figure 1A:
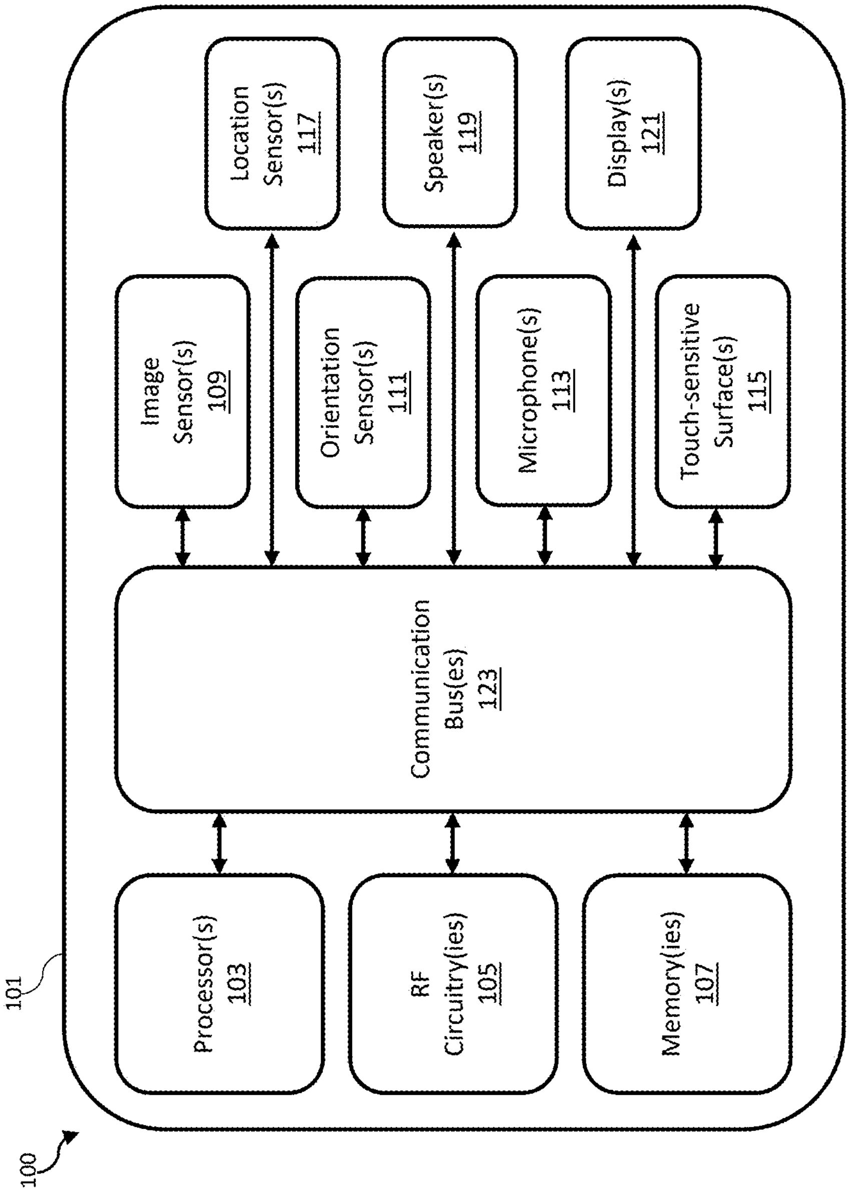
FIG. 1A illustrates an example system for implementing the techniques described herein.

FIG. 1A illustrates an example system 100 for implementing the techniques described herein. System 100 can perform any of the methods described in FIGS. 3, 5, 7, 9, 11, 13, 15, 17, 19, 21, 23, 25, 27, 29, 31, and/or 33 (e.g., methods 300, 500, 700, 900, 1100, 1300, 1500, 1700, 1900, 2100, 2300, 2500, 2700, 2900, 3100, and/or 3100) or portions thereof.

In FIG. 1A, system 100 includes device 101. Device 101 includes various components, such as processor(s) 103, RF circuitry(ies) 105, memory(ies) 107, image sensor(s) 109, orientation sensor(s) 110, microphone(s) 113, location sensor(s) 117, speaker(s) 119, display(s) 121, and touch-sensitive surface(s) 115. These components optionally communicate over communication bus(es) 123 of device 101. In some embodiments, system 100 includes two or more devices that include some or all of the features of device 101.

In some embodiments, system 100 and/or device 101 is a desktop computer, embedded computer, and/or a server. In some embodiments, system 100 and/or device 101 is a mobile device such as, e.g., a smartphone, smartwatch, laptop computer, and/or tablet computer. In some embodiments, system 100 is a head-mounted display (HMD) device. In some embodiments, system 100 and/or device 101 is a wearable HUD device.

Processor(s) 103 include one or more general processors, one or more graphics processors, and/or one or more digital signal processors. In some embodiments, memory(ies) 107 are one or more non-transitory computer-readable storage mediums (e.g., flash memory and/or random access memory) that store computer-readable instructions configured to be executed by processor(s) 103 to perform the techniques described herein.

RF circuitry(ies) 105 optionally include circuitry for communicating with electronic devices, networks, such as the Internet, intranets, and/or a wireless network, such as cellular networks and wireless local area networks (LANs). RF circuitry(ies) 105 optionally includes circuitry for communicating using near-field communication and/or short-range communication, such as Bluetooth®.

In some embodiments, display(s) 121 include one or more monitors, projectors, and/or screens. In some embodiments, display(s) 121 include a first display for displaying images to a first eye of the user and a second display for displaying images to a second eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 121 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 and/or device 101 includes touch-sensitive surface(s) 115 for receiving user inputs, such as tap inputs and swipe inputs. In some embodiments, display(s) 121 and touch-sensitive surface(s) 115 form touch-sensitive display(s).

Image sensor(s) 109 optionally include one or more visible light image sensor, such as charged coupled device (CCD) sensors, and/or complementary metal-oxide-semiconductor (CMOS) sensors operable to obtain images of physical objects. Image sensor(s) also optionally include one or more infrared (IR) sensor(s), such as a passive IR sensor or an active IR sensor, for detecting infrared light. For example, an active IR sensor includes an IR emitter, such as an IR dot emitter, for emitting infrared light. Image sensor(s) 109 also optionally include one or more camera(s) configured to capture movement of physical objects. Image sensor(s) 109 also optionally include one or more depth sensor(s) configured to detect the distance of physical objects from system 100. In some embodiments, system 100 uses CCD sensors, cameras, and depth sensors in combination to detect the physical environment around system 100. In some embodiments, image sensor(s) 109 include a first image sensor and a second image sensor. In some embodiments, system 100 uses image sensor(s) 109 to receive user inputs, such as hand gestures. In some embodiments, system 100 uses image sensor(s) 109 to detect the position and orientation of system 100 in the physical environment.

In some embodiments, system 100 and/or device 101 uses microphone(s) 113 to detect sound from the user and/or the physical environment of the user. In some embodiments, microphone(s) 113 includes an array of microphones (including a plurality of microphones) that optionally operate in tandem, such as to identify ambient noise or to locate the source of sound in space of the physical environment.

In some embodiments, system 100 and/or device 101 uses orientation sensor(s) 111 for detecting orientation and/or movement of system 100. For example, system 100 can use orientation sensor(s) 111 to track changes in the position and/or orientation of system 100, such as with respect to physical objects in the physical environment. Orientation sensor(s) 111 optionally include one or more gyroscopes, one or more inertial measurement units, and/or one or more accelerometers.

Figure 1B:
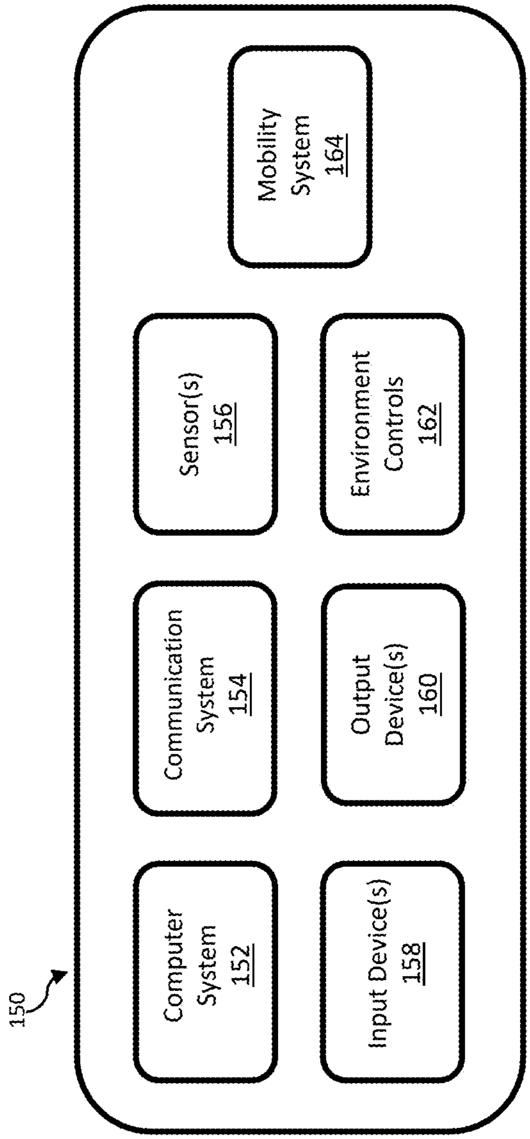
FIG. 1B illustrates an example platform for implementing the techniques described herein.

FIG. 1B illustrates an example platform in accordance with some embodiments. In some embodiments, the processes described with reference to FIGS. 3, 5, 7, 9, 11, 13, 15, 17, 19, 21, 23, 25, 27, 29, 31, and/or 33 are performed by or using platform 150.

Platform 150 includes computer system 152, communication system 154, sensor(s) 156, input device(s) 158, output device(s) 160, environment controls 162, and mobility system 164. In some embodiments, some of these elements are omitted from platform 150. In some embodiments, platform 150 includes additional elements.

In some embodiments, platform 150 is a mobile platform such as, e.g., a vehicle, car, bus, truck, train, bike, motorcycle, boat, plane, golf cart, and/or all-terrain vehicle (ATV), or other mobile vehicle. In some embodiments, platform 150 is semi-autonomous or completely autonomous (e.g., partially autonomous, conditionally autonomous, highly autonomous, or fully autonomous). In some embodiments, platform 150 includes a home automation platform and/or a smart home platform that controls one or more functions and/or characteristics of a home, a house, and/or a building.

In some embodiments, platform 150 includes an interior portion (e.g., a cabin). In some embodiments, the interior portion is fully or partially enclosed and includes furniture such as, e.g., chairs, benches, tables, and/or armrests. In some embodiments, the furniture is configured to be controlled or actuated autonomously and/or manually (e.g., via computer system 152 and/or input device(s) 158).

In some embodiments, platform 150 includes one or more openings (e.g., doors) that are configured for a person to enter and/or exit (e.g., disembark) the interior portion of platform 150. In some embodiments, platform 150 includes one or more closures or apertures such as, e.g., a hood, trunk, window, and/or other opening that are configured to be opened and closed. In some embodiments, an opening is configured to be controlled or actuated autonomously and/or manually (e.g., via computer system 152 and/or input device(s) 158).

Computer system 152 includes one or more features of system 100 and/or device 101, such as processor(s) 103 and/or memory(ies) 107. In some embodiments, computer system 152 is system 100 or device 101. In some embodiments, computer system 152 includes one or more processors (e.g., processor(s) 103) and memory (e.g., memory(ies) 107). In some embodiments, computer system 152 includes one or more general processors, one or more graphics processors, and/or one or more digital signal processors. In some embodiments, computer system 152 includes one or more non-transitory computer-readable storage mediums (e.g., transitory computer-readable storage mediums, non-transitory computer-readable storage mediums, flash memory, and/or random access memory) that store computer-readable instructions configured to be executed by the one or more processors to perform the techniques described herein.

Communication system 154 includes hardware (e.g., RF circuitry(ies) 105) and/or software that is configured to perform wireless and/or wired communication. In some embodiments, communication system 154 includes hardware and/or software for performing cellular communication, internet communication, near-field communication, Wi-Fi communication, short-range communication (e.g., Bluetooth communication), satellite communication, and/or other types of wireless communication.

Sensor(s) 156 include sensors for detecting various conditions. In some embodiments, sensor(s) 156 include orientation sensors (e.g., orientation sensor(s) 111) for detecting orientation and/or movement of platform 150. For example, platform 150 can use orientation sensors to track changes in the position and/or orientation of platform 150, such as with respect to physical objects in the physical environment. Sensor(s) 156 optionally include one or more gyroscopes, one or more inertial measurement units, and/or one or more accelerometers. Sensor(s) 156 include a global positioning sensor (GPS) for detecting a GPS location of platform 150. Sensor(s) 156 optionally include a radar system, LIDAR system, sonar system, image sensors (e.g., image sensor(s) 109, visible light image sensor(s), and/or infrared sensor(s)), depth sensor(s), rangefinder(s), and/or motion detector(s). Sensor(s) 156 optionally include sensors that are in an interior portion of platform 150 and/or sensors that are on an exterior of platform 150. In some embodiments, platform 150 uses sensor(s) 156 (e.g., interior sensors) to detect a presence and/or state (e.g., location and/or orientation) of a passenger in platform 150. In some embodiments, platform 150 uses sensor(s) 156 (e.g., external sensors) to detect a presence and/or state of an object external to platform 150. In some embodiments, platform 150 uses sensor(s) 156 to receive user inputs, such as hand gestures. In some embodiments, platform 150 uses sensor(s) 156 to detect the position and orientation of platform 150 in the physical environment. In some embodiments, platform 150 uses sensor(s) 156 to navigate platform 150 along a planned route, around obstacles, and/or to a destination location. In some embodiments, sensor(s) 156 include one or more sensors (e.g., biometric sensors) for identifying and/or authenticating a user of platform 150, such as a fingerprint sensor and/or facial recognition sensor.

Input device(s) 158 include one or more mechanical and/or electrical devices for detecting input such as, e.g., buttons, sliders, knobs, switches, remote controls, joysticks, touch-sensitive surfaces, keypads, microphones (e.g., microphone(s) 113), and/or cameras. In some embodiments, platform 150 uses microphones to detect sound from the user and/or the physical environment of the user. In some embodiments, platform 150 includes an array of microphones (including a plurality of microphones) that optionally operate in tandem, such as to identify ambient noise or to locate the source of sound in space (e.g., inside platform 150 and/or outside platform 150). In some embodiments, input device(s) 158 include one or more input devices inside platform 150. In some embodiments, input device(s) 158 include one or more input devices on an exterior of platform 150 (e.g., a touch-sensitive surface and/or keypad).

Output device(s) 160 include one or more devices such as, e.g., display(s), monitor(s), projector(s), speaker(s), light(s), and/or haptic output device(s). In some embodiments, output device(s) 160 include one or more external output devices such as external display screens, external lights, and/or external speakers. In some embodiments, output device(s) 160 include one or more internal output devices (e.g., output devices within an interior portion of platform 150) such as internal display screens, internal lights, and/or internal speakers Environment controls 162 include mechanical and/or electrical systems for monitoring and/or controlling conditions (e.g., climate conditions) of an internal portion (e.g., cabin) of platform 150. Environmental controls 162 optionally include fans, heater(s), air conditioner(s), and/or thermostat(s) for controlling the climate, temperature, humidity, pressure, and/or airflow within the interior portion of platform 150.

Mobility system 164 includes mechanical and/or electrical components that enable platform 150 to move and/or that assist in the movement of platform 150. In some embodiments, mobility system 164 includes a powertrain, a drivetrain, a motor (e.g., an electrical motor), an engine, a power source (e.g., battery (ies)), a transmission, a suspension system, a speed control system, and/or a steering system. In some embodiments, one or more elements of mobility system 164 are configured to be controlled autonomously or manually (e.g., via computer system 152 and/or input device(s) 158).

A passenger typically has to manually adjust features of a platform to their desired setting. In addition, different passengers may prefer different settings for the customizable features, such that a first passenger has to re-adjust the features after a second passenger uses a platform. Further still, passengers have to manually open doors, trunks, hatches, and/or entries of a platform when entering and/or exiting the platform, separately from adjusting the customizable features. Accordingly, a passenger has to spend a certain amount of time to enter a platform and/or configure features of the platform before the passenger can begin travelling.

There is a need for a platform, such as a vehicle, that provides a personalized and synchronized experience for a particular person. For instance, there is a need for a platform that prepares multiple features for a particular person that intends to travel and/or is travelling via the platform. In particular, there is a need for a platform that coordinates an adjustment of interior settings and movement of closures (e.g., doors, trunks, hatches, and/or entries) for a particular person when the platform arrives at a pickup and/or drop off location. In some embodiments, a person is identified and the interior settings and/or closures of the platform are adjusted based on the particular preferences of the user when the platform reaches an arrival location. In some embodiments, adjustment of the interior settings and closures are performed in conjunction with one another so that the person can quickly enter an interior of the platform and begin a trip and/or quickly exit the interior portion of the platform and reach a destination. In some embodiments, when it is determined that a person does not intend to use the platform, the interior settings and/or closures of the platform are not adjusted so as to conserve power of the platform. Thus, a person that intends to use and/or is using the platform obtains a personalized travel experience that reduces loading and/or unloading times and/or increases a level of comfort of the person.

Figure 2A:
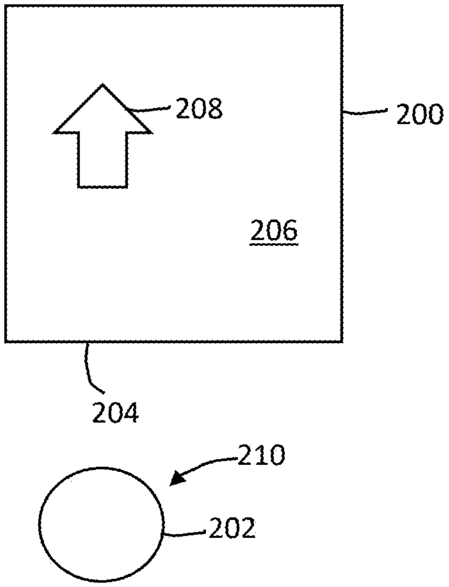
FIGS. 2A-2D illustrate examples of a coordination configuration of features of a platform, in accordance with some embodiments.

Turning now to the drawings, FIG. 2A is a block diagram illustrating platform 200 approaching a pickup location of person 202 so that person 202 can use platform 200 to travel from the pickup location to another location. Platform 200 includes closure 204 (e.g., a door, a hatch, a trunk, and/or an entry), interior portion 206, and configurable elements 208 within interior portion 206. Closure 204 is configured to open and close to provide person 202 access to interior portion 206 of platform 200. In some embodiments, configurable elements 208 include furniture (e.g., seats, benches, tables, armrests, head rests, and/or consoles), lights, speakers, windows, climate control systems, lift systems, and/or suspension systems. At FIG. 2A, closure 204 is in a closed position and configurable elements 208 are in a first state as indicated by no hatching and/or fill within the arrow representing configurable elements 208.

At FIG. 2A, platform 200 identifies person 202 and/or detects location 210 of person 202. In some embodiments, platform 200 includes a computer system that obtains and/or receives information about person 202. For instance, the computer system of platform 200 obtains information about person 202 via an external computer system (e.g., a smart phone, a smart watch, a laptop computer, and/or a tablet computer) that is associated with person 202 (e.g., is in possession of person 202). In some embodiments, the information about person 202 includes location information about person 202 and/or preferences of person 202 related to settings of closure 204 and/or configurable elements 208. As set forth below with reference to FIG. 2B, platform 200 coordinates adjustment of closure 204 and configurable elements 208 based on preferences of person 202 when platform 200 arrives at the pickup location.

In some embodiments, at FIG. 2A, platform 200 outputs an indication, notification, and/or alert that it is safe for person 202 to approach platform 200 while platform 200 is still moving and has not stopped at the pickup location of person 202.

Figure 2B:
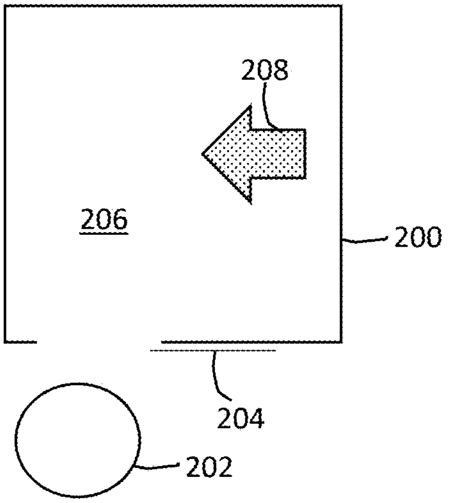

At FIG. 2B, platform 200 has reached the pickup location of person 202. After identifying person 202, platform 200 coordinates adjustment of closure 204 and configurable elements 208. For instance, platform 200 adjusts closure 204 to an open position and adjusts configurable elements 208 to a second state, as indicated by first hatching in the arrow representing configurable elements 208. In some embodiments, platform 200 concurrently adjusts closure 204 to the open position and adjusts configurable elements 208 to the second state.

In some embodiments, platform 200 adjusts closure 204 to the open position and adjusts configurable elements 208 to the second state so that closure 204 reaches the open position and configurable elements 208 reach the second state at the same time. In some embodiments, platform 200 adjusts closure 204 to the open position and adjusts configurable elements 208 to the second state so that closure 204 reaches the open position and configurable elements 208 reach the second state prior to platform 200 coming to a stop at the pickup location. In some embodiments, platform adjusts closure 204 to the open position and configurable elements 208 to the second state so that closure 204 reaches the open position and configurable elements 208 reach the second state before person 202 is within a predetermined distance of platform 200. In some embodiments, platform adjusts closure 204 to the open position and configurable elements 208 to the second state after platform 200 has come to a complete stop at the pickup location and when person 202 is within a predetermined distance of platform 200. In some embodiments, at FIG. 2B, platform 200 outputs an indication, notification, and/or alert that platform 200 recognizes person 202 after platform 200 comes to a stop at the pickup location.

As set forth above, platform 200 adjusts closure 204 to the open position and adjusts configurable elements 208 to the second state based on preferences of person 202. In some embodiments, a speed at which closure 204 is opened, a position of closure 204, and/or a type of closure that is adjusted is based on the user preferences. In some embodiments, the second state of configurable elements 208 corresponds to an ingress state that facilitates an ability of person 202 to enter interior portion 206 of platform 200. In some embodiments, the second state of configurable elements 208 is based on user preferences, such as a preferred position of furniture, a preferred brightness and/or color temperature of lights, a preferred audio output via the speakers, a preferred position, tint, haze, and/or frost of the windows, a preferred climate setting of the climate control system, a preferred height of the interior portion 206 of platform 200 via lift system, and/or a preferred suspension setting of the suspension system. In some embodiments, person 202 has an external computer system in their possession that is currently outputting content, such as a movie, a video, a song, and/or a podcast. In some embodiments, when adjusting configurable elements 208 to the second state, platform 200 causes audio output associated with the content to transition from being output by the external computer system to being output via a speaker of interior portion 206 of platform 200.

Figure 2C:
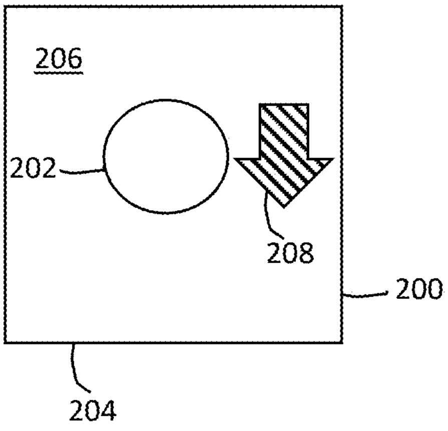

At FIG. 2C, person 202 is positioned within interior portion 206 of platform 200. After person 202 is positioned within interior portion 206 of platform 200, platform 200 adjusts closure 204 to the closed position and adjusts configurable elements 208 to a third state, as indicated by second hatching of the arrow representing configurable elements 208. As set forth above, platform coordinates adjustment of closure 204 and adjustment of configurable elements 208 so that closure 204 is adjusted to the closed position and configurable elements 208 are adjusted to the third state in conjunction with one another. Accordingly, platform 200 prepares closure 204 and configurable elements 208 so that platform 200 can transport person 202 to a drop off location after person 202 is positioned within interior portion 206.

In some embodiments, the third state of configurable elements 208 corresponds to a travel state that increases the comfort of person 202 while platform 200 moves from the pickup location to the drop off location. In some embodiments, the third state of configurable elements 208 is based on user preferences.

Figure 2D:
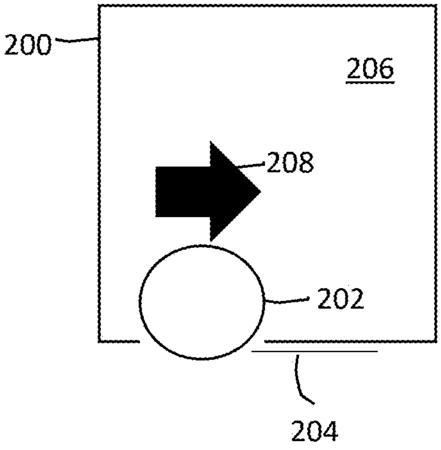

At FIG. 2D, platform 200 has reached and/or arrived at the drop off location. After platform 200 reaches the drop off location, platform 200 adjusts closure 204 to the open position and adjusts configurable elements 208 to a fourth state, as indicated by a solid fill of the arrow representing configurable elements 208. As set forth above, platform coordinates adjustment of closure 204 and configurable elements 208 so that closure 204 is adjusted to the open position and configurable elements 208 are adjusted to the fourth state in conjunction with one another. Thus, platform 200 prepares closure 204 and configurable elements 208 so that person 202 can exit interior portion 206 of platform 200 and move toward a destination of person 202. In some embodiments, the fourth state of configurable elements 208 corresponds to an egress state that facilitates an ability of person 202 to exit interior portion 206 of platform 200. In some embodiments, the fourth state of configurable elements 208 is based on user preferences.

In some embodiments, platform 200 moves closure 204 between positions and adjusts configurable elements 208 between states when platform 200 arrives at staging location, such as a location where platform 200 temporarily stops before proceeding to arrive at the pickup location and/or the drop off location. In some embodiments, platform 200 moves closure 204 between positions and adjusts configurable elements 208 between states based on an arrival location, such as based on attributes and/or characteristics about an environment of the arrival location, in addition to and/or in lieu of preferences of person 202. In some embodiments, platform 200 moves closure 204 between positions and adjusts configurable elements 208 between states based on a relative position of person 202 and platform 200 and/or based on motion between person 202 and platform 200 (e.g., when person 202 is walking toward platform 200 and/or when platform is moving toward a current position of person 202). In some embodiments, platform 200 moves closure 204 between positions and adjusts configurable elements 208 between states based on an activity of person 202, such as whether person is interacting with an external computer system, and/or based on a detected gaze of person 202.

In some embodiments, platform 200 moves closure 204 between positions at a speed that is based on a velocity of platform 200. For instance, in some embodiments, platform 200 adjusts closure 204 from a closed position to an open position at a first velocity that is of the same magnitude as, but in an opposite direction of, a second velocity at which platform 200 is moving toward an arrival location. In some embodiments, platform 200 adjusts closure 204 from a first position to a second position at a speed that is based on a location of person 202.

In some embodiments, one or more additional people are positioned within interior portion 206 of platform 200 when platform 200 arrives at the pickup location of person 202. In some embodiments, one or more additional people and person 202 intend to enter interior portion 206 of platform 200 at the pickup location. In some embodiments, platform 200 moves closure 204 between positions and adjusts configurable elements 208 between states based on the number of people positioned within interior portion 206 and/or based on the number of people intending to enter and/or exit interior portion 206 of platform 200.

In some embodiments, person 202 does not intend to enter interior portion 206 of platform 200 when platform 200 approaches and/or is at an arrival location. For instance, when platform 200 is parked in a garage and/or driveway of a home of person 202 and person 202 walks by platform 200, person 202 may be taking out the garbage and not intending to use platform 200 to take a trip. Accordingly, platform 200 may forgo moving closure 204 between positions and forgo adjusting configurable elements 208 between states when a set of criteria is satisfied.

In some embodiments, the set of criteria includes platform 200 being located within a geo-fenced and/or user-designated area that is indicative of person 202 not intending to enter interior portion 206 of platform 200. For instance, a garage and/or driveway of the home of person 202 may be geo-fenced and/or designated as a location in which platform 200 does not move closure 204 and/or adjust configurable elements 208. In some embodiments, the set of criteria includes a calendar associated with person 202 and indicating that person 202 is already at a scheduled location. For instance, in some embodiments, when person 202 walks by platform 200 and person 202 is already at a scheduled location for a meeting, platform forgoes movement of closure 204 and/or adjustment of configurable elements 208. In some embodiments, the set of criteria includes historical information about previous trips taken by person 202, such as timing of past trips, preferences for when to take trips, and/or trips that regularly occur at the same time of day and/or on the same day of the week. In some embodiments, the set of criteria includes a setting of platform 200, such as a setting of an application associated with platform, being disabled. For instance, when an adjustment setting is disabled, platform forgoes movement of closure 204 and/or adjustment of configurable elements 208 regardless of whether or not person 202 intends to enter interior portion 206 of platform 200.

Figure 3:
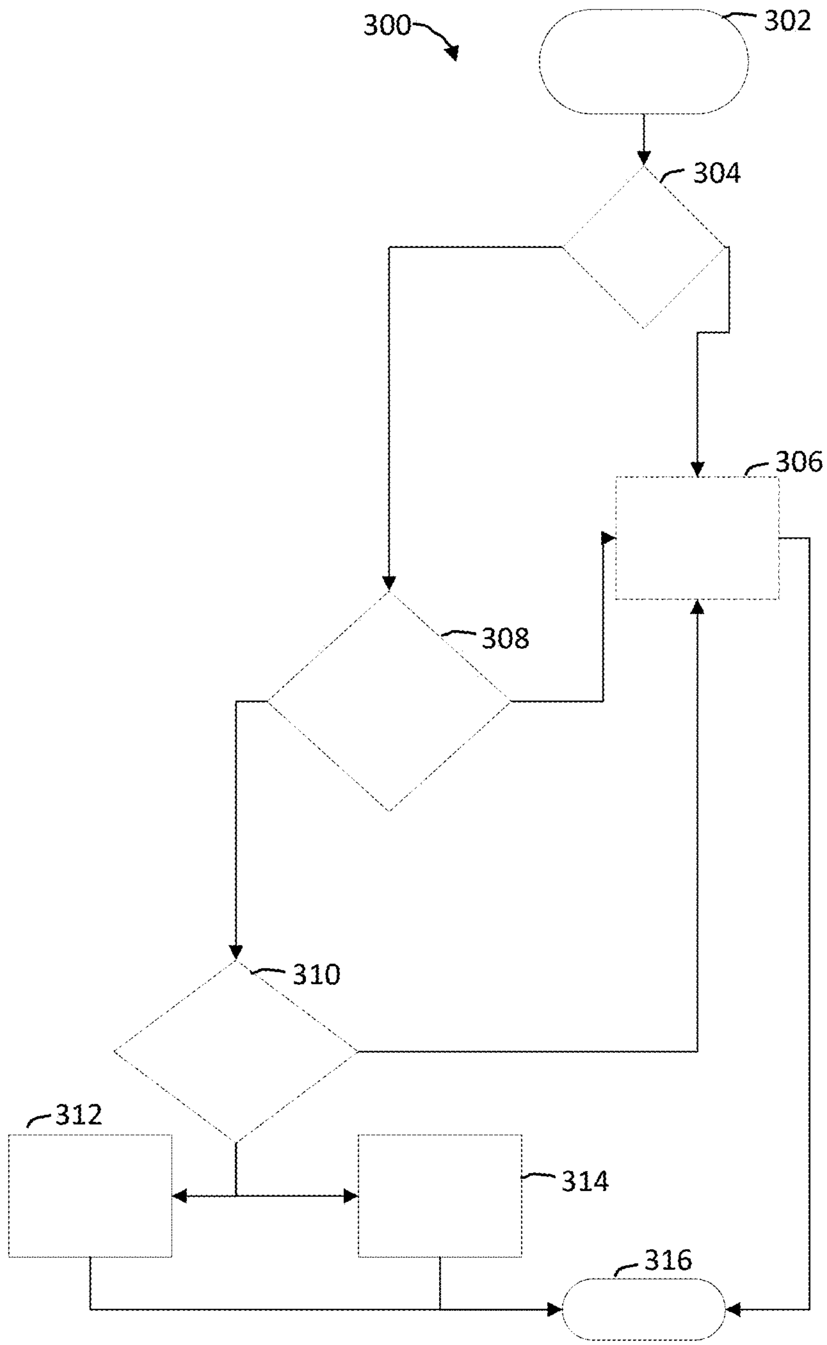
FIG. 3 is a flow diagram illustrating methods for coordinating adjustments of features of a platform, in accordance with some embodiments.

FIG. 3 is a flow diagram illustrating method 300 that can be performed by platform 200 and/or a computer system associated with platform 200. At FIG. 3, platform 200 arrives at an arrival location, such as a pickup location, a drop off location, a staging location, and/or a destination location, as shown at block 302. When platform 200 arrives at the arrival location, a determination is made as to whether a set of criteria is met that would cause platform 200 to forgo adjusting configurable elements 208 and/or moving closure 204.

For instance, at block 304 of FIG. 3, platform 200 and/or a computer system of platform 200 determines whether the arrival location is within a geo-fenced area, such as a predefined area and/or a user-designated area that indicates that person 202 does not intend to take a trip via platform 200. When the arrival location is within a geo-fenced area, platform 200 does not move closure 204 between positions and/or adjust configurable elements 208 between settings, as shown at block 306. When platform 200 does not move closure 204 between positions and/or adjust configurable elements 208 between settings, method 300 ends, as shown at block 316 of FIG. 3.

When the arrival location is not within a geo-fenced area, platform 200 and/or a computer system of platform 200 determines whether information has been obtained that indicates that person 202 is unlikely to take a trip, as shown at block 308 of FIG. 3. As set forth above with reference to FIGS. 2A-2D, the information indicating that person 202 is unlikely to take a trip includes calendar information associated with person 202 and/or historical information about previous trips taken by person 202. When the information indicating that person 202 is unlikely to take the trip has been obtained, platform 200 does not move closure 204 between positions and/or adjust configurable elements 208 between settings, as shown at block 306. When platform 200 does not move closure 204 between positions and/or adjust configurable elements 208 between settings, method 300 ends, as shown at block 316 of FIG. 3.

When the information indicating that person 202 is unlikely to take the trip has not been obtained, platform 200 and/or a computer system of platform determines whether an adjustment setting is enabled, as shown at block [210] 310 of FIG. 3. In some embodiments, the adjustment setting can be enabled and/or disabled via an application associated with platform 202. In some embodiments, the adjustment setting enables platform 200 to coordinate movement of closure 204 between positions and adjustment of configurable elements 208 between settings when platform 200 approaches and/or arrives at the arrival location and without additional user input. When the adjustment setting is not enabled, platform 200 does not move closure 204 between positions and/or adjust configurable elements 208 between settings, as shown at block 306. When platform 200 does not move closure 204 between positions and/or adjust configurable elements 208 between settings, method 300 ends, as shown at block 316 of FIG. 3.

When the adjustment setting is enabled, closure 204 is moved from a first position to a second position, as shown at block 312 of FIG. 3, and configurable elements 208 are adjusted from a first state to a second state, as shown at block 314 of FIG. 3. As set forth above, platform 200 coordinates movement of closure 204 and adjustment of configurable elements 208 so that movement of closure 204 and adjustment of configurable elements 208 happen concurrently and/or in conjunction with one another. In some embodiments, coordination of movement of closure 204 and adjustment of configurable elements 208 includes closure 204 reaching the second position and configurable elements reaching the second state at the same time. After closure 204 is moved to the second position and after configurable elements 208 are adjusted to the second state, method 300 ends, as shown at block 316 of FIG. 3.

A system (e.g., 100 and/or 152) associated with a platform (e.g., 150 and/or 200) is configured to perform a method in accordance with some embodiments. The system (e.g., 100 and/or 152) detects, via a location detection system (e.g., a Global Positioning System (GPS), a magnetometer, Ultra Wideband technology, and/or a global navigation satellite system), that a platform (e.g., 150 and/or 200) (e.g., a physical platform, a virtual platform, a simulated platform, a mobile platform, and/or a vehicle) (in some embodiments, the platform is controlled by and/or otherwise in communication with a computer system (e.g., 100), such as a smartphone, a tablet, a watch, and/or a vehicle computer system) is at a first destination location (e.g., a location associated with dropping off and/or picking up a person).

In response to detecting that the platform (e.g., 150 and/or 200) is at the first destination location, the system (e.g., 100 and/or 152) initiates a coordinated re-configuration of the platform (e.g., a synchronized and/or timed sequence of events that occur concurrently and/or in a predetermined sequential order (e.g., events occur one at a time or events overlap with one another) when the platform is at the first destination location) that is based on (e.g., the coordinated re-configuration includes moving and/or adjusting different components of the platform based on one or more factors and/or the coordinated re-configuration includes different timings and/or sequences for moving and/or adjusting components of the platform based on the one or more factors) a set of one or more factors (e.g., the coordinated re-configuration includes a sequence of events that is based on whether the first destination location is associated with dropping off a person or picking up a person, based on whether a person to be picked up is at the first destination location, and/or based on whether attributes and/or characteristics of the first destination location (e.g., a curb height in an environment at the first destination location, a number of people in the environment at the first destination location, weather in the environment at the first destination location, and/or other platforms within the environment at the first destination location) indicate that is safe for the person to enter and/or exit the interior portion of the platform).

The coordinated re-configuration of the platform (e.g., 150 and/or 200) includes moving (or causing to be moved) one or more actuatable closures (e.g., 204) (e.g., one or more doors, hatches, and/or trunks that enable a person to access, enter, and/or exit an interior portion of the platform, where the one or more doors, hatches, and/or trunks are configured to be opened and/or closed at variable speeds and/or amounts in response to receiving communications (e.g., from the computer system of the platform)) of the platform (e.g., 150 and/or 200) to a first position (e.g., sending and/or transmitting a communication (e.g., via a computer system of the platform) to an actuator of the actuatable closure to cause the actuator to open or close the actuatable closure).

The coordinated re-configuration of the platform (e.g., 150 and/or 200) further includes adjusting (e.g., sending and/or transmitting a communication (e.g., via a computer system of the platform) to one or more external computer systems associated with the one or more configurable elements that cause the one or more configurable elements to operate in a first state) one or more configurable elements (e.g., 208) (e.g., one or more lights, one or more speakers, one or more actuatable windows, one or more actuatable pieces of furniture (such as seats and/or tables), one or more climate systems, one or more display generation components, and/or one or more input devices) of an interior portion (e.g., 206) (e.g., a cabin and/or interior area of the platform that is configured to be occupied by one or more people) of the platform (e.g., 150 and/or 200) to a first state (e.g., a first brightness of the one or more lights, a first color temperature of the one or more lights, a first audio output via the one or more speakers, a first volume level of audio output via the one or more speakers, a first position of the one or more actuatable windows, a first opacity of the one or more actuatable windows, a first position of the one or more actuatable pieces of furniture, a first climate setting of the one or more climate systems, and/or a first user interface and/or media item displayed on the one or more display generation components).

In some embodiments, the first destination location includes a pickup location (e.g., a location at which a person associated with the platform is expected, predicted, and/or determined to enter into an interior portion of the platform) of a person (e.g., 202) (e.g., a rider, a user, and/or a passenger) associated with the platform (e.g., 150 and/or 200).

In some examples the first destination location includes a stopping location (e.g., a location at which a person associated with the platform is expected, predicted, and/or determined to exit the interior portion of the platform, a location at which the person associated with the platform requested to stop temporarily (such as a drive-through), and/or a location at which another person associated with the platform is expected, predicted, and/or determined to enter and/or exit the interior portion of the platform) of the platform (e.g., 150 and/or 200).

In some embodiments, the first destination location includes a temporary stopping location (e.g., a location at which the platform temporarily and/or momentarily stops and/or parks before proceeding to a second destination location at which one or more persons associated with the platform are expected, predicted, and/or determined to enter and/or exit the interior portion of the platform) of the platform (e.g., 150 and/or 200).

In some embodiments, the set of one or more factors includes a first factor indicative of a characteristic (e.g., an identity of a person associated with the platform and/or a profile and/or user account associated with a person, where the profile and/or user account includes one or more user preference settings, accessibility settings, schedule information associated with the person, and/or historical information for previous rides, trips, and/or preferences of the person) of a person (e.g., 202) associated with the platform (e.g., 150 and/or 200). In some embodiments, a first actuatable closure (e.g., 204) of the one or more actuatable closures is moved to the first position, the one or more adjustable closures are moved to the first position at a first speed, and/or the first position of the one or more adjustable closures are based on the characteristic of the person (e.g., 202) associated with the platform (e.g., 150 and/or 200). In some embodiments, a first configurable element of the one or more configurable elements (e.g., 208) is adjusted to the first state and/or the first state of the one or more configurable elements (e.g., 208) is based on the characteristic of the person (e.g., 202) associated with the platform (e.g., 150 and/or 200).

In some embodiments, the set of one or more factors includes a second factor indicative of an environment (e.g., attributes and/or characteristics of the environment that surrounds and/or includes the first destination location, such as curb height, obstructions, an amount of traffic, a number of people located in the environment, weather, and/or proximity of the first destination location relative to a structure and/or building) of (e.g., an environment that includes) the first destination location. In some embodiments, a first actuatable closure (e.g., 204) of the one or more actuatable closures is moved to the first position, the one or more adjustable closures are moved to the first position at a first speed, and/or the first position of the one or more adjustable closures are based on the environment of the first destination location. In some embodiments, a first configurable element of the one or more configurable elements (e.g., 208) is adjusted to the first state and/or the first state of the one or more configurable elements (e.g., 208) is based on the environment of the first destination location.

In some embodiments, the set of one or more factors includes a third factor indicative of a first position profile (e.g., a first location, a first speed and/or velocity of the platform, a first estimated location based on the first speed and/or velocity of the platform, a first estimated location based on attributes and/or features of an environment that includes the first destination location) of the platform (e.g., 150 and/or 200) relative to a second position profile (e.g., a second location, a first speed and/or velocity (e.g., walking speed and/or velocity and/or running speed and/or velocity) of the person associated with the platform, a first stride length of the person associated with the platform (such as a stride length determined based on a height of the person, historical information associated with the person, and/or a number of steps of the person to travel (e.g., walk and/or run) a predetermined distance), and/or a first trajectory and/or approach angle of the person associated with the platform) of a person (e.g., 202) (e.g., a rider, a user, and/or a passenger) associated with the platform (e.g., 150 and/or 200). In some embodiments, a first actuatable closure (e.g., 204) of the one or more actuatable closures is moved to the first position, the one or more adjustable closures are moved to the first position at a first speed, and/or the first position of the one or more adjustable closures are based on the first position profile of the platform (e.g., 150 and/or 200) relative to the second position profile of the person (e.g., 202) associated with the platform (e.g., 150 and/or 200). In some embodiments, a first configurable element of the one or more configurable elements (e.g., 208) is adjusted to the first state and/or the first state of the one or more configurable elements (e.g., 208) is based on the first position profile of the platform (e.g., 150 and/or 200) relative to the second position profile of the person (e.g., 202) associated with the platform (e.g., 150 and/or 200).

In some embodiments, the first position profile of the platform (e.g., 150 and/or 200) includes a velocity of the platform (e.g., 150 and/or 200) (e.g., a vector that includes a speed and a direction of travel associated with the platform) and moving the one or more actuatable closures (e.g., 204) to the first position includes moving the one or more actuatable closures (e.g., 204) to the first position using a first motion profile (e.g., a variable speed, a variable velocity, a constant speed, a constant velocity, and/or a first set of one or more speeds and/or velocities at which at the one or more actuatable closures are moved toward the first position) that is based on the velocity of the platform (e.g., the first motion profile includes a velocity that is proportionate to the velocity of the platform, the first motion profile includes a velocity that matches the velocity of the platform, and/or the first motion profile includes a velocity that is in an opposite direction as the velocity of the platform).

In some embodiments, the second position profile of the user (e.g., 202) associated with the platform (e.g., 150 and/or 200) includes a first location of the person (e.g., 150 and/or 200) (e.g., an actual, estimated, and/or determined position of the person relative to the platform and/or relative to the first destination location) and moving the one or more actuatable closures (e.g., 204) to the first position includes moving the one or more actuatable closures (e.g., 204) to the first position using a second motion profile (e.g., a variable speed, a variable velocity, a constant speed, a constant velocity, and/or a second set of one or more speeds and/or velocities at which at the one or more actuatable closures are moved toward the first position) that is based on the first location of the person (e.g., 202) (e.g., the speed of movement, the velocity of movement, which actuatable closures of the one or more actuatable closures, and/or the first position is based on the first location of the person). In some embodiments, the first location of the person is determined based on location information associated with the person, such as a precise location of the person that is determined using one or more Bluetooth signals transmitted between electronic devices. In some embodiments, the one or more actuatable closures are moved at a faster speed and/or velocity when the first location of the person is closer to the platform as compared to when the first location of the person is further away from the platform. In some embodiments, the one or more actuatable closures are moved at a faster speed and/or velocity when the first location of the person is closer to the first destination location as compared to when the first location of the person is further away from the first destination location. In some embodiments, a first actuatable closure of the one or more actuatable closures that is positioned closest to the first location of the person is moved to the first position based on the first location of the person.

In some embodiments, the set of one or more factors includes a fourth factor indicative of an activity (e.g., a detected, estimated, and/or determined activity being performed by a person, such as the person using and/or interacting with an external device (such as a smart phone, a smart watch, a laptop computer, and/or a tablet computer) and/or the person paying attention to their surroundings (such as based on a gaze of the person)) of a person (e.g., 202) (e.g., a rider, a user, and/or a passenger) associated with the platform (e.g., 150 and/or 200). In some embodiments, a first actuatable closure of the one or more actuatable closures is moved to the first position, the one or more adjustable closures are moved to the first position at a first speed, and/or the first position of the one or more adjustable closures are based on the activity of the person associated with the platform. In some embodiments, a first configurable element of the one or more configurable elements is adjusted to the first state and/or the first state of the one or more configurable elements is based on the activity of the person associated with the platform.

In some embodiments, the set of one or more factors includes a fifth factor indicative of a number of people (e.g., a number of people (such as riders, users, and/or passengers) that are estimated, expected, detected, and/or determined to be present within, entering, and/or exiting the interior portion of the platform) associated with the platform (e.g., 150 and/or 200). In some embodiments, a first actuatable closure of the one or more actuatable closures is moved to the first position, the one or more adjustable closures are moved to the first position at a first speed, and/or the first position of the one or more adjustable closures are based on the number of people associated with the platform. In some embodiments, a first configurable element of the one or more configurable elements is adjusted to the first state and/or the first state of the one or more configurable elements is based on the number of people associated with the platform.

In some embodiments, adjusting the one or more configurable elements (e.g., 208) of the interior portion (e.g., 206) of the platform (e.g., 150 and/or 200) to the first state includes adjusting one or more pieces of furniture (e.g., one or more seats, benches, tables, armrests, consoles, and/or headrests) to a second position (e.g., a position that includes a first amount of reclining, a first amount of firmness, a first amount of height relative to a floor of the interior portion of the platform, a first angle of a seat relative to the floor of the interior portion of the platform, a first temperature setting, a folded and/or collapsed position, and/or an unfolded and/or expanded position).

In some embodiments, adjusting the one or more configurable elements (e.g., 208) of the interior portion (e.g., 206) of the platform (e.g., 150 and/or 200) to the first state includes adjusting one or more lights (e.g., one or more lamps, light bulbs, and/or light emitting diodes) to include a first set of one or more settings (e.g., a first brightness setting, a first color temperature setting, and/or an on or off setting).

In some embodiments, adjusting the one or more configurable elements (e.g., 208) of the interior portion (e.g., 206) of the platform (e.g., 150 and/or 200) to the first state includes adjusting one or more windows (e.g., one or more openings within a frame of the platform that enable a person positioned within the platform to view an environment surrounding an exterior of the platform) to include a second set of one or more settings (e.g., a first tint and/or opacity, a first haze, a first light diffusion setting, a first amount of frost, and/or a first amount of glaze).

In some embodiments, adjusting the one or more configurable elements (e.g., 208) of the interior portion (e.g., 206) of the platform (e.g., 150 and/or 200) to the first state includes adjusting one or more windows (e.g., one or more openings within a frame of the platform that enable a person positioned within the platform to view an environment surrounding an exterior of the platform) to a third position (e.g., a fully open position, a partially open position, and/or a fully closed position).

In some embodiments, adjusting the one or more configurable elements (e.g., 208) of the interior portion (e.g., 206) of the platform (e.g., 150 and/or 200) to the first state includes adjusting one or more audio output devices (e.g., one or more speakers and/or headsets) to output first audio output (e.g., audio including speech, music, a podcast, audio corresponding to a movie, audio corresponding to a television show, audio corresponding to a multi-media file, audio corresponding to directions and/or a status of a trip and/or route, and/or audio including instructions and/or a prompt to a person positioned within the interior portion of the platform).

In some embodiments, adjusting the one or more audio output devices to output the first audio output includes ceasing (e.g., stopping and/or pausing output of the first audio output via the one or more external audio output devices and/or transitioning output of the first audio output from the one or more external audio output devices to the one or more audio output devices) to cause one or more external audio output devices (e.g., one or more speakers of an external device that is not associated with and/or part of the interior portion of the platform, headphones, and/or headsets) to output the first audio output and causing (e.g., resuming output of the first audio output from a time at which the first audio output ceased to be output via the one or more external audio output devices) the one or more audio output devices to output the first audio output. In some embodiments, an external device associated with the one or more external audio output devices maintains display of content after ceasing to output the first audio output, where the content includes a movie, a video, a television show, and/or a user interface that corresponds to the first audio output.

In some embodiments, adjusting the one or more configurable elements (e.g., 208) of the interior portion (e.g., 206) of the platform (e.g., 150 and/or 200) to the first state includes adjusting a climate control device (e.g., an air conditioning system, a heating system, a ventilation system, a fan, a furniture heating system, a furniture cooling system, a surface heating system, and/or a surface cooling system) to a operate in a first mode (e.g., control a temperature of the interior portion of the platform to a first temperature, a first fan speed, a first amount of air flow circulation through the interior portion of the platform, a first amount of heating and/or cooling supplied to one or more pieces of furniture of the interior portion of the platform, and/or a first amount of heating and/or cooling supplied to one or more surfaces of the interior portion of the platform).

In some embodiments, the coordinated re-configuration of the platform (e.g., 150 and/or 200) includes adjusting a lift system (e.g., an actuator configured to change a height of a step and/or entryway providing access to the interior portion of the platform relative to a base (such as tires, a frame, and/or a chassis) of the platform) of the platform (e.g., 150 and/or 200) so that the platform (e.g., 150 and/or 200) (e.g., a step and/or entryway providing access to the interior portion of the platform) is at a first height (e.g., a first distance away from) relative to a feature (e.g., a surface, ground, a curb, and/or a step) of the first destination location.

In some embodiments, the coordinated re-configuration of the platform includes adjusting a suspension system (e.g., one or more tires, shock absorbers, and/or linkages that connect a frame of the interior portion of the platform to wheels of the platform) of the platform (e.g., 150 and/or 200) to a first suspension setting (e.g., a first stiffness, softness, and/or amount of resistance applied to the suspension system).

In some embodiments, the coordinated re-configuration of the platform includes moving the one or more actuatable closures (e.g., 204) to the first position so that the one or more actuatable closures (e.g., 204) reach the first position at a first time (e.g., the one or more actuatable closures stop moving and are positioned at the first position at the first time) and adjusting the one or more configurable elements of the interior portion of the platform to the first state so that the one or more configurable elements of the interior portion of the platform reach the first state at the first time (e.g., the one or more configurable elements of the interior portion stop being adjusted and are at the first state at the first time, which is the same time at which the one or more actuatable closures stop moving and are positioned at the first position). In some embodiments, the one or more actuatable closures reach the first position and the one or more configurable elements of the interior portion of the platform reach the first state at the same time. In some embodiments, the one or more actuatable closures begin moving before and/or after beginning to adjust the one or more configurable elements of the interior portion of the platform so that the one or more actuatable closures reach the first position and the one or more configurable elements of the interior portion of the platform reach the first state at the same time.

In some embodiments, adjusting the one or more configurable elements (e.g., 208) of the interior portion (e.g., 206) of the platform (e.g., 150 and/or 200) to the first state includes adjusting the one or more configurable elements (e.g., 208) of the interior portion (e.g., 206) of the platform (e.g., 150 and/or 200) so that the one or more configurable elements (e.g., 208) of the interior portion (e.g., 206) of the platform (e.g., 150 and/or 200) reach the first state (e.g., the one or more configurable elements of the interior portion of the platform are operating in the first state and/or are no longer transitioning and/or being adjusted to the first state) before (e.g., prior to) a person (e.g., 202) (e.g., a rider, a user, and/or a passenger) associated with the platform (e.g., 150 and/or 200) is within a predetermined distance (e.g., a distance that indicates that the person is preparing to enter the interior portion of the platform, such as within 10 feet, within 5 feet, and/or within 3 feet) of the platform (e.g., 150 and/or 200).

In some embodiments, the coordinated re-configuration of the platform (e.g., 150 and/or 200) includes moving the one or more actuatable closures (e.g., 204) to the first position so that the one or more actuatable closures (e.g., 204) reach the first position at a second time (e.g., the one or more actuatable closures stop moving and are positioned at the first position at the second time), wherein the second time occurs before (e.g., prior to) a third time at which the platform (e.g., 150 and/or 200) ceases to move (e.g., the third time is a time at which the platform has come to a complete stop, is not in motion, and/or has been placed into park at the first destination location) and adjusting the one or more configurable elements (e.g., 208) of the interior portion (e.g., 206) of the platform (e.g., 150 and/or 200) to the first state so that the one or more configurable elements (e.g., 208) of the interior portion (e.g., 206) of the platform (e.g., 150 and/or 200) reach the first state at the second time (e.g., the one or more configurable elements of the interior portion stop being adjusted and are at the first state at the second time, which is the same time at which the one or more actuatable closures stop moving and are positioned at the first position).

In some embodiments, in response to detecting that the platform (e.g., 150 and/or 200) is at the first destination location, in accordance with a determination that the platform (e.g., 150 and/or 200) ceases to move (e.g., the platform has come to a complete stop, is not in motion, and/or has been placed into park at the first destination location), and in accordance with a determination that a person (e.g., 202) (e.g., a rider, a user, and/or a passenger) associated with the platform (e.g., 150 and/or 200) is within a predetermined distance of the platform (e.g., 150 and/or 200) (e.g., within 100 feet, within 50 feet, within 40 feet, within 30 feet, within 20 feet, and/or within 10 feet), the system (e.g., 100 and/or 152) initiates the coordinated re-configuration of the platform (e.g., 150 and/or 200) that is based on the set of one or more factors.

In some embodiments, after detecting that the platform (e.g., 150 and/or 200) is at the first destination location, the system (e.g., 100 and/or 152) detects that the platform (e.g., 150 and/or 200) ceases to move (e.g., the platform has come to a complete stop, is not in motion, and/or has been placed into park at the first destination location) and detects that a person (e.g., 202) (e.g., a rider, a user, and/or a passenger) associated with the platform (e.g., 150 and/or 200) is within a predetermined distance of the platform (e.g., 150 and/or 200) (e.g., within 50 feet, within 40 feet, within 30 feet, within 20 feet, and/or within 10 feet). In response to detecting that the platform (e.g., 150 and/or 200) ceases to move and that the person (e.g., 202) associated with the platform (e.g., 150 and/or 200) is within the predetermined distance of the platform (e.g., 150 and/or 200), the system (e.g., 100 and/or 152) outputs (e.g., displaying, providing audio output, activating one or more lights, and/or causing a notification to be output at an external device associated with the person associated with the platform) a first indication (e.g., a displayed notification that includes a symbol, text, and/or images, audio output that includes speech and/or sound, light emitted from a particular lighting device and/or having a predetermined color, and/or a notification provided to an external device associated with the person associated with the platform) that indicates that the platform (e.g., 150 and/or 200) recognizes the person (e.g., 202) associated with the platform (e.g., 150 and/or 200) (e.g., the person associated with the platform is authorized and/or authenticated as a person that can enter the interior portion of the platform and/or otherwise use one or more features of the platform).

In some embodiments, after detecting that the platform (e.g., 150 and/or 200) is at the first destination location and in accordance with a determination that the platform (e.g., 150 and/or 200) is moving (e.g., in motion and/or not at a complete stop) and that a set of one or more safety criteria (e.g., one or more criteria that indicate that is safe for a person associated with the platform to approach and/or enter the interior portion of the platform, such as the first destination location includes less than a predetermined amount of traffic, the platform is approaching a parking spot that is positioned away from traffic, the platform has reached a speed (such as decelerated to a speed) that is safe for the person to approach the platform, and/or an environment that includes the first destination location does not include any hazards that would affect the person approaching the platform) is satisfied, the system (e.g., 100 and/or 152) outputs a second indication (e.g., a displayed notification that includes a symbol, text, and/or images, audio output that includes speech and/or sound, light emitted from a particular lighting device and/or having a predetermined color, and/or a notification provided to an external device associated with the person associated with the platform) that indicates that a person (e.g., 202) associated with the platform (e.g., 150 and/or 200) is safe to approach the platform (e.g., 150 and/or 200).

In some embodiments, in response to detecting that the platform (e.g., 150 and/or 200) is at the first destination location and in accordance with a determination that a set of one or more adjustment criteria (e.g., the first destination location is within a predetermined area that indicates that use of the platform is unlikely, information (such as schedule information, historical information, and/or user preferences) about a person associated with the platform indicates that the person is unlikely to use the platform, and/or an adjustment setting of the platform is disabled) is satisfied, the system (e.g., 100 and/or 152) forgoes initiating (e.g., not initiating) the coordinated re-configuration of the platform (e.g., 150 and/or 200) that is based on the set of one or more factors.

In some embodiments, the set one or more adjustment criteria includes a first criterion that is satisfied when the first destination location is within a predefined area (e.g., a predefined area, such as an area designated by a person associated with the platform, that indicates that the person associated with the platform is unlikely to use the platform). In some embodiments the predefined area is a geo-fenced area and when the platform is located within the geo-fenced area, the platform does not initiate the coordinated re-configuration of the platform. In some embodiments, when the platform is positioned within the geo-fenced area, the platform initiates the coordinated re-configuration of the platform in response to obtaining and/or receiving a request from the person associated with the platform to initiate the coordinated re-configuration of the platform. In some embodiments, the geo-fenced area includes a garage, a driveway, and/or a parking spot located at a home of the person associated with the platform.

In some embodiments, the set one or more adjustment criteria includes a second criterion that is satisfied when calendar information (e.g., information that includes a schedule, timing and/or locations of meetings, and/or timing and/or locations of events) of a person (e.g., 202) (e.g., a rider, a user, and/or a passenger) associated with the platform (e.g., 150 and/or 200) indicates that first destination location corresponds to a scheduled location (e.g., the person associated with the platform is already at a scheduled location, such that the person associated with the platform is unlikely to use the platform).

In some embodiments, the set one or more adjustment criteria includes a third criterion that is satisfied when first information (e.g., information corresponding to preferences of a person associated with the platform (such as trip preferences at predetermined times) and/or historical information corresponding to estimated, learned, and/or predicted trips that the person associated with the platform takes at particular times) corresponding to a person (e.g., a rider, a user, and/or a passenger) associated with the platform (e.g., 150 and/or 200) indicates that the user (e.g., 202) associated with the platform (e.g., 150 and/or 200) is not likely to use the platform (e.g., 150 and/or 200) (e.g., the information indicates that the user is not likely to take a trip with the platform based on previous habits, preferences, and/or trips of the person).

In some embodiments, the set one or more adjustment criteria includes a fourth criterion that is satisfied when an adjustment setting (e.g., a setting that enables the movement of the one or more actuatable closures and/or the adjustment of the one or more configurable elements of the interior portion of the platform automatically when the platform is at the first destination location) of the platform (e.g., 150 and/or 200) is disabled (e.g., turned off, such as via user input).

Existing platforms do not behave in a way that provides an experience that is based on the needs of the passenger. Instead, the passenger must control the platform manually in order to obtain the experience that the passenger intends.

Thus, there is a need for a platform, such as a vehicle, that can provide an experience, such as an experience that simulates an attitude and/or behavior, for a person that is based on the persons' intent. For instance, a person that is late to work may intend to quickly enter and exit an interior portion of the platform and/or travel along the quickest route to their office. In some embodiments, the platform can determine that the person is late to work based on a calendar and/or schedule of the person, messages sent and/or received by the person, prior trips taken by the user that indicate a pattern of use of the platform, location information about the person and/or platform, and/or other contextual information about the person and/or the platform. The platform can therefore simulate an attitude and/or behavior that satisfies the needs of the person using the platform. For instance, when the person is late to work, the platform may rush and/or hurry when picking up, transporting, and/or dropping off the person at a location where the person is employed. In some embodiments, the platform arrives at a fast speed, opens one or more closures of the platform quickly, adjusts configurable elements of the platform within shorter amounts of time, determines a fastest route to a destination, and/or arrives at the destination at a relatively fast speed. As such, the person does not have to manually operate and/or control the platform in order to reach a destination in a manner that is consistent with their intent.

Figure 4A:
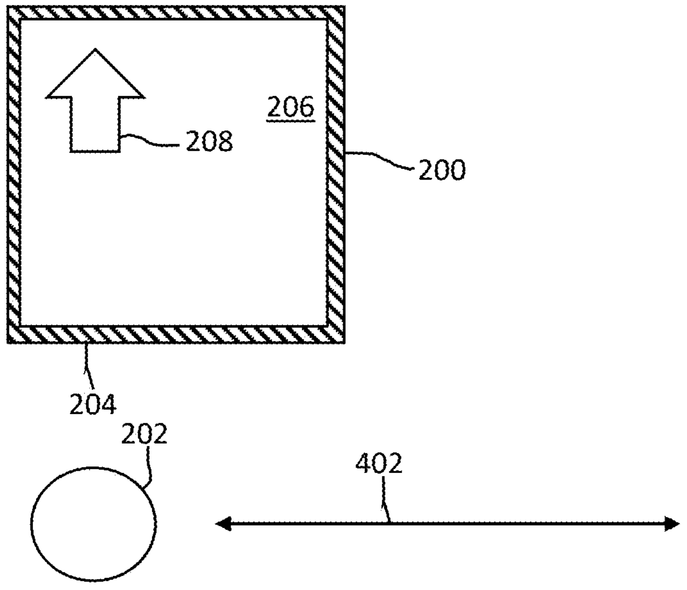
FIGS. 4A-4D illustrate examples of simulating an experience of a platform, in accordance with some embodiments.

Turning now to the drawings, FIG. 4A is a block diagram illustrating platform 200 arriving at a pickup location so that person 202 can use platform 200 to travel to a destination. At FIG. 4A, platform 200 approaches the pickup location in a first state as indicated by first hatching of the outline around platform 200. In some embodiments, platform 200 approaches the pickup location in a default state that does not simulate a particular experience for person 202. In some embodiments, when platform 200 is within a predetermined distance of the pickup location, platform 200 operates to create an experience that simulates an attitude and/or behavior that enables person 202 to reach their destination in an intended manner. In some embodiments, platform 200 determines the simulated experience based on information about person 202 and/or other contextual information. For instance, in some embodiments, platform 200 obtains information about a schedule of person 202, previous trips taken by person 202 using platform 200, a time of day, a day of the week, and/or information about a destination (such as a time at which person 202 should arrive at the destination and/or a distance between the pickup location and the destination).

FIG. 4A illustrates indicator 402 of a first timeline for a trip of platform 200 when picking up person 202. In some embodiments, the simulated behavior and/or attitude of platform 200 is based on the first timeline. At FIG. 4A, indicator 402 is relatively long (e.g., as compared to indicator 404 shown at FIGS. 4C and 4D), such that an overall duration of the trip is relatively lengthy and platform 200 is not in a rush to arrive at a destination. Thus, indicator 402 indicates that platform 200 picks up person 202 in a relaxed and/or clam state.

Figure 4B:
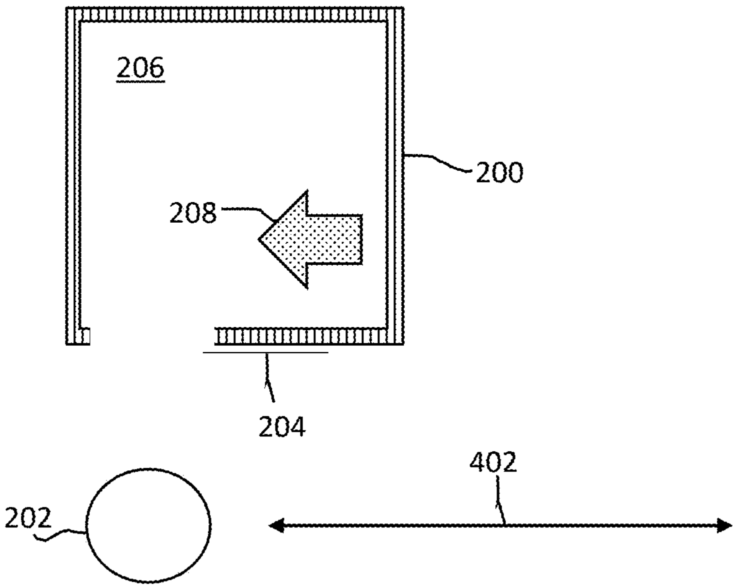

At FIG. 4B, platform 200 arrives at the pickup location in the first simulated state, such as a calm and/or relaxed state, as indicated by second hatching of outline around platform 200. In some embodiments, platform 200 adjusts one or more features of platform 200 to provide a travel experience that enables person 202 to be calm and/or relaxed while traveling from the pickup location to the destination. At FIG. 4B, platform 200 adjusts configurable elements 208 to a first state that is based on the calm and/or relaxed state of platform 200. In some embodiments, platform 200 adjusts configurable elements 208 so that interior portion 206 of platform 200 presents a calm and/or relaxing environment for person 202. In some embodiments, platform 200 adjusts one or more lights to cooler color temperatures and/or to a reduced brightness, adjusts one or more speakers to output calming audio, and/or adjusts one or more windows to increase an opacity, tint, and/or haze. In addition, platform 200 opens closure 204 at a speed, rate, and/or acceleration that indicates and/or allows person 202 to perceive platform 200 as operating in a relaxed and/or calm manner. In some embodiments, platform 200 adjusts closure 204 to the open position at a relatively slow speed, rate, and/or acceleration to signal to person 202 that platform 200 is not in a rush.

In some embodiments, after person 202 enters platform 200, platform 200 determines a relaxing and/or calm route and moves along the relaxing and/or calm route toward the destination of person 202. In some embodiments, the relaxing and/or calm route is not the fastest route to the destination. In some embodiments, when platform 200 arrives at the destination, platform 200 moves closure 204 at the slow speed, rate, and/or acceleration that allows person 202 to exit interior portion 206 of platform 200 at a leisurely and/or relaxed pace. Thus, platform 200 generates an experience that allows person 202 to enjoy a trip and/or relax during the trip between the pickup location and the destination.

Figure 4C:
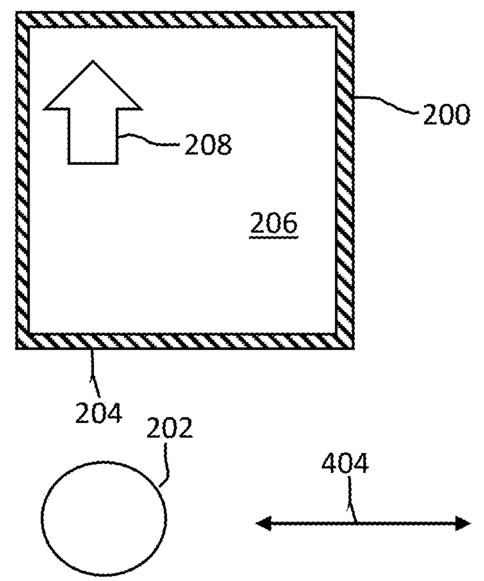

At FIG. 4C, platform 200 arrives at the pickup location so that person 202 can use platform 200 to travel to a destination. At FIG. 4C, platform 200 approaches the pickup location in the first state, such as the default state, as indicated by the first hatching of the outline around platform 200. In some embodiments, platform 200 obtains information about a schedule of person 202, previous trips taken by person 202 using platform 200, a time of day, a day of the week, and/or information about a destination (such as a time at which person 202 should arrive at the destination and/or a distance between the pickup location and the destination) that indicates that person 202 intends to arrive at the destination quickly and/or in a rushed manner.

FIG. 4C includes indicator 404 of a second timeline for a trip of platform 200 when picking up person 202. In some embodiments, the simulated behavior and/or attitude of platform 200 is based on the second timeline. At FIG. 4C, indicator 404 is relatively short (e.g., as compared to indicator 402 of FIGS. 4A and 4B), such that an overall duration of the trip is short and/or platform 200 is to arrive at a destination quickly and/or in a hurried state. At FIG. 4C, indicator 404 indicates that platform 200 picks up person 202 in a rushed and/or hurried state.

Figure 4D:
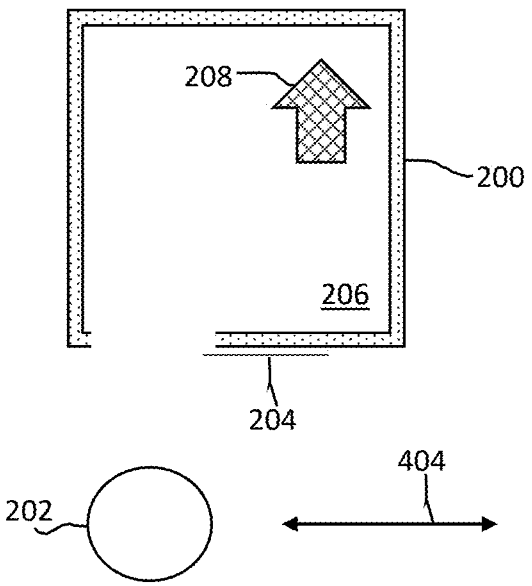

At FIG. 4D, platform 200 arrives at the pickup location in a second simulated state, such as a rushed and/or hurried state, as indicated by third hatching of outline around platform 200. In some embodiments, platform 200 adjusts one or more features of platform 200 to provide a travel experience that enables person 202 to perceive platform 200 as performing a trip as quickly as possible. At FIG. 4D, platform 200 adjusts configurable elements 208 to a second state that is based on the rushed and/or hurried state of platform 200. In some embodiments, platform 200 adjusts configurable elements 208 so that interior portion 206 of platform 200 presents a rushed and/or hurried environment for person 202. In some embodiments, platform 200 adjusts one or more lights to warmer color temperatures and/or to an increased brightness, adjusts one or more speakers to output audio that indicates and/or is consistent with the second simulated state of platform 200 (such as upbeat and/or high tempo audio), and/or adjusts one or more windows to reduce an opacity, tint, and/or haze (such that person 202 can easily see where platform 200 is currently located in relation to the destination). In addition, platform 200 opens closure 204 at a speed, rate, and/or acceleration that indicates and/or allows person 202 to perceive platform 200 as being rushed and/or hurried. In some embodiments, platform 200 adjusts closure 204 to the open position at a relatively fast speed, rate, and/or acceleration to signal to person 202 that platform 200 is in a rush and trying to get person 202 to their destination as quickly as possible.

In some embodiments, after person 202 enters platform 200, platform 200 determines a rushed and/or hurried route to the destination of person 202 and moves along the route, such that person 202 can arrive at their destination in the fastest way possible. In some embodiments, the route is the fastest route to the destination. In some embodiments, when platform 200 arrives at the destination, platform 200 moves closure 204 at the fast speed, rate, and/or acceleration that allows person 202 to exit interior portion 206 of platform 200 as quickly as possible. Thus, platform 200 generates an experience that allows person 202 to reach their destination quickly.

In some embodiments, platform 200 determines, creates, generates, and/or simulates an experience based on a distance between the pickup location and the drop off location, a requested time of arrival at the drop off location, traffic conditions along a route from the pickup location to the drop off location, weather conditions along a route from the pickup location to the drop off location, preferences designated by person 202, a calendar and/or schedule of person 202, and/or previous trips taken by person 202 using platform 200 (and/or using a different platform). In some embodiments, when platform 200 does not obtain information and/or obtains information with which platform 200 cannot determine an experience for performing a trip, platform 200 performs the trip (picks up person 202, transports person 202, and/or drops off person 202) in a default state and/or normal mode. In some embodiments, the normal mode includes platform 200 performing a trip in a non-rushed and a non-relaxed state, such that platform 200 adjusts configurable elements 208 and/or closure 204 in a manner that is between the rushed state and the relaxed state.

Figure 5:
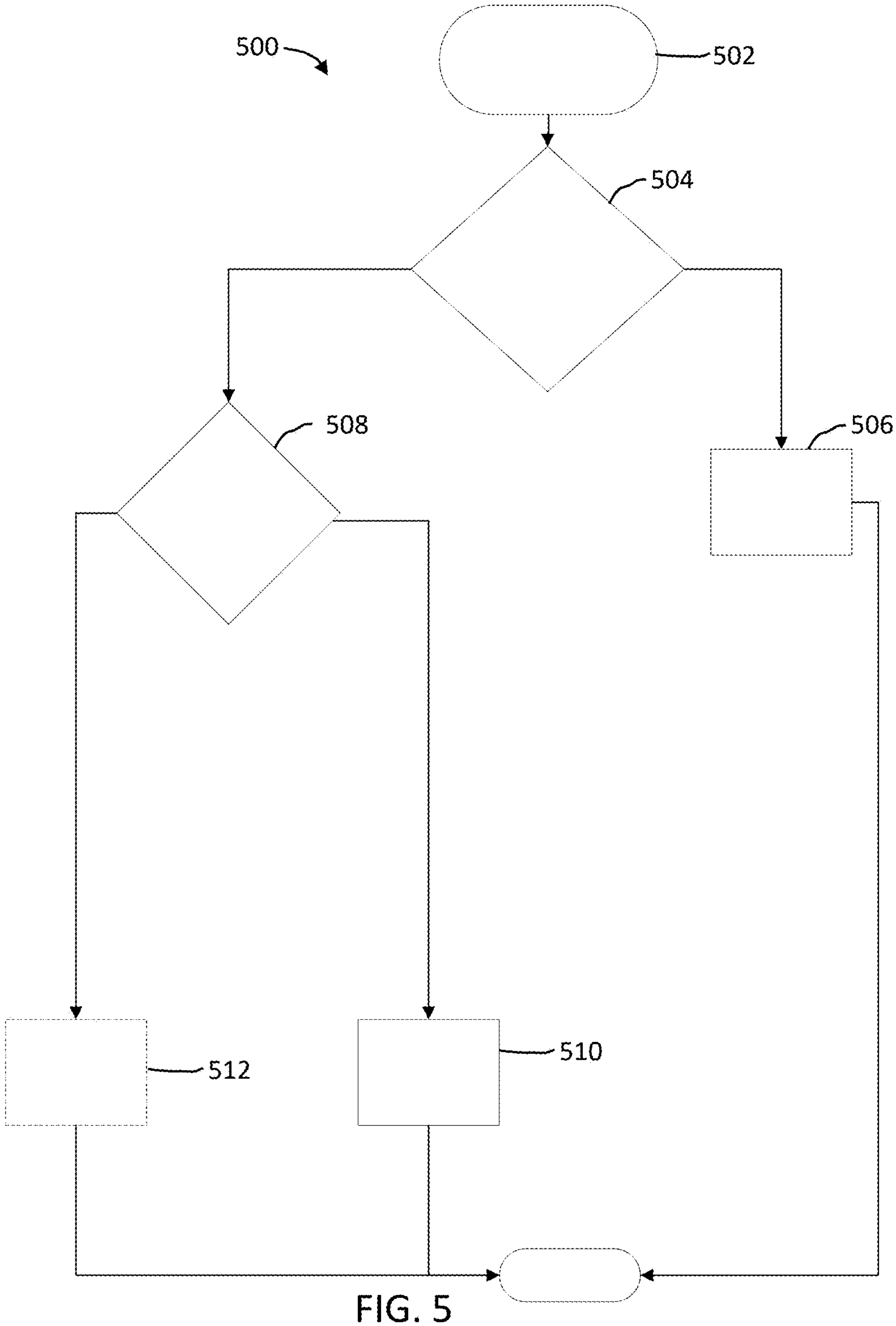
FIG. 5 is a flow diagram illustrating methods for simulating different experiences of a platform, in accordance with some embodiments.

FIG. 5 is a flow diagram illustrating method 500 that can be performed by platform 200, such as a computer system associated with platform 200. At FIG. 5, platform 200 obtains information that indicates how platform 200 should perform a trip, such as a state at which platform 200 operates to simulate an experience for person 202, as shown at block 502. In some embodiments, the information that platform 200 obtains includes information about person 202, information about a trip requested by person 202, information about a trip that person 202 is estimated, predicted, and/or determined to intend to take, and/or information about one or more locations along a requested, estimated, determined, and/or predicted route of a trip.

For instance, at block 504 of FIG. 5, platform 200 and/or a computer system of platform 200 determines whether information indicates that platform 200 should perform the trip in a rushed and/or hurried state. When platform 200 determines that the information indicates that platform 200 should perform the trip in the rushed and/or hurried state, platform 200 arrives at a destination, such as pickup location and/or a drop off location of person 202, in a first state, such as the rushed and/or hurried state, as shown at bock 506 of FIG. 5. As set forth above with reference to FIGS. 4C and 4D, the rushed and/or hurried state of platform 200 includes platform 200 adjusting configurable elements 208 to a particular state within a predetermined amount of time, moving along a route of a trip in accordance with a fastest route and/or at high speeds, and/or adjusting closure 204 at relatively fast speeds.

When the information indicates that platform 200 should not perform the trip in the rushed and/or hurried state, platform 200 and/or a computer system of platform 200 determines whether platform 200 should perform the trip in a relaxed and/or calm state, as shown at block 508 of FIG. 5. When platform 200 determines that the information indicates that platform 200 should perform the trip in the relaxed and/or calm state, platform 200 arrives at a destination, such as pickup location and/or a drop off location of person 202, in a second state, such as the relaxed and/or calm state, as shown at bock 510 of FIG. 5. As set forth above with reference to FIGS. 4A and 4B, the relaxed and/or calm state of platform 200 includes platform 200 adjusting configurable elements 208 to a particular state within a time that exceeds a predetermined amount of time, moving along a route of a trip in accordance with a route that is not the fasted route and/or at slower speeds, and/or adjusting closure 204 at relatively slow speeds.

When the information indicates that platform 200 should not perform the trip in the rushed and/or hurried state and that platform 200 should not perform the trip in the relaxed and/or calm state, platform 200 and/or a computer system of platform 200 determines that platform 200 should perform the trip and/or arrive at the destination in a third state, as shown at block 512 of FIG. 5. In some embodiments, the third state includes a default state and/or a state that is neither rushed nor relaxed. Accordingly, platform 200 performs trips in a state that simulates and/or creates an experience that person 202 perceives as being consistent with the intentions of person 202.

A system (e.g., 100 and/or 152) associated with a platform (e.g., 150 and/or 200) is configured to perform a method in accordance with some embodiments. The system (e.g., 100 and/or 152) receives (e.g., via one or more receiving devices, such as wireless communication devices (e.g., Bluetooth, Wi-Fi, and/or wireless antennae)) arrival information (e.g., information that includes a pick up location, a staging location, a drop off location, a pick up time, a drop off time, a meeting invitation, a text message, a voice message, an electronic mail message, user preferences (such as user preferences of a simulated personality and/or attitude of the platform), previous user trips, an electronic ticket, a time of day, a day of the week, weather, traffic conditions, and/or context-based information about a user's behavior and/or mood) associated with a platform (e.g., 150 and/or 200) (e.g., a physical platform, a virtual platform, a simulated platform, a mobile platform, and/or a vehicle). In some embodiments, the platform is controlled by and/or otherwise in communication with a computer system, such as a smartphone, a tablet, a watch, and/or a vehicle computer system. In some embodiments, the arrival information includes an indication of a level of urgency, a mood of a user (such as relaxed, rushed, happy, cheerful, and/or excited), a behavior of the user (such as speed of movement of the user and/or type of movement of the user), how quickly a user of the platform intends to get from a pick up location to a drop off destination, whether the user of the platform is late, whether the user is on vacation, whether the user is rushing, and/or whether the user intends to relax. In some embodiments, the arrival information is received by a computer system of the platform from an external computer system of the user, such as a smart phone, a smart watch, a tablet, and/or a desktop computer system.

In response to receiving the arrival information and in accordance with a determination that the arrival information indicates a first characteristic of the platform (e.g., 150 and/or 200) (e.g., a first level of urgency, a first mood of a user, a first behavior of the user, the arrival information indicates that the user is in a rush and/or in a hurry, and/or the arrival information indicates that the user intends to get from a pick up location to a destination and/or drop off location within a first amount of time), the system (e.g., 100 and/or 152) causes the platform (e.g., 150 and/or 200) to arrive at a location (e.g., a pickup location or a drop off location) in a first mode in which the platform (e.g., 150 and/or 200) has the first characteristic (e.g., a mode that includes the platform moving toward the location at a first speed (e.g., a speed faster than the second mode), a mode that includes the platform opening a door, hatch, and/or trunk at a second speed (e.g., a speed faster than the second mode), a mode that includes the platform moving furniture (e.g., seats, tables, and/or armrests) at a third speed (e.g., a speed faster than the second mode), a mode that includes the platform simulating a feeling of rushing and/or urgency, and/or a mode that includes a first motion profile (e.g., a motion profile that includes one or more speeds and/or accelerations that are faster than a motion profile of the second mode)).

In response to receiving the arrival information and in accordance with a determination that the arrival information indicates a second characteristic of the platform (e.g., 150 and/or 200) (e.g., a second level of urgency, a second mood of a user, a second behavior of the user, the arrival information indicates that the user is not in a rush and/or in a hurry (e.g., the arrival information indicates that the user is relaxed, calm, and/or unhurried), and/or the arrival information indicates that the user intends to get from a pick up location to a destination and/or drop off location within a second amount of time), different from the first characteristic of the platform (e.g., 150 and/or 200), the system (e.g., 100 and/or 152) causes the platform (e.g., 150 and/or 200) to arrive at the location in a second mode in which the platform (e.g., 150 and/or 200) has the second characteristic (e.g., a mode that includes the platform moving toward the location at a fourth speed (e.g., a speed slower than the first speed of the first mode), a mode that includes the platform opening a door, hatch, and/or trunk at a fifth speed (e.g., a speed slower than the second speed of the first mode), a mode that includes the platform moving furniture (e.g., seats, tables, and/or armrests) at a sixth speed (e.g., a speed slower than the third speed of the first mode), a mode that includes the platform simulating a feeling of relaxation, calm, and/or case, and/or a mode that includes a second motion profile (e.g., a motion profile that includes one or more speeds and/or accelerations that are slower than the first motion profile of the first mode)), wherein the second mode is different from the first mode.

In some embodiments, the first characteristic of the platform (e.g., 150 and/or 200) includes a first indication (e.g., first information (such as scheduling information associated with a calendar of the user of the platform; trip information associated with a pickup location, a drop off location, and/or a requested arrival time; historical information about previous trips taken by the user of the platform; and/or preference information associated with the user of the platform) that is used to determine, estimate, and/or predict) that a user (e.g., 202) of the platform (e.g., 150 and/or 200) is in a rushed state (e.g., the user is in a hurry, is late for a scheduled appointment and/or meeting, is rushing to work, and/or requested that the trip be completed within a predetermined amount of time).

In some embodiments, the second characteristic of the platform (e.g., 150 and/or 200) includes a second indication (e.g., second information (such as scheduling information associated with a calendar of the user of the platform; trip information associated with a pickup location, a drop off location, and/or a requested arrival time; historical information about previous trips taken by the user of the platform; and/or preference information associated with the user of the platform) that is used to determine, estimate, and/or predict) that a user (e.g., 202) of the platform (e.g., 150 and/or 200) is in a relaxed state (e.g., the user is not in a hurry, the user has ample time before a scheduled appointment and/or meeting, the user is not rushing to work, and/or the user has not provided and/or requested that the trip be completed within a predetermined amount of time).

In some embodiments, the arrival information includes user preference information (e.g., user preference information obtained from an application associated with the platform and/or from an account of a person associated with the platform) associated with a movement style (e.g., a driving style, a simulated personality of the platform while performing a trip, a simulated attitude of the platform while performing a trip, and/or an overall manner in which the platform performs the trip) for which the platform (e.g., 150 and/or 200) is configured to perform a trip (e.g., the arrival information includes user preferences associated with whether the platform performs a trip in a hurried and/or rush manner, a relaxed and/or calm manner, and/or in another manner).

In some embodiments, the first characteristic of the platform (e.g., 150 and/or 200) includes a first requested destination arrival time (e.g., a first amount of time that it will take the platform to move from a first location (such as a first pickup location of the user of the platform) to a second location (such as a first destination location of the user of the platform) and/or a first time of day at which the user of the platform requested to arrive at the location (such as the second location and/or the first destination location)) and the second characteristic of the platform (e.g., 150 and/or 200) includes a second requested destination arrival time (e.g., a second amount of time that it will take the platform to move from a third location (such as a second pickup location of the user of the platform) to a fourth location (such as a second destination location of the user of the platform) and/or a time of day at which the user of the platform requested to arrive at the location (such as the fourth location and/or the second destination location)), different from the first requested destination arrival time (e.g., the first requested destination arrival time includes a longer distance between pickup and drop off of the user as compared to the second requested destination arrival time and/or the first requested destination arrival time includes a lesser time differential between the current time of day and a time of day at which the user requested to arrive at the location).

In some embodiments, the first requested destination arrival time is based on a first distance (e.g., a first travel distance, non-linear distance, and/or distance from a starting point to an ending point when traveled via roadways) between a first pickup location (e.g., a first starting point of the trip) and a first destination location (e.g., a first ending point of the trip) associated with the first characteristic of the platform (e.g., 150 and/or 200) (e.g., the first characteristic of the platform includes information associated with the first pickup location, the first destination location, and/or a requested arrival time at the first destination location) and the second requested destination arrival time is based on a second distance (e.g., a second travel distance, non-linear distance, and/or distance from a starting point to an ending point when traveled via roadways) between a second pickup location (e.g., a second starting point of the trip) and a second destination location (e.g., a second ending point of the trip) associated with the second characteristic of the platform (e.g., 150 and/or 200) (e.g., the second characteristic of the platform includes information associated with the second pickup location, the second destination location, and/or a requested arrival time at the second destination location).

In some embodiments, the first requested destination arrival time is based on a first requested arrival time (e.g., a first time of day at which the user of the platform requests to be at a third destination location and/or a first time of day at which the user of the platform is expected and/or estimated to be at the third destination location) at a third destination location (e.g., a third ending point of the trip and/or the first ending point of the trip) associated with the first characteristic of the platform (e.g., 150 and/or 200) (e.g., the first characteristic of the platform includes information associated with the third destination location and/or the first requested arrival time at the third destination location) and the second requested destination arrival time is based on a second requested arrival time (e.g., a second time of day at which the user of the platform requests to be at a fourth destination location and/or a second time of day at which the user of the platform is expected and/or estimated to be at the fourth destination location) at a fourth destination location (e.g., a fourth ending point of the trip and/or the second ending point of the trip) associated with the second characteristic of the platform (e.g., 150 and/or 200) (e.g., the second characteristic of the platform includes information associated with the fourth destination location and/or the second requested arrival time at the fourth destination location).

In some embodiments, the first requested destination arrival time includes a third requested arrival time (e.g., a third time of day at which the user of the platform requests to be at a destination location and/or a third time of day at which the user of the platform is expected and/or estimated to be at the destination location) that is earlier than a fourth requested arrival time (e.g., a fourth time of day at which the user of the platform requests to be at a destination location and/or a fourth time of day at which the user of the platform is expected and/or estimated to be at the destination location) of the second requested destination arrival time and/or the first requested destination arrival time includes a fifth destination location (e.g., a fifth ending point of the trip, the first destination location, and/or the third destination location) that is further (e.g., a greater distance from a current location of the platform) than a sixth destination location (e.g., a sixth ending point of the trip, the second destination location, and/or the fourth destination location) of the second requested destination arrival time.

In some embodiments, the first characteristic includes quick movements (e.g., faster movements than movements associated with the second characteristic) of one or more features (e.g., 204 and/or 208) (e.g., one or more closures and/or one or more configurable elements of an interior portion of the platform) of the platform (e.g., 150 and/or 200). In some embodiments, the first characteristic selected from the group consisting of: a first closure acceleration (e.g., a first acceleration at which one or more closures (such as one or more doors, trunks, hatches, and/or entries) of the platform open and/or close), a first platform speed (e.g., a first speed at which the platform arrives at the location, a first speed at which the platform departs from the location, and/or one or more first speeds at which the platform travels and/or moves along a route of the trip), a first adjustment speed of one or more configurable elements of the platform (e.g., one or more first speeds, velocities, durations, and/or delay periods associated with adjusting furniture, windows, audio output devices, lighting devices, consoles, display devices, temperature control systems, lift systems, and/or suspension systems to a first state, position, and/or setting), a first simulated experience for the user of the platform (e.g., a coordinated configuration of one or more closures and/or one or more configurable elements of the platform and/or an operational state of the platform that causes the user of the platform to perceive the platform as being in a rushed state, a relaxed state, and/or an intermediate state (such as a state that is not a rushed state and not a relaxed state), and/or a first motion profile (e.g., one or more first speeds, velocities, and/or accelerations of the platform and/or components of the platform (such as one or more closures and/or one or more configurable elements of the platform) that are based on the first characteristic of the trip).

In some embodiments, the second characteristic includes slow movements (e.g., slower movements than movements associated with the first characteristic) of one or more features (e.g., 204 and/or 208) (e.g., one or more closures and/or one or more configurable elements of an interior portion of the platform) of the platform (e.g., 150 and/or 200). In some embodiments, the second characteristic is selected from the group consisting of: a second closure acceleration (e.g., a second acceleration at which one or more closures (such as one or more doors, trunks, hatches, and/or entries) of the platform open and/or close) (in some embodiments, the second closure acceleration is less than the first closure acceleration), a second platform speed (e.g., a second speed at which the platform arrives at the location, a second speed at which the platform departs from the location, and/or one or more second speeds at which the platform travels and/or moves along a route of the trip) (in some embodiments, the second platform speed is less than the first platform speed), a second adjustment speed of one or more configurable elements of the platform (e.g., one or more second speeds, velocities, durations, and/or delay periods associated with adjusting furniture, windows, audio output devices, lighting devices, consoles, display devices, temperature control systems, lift systems, and/or suspension systems to a second state, position, and/or setting) (in some embodiments, the second adjustment speed is less than the first adjustment speed), a second simulated experience for the user of the platform (e.g., a coordinated configuration of one or more closures and/or one or more configurable elements of the platform and/or an operational state of the platform that causes the user of the platform to perceive the platform as being in a rushed state, a relaxed state, and/or an intermediate state (such as a state that is not a rushed state and not a relaxed state)), and/or a second motion profile (e.g., one or more second speeds, velocities, and/or accelerations of the platform and/or components of the platform (such as one or more closures and/or one or more configurable elements of the platform) that are based on the second characteristic of the of the trip) (in some embodiments, the one or more second speeds of the second motion profile are less than the one or more first speeds of the first motion profile).

In some embodiments, the arrival information includes a time of day (e.g., a current time of a current day) and/or a day of the week (e.g., a current day of the week). In some embodiments, the platform arrives at the location in the first mode when the time of day and/or the day of the week indicates that the user of the platform is rushing to a destination location, such as when the time of day and/or the day of the week indicates that the user is late to a scheduled appointment, meeting, and/or event and/or when the time of day and/or the day of the week indicates that there will be an increased amount of traffic along a route of the trip. In some embodiments, the platform arrives at the location in the second mode when the time of day and/or the day of the week indicates that the user of the platform is not rushing to the destination location, such as when the time of day and/or the day of the week indicates that the user is not late to and/or does not have a scheduled appointment, meeting, and/or event and/or when the time of day and/or the day of the week indicates that there will be a reduced amount of traffic along a route of the trip.

In some embodiments, the arrival information includes weather conditions (e.g., current and/or estimated precipitation, current and/or estimated wind speed, and/or current and/or estimated temperatures) associated with the trip (e.g., current and/or estimated weather conditions along a route of the trip (such as from the location to a destination location)). In some embodiments, the platform arrives at the location in the first mode when the weather conditions indicate current and/or estimated precipitation that could slow traffic along a route of the trip. In some embodiments, the platform arrives at the location in the second mode when the weather conditions indicate that no current and/or estimated weather conditions will cause an increased and/or a slowing of traffic along a route of the trip.

In some embodiments, the arrival information includes traffic conditions (e.g., an amount of other platforms, pedestrians, vehicles, obstructions, and/or road closures that are currently present and/or estimated to be present along a route of the trip) associated with the trip (e.g., current and/or estimated traffic conditions along a route of the trip (such as from the location to a destination location)). In some embodiments, the platform arrives at the location in the first mode when the traffic conditions indicate heavy traffic along a route of the trip (and, optionally, no alternative, faster routes for completing the trip). In some embodiments, the platform arrives at the location in the second mode when the traffic conditions indicate light traffic along a route of the trip.

Existing platforms do not begin making preparations for a trip based on a determination that the passenger intends to use the platform for a trip.

Thus, there is a need for a platform, such as a vehicle, that can determine and/or estimate when a person that is near the platform intends to take a trip based on information obtained about the person. In some embodiments, the platform can park and/or store itself at a location for an extended period of time while in an idle and/or inactive mode so that the platform conserves power. When the platform determines and/or estimates that the person intends to use the platform to take a trip, the platform can transition from the idle mode to an initiation mode that prepares the platform for the upcoming trip, thereby enabling the platform to be ready to perform the trip in a reduced amount of time. In some embodiments, the initiation mode includes opening one or more closures and/or doors of the platform to facilitate an ability of the person to enter an interior portion of the platform. When the platform determines and/or estimates that the person does not intend to use the platform to take a trip, the platform is maintained in the idle mode and/or the platform does not make preparations for the trip. In some embodiments, when the platform determines and/or estimates that it is uncertain whether the person intends to use the platform, the platform wakes up and/or takes minimal preparations for a potential trip. In some embodiments, waking up the platform does not include opening a door, but instead includes turning on one or more lights to signal to the person that the platform is ready for the trip.

Figure 6A:
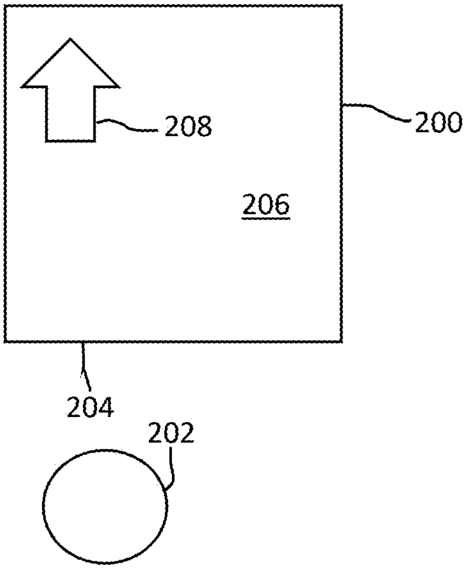
FIGS. 6A-6C illustrate examples of different modes of operation of a platform, in accordance with some embodiments.

Turning now to the drawings, FIG. 6A is a block diagram illustrating platform 200 positioned at a parking location and in the idle mode. At FIG. 6A, the arrow representing configurable elements 208 does not include hatching and/or fill indicating that platform 200 is in the idle mode. In some embodiments, the idle mode includes platform 200 being in an inactive and/or sleep state so that platform 200 conserves power while parked and/or positioned in a location for an extended period of time.

At FIG. 6A, person 202 is within a predetermined distance of platform 200 and person 202 includes a first intent, as indicated by no fill and/or hatching of person 202 shown at FIG. 6A. The first intent of person 202 is to not use platform 200 to take a trip. In some embodiments, the first intent of person 202 is determined and/or estimated in response to person 202 being within the predetermined distance of platform 200 and/or in response to platform 200 currently operating in the idle mode. In some embodiments, platform 200 determines the first intent of person 202 based on a location of platform 200, an orientation of person 202 relative to platform 200, a speed at which person 202 is moving toward platform 200, information associated with person 202 (such as a meeting invitation, a text message, a voice message, an electronic mail message, user preferences, previous trips of person 202, and/or an electronic ticket of person 202), a time of day, a day of the week, weather conditions, traffic conditions, conditions in an environment in which platform 200 is located, and/or context-based information about a behavior of person 202.

At FIG. 6A, platform 200 maintains operation in the idle mode based on the determination that person 202 has the first intent. Since it is determined that person 202 does not intend to use platform 200 to take a trip, platform 200 does not transition to a different mode and/or otherwise make preparations for the trip in order to conserve power. In some embodiments, platform 200 maintains operation in the idle mode when person 202 is not within the predetermined distance of platform 200. In some embodiments, platform 200 does not determine whether to transition from the idle mode to a different mode when person 202 is not within the predetermined distance of platform 200.

Figure 6B:
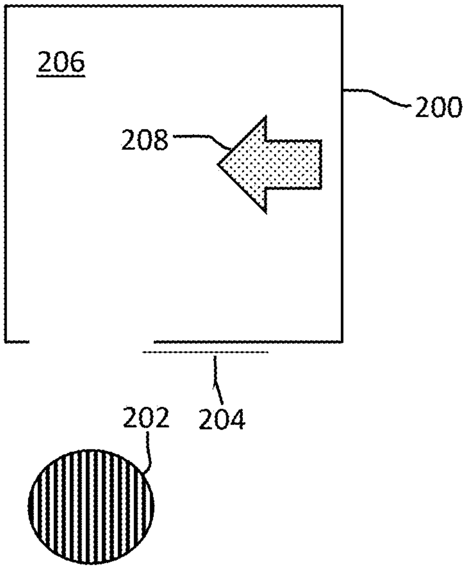

At FIG. 6B, platform 200 is positioned at a parking location and person 202 is within the predetermined distance of platform 200. At FIG. 6B, person 202 includes a second intent, as indicated by first hatching of person 202 shown in FIG. 6B. The second intent of person 202 includes an intent to use platform 200 to take a trip. For instance, person 202 wants and/or intends to enter interior portion 206 of platform 200 so that person 202 can be transported from the parking location to a destination location. As set forth above, the second intent of person 202 can be determined based on a variety of different factors that indicate how ready person 202 is to take a trip. When platform 200 determines that the intent of person 202 is the second intent, platform 200 transitions from operating in the idle mode to operating in the initiation mode, as shown at FIG. 6B.

At FIG. 6B, the initiation mode includes platform 200 adjusting configurable elements 208 and/or opening closure 204. For instance, at FIG. 6B, platform 200 moves closure 204 from a closed position to an open position to allow person 202 to quickly enter interior portion 206 of platform 200 and take the trip. In addition, at FIG. 6B, platform 200 transitions from operating in the idle mode to operating in an initiation mode based on the second intent of person 202. For instance, configurable elements 208 of platform 200 are adjusted to an initiation state, as indicated by first hatching of arrow representing configurable elements 208. In some embodiments, the initiation state of configurable elements 208 is different from an idle state at which configurable elements 208 operate while platform 200 is in the idle mode. In some embodiments, the initiation state of configurable elements 208 includes turning on one or more lights of interior portion 206 to a particular brightness and/or color temperature. In some embodiments, the initiation state of configurable elements 208 includes adjusting a position of one or more pieces of furniture to an ingress position that allows person 202 to enter interior portion 206 of platform 200 quickly. Thus, platform 200 performs various actions and/or adjusts one or more features to prepare platform 200 for an upcoming trip to reduce an amount of time needed for person 202 to begin the trip.

Figure 6C:
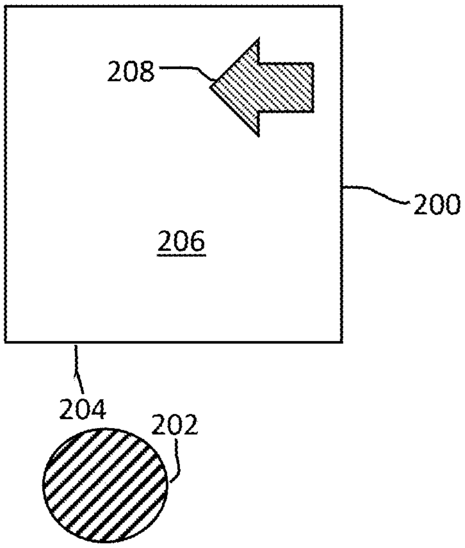

At FIG. 6C, platform 200 is positioned at a parking location and person 202 is within the predetermined distance of platform 200. At FIG. 6C, person 202 includes a third intent, as indicated by second hatching of person 202 shown in FIG. 6C. The third intent of person 202 includes an uncertain, ambiguous, and/or inconclusive intent. For instance, the third intent of person 202 includes an intent that cannot be determined above a confidence level threshold. In some embodiments, the intent of person 202 is determined to be the first intent (i.e., person 202 does not intend to take a trip) when the confidence level is below a first confidence level threshold, the intent of person 202 is determined to be the second intent (i.e., person 202 does intend to take a trip) when the confidence level is above a second confidence level threshold, and the intent of person 202 is determined to be the third intent when the confidence level is between the first confidence level threshold and the second confidence level threshold.

At FIG. 6C, when platform 200 determines that the intent of person 202 is the third intent, platform 200 transitions from operating in the idle mode to operating in a wake up mode, as shown at FIG. 6C. In some embodiments, the wake up mode includes platform 200 adjusting configurable elements 208 to a wake up state, as indicated by second hatching of arrow representing configurable elements 208. In some embodiments, the wake up mode includes turning on one or more lights (such as interior lights and/or exterior lights) of platform. In some embodiments, the wake up mode does not include moving and/or opening closure 204 because the third intent of person 202 is not determined to be certain enough that person 202 wants to take the trip.

In some embodiments, platform 200 displays a keypad and/or a user interface that allows person 202 to provide credentials for authenticating and/or authorizing person 202 to use platform 200 (such as when person 202 does not have an external device that enables authentication and/or authorization in their possession). In some embodiments, platform 200 displays the keypad and/or the user interface when person 202 is determined to be within the predetermined distance of platform 200, but platform 200 has not confirmed that person 202 is authenticated and/or authorized to use platform 200. In some embodiments, the keypad and/or the user interface allows person 202 to provide one or more user inputs corresponding to a passcode and/or other credentials that authenticates and/or authorizes person 202 to use platform 200.

Figure 7:
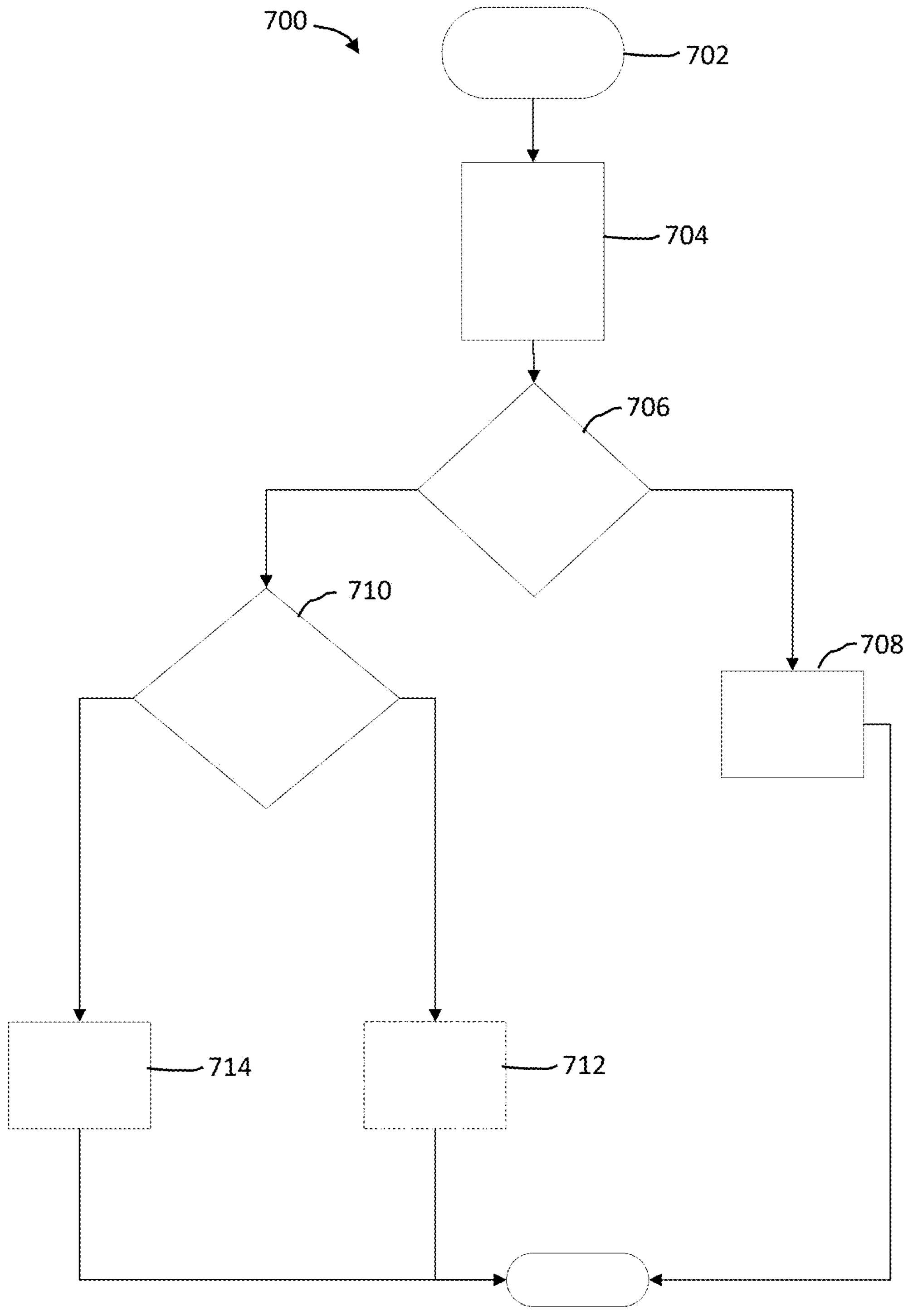
FIG. 7 is a flow diagram illustrating methods for transitioning between modes of operation of a platform, in accordance with some embodiments.

FIG. 7 is a flow diagram illustrating method 700 that can be performed by platform 200, such as a computer system associated with platform 200. At FIG. 7, platform 200 determines that person 202 is within the predetermined distance of platform 200 and that platform 200 is operating in the idle mode, as shown at block 702 of FIG. 7. After platform 200 determines that person 202 is within the predetermined distance of platform 200 and that platform 200 is operating in the idle mode, platform 200 obtains information that indicates a level of user readiness for taking a trip, as shown at block 704. In some embodiments, the information that indicates the level of user readiness for taking the trip includes information about an intent of person 202 and/or other contextual information about platform 200 and/or person 202.

After platform 200 obtains the information that indicates the level of user readiness for taking the trip, platform 200 determines whether the level of user readiness satisfies and/or exceeds a first confidence level threshold, as shown at block 706. For instance, in some embodiments, platform 200 associates a confidence level with the level of user readiness for taking the trip that indicates how strongly the information indicates that person 202 wants to or does not want to take the trip.

When platform 200 determines that the level of user readiness satisfies the first confidence level threshold, platform 200 transitions from operating in the idle mode to operating in the initiation mode, as shown at block 708. As set forth above, in some embodiments, the initiation mode includes platform 200 adjusting configurable elements 208 to an initiation state and/or moving closure 204 to an open position. Conversely, when platform 200 determines that the level of user readiness does not satisfy the first confidence level threshold, platform 200 determines whether the level of user readiness satisfies and/or exceeds a second confidence level threshold, as shown at block 710.

In some embodiments, when platform 200 determines that the level of user readiness satisfies the second confidence level threshold (but not the first confidence level threshold), platform 200 transitions from operating in the idle mode to operating in a wake up mode, as shown at block 712. As set forth above, in some embodiments, the wake up mode includes platform 200 adjusting configurable elements 208 to a wake up state, but the wake up mode does not include movement of closure 204.

When platform 200 determines that the level of user readiness does not satisfy the second confidence level threshold (and does not satisfy the first confidence level threshold), operation of platform 200 is maintained in the idle mode, such that platform 200 does not take any action to prepare for a trip, as shown at block 714. As such, platform 200 can automatically prepare itself for taking a trip based on a level of user readiness that is obtained, determined, and/or estimated by platform 200.

A system (e.g., 100 and/or 152) associated with a platform (e.g., 150 and/or 200) is configured to perform a method in accordance with some embodiments. The system (e.g., 100 and/or 152) determines that a user (e.g., 202) (e.g., a rider, person, and/or passenger) is within a predetermined distance (e.g., within twenty feet, within ten feet, within five feet, or within two feet) of a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system) and that the platform (e.g., 150 and/or 200) is operating in a first mode (e.g., a sleep mode, an idle mode, an inactive mode, and/or a mode in which the platform is not preparing for and/or taking a trip).

After determining that the user (e.g., 202) is within the predetermined distance of the platform (e.g., 150 and/or 200) and that the platform (e.g., 150 and/or 200) is operating in the first mode, the system (e.g., 100 and/or 152) obtains information (e.g., information that includes a location of the platform, an orientation of the user relative to the platform (such as an angle and/or direction of a position of the user relative to the location of the platform), a speed at which the user is moving, a meeting invitation, a text message, a voice message, an electronic mail message, user preferences, previous trips of the user, an electronic ticket, a time of day, a day of the week, weather, traffic conditions, conditions in an environment in which the platform is located, and/or context-based information about a user's behavior) that indicates a level of user readiness for taking a trip (e.g., the information indicates that a user intends to take a trip using the platform, the information indicates that the platform is prepared to take the trip (such as the platform has sufficient fuel and/or battery charge and/or the platform has received authorization to take the trip), and/or the information indicates that the platform is in an environment that enables the platform to begin the trip). In some embodiments, the information is received by a computer system of the platform from an external computer system of the user, such as a smart phone, a smart watch, a tablet, and/or a desktop computer system.

In response to obtaining the information (and, optionally, in response to a determination that the user is within the predetermined distance of the platform) and in accordance with a determination that the information indicates a first level of user readiness for taking the trip (e.g., the information indicates that an intent of the user is to take and/or take the trip is above a first confidence level threshold), the system (e.g., 100 and/or 152) transitions operation of the platform (e.g., 150 and/or 200) from the first mode to a second mode (e.g., an awake mode, a preparation mode, an initiation mode, a mode in which one or more lights of the platform are activated and/or turned on, and/or a mode in which one or more closures (such as doors, hatches, and/or trunks) of the platform are opened), different from the first mode.

In response to obtaining the information (and, optionally, in response to a determination that the user is within the predetermined distance of the platform) and in accordance with a determination that the information indicates a second level of user readiness for taking the trip (e.g., the information indicates that an intent of the user to take and/or perform the trip is below a second confidence level threshold), different from (e.g., the second level of user readiness is less than and/or lower than the first level of user readiness for taking the trip and/or the user and/or platform does not intend and/or is not ready to take the trip when the information indicates the second level of user readiness for taking the trip) the first level of user readiness for taking the trip, the system (e.g., 100 and/or 152) maintains operation of the platform (e.g., 150 and/or 200) in the first mode (e.g., forgoing transitioning operation of the platform from the first mode to the second mode).

In some embodiments, the first mode includes an inactive mode (e.g., an idle mode, a sleep mode, a mode in which the platform receives and/or obtains information but does not initiate a trip, and/or a mode in which the platform receives and/or obtains information, but does not adjust one or more configurable elements of an interior of the platform to a predefined state and/or does not move, open, and/or close one or more closures of the platform) of the platform (e.g., 150 and/or 200).

In some embodiments, the second mode includes an initiation mode (e.g., a wake up mode, a preparation mode, a wake up and go mode, a mode in which the platform adjusts a state of one or more configurable elements of an interior portion of the platform, a mode in which the platform moves, opens, and/or closes one or more closures of the platform, and/or a mode in which the platform prepares (such as by starting an engine and/or motor of the platform) for an upcoming trip) of the platform (e.g., 150 and/or 200).

In some embodiments, the second mode includes moving one or more actuatable closures (e.g., 204) (e.g., one or more doors, hatches, trunks, and/or entries that provide access to an interior portion of the platform) of the platform (e.g., 150 and/or 200) to a first position (e.g., an open position, a closed position, and/or a partially open position).

In some embodiments, the first level of user readiness for taking the trip indicates that the user (e.g., 202) (e.g., a rider, a person, and/or a passenger) intends to use the platform (e.g., 150 and/or 200) to take the trip (e.g., the user is estimated, determined, and/or predicted to use, access, and/or travel via the platform from a current location of the platform to a destination location within a predetermined amount of time (such as within one hour, within 30 minutes, within 15 minutes, within 10 minutes, and/or within 5 minutes from a current time of day)). In some embodiments, the first level of user readiness indicates that the user intends to use the platform to take the trip within a predetermined amount of time (such as within one hour, within 30 minutes, within 15 minutes, within 10 minutes, and/or within 5 minutes from a current time of day).

In some embodiments, the second level of user readiness for taking the trip indicates that the user (e.g., 202) (e.g., a rider, a person, and/or a passenger) does not intend to use the platform (e.g., 150 and/or 200) to take the trip (e.g., the user is estimated, determined, and/or predicted to not use, access, and/or travel via the platform from a current location of the platform to a destination location within a predetermined amount of time (such as within one hour, within 30 minutes, within 15 minutes, within 10 minutes, and/or within 5 minutes from a current time of day)). In some embodiments, the second level of user readiness indicates that the user does not intend to use the platform to take the trip within a predetermined amount of time (such as within one hour, within 30 minutes, within 15 minutes, within 10 minutes, and/or within 5 minutes from a current time of day).

In some embodiments, after obtaining the information, the system (e.g., 100 and/or 152) determines the level of user readiness for taking the trip (e.g., determining the level of user readiness for taking the trip via a computer system of the platform and/or via an external computer system that is in communication with the computer system of the platform (such as a server and/or an external computer system associated with the user)). In some embodiments, determining the level of user readiness for taking the trip includes, in accordance with a determination that the information indicates that the level of user readiness exceeds a first confidence level threshold (e.g., the information is determined, estimated, and/or predicted to indicate that the user is likely to take the trip within a predetermined amount of time (such as within one hour, within 30 minutes, within 15 minutes, within 10 minutes, and/or within 5 minutes from a current time of day)), determining that the information indicates the first level of user readiness for taking the trip. In some embodiments, determining the level of user readiness for taking the trip includes, in accordance with a determination that the information indicates that the level of user readiness does not exceed a second confidence level threshold (e.g., the information is determined, estimated, and/or predicted to indicate that the user is unlikely to take the trip and/or is unlikely to take the trip within a predetermined amount of time (such as within one hour, within 30 minutes, within 15 minutes, within 10 minutes, and/or within 5 minutes from a current time of day)), determining that the information indicates the second level of user readiness for taking the trip.

In some embodiments, in response to obtaining the information and in accordance with a determination that the information indicates that the level of user readiness for taking the trip is between the first confidence level threshold and the second confidence level threshold (e.g., the information is determined, estimated, and/or predicted to indicate that the user may (e.g., is not likely, but not unlikely) take the trip within a predetermined amount of time (such as within one hour, within 30 minutes, within 15 minutes, within 10 minutes, and/or within 5 minutes from a current time of day)), the system (e.g., 100 and/or 152) transitions operation of the platform (e.g., 150 and/or 200) from the first mode to a third mode (e.g., an awake mode, a preparation mode, and/or a mode in which one or more lights of the platform are activated and/or turned on without moving, opening, and/or closing one or more closures (such as doors, hatches, and/or trunks) of the platform), wherein the third mode includes adjusting one or more configurable elements (e.g., 208) (e.g., furniture, windows, audio output devices, display generation components, lighting devices, and/or climate control systems) of an interior portion (e.g., 206) of the platform (e.g., 150 and/or 200) to a first state without moving a first closure (e.g., 204) (e.g., a door) of the platform (e.g., 150 and/or 200) (e.g., a position of the one or more closures is maintained and/or not changed). In some embodiments, the third mode includes adjusting the one or more configurable elements of the interior portion of the platform to the first state and moving a second closure (such as a trunk and/or a hatch of the platform), different from the first closure, to an open position without moving the first closure of the platform.

In some embodiments, the information is selected from the group consisting of: a first location of the platform (e.g., 150 and/or 200) (e.g., a current, estimated, predicted, and/or determined location of the platform) (in some embodiments, when the platform is at a home and/or residence of the user, the level of user readiness is determined by a model and/or algorithm that is based on user preferences, previous trips taken by the user, a time of day, a day of the week, and/or contextual information about the user), a second location of the user (e.g., 202) (e.g., a current, estimated, predicted, and/or determined location of the user), a current time of day (e.g., a time of day at which the user is within the predetermined distance of the platform and/or a time of day at which the user was detected to be within the predetermined distance of the platform), an indication of user input (e.g., interaction with one or more input devices of the platform and/or interaction with an external computer system associated with the user) (in some embodiments, user input includes a voice command (such as a voice command directed to a virtual assistant) requesting that a closure of the platform be moved to an open position), a motion profile of the user (e.g., 202) (e.g., a speed, velocity, and/or acceleration of the user approaching the platform, a direction at which the user is approaching the platform, and/or a proximity of the user to the platform), calendar information associated with the user (e.g., 202) (e.g., information about scheduled meetings, events, and/or appointments, information about start times and/or end times of meetings, events, and/or appointments, and/or locations of meetings, events, and/or appointments), historical information about previous trips taken by the user (e.g., 202) (e.g., information about prior trips that the user has taken via the platform (and, optionally, other platforms) that indicate enables a determination, estimation, and/or prediction to be made about whether or not the user is likely to take the trip with the platform), and an environment of the first location of the platform (e.g., 150 and/or 200) (e.g., attributes and/or characteristics of an area and/or vicinity that includes the first location of the platform, such as obstructions, a number of people, an amount of traffic, one or more distances to one or more respective buildings, weather, hazards, and/or a type of location (such as a residential location, a business location, and/or a commercial location)).

In some embodiments, while the platform (e.g., 150 and/or 200) is operating in the first mode, the system (e.g., 100 and/or 152) displays, via a display generation component (e.g., a display controller, a touch-sensitive display system, a projector, a display screen, a display monitor, and/or a holographic display) of the platform (e.g., 150 and/or 200) (e.g., positioned, mounted, and/or included within an exterior portion of the platform (such as a frame and/or a pillar of a frame of the platform)), a keypad (e.g., a user interface object that includes one or more alphanumeric characters that, when selected via user input, enable a user to enter a passcode), wherein the keypad, when selected via one or more user inputs (e.g., one or more tap gestures, touch gestures, swipe gestures, press gestures, air gestures, hand gestures, and/or voice commands), is configured to enable authentication of the user (e.g., 202) (e.g., determine whether a passcode, a voice, and/or a biometric feature of the user matches a predetermined passcode, voice, and/or biometric feature). In some embodiments, the keypad is displayed in accordance with a determination that the user does not have an external computer system and/or that the external computer system was note detected so that the user can still be authenticated and/or authorized to take the trip without the external computer system.

There is a need for a platform, such as a vehicle, that can determine and/or estimate when a person intends to use the platform to take a trip based on information obtained about the person. In some embodiments, the information about the person is not based on a request and/or user input provided by the person. For instance, in some embodiments, the information about the person is passively and/or indirectly obtained by the platform, such that the person does not manually transmit and/or provide the information. In some embodiments, the platform is moved toward a staging location that is based on a location of the person when the information about the person indicates that the person intends to take the trip and that the person intends to take the trip within a predetermined amount of time from a current time. Thus, the platform can automatically move to a location that is proximate to the person without requiring the person to request that the platform move toward the location of the person. The person can, therefore, reach the platform and/or enter the platform with little effort and within a reduced amount of time.

Figure 8A:
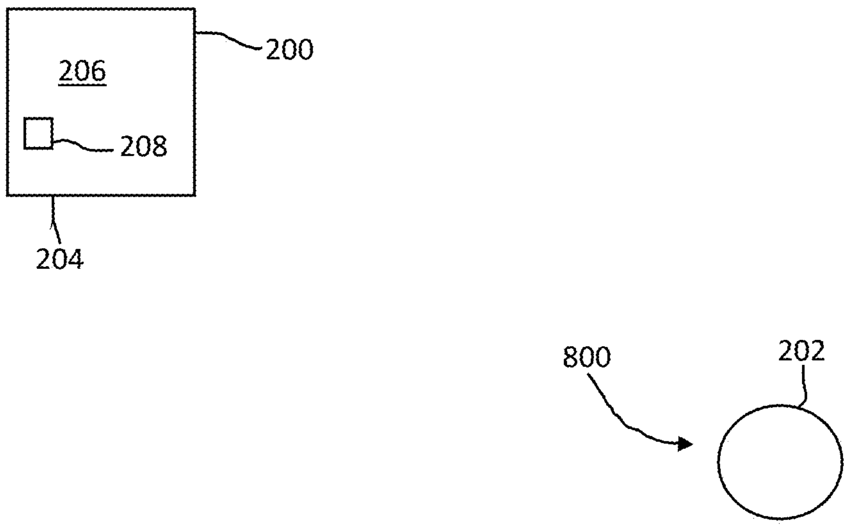
FIGS. 8A-8C illustrate examples of a platform arriving at a staging location based one of more factors, in accordance with some embodiments.

Turning now to the drawings, FIG. 8A is a block diagram illustrating platform 200 positioned at a parking location, such as a parking spot, a parking lot, a parking garage, a garage of a residence, and/or another location at which platform 200 can stop moving for a predetermined amount of time. At FIG. 8A, person 202 is positioned at location 800 while platform 200 is at the parking location. Platform 200 has not received information about person 202 that indicates an intent of person 202, such as whether person 202 intends to use platform 200 to take a trip and/or when person 202 intends to use platform 200 to take a trip.

In some embodiments, when platform 200 does not receive information that indicates the intent of person 202, platform 200 remains and/or does not move from the parking location. In some embodiments, platform 200 receives information about person 202 periodically, intermittently, regularly, and/or continuously and uses the information about person 202 to determine an intent of person 202. In some embodiments, person 202 authorizes, allows, and/or provides approval before platform 200 can receive information about person 202. For instance, in some embodiments, person 202 is prompted to provide authorization, such as via an application associated with platform 200, for causing the information about person 202 to be sent and/or otherwise provided to platform 202. In some embodiments, when person 202 has not provided authorization and/or has declined to provide authorization, platform 200 does not receive the information about person 202, determine an intent of person 202, and/or move based on information about person 202 because platform 200 does not receive the information about person 202.

As set forth below with reference to FIG. 8B, when platform 200 determines that person 202 intends to use platform 200 to take a trip within a predetermined amount of time from a current time and that the determined intent of person 202 includes a confidence level above a confidence level threshold, platform 200 moves from the parking location toward a location that is based on location 800 of person 202. As set forth below with reference to FIG. 8C, when platform 200 determines that person 202 does not intend to use platform 200 to take a trip within the predetermined amount of time from the current time and/or that the determined intent of person 202 includes a confidence level below the confidence level threshold, platform 200 remains at the parking location and/or does not move toward a location based on location 800 of person 202.

In some embodiments, the information about person 202 includes calendar information of person 202, messages (such as text messages and/or emails) sent and/or received by an external device associated with person 202, prior trips taken by person 202, electronic ticket information in an electronic wallet associated with person 202, location 800 of person 202, indirect location information of person 202 (such as reservations and/or scheduled events of person 202), transactions performed by person 202, information from applications of an external device associated with person 202, and/or a browser history of person 202. In some embodiments, the information about person 202 does not include a request made by person 202 via an application associated with platform. In some embodiments, the information about person 202 does not include information that person 202 caused to be transmitted to platform 200. In some embodiments, the information about person 202 is obtained by platform 200 via a mobile ecosystem that includes one or more external devices associated with person 202 that are in communication with a computer system of platform 200.

In some embodiments, platform 200 uses the information about person 202 to determine an intent of person 202. In some embodiments, platform 200 uses the information about person 202 to determine whether person 202 intends to perform a trip (such as whether the information indicates that an intent of person 202 to perform a trip includes a confidence level that is above a confidence level threshold), whether person 202 intends to perform the trip within a predetermined amount of time from a current time, a starting location of an intended trip, and/or a destination location of the intended trip.

Figure 8B:
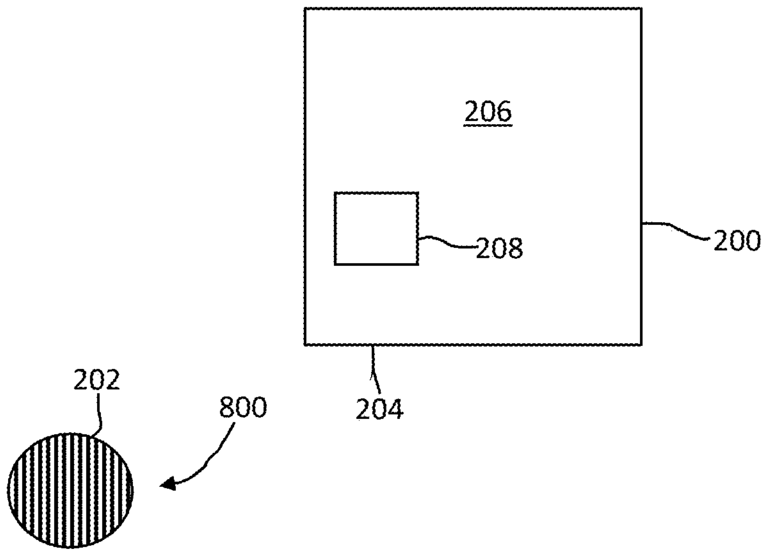

At FIG. 8B, platform 200 obtains the information about person 202 and determines that person 202 intends to use platform 200 to take a trip, as indicated by first hatching of person 202 shown at FIG. 8B. For instance, platform 200 determines that a predicted intent of person 202 to use platform 200 includes a confidence level that exceeds a confidence level threshold. In addition, platform 200 determines that person 202 intends to use platform 200 to take the trip within a predetermined amount of time from the current time.

In some embodiments, platform 200 determines that person 202 intends to use platform 200 because calendar information of person 202 indicates that person 202 needs to leave location 800 soon in order to reach a destination of a scheduled event. In some embodiments, platform 200 determines that person 202 intends to use platform 200 because person 202 sent and/or received a message indicating that person 202 is on their way to a destination location of a contact. In some embodiments, platform 200 determines that person 202 intends to use platform 200 because person 202 typically uses platform 200 to take a trip from location 800 to a destination location around the current time of day (e.g., person 202 typically leaves work around the same time every day).

At FIG. 8B, platform 200 moves to a staging location based on the determination that person 202 intends to use platform 200 to take the trip. As shown at FIG. 8B, platform 200 is illustrated with a larger size when compared to platform 200 shown at FIG. 8A to indicate that platform 200 has moved closer to person 202. In some embodiments, the staging location is based on location 800 of person 202. In some embodiments, the staging location of platform 200 is within a predetermined distance of location 800 of person 202. In some embodiments, the staging location is a location at which platform 200 temporarily stops and/or parks before proceeding to a pickup location of person 202. In some embodiments, the staging location is based on a model and/or algorithm that determines whether a location is suitable, safe, and/or otherwise appropriate for platform 200 to stop and/or park for a predetermined amount of time. For instance, in some embodiments, platform 200 determines the staging location based on local regulations and/or traffic laws that indicate where platform 200 is allowed stop and/or park for a predetermined period of time. In some embodiments, the staging location is a cell phone lot and/or a waiting area designated for platforms to park and/or stop.

In some embodiments, the staging location is based on a predicted location of person 202 at a time at which person 202 intends to begin the trip. For instance, location 800 of person 202 can correspond to an office building and/or restaurant, but person 202 intends to be picked up by platform 200 at a nearby parking lot. As such, platform 200 may position itself at the nearby parking lot at a time at which person 202 is predicted, estimated, and/or determined to be at the parking lot.

In some embodiments, the staging location varies and/or changes based on a confidence level of the determined intent of person 202. For instance, when platform 200 determines that an intent of person 202 to use platform 200 exceeds a first confidence level (e.g., a high confidence level), the staging location is closer to a current location of person 202. Conversely, in some embodiments, when platform 200 determines that the intent of person 202 to use platform 200 is less than the first confidence level but greater than a second confidence level, the staging location is further from the current location of person 202.

In some embodiments, the staging location is based on a location requested by person 202 (e.g., person 202 does not request when platform 200 moves toward the requested location, but that platform 200 use the requested location when platform 200 determines that person 202 intends to use platform 200). In some embodiments, person 202 can select, modify, designate, and/or create a staging location using a user interface, such as a user interface of an application associated with platform 200. In some embodiments, person 202 can select requested staging locations in first areas, such as a residence of person 202. In some embodiments, person 202 can select from designated staging locations that are determined and/or set by an owner of a business in second areas, such as a commercial area having one or more businesses. In some embodiments, the owner of a business can select, modify, designate, and/or create staging locations for platform 200 and/or other platforms at the location of their business (such as via an application associated with platform 200 and/or other platforms).

Figure 8C:
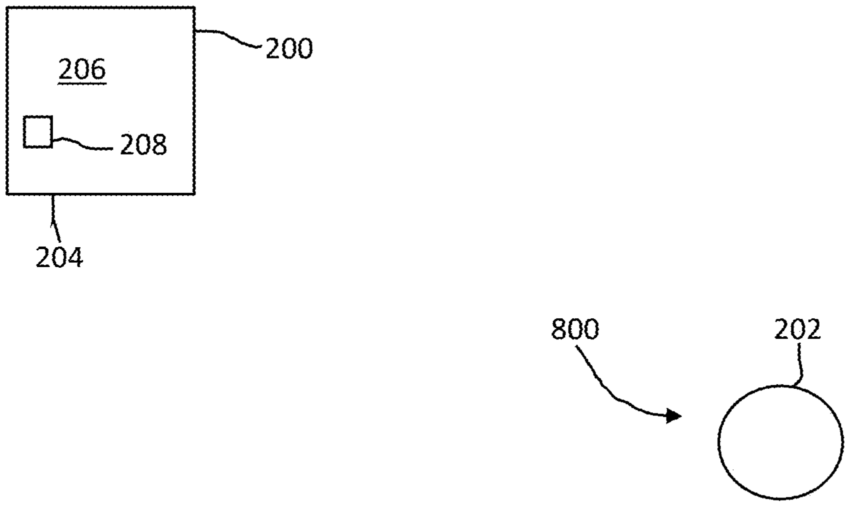

At FIG. 8C, platform 200 obtains the information about person 202 and determines that person 202 does not intend to use platform 200 to take a trip, as indicated by no hatching and/or fill of person 202 shown at FIG. 8C. For instance, platform 200 determines that a predicted intent of person 202 to use platform 200 includes a confidence level that is below the confidence level threshold. In addition, platform 200 determines that person 202 does not intend to use platform 200 to take the trip within a predetermined amount of time from the current time.

In some embodiments, platform 200 determines that person 202 does not intend to use platform 200 because calendar information of person 202 indicates that person 202 is already positioned at a location of a scheduled event. In some embodiments, platform 200 determines that person 202 does not intend to use platform 200 because person 202 sent and/or received a message indicating that person 202 is going to stay and/or remain at their current location. In some embodiments, platform 200 determines that person 202 does not intend to use platform 200 because person 202 does not typically use platform 200 to take a trip from location 800 around the current time of day (e.g., location 800 is the work and/or office of person 202 and person 202 is estimated to continue working for a few more hours).

At FIG. 8C, platform 200 remains at the parking location based on the determination that person 202 does not intend to use platform 200 to take the trip. As shown at FIG. 8C, platform 200 is illustrated with the smaller size to indicate that platform 200 is maintained at the parking location and/or has not moved closer to location 800 of person 202.

Figure 9:
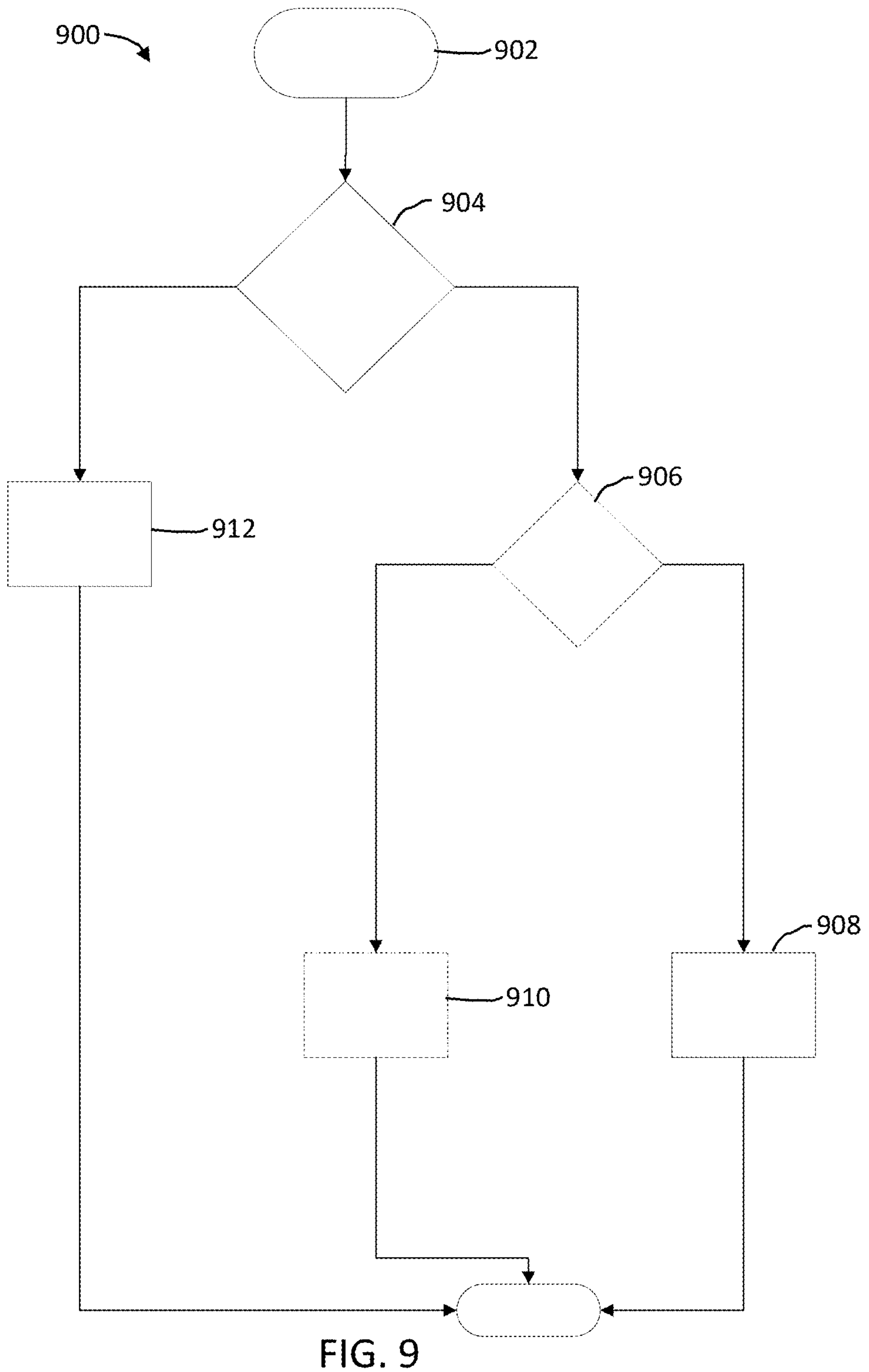
FIG. 9 is a flow diagram illustrating methods for causing a platform to arrive at a staging location, in accordance with some embodiments.

FIG. 9 is a flow diagram illustrating method 900 that can be performed by platform 200, such as a computer system associated with platform 200. At FIG. 9, platform 200 obtains indirect information about person 202, as shown at block 902. As set forth above, the indirect information about person 202 does not include a request by person 202 to perform a trip via platform 200. Instead, the indirect information about person 202 includes passive information that is used to determine whether person 202 intends to take a trip. Thus, person 202 does not have to spend the time providing user inputs and/or requests cause platform 200 to begin preparing for a trip.

After obtaining the indirect information about person 202, platform 200 determines whether the indirect information about person 202 indicates that person 202 intends to take a trip, as shown at block 904. For instance, as set forth above, platform 200 determines whether the indirect information is indicative of an intent of person 202 that includes a confidence level above a first confidence level threshold. In addition, platform 200 determines whether the indirect information indicates that person 202 intends to take the trip within a predetermined amount of time from a current time.

When platform 200 determines that person 202 intends to take a trip, platform 200 determines whether the predicted intent of person 202 is above a second confidence level threshold (such as a confidence level threshold that is greater than the first confidence level threshold), as shown at block 906. When platform 200 determines that the predicted intent of person 202 to take the trip is above the second confidence level threshold, platform 200 is moved to a first staging location, as shown at block 908. When platform 200 determines that the predicted intent of person 202 to take the trip is not above the second confidence level threshold (but is above the first confidence level threshold), platform 200 is moved to a second staging location, different from the first staging location, as shown at block 910. In some embodiments, the first staging location is closer to a current location of person 202 as compared to the second staging location.

When platform 200 determines that person 202 does not intend to take the trip, platform 200 is not moved to a staging location (such as the first staging location or the second staging location), as shown at block 912. In some embodiments, platform 200 is maintained at a current location (such as the parking location) when platform 200 determines that person 202 does not intend to take the trip.

As such, person 202 can quickly and easily find, reach, and/or enter platform 200 when person 202 intends to take a trip. In addition, platform 200 conserves power by not moving toward a staging location when person 202 does not intend to take the trip.

A system (e.g., 100 and/or 152) associated with a platform (e.g., 150 and/or 200) is configured to perform a method in accordance with some embodiments. The system (e.g., 100 and/or 152) obtains information (e.g., indirect and/or passive information (e.g., information that is not requested to be sent by a user), such as calendar information of a user, a message, habits of a user, past behavior of a user, a location of a user, a ticket in an electronic wallet of a user, and/or a location of a platform) that is associated with a user (e.g., 202) (e.g., a rider and/or passenger) of a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system), wherein the information does not include a request (e.g., an active and/or direct request to perform the trip that is initiated via user input and/or via the user interacting with the platform and/or an application associated with the platform) for the platform (e.g., 150 and/or 200) to perform a trip (e.g., a potential trip, an expected trip, and/or an unrequested trip).

In response to obtaining the information, in accordance with a determination that the information meets a first criterion that indicates that the user (e.g., 202) intends to perform the trip (e.g., the information indicates that the user of the platform intends to experience and/or go on the trip, such as by indicating that the user has an upcoming event, an event in which the user is currently attending is scheduled to end, a schedule of the user indicates that the user is likely to take the trip within a predetermined time, the user received and/or sent a message indicating that the user intends to take the trip within a predetermined time, the user is in a location where the user is likely to take the trip, and/or past behavior of the user indicates that the user is likely to take the trip within a predetermined time) within a predetermined amount of time (e.g., the user intends to perform the trip at a first estimated, predicted, and/or scheduled time that is within 30 minutes, within 20 minutes, within 10 minutes, within 5 minutes, and/or within 2 minutes of a current time) (in some embodiments, the predetermined amount of time is based on a location of the platform relative to a location of the user) from a current time (e.g., a current time of a current day), and in accordance with a determination that the information meets a second criterion that indicates that a confidence level (e.g., an estimated, predicted, and/or determined intent of the user that is based on the information about the trip that is associated with the user) (in some embodiments, the confidence level is determined using an algorithm and/or a machine-learning based program that uses the information about the trip that is associated with the user as an input) of an intent of the user (e.g., 202) (e.g., an intent to take the trip) satisfies a confidence level threshold (e.g., a threshold that indicates that the user is likely to want to take the trip), the system (e.g., 100 and/or 152) causes the platform (e.g., 150 and/or 200) to be positioned (e.g., causing the platform to move from a current location to the first location) at a staging location (e.g., a temporary parking spot and/or a temporary location in which the platform can remain stationary for a predetermined amount of time) that is within a predetermined distance of (e.g., within 1 mile of, within 0.5 miles of, within 0.25 miles of, within 100 feet of, and/or within 50 feet of) (in some embodiments, the predetermined distance is based on the second location of the user, the time associated with the trip, and/or a current location of the platform) a location (e.g., 800) of the user (e.g., 202) (e.g., a location of the user that is determined based on the information and/or based on additional location information received from an external computer system that is associated with the user, such as a device that is determined to be in the user's current possession).

In response to obtaining the information and in accordance with a determination that the information does not satisfy both the first criterion and the second criterion (e.g., the information indicates that the user of the platform does not intend to experience and/or go on the trip, such as by indicating that the time associated with the trip is not within the predetermined amount of time from the current time, the confidence level of the intent of the user is less than the confidence level threshold, the user does not have an upcoming event, an event in which the user is currently attending is not scheduled to end within a predetermined time, a schedule of the user indicates that the user is not likely to take the trip within a predetermined time, the user has not received and/or sent a message indicating that the user intends to take the trip within a predetermined time, the user is not in a location where the user is likely to take the trip, and/or past behavior of the user indicates that the user is not likely to take the trip within a predetermined time), the system (e.g., 100 and/or 152) forgoes causing the platform (e.g., 150 and/or 200) to be positioned at the staging location (e.g., maintaining a position of the platform at the current location of the platform).

In some embodiments, the request for the platform (e.g., 150 and/or 200) to perform the trip is obtained via an application associated with the platform (e.g., 150 and/or 200) (e.g., the request is configured to be obtained from (such as transmitted to the platform via a server) a software program that enables the user (such as via one or more user inputs) to request and/or summon the platform to arrive at a predefined location).

In some embodiments, the information is selected from the group consisting of: calendar information associated with the user (e.g., 202) (e.g., information that includes a schedule, timing and/or locations of meetings, and/or timing and/or locations of events), one or more electronic messages sent and/or received by the user (e.g., 202) (e.g., content associated with one or more text messages, electronic mail messages, short message service messages, and/or voicemail messages), historical information of the user (e.g., 202) (e.g., information corresponding to estimated, learned, and/or predicted trips that the person associated with the platform takes at particular times), user preferences of the user (e.g., 202) (e.g., information corresponding to preferences of the user that indicate whether the user is likely to and/or intends to take the trip), wallet information of the user (e.g., 202) (e.g., information associated with a ticket for a scheduled event that is included in an electronic wallet of the user (such as an electronic wallet associated with a user account of the user)), a current location of the user (e.g., 202) (e.g., location information of the user that suggests whether the user is likely to request that the platform perform the trip or not), transactional information of the user (e.g., 202) (e.g., transactions that occurred using one or more accounts associated with the user (such as a transaction acquiring a hotel room and/or a ticket to a concert)), information associated with applications of an external computer system associated with the user (e.g., 202) (e.g., software and/or applications that provide location information, transaction information, reservation information (such as dinner reservations), and/or scheduling information), and browser history information (e.g., whether the user planned a trip using a travel planning website).

In some embodiments, the information is obtained via a communication network (e.g., a network of at least two devices (such as computer systems) that are in communication with one another (such as via a server)) that includes the platform (e.g., 150 and/or 200) and one or more external computer systems (e.g., one or more smart phones, smart watches, laptop computer systems, and/or tablet computer systems that are associated with an account of the user).

In some embodiments, the information does not include a destination location (e.g., a location at which the user has requested as a stopping location and/or an ending location for the trip) requested by the user (e.g., 202) (e.g., an active and/or direct request that the trip include the destination location as a stopping location and/or an ending location).

In some embodiments, causing the platform (e.g., 150 and/or 200) to be positioned at the staging location that is within the predetermined distance of the location (e.g., 800) of the user (e.g., 202) includes causing the platform (e.g., 150 and/or 200) to be positioned at an estimated location (e.g., a location at which the user is estimated, predicted, and/or determined to be located at the second time) of the user (e.g., 202) at a first time (e.g., a time that is prior to or the time as the second time at which the user intends to perform the trip), wherein the first time is based on a second time at which the user (e.g., 202) intends to perform the trip (e.g., an estimated, determined, and/or predicted time at which the user is expected to enter an interior portion of the platform to begin the trip).

In some embodiments, the system (e.g., 100 and/or 152) determines the staging location based on a second set of one or more criteria (e.g., whether a location is safe for the platform to stop moving (such as based on traffic conditions, road construction, an amount of people positioned near the location, obstructions) and/or whether the location is designated as a stopping location and/or a parking location (such as via local ordinances, laws, and/or traffic regulations)) that indicates whether a first location is an appropriate location for the staging location (e.g., whether the platform can stop moving and/or temporarily park at the first location without risking damage to the platform, without risking safety concerns for the user (and, optionally, other users of the platform), and/or without risking violating traffic laws).

In some embodiments, the second set of one or more criteria that indicates whether the first location is an appropriate location for the staging location includes determining whether the first location includes a cell phone lot, whether the first location is suitable for the platform to park and/or temporarily stop for a predetermined amount of time, whether the first location includes limitations and/or restrictions on movement and/or behavior of the platform (such as whether the platform is blocking other platforms, whether the platform is restricting traffic, whether the platform should limit noise output, and/or whether the platform should respond to movement of other platforms and/or people at the first location).

In some embodiments, in accordance with a determination that the intent of the user (e.g., 202) satisfies a second confidence level threshold (e.g., a second estimated, predicted, and/or determined intent of the user that is based on the information about the trip that is associated with the user), the system (e.g., 100 and/or 152) causes the platform (e.g., 150 and/or 200) to be positioned at a second staging location (e.g., the staging location or a second temporary parking spot and/or a temporary location in which the platform can remain stationary for a predetermined amount of time). In some embodiments, in accordance with a determination that the intent of the user (e.g., 202) satisfies a third confidence level threshold (e.g., a third estimated, predicted, and/or determined intent of the user that is based on the information about the trip that is associated with the user), different from the second confidence level threshold, the system (e.g., 100 and/or 152) causes the platform (e.g., 150 and/or 200) to be positioned at a third staging location (e.g., a third temporary parking spot and/or a temporary location in which the platform can remain stationary for a predetermined amount of time), different from the second staging location. In some embodiments, the staging location is different based on whether a determination is made that the user is more likely or less likely to perform the trip. In some embodiments, the staging location is at a location that is closer to the location of the user based on a determination that the user is more likely to perform the trip and the staging location is at a location that is further from the location of the user based on a determination that the user is less likely to perform the trip.

In some embodiments, the system (e.g., 100 and/or 152) obtains second information (e.g., obtaining information via an external computer system that is associated with the user, where the external computer system displays a user interface that enables the user to request, modify, select, create, and/or designate a preferred and/or intended staging location) that is associated with a fourth staging location requested by the user (e.g., 202) (e.g., a location that is selected, designated, and/or requested by the user as the staging location), wherein the staging location is based on the second information that is associated with the fourth staging location requested by the user (e.g., 202) (e.g., the staging location is at a location that is the fourth staging location, that is proximate to the fourth staging location, and/or is as close to the fourth staging location as is safely and/or legally possible (such as based on safety conditions around the fourth staging location and/or traffic laws and/or regulations around the fourth staging location)).

In some embodiments, in response to obtaining the second information that is associated with a fourth staging location requested by the user (e.g., 202) and in accordance with a determination that the fourth staging location requested by the user (e.g., 202) is associated with a commercial location (e.g., the user requested to stage the platform at a business and/or location that is not owned and/or associated with the user), the system (e.g., 100 and/or 152) determines the staging location based on one or more fifth staging locations designated by an owner of the commercial location (e.g., an owner of a business and/or commercial structure designates and/or selects options for staging areas at the commercial location) (in some embodiments, the fourth staging location includes a selection of a sixth staging location of the one or more fifth staging locations) (in some embodiments, the one or more fifth staging locations are designated by the owner of the commercial location via a user interface of an external computer system that guides and/or facilitates designation of the one or more fifth staging locations). In some embodiments, in response to obtaining the second information that is associated with the fourth staging location requested by the user (e.g., 202) and in accordance with a determination that the fourth staging location requested by the user (e.g., 202) is associated with a residential location (e.g., a home and/or residence of the user), the system (e.g., 100 and/or 152) determines that the staging location is the fourth staging location (e.g., the user can designate the staging location of the platform at their own home and/or residence (such as via a user interface displayed on an external computer system associated with the user)).

Passengers need a clear way to interact with a platform as well as other applications and/or smart devices. For example, a passenger may wish to request a platform for a trip from the passenger's home to the passenger's office and also adjust one or more smart devices of the passenger's home. Current platforms do not allow a passenger to control the platform (e.g., request a platform and/or provide an itinerary) while also interacting with components of the passenger's computer system and smart devices associated with the passenger.

Thus, there is need for a platform, such as a vehicle, which can be controlled through a control application that also provides access to components of the passenger's computer system, applications installed on the passenger's computer system, and/or smart devices associated with the passenger. For example, by using a single application and/or user interface the passenger can request a pick-up from a platform, access an application associated with the platform to provide a destination, enable and/or disable a component of the computer system (e.g., a smart phone, smart watch, tablet, and/or laptop), and activate or deactivate a smart light or smart lock at the passenger's home. In this way the passenger can efficiently manage and interact with controls for several different devices and the platform.

Figure 10A:
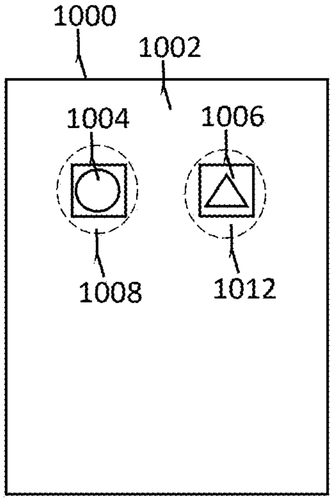
FIGS. 10A-10D illustrate examples of user interfaces for interacting with a platform and other functions, in accordance with some embodiments.

Turning now to the drawings. FIG. 10A illustrates computer system 1000 displaying user interface 1002. User interface 1002 includes platform control element 1004 and function control element 1006. While displaying user interface 1002, computer system 1000 detects input 1008 on platform control element 1004.

In some embodiments, input 1008 is an input of a first type such as a tap input. In response to determining that input 1008 is an input of the first type, computer system 1000 performs a function associated with the platform such as initiating a request for a platform to move to a location. In some embodiments, the location is a location of computer system 1000 or the passenger associated with computer system 1000. In some embodiments, the location is a predetermined location such as the passenger's home or place of work. In some embodiments, the location is the location of another computer system that can be associated with the passenger.

In some embodiments, input 1008 is an input of a second type such as a gaze, a press, and/or a long press input. In response to determining that input 1008 is an input of the second type, computer system 1000 displays user interface 1010 associated with the platform, as shown in FIG. 10C. User interface 1010 is a user interface of an application for controlling the platform. Accordingly, user interface 1010 displays a status of the platform including the current distance the platform is from the passenger. In some embodiments, user interface 1010 includes one or more control elements and/or selectable user interface elements that allow input of a pick-up location, selection of a platform, and/or cancellation of a pick-up request. In some embodiments, computer system 1000 detects input 1020 which can include a swipe, drag, and/or pull input. In response to detecting input 1020, computer system 1000 displays user interface 1002 as shown in FIG. 10A.

Returning to FIG. 10A, while displaying user interface 1002, computer system 1000 detects input 1012 on function control element 1006. In some embodiments, function control element 1006 is associated with a component of computer system 1000. Accordingly, when input 1012 is detected selecting function control element 1006, computer system 1000 executes a function associated with the function control element. For example, when function control element 1006 is associated with a flashlight of computer system 1000, selection of function control element 1006 causes computer system 1000 to turn the flashlight on or off.

In some embodiments, function control element 1006 is associated with an application installed on computer system 1000. Accordingly, when input 1012 is determined to be an input of a first type, such as a tap input, computer system 1000 causes a function associated with the application to be performed. For example, when function control element 1006 is associated with an application for controlling smart devices, selection of function control element 1006 with a tap input causes the smart device such as a smart light to turn on or off. As another example, when function control element 1006 is associated with an application for a home security system, selection of function control element 1006 with a tap input causes a smart lock to engage or disengage and/or causes a home alarm system to arm or disarm.

In some embodiments, input 1012 is determined to be an input of a second type, such as a gaze, press, and/or long press. Accordingly, in response to determining that input 1012 is an input of the second type, computer system 1000 displays user interface 1014 associated with the smart home application, as shown in FIG. 10D. User interface 1014 includes selectable elements 1016 for performing various functions of the application including adding a smart device, modifying a smart device, and deleting a smart device.

Figure 10B:
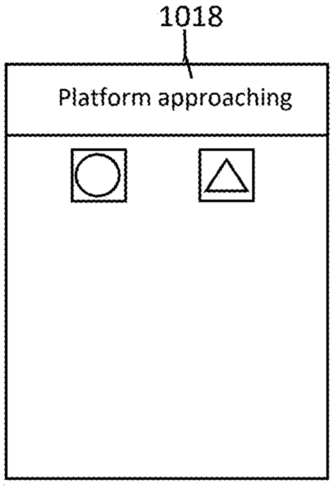
Figure 10C:
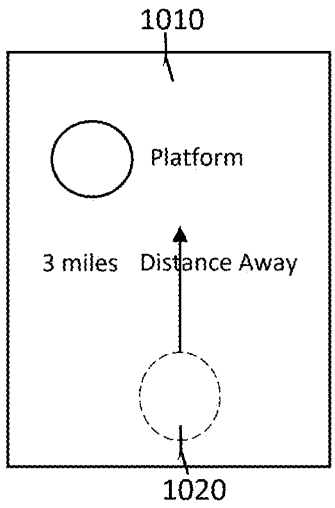
Figure 10D:
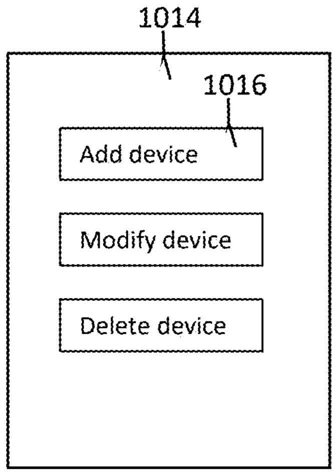

Returning to FIG. 10A, in some embodiments, when the platform is nearing the location requested by the passenger (e.g., the pick-up location), computer system 1000 displays notification 1018, as shown in FIG. 10B. Notification 1018 includes that information related to the platform including a status of the platform and/or a distance from the platform to the user. In some embodiments, notification 1018 is displayed over (e.g., on top of) user interface 1002. In some embodiments, notification 1018 is displayed over (e.g., on top of) another user interface of computer system 1000.

In some embodiments, user interface 1002 is associated with an operating system of computer system 1000. For example, rather than being associated with one application installed on computer system 1000 or a device connected to computer system 1000, user interface 1002 is a part of the operating system of computer system 1000 and thus can access many different applications and functions associated with computer system 1000, the platform, and other devices.

In some embodiments, user interface 1002 includes an element for selecting a pick-up location. For example, user interface 1002 can include an element that when selected displays different locations the platform can travel to including the current location of computer system 1000, the passenger's home, and a commonly requested location. Computer system 1000 can then detect selection of one of the provided locations and cause the platform to begin traveling towards the selected location.

In some embodiments, user interface 1002 is displayed by computer system 1000 in response to detecting a predetermined type of input regardless of the currently displayed user interface. For example, when computer system 1000 detects a drag input from the bottom of the screen such as input 1020 on any of the user interfaces of computer system 1000, computer system 1000 can display user interface 1002.

Figure 11:
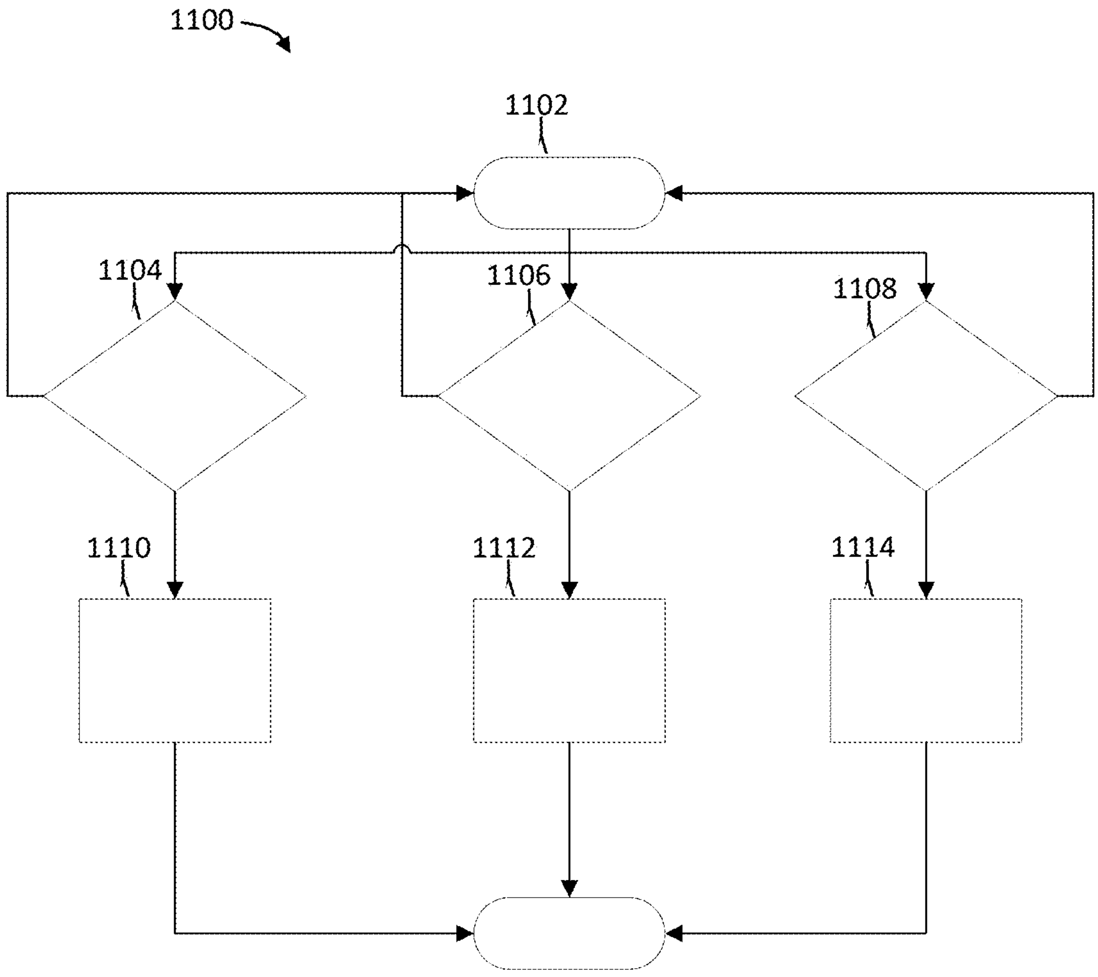
FIG. 11 is a flow diagram illustrating methods for providing user interfaces for interacting with a platform and other functions, in accordance with some embodiments.

FIG. 11 is a flow diagram illustrating method 1100 that can be performed by computer system 1000. At block 1104, computer system 1000 determines whether selection of the function control element is selected. When selection of the function control element is detected then computer system 1000 performs the associated function as shown at block 1110. When the function control element is not selected then computer system 1000 continues to display user interface 1002, as shown at block 1102.

At block 1106, computer system 1000 determines whether selection of the platform control element is detected. When selection of the platform control element is detected then computer system 1000 requests that the platform perform a pick-up action at the requested location as shown at block 1112. When selection of the platform control element is not detected then computer system 1000 continues to display user interface 1002, as shown at block 1102.

At block 1108, computer system 1000 determines whether the platform has arrived or is arriving at the requested location. When the platform has arrived or is arriving at the requested location then computer system 1000 provides a notification of the platform arrival as shown at block 1114. When the platform has not arrived or is not yet arriving at the requested location then computer system 1000 continues to display user interface 1002 as shown at block 1102.

In some embodiments, a computer system (e.g., 100, 152, and/or 1000) (e.g., a smartwatch, a wearable electronic device, a smartphone, a desktop computer, a laptop, or a tablet) that is in communication with a display generation component (e.g., a display controller and/or a touch-sensitive display system) displays, via the display generation component, a user interface (e.g., a control user interface, a control center, a user interface that includes a selectable user interface element associated with an application, a user interface that includes a selectable user interface element for changing a setting of the computer system (such as changing the brightness, volume, and/or orientation of the computer system), a user interface that includes a selectable user interface element for changing a mode of the computer system (such as airplane mode, an orientation lock), a user interface that includes a selectable user interface element for enabling a component of the computer system (e.g., an antenna, a flashlight)).

In some embodiments, the computer system is in communication with one or more input devices (e.g., a button, a rotatable input mechanism, a speaker, a camera, a motion detector (such as, e.g., an accelerometer and/or gyroscope), and/or a touch-sensitive surface).

Displaying the user interface including the selectable user interface element for enabling a component of the computer system includes concurrently displaying: a platform control element (e.g., a complication, an affordance, and/or a button) that, when selected, causes the computer system (e.g., computer system 1000) to perform a function associated with a platform (e.g., 150 and/or 200) (e.g., a physical platform, a virtual platform, a simulated platform, a mobile platform, and/or a vehicle), and a function control element (e.g., a complication, an affordance, and/or a button) that, when selected, causes the computer system to perform a function that is not associated with the platform (e.g., a home and/or smart device application such as a smart light or a smart lock). In some embodiments, the platform is controlled by and/or otherwise in communication with the computer system. In some embodiments, the platform control element calls and/or controls the vehicle.

The computer system (e.g., 100, 152, and/or 1000) detects selection of the platform control element (e.g., a set of one or more inputs, a raise or rotation gesture, a set of one or more touch gestures (e.g., on a touch-sensitive surface), a voice command, a button press, and/or a rotation of a rotatable input mechanism); and in response to (or, in some embodiments, after) detecting the selection of the platform control element, initiates (e.g., providing, sending, and/or creating) a request for the platform (e.g., 150 and/or 200) to move to (e.g., arrive at) a location (e.g., a request for the platform to arrive at and/or pick up the user at a location). In some embodiments, the location is the location of a computer system associated with the user. In some embodiments, the location of the computer system is based on a sensor (e.g., GPS) of the computer system. In some embodiments, the location is a predetermined location (e.g., a default or preset location). In some embodiments, the predetermined location is a landmark set by the user (e.g., the user's home or work). In some embodiments, the location is a location of another computer system (e.g., a watch or computer and not the user's phone).

In accordance with a determination that a set of arrival criteria is met (e.g., an estimated arrival time is within a predetermined amount of time and/or the platform is within a predetermined distance (e.g., a static distance or a dynamic distant that is based on one or more factors such as the location of the computer system, a velocity of the platform, and/or an estimated arrival time) of the location of the computer system), the computer system (e.g., 100, 152, and/or 1000) provides (e.g., displaying and/or outputting) a notification indicating that the platform (e.g., 150 and/or 200) is near the location. In some embodiments, the notification is provided in the user interface. In some embodiments, the notification is provided in the platform control element. In some embodiments, the notification is provided over a currently displayed user interface of the computer system. In some embodiments, the notification includes a graphical notification. In some embodiments, the notification includes an audio notification and/or a haptic notification.

In some embodiments, the platform control element displays a platform type (e.g., a graphical representation, such as an icon or thumbnail image, that is based on the platform type). In some embodiments, the platform control element displays an estimated distance of the platform (e.g., 150 and/or 200) (e.g., a vehicle) from the computer system. In some embodiments, the platform control element displays a status (e.g., parked, on the way, delayed, arrived, and/or parking) of the platform (e.g., vehicle). In some embodiments, the user interface is accessed in response to receiving a particular type of input (e.g., a swipe, tap, and/or drag). In some embodiments, the user interface is accessed in response to receiving a particular type of input regardless of a currently displayed user interface (e.g., an application interface or a system interface, such as a lock screen, a wake screen, or a home screen) of the computer system (e.g., the computer system displays the user interface, including the platform control element, in response to detecting the input while displaying an application interface or a system interface). In some embodiments, the user interface is configurable and/or customizable. For example, in some embodiments, an input to customize the user interface is received. In some embodiments, in response to receiving the input to customize the user interface, the platform control element is displayed at a second position within the user interface. In some embodiments, in response to receiving the input to customize the user interface, a second platform control element is displayed in the user interface. In some embodiments, in response to receiving the input to customize the user interface, a second function control element is displayed in the user interface. In some embodiments, in response to receiving the input to customize the user interface, the function control element is displayed at a second position within the user interface.

In some embodiments, the user interface is associated with an operating system of the computer system (e.g., 100, 152, and/or 1000). For example, in some embodiments, the user interface is developed as a part of the operating system. In some embodiments, the user interface is an interface of the operating system and includes a plurality of control elements associated with the operating system.

In some embodiments, displaying, via the display generation component, the user interface further includes concurrently displaying: a first application element (e.g., a complication, an affordance, and/or a button) that, when selected, causes the computer system (e.g., 100, 152, and/or 1000) to display a user interface (e.g., access) associated with a first application (e.g., an application of the computer system such as a music, navigation, messaging, and/or browsing application); and a second application element (e.g., a complication, an affordance, and/or a button) that, when selected, causes the computer system to display a user interface (e.g., access) associated with a second application (e.g., an application of the computer system such as a music, navigation, messaging, and/or browsing application). In some embodiments, the first application is different from the second application. In some embodiments, the first application is associated with a first type of task (e.g., playing music) and the second application is associated with a second type of task (e.g., providing directions). In some embodiments, the first type of task is different from the second type of task. In some embodiments, the first application and the second application are associated with the same type of task.

In some embodiments, the platform control element, when selected, causes the computer system (e.g., 100, 152, and/or 1000) to send a request (e.g., a summon and/or a call) for the platform to move to a requested location (e.g., the location of the computer system and/or a location the user requests); and the function control element (e.g., a complication, an affordance, and/or a button), when selected, causes the computer system to perform an operation (e.g., enable, disable, and/or change a state and/or mode) with a component (e.g., a flashlight) of the computer system.

In some embodiments, displaying, via the display generation component, the user interface further includes displaying a location element (e.g., a location setting and/or drop down) that, when selected, causes the computer system to display a location settings interface (e.g., options that can be selected for the location such as the user's current location, a predetermined location, and/or another location). In some embodiments, displaying the location settings interface includes displaying a predetermined location (e.g., the user's home or work). In some embodiments, displaying the location settings interface includes displaying a location of the computer system (e.g., the user's current location). In some embodiments, displaying the location settings interface includes displaying a location of another computer system associated with the user (e.g., the user's smartwatch or computer).

In some embodiments, the platform control element is a selectable user interface element (e.g., an affordance and/or a button) that, when selected, causes the computer system to send a request for the platform (e.g., platform 150) to move to the location of the computer system (e.g., the user).

In some embodiments, the computer system (e.g., 100, 152, and/or 1000) detects a user input selecting the platform control element. In some embodiments, in accordance with a determination that the user input selecting the platform control element is of a first type (e.g., the user input is a tap), causes the computer system to send the request for the platform (e.g., 150 and/or 200) to move to the location of the computer system; and in accordance with a determination that the user input selecting the platform control element is of a second type (e.g., the user input is a press, a long press, and/or a gaze), causes the computer system to display (e.g., open and/or make the focus) an application associated with the platform. In some embodiments, the input of the first type has a first duration (e.g., a tap) and the input of the second type has a second duration (e.g., a press). In some embodiments, the second duration is longer than the first duration. In some embodiments, the method further comprises detecting a user input selecting the function control element. In some embodiments, in accordance with a determination that the user input selecting the function control element is of a first type, causing the computer system to perform the function that is not associated with the platform. In some embodiments, in accordance with a determination that the user input selecting the function control element is of a second type, causing the computer system to display an application associated with the function control element (e.g., an application associated with a component of the computer system (e.g., flashlight and/or network settings) and/or an application associated with a smart device).

Passengers travelling in a platform can watch and/or listen to media content including music, videos, and/or engaging in phone calls with other users that the passengers would like to continue when outside of the platform. For example, a passenger that starts watching a video while walking from their house to the platform will want to continue watching the video upon entering the platform and a passenger that starts a phone call while in the platform will want to continue that phone call when the passenger must leave the platform to enter their place of work. In such instances, it is desirable for the passenger to enjoy full use of the capabilities of the platform including larger screens for viewing and audio systems for listening while being able to transfer the media content efficiently and intelligently when the passenger is transitioning in or out of the platform. For example, a passenger may not wish to transfer the song they are listening to from their personal device (e.g., a cell phone, smart watch, tablet, and/or laptop) to an output device of the platform when another passenger is in the platform or when the subject matter is of a personal nature. Existing platforms do not provide this ability to efficiently and intelligently transfer media content of different types. Instead, the passenger must choose for all media content to be automatically transferred or for none of the media content to be transferred.

Thus, there is a need for a platform, such as a vehicle, that can determine whether criteria for transferring media content are met and transfer the media efficiently when desired by the users, or passengers, of the platform. For example, when watching a movie with another passenger in the platform, a passenger leaving the platform would not want the movie to transfer from the platform to the leaving passenger's personal device as this would prevent the continuing passenger from finishing the movie. Rather, the departing passenger may like the movie to start playing on their personal device from the point when they departed while the movie continues playing in the platform or may wish for the movie to not play on their personal device at all. As another example, a passenger entering the vehicle talking on an accessory device such as smart headphones would not want an ongoing call through the smart headphones to transfer to speakers of the platform because the call may include personal information. Thus, the platform can determine that based on the current output device of the incoming passenger's phone call the call should not be transferred when the passenger enters the platform.

Figure 12A:
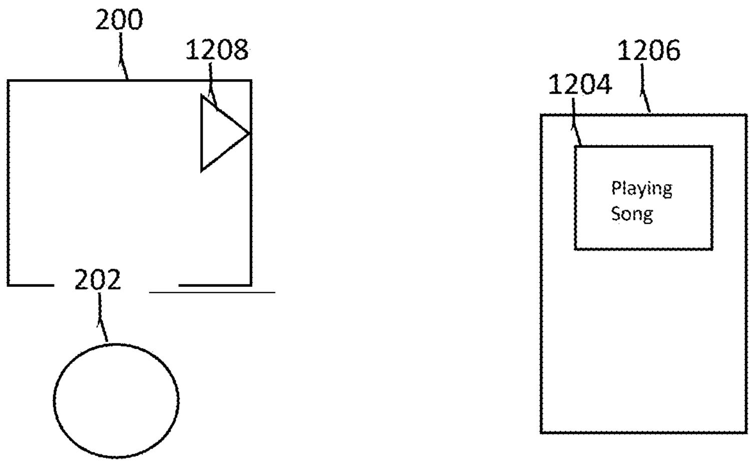
FIGS. 12A-12D illustrate examples of media transfer to a platform, in accordance with some embodiments.

Turning now to the figures, FIG. 12A illustrates platform 200 waiting to pick up passenger 202 as passenger 202 moves toward platform 200. As passenger 202 approaches platform 200, passenger 202 is listening to music 1204 on personal device 1206. When passenger 202 enters (e.g., ingresses) platform 200, platform 200 determines whether to transfer music 1204 to speaker 1208 of platform 200. Platform 200 determines whether to transfer music 1204 (or other media content including a video and/or a phone call) to speaker 1208 of platform 200 based on whether transfer criteria are met. Exemplary transfer criteria includes, but is not limited to, whether other passengers are in platform 200, the type of media content being play by personal device 1206, whether music 1204 is being played through an accessory device (e.g., headphones) connect to personal device 1206, and/or whether platform 200 is already playing media content. Because platform 200 does not include any other passengers and is not playing any other media content when passenger 202 enters with personal device 1206 playing music 1204, platform 200 transfers music 1204 from personal device 1206 to speaker 1208, as shown in FIG. 12B.

Figure 12B:
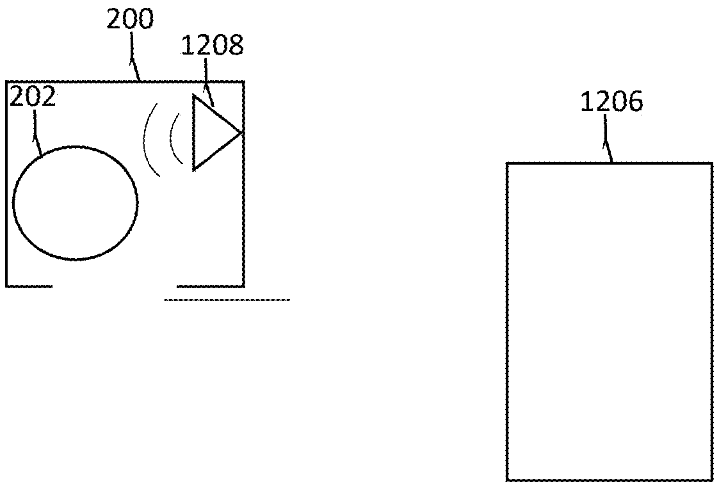

At FIG. 12B, platform 200 is playing music 1204 from speaker 1208 and personal device 1206 has stopped playing music 1204, demonstrating that music 1204 has been successfully transferred from personal device 1206 associated with passenger 202 to platform 200.

Figure 12C:
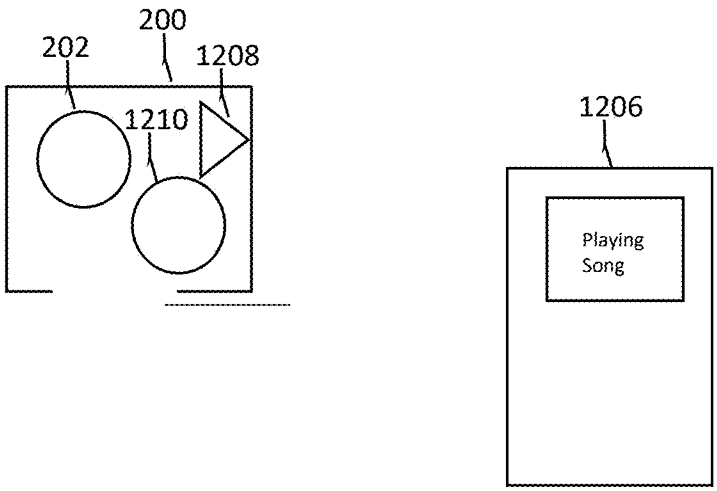

In contrast, at FIG. 12C, platform 200 is not playing music 1204 from speaker 1208. In particular, platform 200 has determined that transfer criteria are not met because passenger 1210 was already in platform 200 when passenger 202 entered platform 200 with personal device 1206 playing music 1204. Accordingly, platform 200 does not transfer music 1204 from personal device 1206 and personal device 1206 continues to play music 1204. As discussed above, in another example, personal device 1206 plays music 1204 through smart and/or wireless headphones connected to personal device 1206. Accordingly, when passenger 202 enters platform 200, music 1204 is not transferred to platform 200 and continues to play on personal device 1206.

Figure 12D:
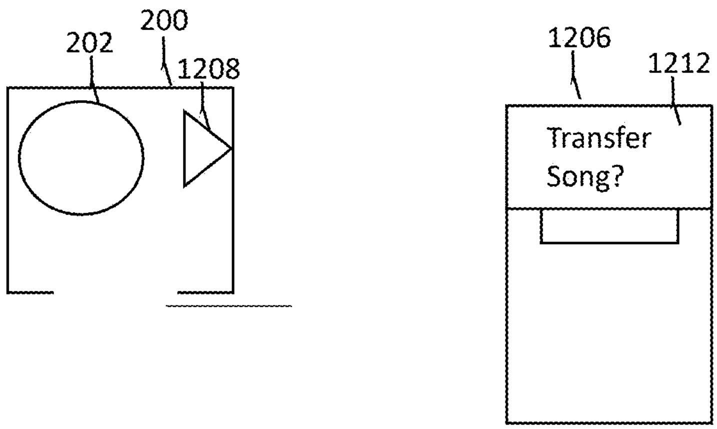

In some embodiments, prompt 1212 to transfer music 1204 is provided to passenger 202, as shown in FIG. 12D. In some embodiments, prompt 1212 is displayed on a display (e.g., screen) of personal device 1206. In some embodiments, prompt 1212 is displayed on a display (e.g., screen) of platform 200. In some embodiments, prompt 1212 is provided as an audio output from personal device 1206 and/or speaker 1208 of platform 200. In some embodiments, prompt 1212 is provided as an audio output and on a display of personal device 1206 and/or platform 200.

In some embodiments, after providing prompt 1212, platform 200 and/or personal device 1206 detects an input. In some embodiments, in accordance with the detected input indicating to transfer music 1204, music 1204 is transferred from personal device 1206 to platform 200. In some embodiments, in accordance with the detected input indicating not to transfer music 1204, music 1204 is not transferred from personal device 1206 to platform 200. In some embodiments, the input is a voice input provided by passenger 202 such as "yes, transfer my music to the platform." In some embodiments, the input is a tap and/or press input on a touch sensitive display or a button of personal device 1206 and/or platform 200.

In some embodiments, transferring music 1204 includes continuing to play music 1204 from the point of transfer from personal device 1206 to speaker 1208 of platform 200. For example, when passenger 202 enters platform 200 personal device 1206 may have previously provided an output of a portion (e.g., 30 seconds, 1 minute, 2 minutes, etc.) of music 1204. Accordingly, when music 1204 is transferred to platform 200, the output of music 1204 from speaker 1208 will start after the portion that has previously been played. Thus, rather than starting music 1204 from the beginning, platform 200 will play music 1204 from the point at which the transfer was initiated (e.g., 30 seconds, 1 minute, or 2 minutes into the song). As another example, when personal device 1206 has previously played the first 35 minutes of a movie when passenger 202 enters platform 200, platform 200 will continue playing the movie at the 35-minute mark so that the previously viewed portion is not provided to passenger 202.

In some embodiments, a first portion of music 1204 is transferred prior to a second portion of music 1204. For example, an initial portion of music 1204 is transferred and provided as an output from speaker 1208 of platform 200 while the rest of music 1204 is transferred. In this way, music 1204 and other media content can be provided in a more fluid manner without requiring the entirety of the media content to be transferred prior to providing an output for passenger 202.

In some embodiments, platform 200 and personal device 1206 make a similar determination when passenger 202 is leaving platform 200. Thus, platform 200 and personal device 1206 will determine whether to transfer media from platform 200 to personal device 1206 when passenger 202 leaves platform 200 when certain transfer criteria are met. For example, when passenger 202 leaves platform 200 and music 1204 is playing through speaker 1208, music 1204 will not be transferred to personal device 1206 when passenger 1210 is also in platform 200 at the time of passenger 202's departure. Conversely, when passenger 202 leaves platform 200 and music 1204 is playing through speaker 1208, music 1204 will be transferred to personal device 1206 when there are no other passengers in platform 200 at the time of passenger 202's departure (e.g., egress).

Figure 13:
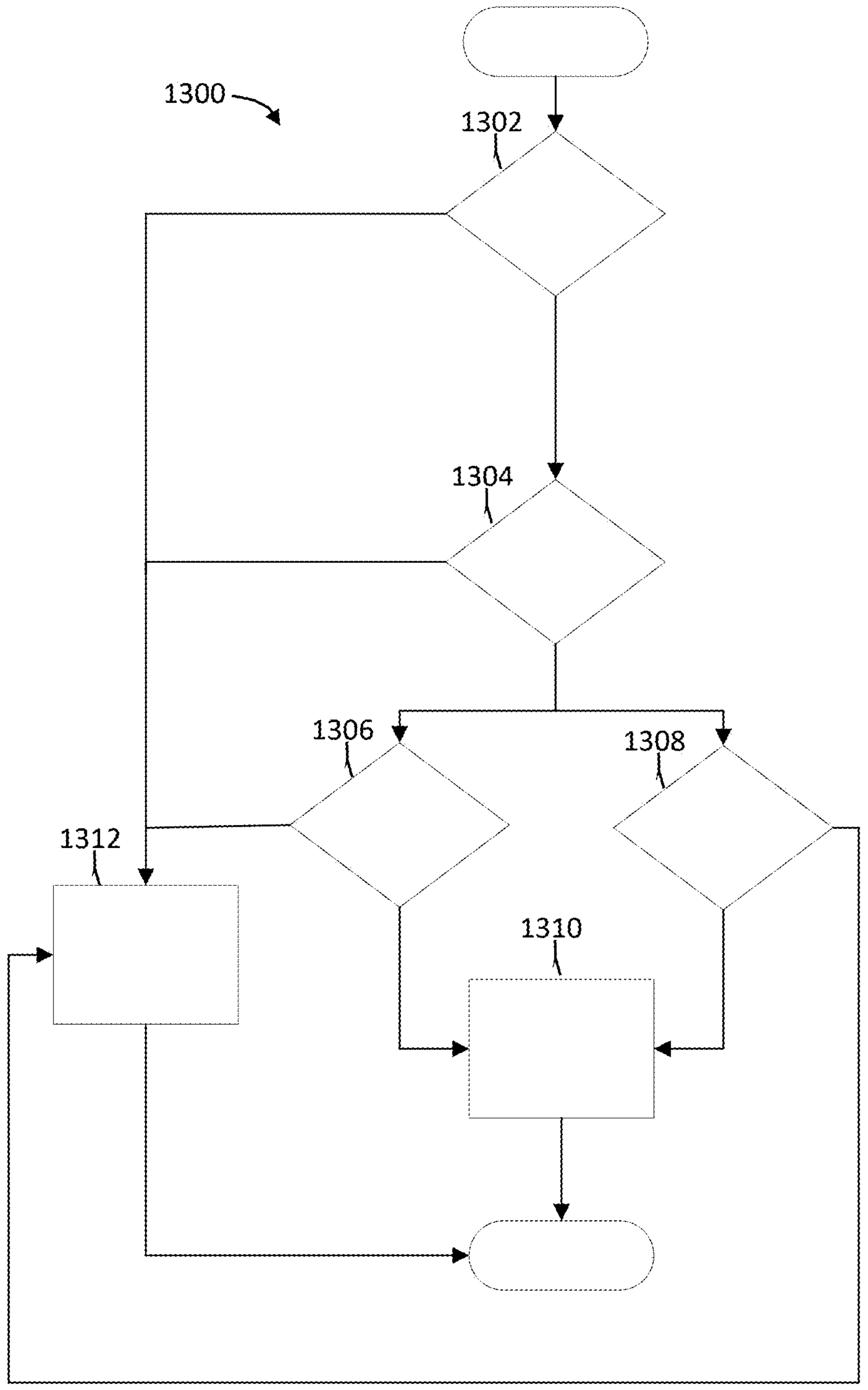
FIG. 13 is a flow diagram illustrating method for transferring media to a platform, in accordance with some embodiments.

FIG. 13 is a flow diagram illustrating method 1300 that can be performed by platform 200, personal device 1206, and/or another computer system. At FIG. 13, platform 200, personal device 1206, and/or another computer system (e.g., a computer system of platform 200) determine whether to transfer media from personal device 1206 to platform 200. For instance, at block 1302, platform 200, personal device 1206, and/or another computer system determines whether passenger 202 (e.g., a user) has entered platform 200 (e.g., the vehicle). When passenger 202 has not entered platform 200 then media (e.g., music 1204) is not transferred from personal device 1206 to platform 200, as shown in block 212. When passenger 202 has entered platform 200, then platform 200, personal device 1206, and/or another computer system determines whether personal device 1206 is playing media such as music 1204, as shown in block 1304.

When personal device 1206 is not playing media then media is not transferred from personal device 1206 to platform 200, as shown in block 1312. When personal device 1206 is playing media then platform 200, personal device 1206, and/or another computer system determines whether other transfer criteria are met as shown in blocks 1306 and 1308. In particular, at block 1306, platform 200, personal device 1206, and/or another computer system determines whether another passenger (e.g., user) is in platform 200. When another passenger is in platform 200 then media is not transferred from personal device 1206 to platform 200, as shown in block 1312. When another passenger is not in platform 200 then media is transferred from personal device 1206 to platform 200, as shown in block 1310.

At block 1308, platform 200, personal device 1206, and/or another computer system determines whether media is playing through an accessory device such as headphones. When media is playing through an accessory device then media is not transferred from personal device 1206 to platform 200, as shown in block 1312. When media is not playing through an accessory device then media is transferred from personal device 1206 to platform, as shown in block 1310. Accordingly, media is transferred from personal device 1206 to platform 200 when the set of criteria indicate that media should be transferred.

It should be appreciated that FIG. 13 is exemplary and blocks of method 1300 can be combined and/or performed in alternative methods than those shown in FIG. 13. For example, platform 200, personal device 1206, and/or another computer system can determine whether another passenger is in platform 200 at the same time as platform 200, personal device 1206, and/or another computer system determines whether media is playing through an accessory device and transfer the media from personal device 1206 to platform 200 when there is no other passenger and media is not playing through an accessory. As another example, platform 200, personal device 1206, and/or another computer system can determine whether personal device 1206 is playing media before determining whether passenger has entered platform 200, or may determine whether personal device 1206 is playing media at the same as determining whether passenger 202 has entered platform 200.

A system (e.g., 100 and/or 152) associated with the platform (e.g., 150 and/or 200) is configured to perform a method in affordance with some embodiments. The system detects that a set of ingress criteria is met, the set of ingress criteria including a criterion that a user (e.g., 202) has entered a platform (e.g., a mobile platform, a physical platform, a virtual platform, and/or a vehicle); and in response to detecting that the set of ingress criteria is met and in accordance with a determination that a set of content transfer criteria is met, the set of content transfer criteria including a condition that a computer system associated with the user (e.g., the user that has been determined to have entered the platform) is performing (e.g., currently performing) playback of (e.g., playing) media content (e.g., a video, a song, and/or a call), initiating (e.g., transferring) playback of the media content on a media output device of the platform (e.g., a speaker, screen, and/or surface of the platform).

In some embodiments, playback of the media content is transferred from a computer system associated with the user (e.g., 202) (e.g., a cell phone, a tablet, a laptop computer, a desktop computer, a television, and/or a smart speaker) to the output device (e.g., a screen, a speaker, a projector, and/or a touch-sensitive surface) of the platform (e.g., 150 and/or 200).

In some embodiments, the media content includes a video output (e.g., a movie, a video call, and/or a camera stream) and/or an audio output (e.g., an audio call, music, and/or audio accompanying a video). In some embodiments, the media content includes a call between the user and a plurality of other users (e.g., a conference call). In some embodiments, the media content includes both an audio output and a video output (e.g., a movie). In some embodiments, the media content includes music (e.g., a song and/or an album). In some embodiments, the media content includes a plurality of pieces of media content (e.g., a video and music). In some embodiments, the plurality of pieces of media content are related. In some embodiments, the plurality of pieces of media content are unrelated (e.g., playing a song and playing a streamed video that is muted).

In some embodiments, the system (e.g., 100 and/or 152) detects the presence of another user in the platform (e.g., 150 and/or 200); and in response to detecting the presence of another user in the platform, forgoing initiating playback of the media content on a media output device of the platform. In some embodiments, the set of content transfer criteria includes a condition that is met when another user is not detected in the platform.

In some embodiments, in accordance with a determination that the computer system is providing playback of the media content through an accessory device (e.g., headphones) communicatively coupled (e.g., through Bluetooth) to the computer system, the platform forgoes initiating playback of the media content on the media output device of the platform.

In some embodiments, the system (e.g., 100 and/or 152) causes the computer system to provide (e.g., display and/or output) a notification (e.g., on a screen and/or touch sensitive display and/or through an audio output) including a request to initiate playback of the media content on the media output device of the platform. In some embodiments, the method further comprises detecting a user input confirming playback of the media content on the media output device of the platform. In some examples the method further comprises, in response to detecting the user input confirming playback of the media content on the media output device of the platform, initiating playback of the media content on a media output device of the platform. In some embodiments, the user input confirming playback of the media content on the media output device of the platform includes selecting a selectable user interface element on a display of the computer system. In some embodiments, the user input confirming playback of the media content on the media output device of the platform includes an audio input.

In some embodiments, initiating (e.g., transferring) playback of the media content on the media output device of the platform (e.g., 150 and/or 200) (e.g., a speaker, screen, and/or surface of the platform) includes transferring a first subset of the media content prior to transferring a second subset of the media content. In some embodiments, the first subset of the media content is a portion of the media content. In some embodiments, the second subset of the media content includes the media content that is not included in the first subset. In some embodiments, the first subset of the media content is smaller than the second subset of the media content. In some embodiments, the second subset of the media content is transferred after playback of the first subset begins (e.g., the rest of the media content is transferred after the first portion has successfully been transferred).

In some embodiments, the system (e.g., 100 and/or 152) detects that a set of egress criteria is met, the set of egress criteria including a criterion that the user has left the platform (e.g., 150 and/or 200) (e.g., a mobile platform, a physical platform, a virtual platform, and/or a vehicle); and in response to detecting that the set of egress criteria is met and in accordance with a determination that a set of content transfer criteria is met, the set of content transfer criteria including a condition that the media output device of the platform is performing (e.g., currently performing) playback (e.g., playing) of media content (e.g., a video, a song, and/or a call), initiating playback of the media content on the computer system associated with the user (e.g., on a screen and/or speaker of the computer system).

Existing platforms rely on the passenger to ultimately control how the platform reaches the desired destination.

Thus, there is a need for a platform, such as a vehicle, that can reduce a burden on a person and/or passenger that is using and/or intends to use the platform to take a trip. For instance, there is a need for a platform that can provide control over a route to a destination with limited assistance from a person. In addition, there is a need for a platform that controls components of the interior of the platform to indicate to a person whether additional information is needed in order for the platform to complete the trip to the destination. There is also a need for a platform that prepares components of the interior platform to a preferred state when additional information is not needed from the person. Further still, there is a need for a platform that can begin a trip without receiving a destination from a person and without requiring the person to steer and/or control the platform.

Figure 14A:
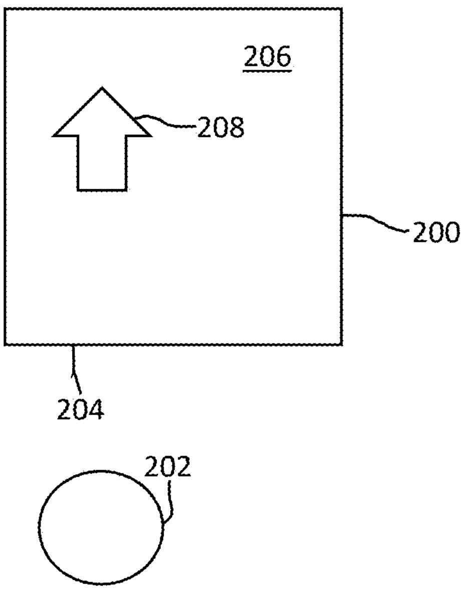
FIGS. 14A-14D illustrate examples of adjusting features of platform to different states based on destination criteria, in accordance with some embodiments.

Turning now to the drawings, FIG. 14A is a block diagram illustrating platform 200 arriving at a pickup location of person 202 so that person 202 can use platform 200 to take a trip from the pickup location to a destination location. At FIG. 14A, platform 200 arrives at the pickup location and configurable elements 208 of interior portion 206 of platform 200 are in a first state, such as a default state. In some embodiments, platform 200 arrives at the pickup location with one or more elements of configurable elements 208 in an off state and/or a state that conserves power of platform 200 because a person and/or passenger is not positioned within interior portion 206.

While platform 200 is arriving at the pickup location and/or after platform 200 arrives at the pickup location, platform 200 determines whether person 202 is within a predetermined distance of platform 200. In some embodiments, the predetermined distance includes a distance between platform 200 and person 202 that indicates that person 202 is entering, intends to enter, and/or is already within interior portion 206 of platform 200.

After platform 200 determines that person 202 is within the predetermined distance of platform 200, platform 200 determines whether destination information has been received. In some embodiments, the destination information includes a destination requested by person 202 (such as a via an external device associated with person 202) and/or a destination predicted based on information about person 202 (such as calendar and/or schedule information of person 202, previous trips taken by person 202, and/or other contextual information about person 202). As set forth below with reference to FIGS. 14B-14D, configurable elements 208 of platform 200 are adjusted to different states based on whether the destination information has been received, the destination information has not been received but has been estimated, or the destination information has not been received (and not estimated).

Figure 14B:
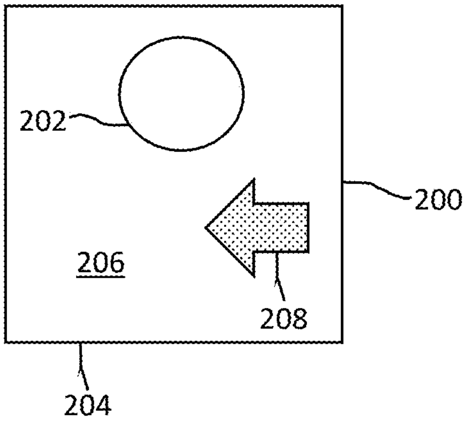

At FIG. 14B, person 202 is within the predetermined distance of platform 200 (person 202 is shown within interior portion 206 of platform 200) and platform 200 has received the destination information. For instance, in some embodiments, platform 200 received information from an application associated with platform 200 that includes a destination requested by person 202. When person 202 is within the predetermined distance of platform 200 and based on the determination that the destination information was received, platform 200 adjusts configurable elements 208 to a second state, as indicated by first hatching of arrow representing configurable elements 208.

In some embodiments, the second state of configurable elements 208 includes a state that is preferred by person 202. For instance, in some embodiments, the second state of configurable elements 208 is based on preferences that have been selected and/or designated by person 202 (such as via an application associated with platform 200). In some embodiments, the second state is based on the destination information. For instance, in some embodiments, when a destination of the destination information includes a spa, a speaker of configurable elements 208 outputs relaxing and/or calming audio output.

In some embodiments, after configurable elements 208 are adjusted to the second state, platform 200 determines that person 202 is within interior portion 206 of platform 200 and is ready to begin the trip (such as person 202 has fastened their seat belt). In some embodiments, after determining that person 202 is within interior portion 206 of platform 200, platform 200 begins moving toward a destination location associated with the received destination information.

Figure 14C:
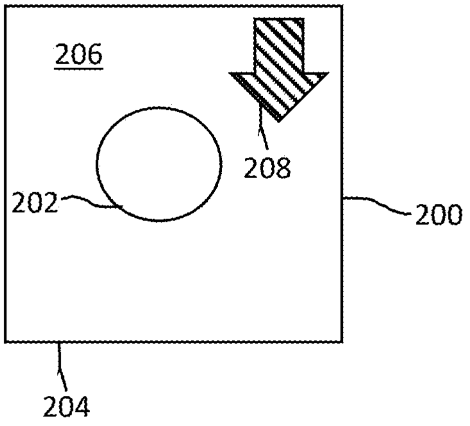

At FIG. 14C, person 202 is within the predetermined distance of platform 200 and platform 200 has not received the destination information (and platform 200 has not estimated the destination information). For instance, in some embodiments, person 202 can summon platform 200 to the pickup location without providing a destination for the trip. When person 202 is within the predetermined distance of platform 200 and based on the determination that the destination information has not been received (and has not been estimated), platform 200 adjusts configurable elements 208 to a third state, as indicated by second hatching of arrow representing configurable elements 208.

In some embodiments, the third state of configurable elements 208 is not a state that is based on preferences of person 202. In some embodiments, the third state of configurable elements 208 includes a second default state that does not conserve as much power as the first state of configurable elements 208. In some embodiments, the second state of configurable elements 208 includes furniture of interior portion 206 positioned in a first position that is based on preferences of person 202, whereas the third state includes the furniture of interior portion 206 positioned in a second position, such as a default ingress position. In some embodiments, the second state of configurable elements 208 includes one or more lights of interior portion 206 having a first brightness and/or first color temperature based on preferences of person 202, whereas the third state includes the one or more lights having a second brightness and/or second color temperature different from the first brightness and/or the first color temperature, respectively. In some embodiments, the second state of configurable elements 208 includes one or more windows of platform 200 having a first opacity (such as a first tint, haze, frost, and/or glaze) that is based on preferences of person 202, whereas the third state includes the one or more windows having a second opacity different from the first opacity. In some embodiments, the second state of configurable elements 208 includes one or more speakers of platform 200 outputting first audio that is based on preferences of person 202 (and/or based on audio output of an external device associated with person 202), whereas the third state includes the one or more speakers outputting second audio, different from the first audio.

In addition, when person 202 is within the predetermined distance of platform 200 and based on the determination that the destination information has not been received, platform 200 prompts person 202 to provide the destination information. For instance, in some embodiments, a display of configurable elements 208 provides a visual prompt requesting the destination information, a speaker of configurable elements 208 outputs audio requesting the destination information, and/or an external device associated with person 202 outputs a notification prompting and/or requesting the destination information.

In some embodiments, after platform 200 prompts person 202 for the destination information and platform 200 receives the destination information, platform 200 adjusts configurable elements 208 from the third state to the second state.

In some embodiments, after platform 200 prompts person 202 for the destination information and platform 200 does not receive the destination information, platform 200 can begin the trip based on user input obtained from person 202. For instance, in some embodiments, even when platform 200 has not received the destination information, platform 200 begins to move in response to detecting user input requesting to move, such as a voice command saying "Let's go." After platform 200 begins to move in response to receiving the user input, platform 200 outputs a second prompt to person 202 to provide the destination information so that platform 200 can take person 202 to their desired location.

Figure 14D:
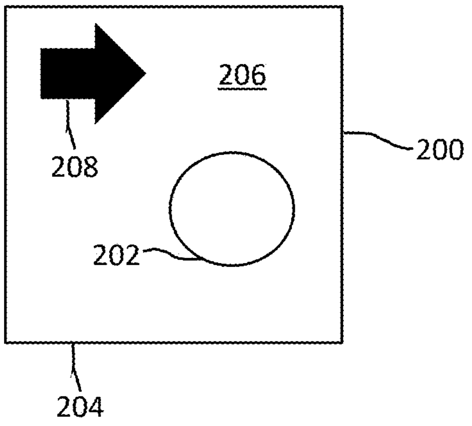

At FIG. 14D, person 202 is within the predetermined distance of platform 200 and platform 200 has not received the destination information, but platform 200 has estimated the destination information based on obtained information. For instance, in some embodiments, platform 200 obtains information about person 202 that is indicative of an intended destination of person 202. In some embodiments, the information about person 202 includes previous trips taken by person 202 (such as a pattern of usage of platform 200) and/or contextual information about person 202 (such as calendar and/or schedule information). When person 202 is within the predetermined distance of platform 200 and based on the determination that the destination information has been estimated, platform 200 adjusts configurable elements 208 to a fourth state, as indicated by third hatching of arrow representing configurable elements 208.

In addition, when person 202 is within the predetermined distance of platform 200 and based on the determination that the destination information has been estimated, platform 200 prompts person 202 to confirm the destination information. In some embodiments, platform 200 prompts person 202 to confirm the estimated destination information to ensure that platform 200 is moving toward a location that is consistent with the intent of person 202. In some embodiments, platform 200 begins to move toward an estimated destination associated with estimated destination information without receiving confirmation of the estimated destination information.

In some embodiments, the fourth state of configurable elements 208 is different from the second state and/or the third state. In some embodiments, the fourth state is the same as the second state. In some embodiments, the fourth state is the same as the third state. In some embodiments, the fourth state is based on the estimated destination information. For instance, in some embodiments, when a destination of the estimated destination information includes a movie theater, a speaker of configurable elements 208 outputs a soundtrack of a movie currently playing in theaters while in the fourth state.

In some embodiments, the second state, the third state, and/or the fourth state is based on information about a previous activity performed by person 202. For instance, when platform 200 determines that person 202 was performing a hike prior to being within the predetermined distance of platform 200, platform 200 adjusts a climate control system of configurable elements 208 to reduce a temperature within interior portion 206.

In some embodiments, when the destination information and/or the estimated destination information is a general area and not a specific address, name, and/or identifier, platform 200 begins moving toward the general area and prompts person 202 to provide additional destination information (so that platform 200 can drop off person 202 at a particular location that is consistent with the intent of person 202). In some embodiments, platform 200 displays a navigation user interface, such as a map, that includes an indication of a location of platform 200 relative to the general area so that person 202 can determine how close platform 200 is to the general area.

In some embodiments, person 202 is taking the trip via platform 200 at the request of a second person. For instance, in some embodiments, a parent and/or friend of person 202 requests platform 200 to pick up person 202. In some embodiments, an external device of the second person displays a location of platform 200 so that the second person can determine a location of person 202 during the trip.

In some embodiments, the destination information includes a location associated with a third person, such as a contact of person 202. For instance, in some embodiments, person 202 intends to meet with the third person and requests that the destination location be a location of the third person. In some embodiments, platform 200 updates the destination location of the trip based on a current location of the third person so that platform 200 ultimately drops off person 202 at the location of the third person. In some embodiments, the destination information includes a predetermined route, such as a scenic route through the mountains, an experience, a tour of a popular area, and/or a route that starts and ends at the same location (such as the pickup location). In some embodiments, the destination information includes a duration of the trip instead of a particular location at which person 202 intends to visit. In some embodiments, the destination information includes a general request to begin moving. In some embodiments, the destination information includes a route that is based on user preferences, such as a fastest route, a route with the least amount of motion and/or turns, and/or a scenic route.

In some embodiments, after platform 200 begins to move and has received and/or estimated the destination information, platform 200 outputs the destination so that person 202 can confirm that the destination is consistent with their intent. In some embodiments, platform 200 outputs the destination in different manners based on the destination type. In some embodiments, when platform 200 stops to pick up another person to take on the trip, platform 200 re-announces and/or re-outputs the destination after picking up the other person. In some embodiments, a height of platform 200 is adjusted after platform 200 begins to move so as to conserve power and/or increase a comfort of person 202 during the trip.

Figure 15:
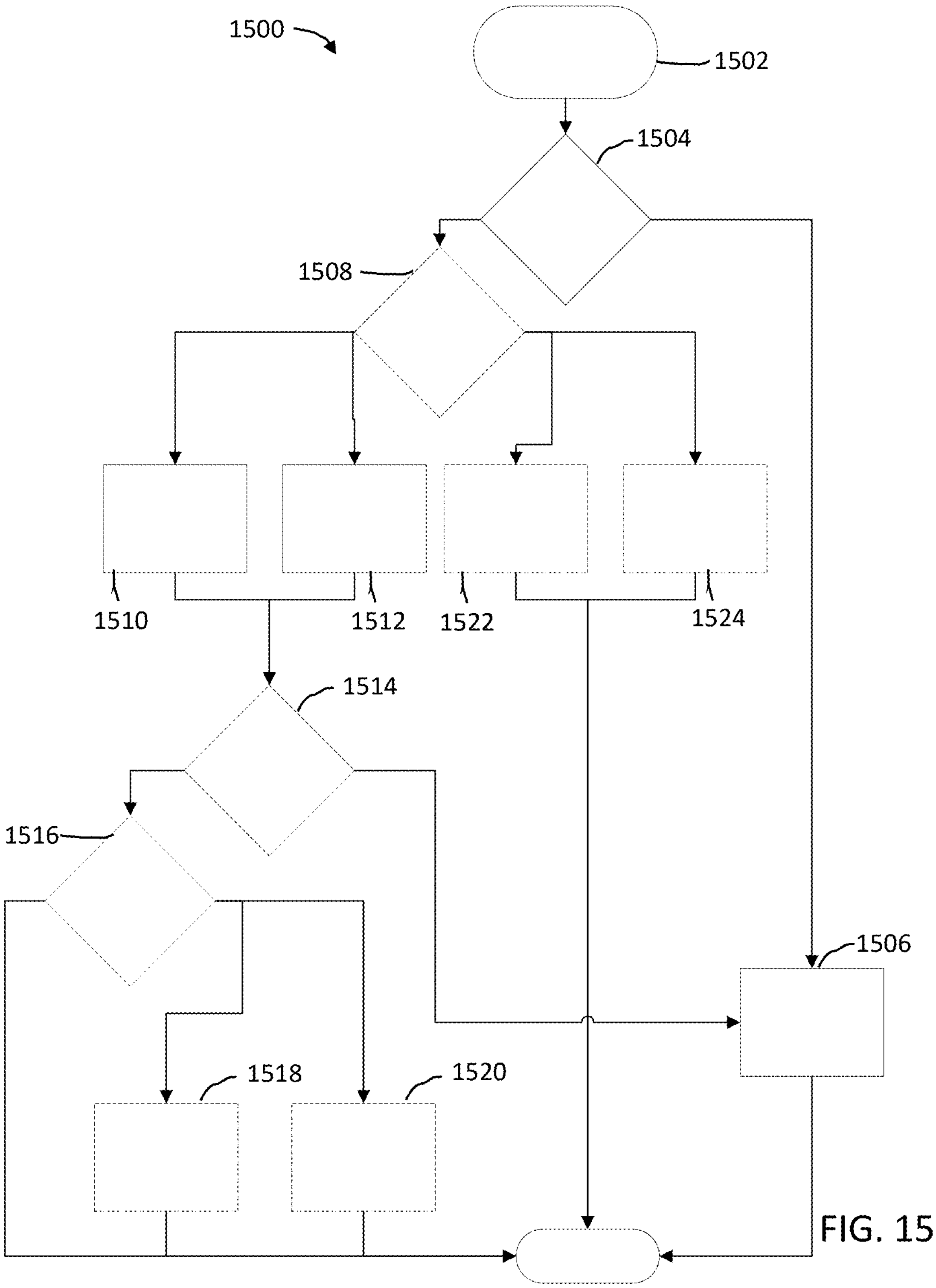
FIG. 15 is a flow diagram illustrating methods for adjusting features of a platform to different states based on destination criteria, in accordance with some embodiments.

FIG. 15 is a flow diagram illustrating method 1500 that can be performed by platform 200, such as a computer system that is associated with platform 200. At FIG. 15, platform 200 detects that person 202 is within a predetermined distance of platform 200, as shown at block 1502. After detecting that person 202 is within the predetermined distance of platform 200, platform 200 determines whether destination information has been received (such as via an application associated with platform 200), as shown at block 1504.

When platform 200 determines that the destination information has been received, platform 200 causes configurable elements 208 to be adjusted to a first state (e.g., the second state shown at FIG. 14B), as shown at block 1506. When platform 200 determines that the destination information has not been received, platform 200 determines whether the destination information has been estimated, as shown at block 1508.

When platform 200 determines that the destination information has not been estimated (and has not been received), platform 200 causes configurable elements 208 to be adjusted to a second state (e.g., the third state shown at FIG. 14C), as shown at block 1510. In addition, when platform 200 determines that the destination has not been estimated (and has not been received), platform 200 prompts person 202 for the destination information, as shown at block 1512.

After adjusting configurable elements 208 to the second state and prompting person 202 for the destination information, platform 200 determines whether the destination has been received, as shown at block 1514. When the destination has been received, platform 200 causes configurable elements 208 to be adjusted to the first state, as shown at block 1506. When platform 200 determines that the destination information has not been received, platform 200 determines whether a request to move has been received, as shown at block 1516.

When platform 200 determines that the request to move has been received (without receiving the destination information), platform 200 begins to move, as shown at block 1518. In addition, when platform 200 determines that the request to move has been received (without receiving the destination information), platform 200 prompts person 202 for the destination information, as shown at block 1520. When platform 200 determines that the request to move has not been received, method 1500 ends (and, optionally, configurable elements 208 are maintained in the second state and platform 200 continues to prompt person 202 for the destination information).

When platform 200 determines that the destination information has been estimated (and has not been received), platform 200 causes configurable elements 208 to be adjusted to a third state (e.g., the fourth state shown at FIG. 14D), as shown at block 1522. In addition, when platform 200 determines that the destination information has been estimated (and has not been received), platform 200 prompts person 202 to confirm the destination information, as shown at block 1524.

A system (e.g., 100 and/or 152) associated with a platform (e.g., 150 and/or 200) is configured to perform a method in accordance with some embodiments. The system (e.g., 100 and/or 152) detects that a person (e.g., 202) (e.g., a real person, a virtual person, or an external computer system associated with the person) is within a predetermined distance of (e.g., a distance that indicates that the user has entered and/or is within an interior portion of a platform) (in some embodiments, a computer system of the platform and/or a computer system associated with the platform determines that the person is within the predetermined distance of the platform based on location information received from an external computer system associated with the person) a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system).

In response to detecting that the person (e.g., 202) is within the predetermined distance of the platform (e.g., 150 and/or 200) and in accordance with a determination that the platform (e.g., 150 and/or 200) (e.g., a computer system of the platform) has received destination information (e.g., received destination information from an external computer system associated with the person prior to the person being within the predetermined distance of the platform) (in some embodiments, the destination information includes coordinates, an address, and/or a name of a drop off location), the system (e.g., 100 and/or 152) adjusts (e.g., sending and/or transmitting a communication to one or more external computer systems associated with the one or more configurable elements that cause the one or more configurable elements to operate in a first state) one or more configurable elements (e.g., 208) (e.g., one or more lights, one or more speakers, one or more actuatable pieces of furniture, one or more climate systems, one or more display generation components, and/or one or more input devices) of an interior portion (e.g., 206) (e.g., a cabin and/or interior area of the platform that is configured to transport and/or move a person between physical locations) of the platform (e.g., 150 and/or 200) to a first state (e.g., a first brightness of the one or more lights, a first color temperature of the one or more lights, a first audio output via the one or more speakers, a first volume level of audio output via the one or more speakers, a first position of the one or more actuatable windows, a first opacity of the one or more actuatable windows, a first position of the one or more actuatable pieces of furniture, a first climate setting of the one or more climate systems, and/or a first user interface and/or media item displayed on the one or more display generation components).

In response to detecting that the person (e.g., 202) is within the predetermined distance of the platform (e.g., 150 and/or 200) and in accordance with a determination that the platform (e.g., a computer system of the platform) has not received destination information (e.g., the destination information has not been received from an external computer system associated with the person prior to the person being within the predetermined distance of the platform), the system (e.g., 100 and/or 152) adjusts (e.g., sending and/or transmitting a communication to one or more external computer systems associated with the one or more configurable elements that cause the one or more configurable elements to operate in a second state) the one or more configurable elements (e.g., 208) of the interior portion (e.g., 206) of the platform (e.g., 150 and/or 200) to a second state (e.g., a second brightness of the one or more lights, a second color temperature of the one or more lights, a second audio output via the one or more speakers, a second volume level of audio output via the one or more speakers, a second position of the one or more actuatable windows, a second opacity of the one or more actuatable windows, a second position of the one or more actuatable pieces of furniture, a second climate setting of the one or more climate systems, and/or a second user interface and/or media item displayed on the one or more display generation components), different from the first state.

In response to detecting that the person (e.g., 202) is within the predetermined distance of the platform (e.g., 150 and/or 200) and in accordance with a determination that the platform (e.g., a computer system of the platform) has not received destination information (e.g., the destination information has not been received from an external computer system associated with the person prior to the person being within the predetermined distance of the platform), the system (e.g., 100 and/or 152) prompts the person (e.g., 202) to provide destination information (e.g., displaying a user interface, outputting audio output, outputting light, and/or outputting haptic output guiding a person to provide and/or input the destination information on an external device associated with the person and/or an input device of the platform).

In some embodiments, in response to detecting that the person (e.g., 202) is within the predetermined distance of the platform (e.g., 150 and/or 200), in accordance with a determination that the platform (e.g., 150 and/or 200) has not received the destination information, and in accordance with a determination that the destination information has been estimated (e.g., the platform has not received the destination information, but a destination and/or destination information has been estimated and/or predicted based on context information and/or secondary information (such as historical information that indicates a destination that the person likely intends to reach)), the system (e.g., 100 and/or 152) adjusts the one or more configurable elements (e.g., 208) of the interior portion (e.g., 206) of the platform (e.g., 150 and/or 200) to a third state (e.g., a third brightness of the one or more lights, a third color temperature of the one or more lights, a third audio output via the one or more speakers, a third volume level of audio output via the one or more speakers, a third position of the one or more actuatable windows, a third opacity of the one or more actuatable windows, a third position of the one or more actuatable pieces of furniture, a third climate setting of the one or more climate systems, and/or a third user interface and/or media item displayed on the one or more display generation components), different from the first state and the second state, and the system (e.g., 100 and/or 152) prompts the person (e.g., 202) to confirm the destination information (e.g., displaying a user interface, outputting audio output, outputting light, and/or outputting haptic output guiding a person to confirm the destination information on an external device associated with the person and/or an input device of the platform).

In some embodiments, the first state of the one or more configurable elements (e.g., 208) of the interior portion (e.g., 206) of the platform (e.g., 150 and/or 200) is based on the destination information (e.g., the one or more configurable elements of the interior portion of the platform output content (such as light, media, and/or audio) that is based on a destination of the destination information). In some embodiments, the one or more configurable elements of the interior portion of the platform includes one or more audio output devices that, while configured to operate in the first state, output one or more songs that correspond to a destination of the destination information. For instance, in some embodiments, when the destination of the destination information includes a movie theater, the one or more audio output devices output one or more songs of a soundtrack for a movie that is currently in theaters.

In some embodiments, after adjusting the one or more configurable elements (e.g., 208) of the interior portion (e.g., 206) of the platform (e.g., 150 and/or 200) to the second state and prompting the person (e.g., 202) to provide destination information, the system (e.g., 100 and/or 152) receives (e.g., via one or more input devices of the interior portion of the platform (such as a touch screen, a microphone configured to detect voice commands, and/or one or more physical buttons) and/or via one or more input devices of an external computer system associated with the person (such as a smart phone, a smart watch, a laptop computer, and/or a tablet computer)) a request to cause the platform (e.g., 150 and/or 200) to move (e.g., the user requests that the platform begin moving and/or travelling without having a specific and/or predetermined destination and/or route). In response to receiving the request to cause the platform (e.g., 150 and/or 200) to move, the system (e.g., 100 and/or 152) causes the platform (e.g., 150 and/or 200) to move (e.g., move away from a current location of the platform and toward one or more different locations) and the system (e.g., 100 and/or 152) prompts the person (e.g., 202) to provide the destination information (e.g., displaying a user interface, outputting audio output, outputting light, and/or outputting haptic output guiding a person to provide and/or input the destination information on an external device associated with the person and/or an input device of the platform).

In some embodiments, adjusting the one or more configurable elements (e.g., 208) of the interior portion (e.g., 206) of the platform (e.g., 150 and/or 200) to the first state includes adjusting one or more pieces of furniture (e.g., seats, benches, tables, consoles, footrests, headrests, and/or armrests) of the interior portion (e.g., 206) of the platform (e.g., 150 and/or 200) to one or more first positions (e.g., a position that includes a first amount of reclining, a first amount of firmness, a first amount of height relative to a floor of the interior portion of the platform, a first angle of a seat relative to the floor of the interior portion of the platform, a first temperature setting, a folded and/or collapsed position, and/or an unfolded and/or expanded position). In some embodiments, adjusting the one or more configurable elements (e.g., 208) of the interior portion (e.g., 206) of the platform (e.g., 150 and/or 200) to the second state includes adjusting the one or more pieces of furniture of the interior portion (e.g., 206) of the platform (e.g., 150 and/or 200) to one or more second positions (e.g., a position that includes a second amount of reclining, a second amount of firmness, a second amount of height relative to a floor of the interior portion of the platform, a second angle of a seat relative to the floor of the interior portion of the platform, a second temperature setting, a folded and/or collapsed position, and/or an unfolded and/or expanded position), different from the one or more first positions.

In some embodiments, adjusting the one or more configurable elements (e.g., 208) of the interior portion (e.g., 206) of the platform (e.g., 150 and/or 200) to the first state includes adjusting one or more lighting devices (e.g., one or more lamps, light bulbs, and/or light emitting diodes) of the interior portion (e.g., 206) of the platform (e.g., 150 and/or 200) to a first set of one or more settings (e.g., a first brightness setting, a first color temperature setting, and/or an on or off setting). In some embodiments, adjusting the one or more configurable elements (e.g., 208) of the interior portion (e.g., 206) of the platform (e.g., 150 and/or 200) to the second state includes adjusting the one or more lighting devices of the interior portion (e.g., 206) of the platform (e.g., 150 and/or 200) to a second set of settings (e.g., a second brightness setting, a second color temperature setting, and/or an on or off setting), different from the first set of settings.

In some embodiments, adjusting the one or more configurable elements (e.g., 208) of the interior portion (e.g., 206) of the platform (e.g., 150 and/or 200) to the first state includes adjusting one or more windows (e.g., one or more openings within a frame of the platform that enable a person positioned within the platform to view an environment surrounding an exterior of the platform) of the interior portion (e.g., 206) of the platform (e.g., 150 and/or 200) to a first opacity (e.g., a first tint, a first haze, a first light diffusion setting, a first amount of frost, and/or a first amount of glaze). In some embodiments, adjusting the one or more configurable elements (e.g., 208) of the interior portion (e.g., 206) of the platform (e.g., 150 and/or 200) to the second state includes adjusting the one or more windows of the interior portion (e.g., 206) of the platform (e.g., 150 and/or 200) to a second opacity (e.g., a second tint, a second haze, a second light diffusion setting, a second amount of frost, and/or a second amount of glaze), different from the first opacity.

In some embodiments, adjusting the one or more configurable elements (e.g., 208) of the interior portion (e.g., 206) of the platform (e.g., 150 and/or 200) to the first state includes causing one or more audio output devices (e.g., one or more speakers and/or headsets) of the interior portion (e.g., 206) of the platform (e.g., 150 and/or 200) to output first audio (e.g., audio selected by the person, audio that is based on preferences of the person, and/or audio currently and/or previously being output by an external computer system associated with the person (such as a smart phone, a smart watch, a laptop computer, and/or a tablet computer)). In some embodiments, adjusting the one or more configurable elements (e.g., 208) of the interior portion (e.g., 206) of the platform (e.g., 150 and/or 200) to the second state includes causing the one or more audio output devices of the interior portion (e.g., 206) of the platform (e.g., 150 and/or 200) to output second audio (e.g., default audio, audio that includes speech requesting that the person provide the destination information, audio that is not selected by the person, and/or audio that is not based on preferences of the person), different from the first audio.

In some embodiments, prompting the person (e.g., 202) to provide the destination information includes, displaying, via a display generation component (e.g., a display controller, a touch-sensitive display system, a projector, a display screen, a display monitor, and/or a holographic display) (in some embodiments, the display generation component is included within and/or part of the interior portion of the platform) (in some embodiments, the display generation component is in communication with an external computer system that is associated with the person (such as a smart phone, a smart watch, a laptop computer, and/or a tablet computer)), a notification (e.g., a push notification, a user interface object, and/or text that, when selected via user input, enables the user to provide one or more inputs corresponding to the destination information (such as an address and/or a name of a destination location)) requesting the destination information.

In some embodiments, after adjusting the one or more configurable elements (e.g., 208) of the interior portion (e.g., 206) of the platform (e.g., 150 and/or 200) to the second state and prompting the person (e.g., 202) to provide destination information, the system (e.g., 100 and/or 152) receives the destination information (e.g., receiving the destination information from an external computer system associated with the person and/or from one or more input devices of the platform) (in some embodiments, the destination information includes coordinates, an address, and/or a name of a drop off location). In response to receiving the destination information, the system (e.g., 100 and/or 152) adjusts the one or more configurable elements (e.g., 208) of the interior portion (e.g., 206) of the platform (e.g., 150 and/or 200) from the second state to the first state (e.g., the one or more configurable elements of the interior portion of the platform are adjusted to the first state when the destination information has been received and/or confirmed).

In some embodiments, the first state and/or the second state of the one or more configurable elements (e.g., 208) of the interior portion (e.g., 206) of the platform (e.g., 150 and/or 200) are based on information that indicates an activity of the person (e.g., 202) (e.g., information (such as location information, communication information (e.g., text messages and/or electronic mail), calendar information, and/or scheduling information) about the person is received and/or obtained (such as prior to and/or in response to the person being within the predetermined distance of the platform) and the information indicates that the person was performing a particular activity before approaching the platform). In some embodiments, the information indicates that the person was previously performing an exercise activity and the first state and/or the second state includes adjusting a climate control system to reduce a temperature within the interior portion of the platform.

In some embodiments, after receiving the destination information, the system (e.g., 100 and/or 152) causes the platform (e.g., 150 and/or 200) to move toward a destination location (e.g., a location at which the person is determined, expected, and/or predicted to exit and/or depart from the interior portion of the platform and/or a location at which the platform is determined, expected, and/or predicted to stop for a predetermined amount of time) associated with the destination information and while the platform (e.g., 150 and/or 200) is moving toward the destination location associated with the destination information (e.g., the platform is moving along a route that ends and/or includes a stop at the destination location), in accordance with a determination that the destination location does not satisfy a first set of one or more criteria (e.g., the destination location is a general area (such as a county, a city, a town, and/or a location having multiple structures, buildings, and/or entrances) and does not include a specific address, identifier, and/or entrance of the person's intended destination), the system (e.g., 100 and/or 152) prompts the person (e.g., 202) to provide second destination information (e.g., information that narrows and/or provides more specifics about the destination location, such as an address, a name of a building, a name of a park, and/or a name of a business).

In some embodiments, in accordance with a determination that the destination location does not satisfy the first set of one or more criteria, the system (e.g., 100 and/or 152) displays, via a display generation component (e.g., a display controller, a touch-sensitive display system, a projector, a display screen, a display monitor, and/or a holographic display) (in some embodiments, the display generation component is included within and/or part of the interior portion of the platform), a navigation user interface (e.g., a user interface that includes a map and/or navigational user interface object) that includes an indication (e.g., a user interface object, such as an image, symbol, text, and/or icon) of a current location (e.g., an estimated, predicted, and/or determined location) of the platform (e.g., 150 and/or 200) relative to the destination location (e.g., the navigation user interface displays the indication of the current location of the platform on a map and/or navigational user interface object that provides context to the person about where the platform is located along a route toward the destination location).

In some embodiments, a second person requested and/or directed that the platform pick up the person (e.g., 202). In some embodiments, the second person provides the destination information. For instance, in some embodiments, when the person (e.g., 202) is within the predetermined distance of the platform (e.g., 150 and/or 200) and in accordance with a determination that the platform (e.g., 150 and/or 200) received the destination information (such as via the second person and/or via the person), the one or more configurable elements (e.g., 208) of the interior portion (e.g., 206) of the platform (e.g., 150 and/or 200) are adjusted to the first state. In some embodiments, the second person does not provide the destination information and the person (e.g., 202) is prompted to provide the destination information. For instance, in some embodiments, when the person (e.g., 202) is within the predetermined distance of the platform (e.g., 150 and/or 200) and in accordance with a determination that the platform (e.g., 150 and/or 200) has not received the destination information (such as via the second person and/or via the person), the one or more configurable elements (e.g., 208) of the interior portion (e.g., 206) are adjusted to the second state and the person (e.g., 202) is prompted to provide the destination information. In some embodiments, after the platform (e.g., 150 and/or 200) begins to move toward a destination, an external computer system associated with the second person receives status information about a current location of the platform (e.g.,

150 and/or 200) and/or the person (e.g., 202). Thus, when a second person requests and/or directs the platform to pick up the person (e.g., 202), the second person can track and/or receive status updates as to the location of the platform (e.g., 150 and/or 200) and/or the person (e.g., 202).

In some embodiments, the destination information includes a destination location corresponding to a current location of a third person. For instance, in some embodiments, the destination information includes a request to travel toward a location of a contact of the person (e.g., 202) so that the person (e.g., 202) can meet the third person. In some embodiments, the platform (e.g., 150 and/or 200) receives and/or obtains information about the current location of the third person and adjusts and/or modifies the destination location based on the most current location of the third person. In some embodiments, the third person moves after the platform (e.g., 150 and/or 200) receives the destination information and the platform (e.g., 150 and/or 200) adjusts the destination location based on the location of the third person. In some embodiments, the person (e.g., 202) requests to follow (such as via location tracking) a location of the third person and/or a second platform associated with the third person.

In some embodiments, the destination information includes a route toward a destination location. For instance, in some embodiments, the route toward the destination location is based on user preferences. In some embodiments, the user preferences of the person (e.g., 202) specify that the person (e.g., 202) would like to travel along a scenic route toward the destination location. In some embodiments, the route toward the destination location includes an experience and/or a tour of a particular geographic area. For instance, in some embodiments, the experience and/or the tour includes a tour of notable sites within a particular county, city, and/or town. In some embodiments, the route includes a starting point and an ending point that are the same location. For instance, in some embodiments, the person (e.g., 202) intends to use the platform (e.g., 150 and/or 200) to travel from their home and toward one or more locations before returning back to the person's home.

In some embodiments, the destination information includes a duration of a trip instead of a particular destination location. In some embodiments, the platform (e.g., 150 and/or 200) estimates, determines, and/or predicts a route that will last the duration. In some embodiments, the platform (e.g., 150 and/or 200) estimates, determines, and/or predicts a route that includes the same starting location and ending location that will last for the duration included in the destination information.

In some embodiments, the destination information includes a general command to initiate a trip without including a specific destination location. For instance, in some embodiments, the destination information includes a request (such as via user input and/or via a voice command) requesting that the platform (e.g., 150 and/or 200) begin to move without providing a particular destination location. In some embodiments, in response to receiving and/or obtaining the general command to initiate the trip without receiving and/or obtaining the specific destination location, the platform (e.g., 150 and/or 200) begins to move along a predetermined route.

In some embodiments, the destination information includes routing criteria that is based on preferences of the person (e.g., 202). For instance, in some embodiments, the routing criteria includes a fastest route toward a destination location, a route that includes the fewest turns and/or the least amount of non-linear motion of the platform, and/or a route that includes the most scenery.

In some embodiments, in response to detecting that the person (e.g., 202) is within the predetermined distance of the platform (e.g., 150 and/or 200) and in accordance with the determination that the platform (e.g., 150 and/or 200) has received the destination information, the platform (e.g., 150 and/or 200) begins to move toward a destination location associated with the destination information without prompting the person (e.g., 202) for additional information. In some embodiments, in response to detecting that the person (e.g., 202) is within the predetermined distance of the platform (e.g., 150 and/or 200), in accordance with the determination that the platform (e.g., 150 and/or 200) has received the destination information, and in accordance with a determination that a set of one or more criteria is met, the platform (e.g., 150 and/or 200) begins to move toward a destination location associated with the destination information without prompting the person (e.g., 202) for additional information. In some embodiments, the set of one or more criteria includes the person (e.g., 202) and/or additional persons within the interior portion (e.g., 206) of the platform (e.g., 150 and/or 200) having fastened their seatbelts, one or more closures (e.g., 204) of the platform having been moved toward a closed position, the destination information having been confirmed by the person (e.g., 202) and/or another person within the interior portion (e.g., 206) of the platform (e.g., 150 and/or 200), and/or a user input (such as a voice command, a user input on device of the platform, and/or a user input on an external device associated with the person) has been received requesting that the platform (e.g., 150 and/or 200) begin to move.

In some embodiments, after the platform (e.g., 150 and/or 200) begins to move toward a destination location associated with the destination information, the platform (e.g., 150 and/or 200) outputs (such as concurrent with the initiation of movement of the platform) an announcement (such as an audio announcement, a visual announcement displayed on a display generation component of the platform, and/or a visual announcement displayed on a display generation component of an external device associated with the person) that includes an indication of the destination location.

In some embodiments, the announcement that includes the indication of the destination location includes a first indication of the destination location when the destination location satisfies a first set of criteria (such as the destination location including an address). In some embodiments, the announcement that includes the indication of the destination location includes a second indication of the destination location when the destination location satisfies a second set of criteria (such as the destination location including a name of a business, an establishment, a person, a park, and/or a structure).

In some embodiments, the destination information includes multiple destination locations (such as when the platform is traveling toward a pickup location of a second person). In some embodiments, the platform (e.g., 150 and/or 200) outputs the announcement that includes an indication of a final destination location. In some embodiments, after the platform (e.g., 150 and/or 200) reaches a first destination location of the multiple destination locations, where the first destination location of the multiple destination locations is not the final destination location, the platform (e.g., 150 and/or 200) re-outputs (such as outputs a second announcement) the announcement that includes an indication of the final destination location.

In some embodiments, after the platform (e.g., 150 and/or 200) begins to move toward a destination location associated with the destination information, a height of the platform (e.g., 150 and/or 200) (such as a height of at least a portion of the platform relative to a surface upon which the platform is moving) is adjusted based on one or more factors. In some embodiments, the one or more factors include weather conditions, road conditions, a distance (such as a determined, estimated, and/or predicted distance) between a current location of the platform (e.g., 150 and/or 200) and the destination location, a speed at which the platform (e.g., 150 and/or 200) is moving, and/or a current location of the platform (e.g., 150 and/or 200).

Existing platforms do not determine whether the platform and/or the passenger are ready prior to preparing for departure.

Thus, there is a need for a platform, such as a vehicle, that can depart based on a passenger's readiness and the platform's readiness after receiving an indication of a trip. In some embodiments, the passenger's readiness is based on (or includes) a state of the passenger and/or an action of the passenger. For example, the passenger can enter the platform, be seated, and secure themselves with the required safety equipment, putting the passenger in a state ready for travel. In some embodiments, the platforms readiness is based on (or includes) a state of the platform and/or a position of a component of the platform. For example, the platform can close a door after the passenger enters and raise the seat back to an upright position, putting the platform in a state ready for travel. In some embodiments, the state of the passenger and/or the platform update during travel and change to a state that indicates the passenger and/or the platform are not ready. For example, when a component shifts during travel the passenger's readiness and/or the platforms readiness may indicate that either or both of the passenger and the platform are no longer ready for travel.

In some embodiments, the readiness of the passenger and/or the platform is based on sensors of the platform including one or more cameras, one or more pressure sensors, and/or one or more positional sensors. For example, a camera of the platform may include a video feed showing the passenger's seatbelt buckled while a pressure sensor of the seatbelt also indicates that the seatbelt is buckled correctly.

Figure 16A:
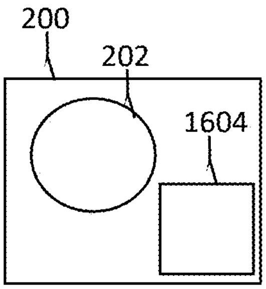
FIGS. 16A-16D illustrate examples of a platform determining readiness for movement, in accordance with some embodiments.

Turning now to the figures, FIG. 16A illustrates platform 200 ready for departure. In particular, platform 200 is in a state that indicates readiness because component 1604 is in a position and/or a state that is meant for travel. Exemplary components of platform 200 include doors, seats, tables, dividers, and/or screens that may change position before, during, and after travel. For example, component 1604 can include a door of platform 200 that is closed and thus ready for departure. As another example, component 1604 can include a seat of platform 200 that is in a position away from doors and sitting upright and thus is ready for departure.

FIG. 16A further illustrates that passenger 202 is ready for departure. In particular, passenger 202 is in a state that indicates readiness to travel and thus is ready for the trip to begin. In some embodiments, an indication of the upcoming trip is provided to platform 200 prior to determining passenger 202's readiness. For example, passenger 202 may provide an itinerary or destination they wish to reach through a personal computer system or a computer system of platform 200. Accordingly, platform 200 may then determine the readiness of passenger 202 as well as platform 200 prior to departing on the trip.

In some embodiments, the readiness of passenger 202 is based on an action of passenger 202. For example, when passenger 202 enters platform 200, sits down in a seat and secures the requires safety equipment, such as a seatbelt, platform 200 or a computer system of platform 200 determines that the user is ready. In some embodiments, the readiness of passenger 202 is based on a sensor of platform 200 such as a camera, a pressure sensor, and/or a proximity sensor which indicates that a user has taken an action such as buckling a seatbelt.

Figure 16B:
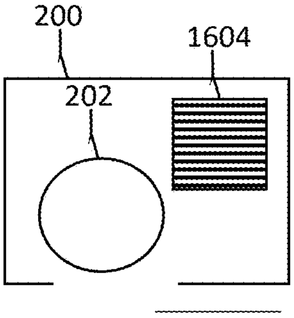

FIG. 16B illustrates an example in which platform 200 and passenger 202 are not ready for departure. In particular, passenger 202 is in a position near the door, has not taken the appropriate seat, and has not secured their safety equipment. Thus, passenger 202 is not in a ready state and has not taken the actions that would indicate that passenger 202 is ready for travel. Similarly, the door of platform 200 remains open and component 1604 is in a position and/or state that is not ready for departure. Thus, platform 200 is in a state that does not indicate that platform 200 is ready for travel. When passenger 202 takes the appropriate seat and secures the safety equipment and platform 200 closes the door and places component 1604 in the correct positions, as shown in FIG. 16A, platform 200 may depart because the states of both passenger 202 and platform 200 indicate that passenger 202 and platform 200 are ready for departure.

In some embodiments, the determination of platform 200's readiness and passenger 202's readiness occurs automatically (e.g., without user input or prompting). Thus, platform 200 and/or a computer system of platform 200 may continuously monitor the state, position, and/or actions of platform 200 and passenger 202 to determine the readiness of platform 200 and passenger 202 for departure. In this way, platform 200 and/or a computer system of platform 200 efficiently and intelligently determine when departure can occur based on passenger 202 and platform 200.

Figure 16C:
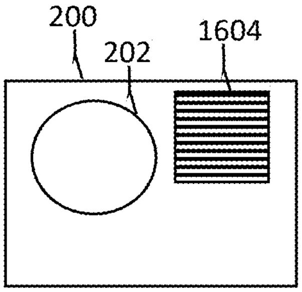

In some embodiments, after platform 200 has departed and is traveling to the requested destination the readiness of passenger 202 and/or the readiness of platform 200 will change, as shown in FIG. 16C. For example, during travel passenger 202 can release the required safety devices indicating that passenger 202 is no longer ready for travel and/or departure. As another example, during travel the position of component 1604 can change from an upright position to a laid down position, indicating that platform 200 is no longer ready for travel and/or departure. In some embodiments, in response to determining that passenger 202 and/or platform 200 is no longer ready for travel, platform 200 ceases movement and/or does not continue on the planned trip (e.g., itinerary).

Figure 16D:
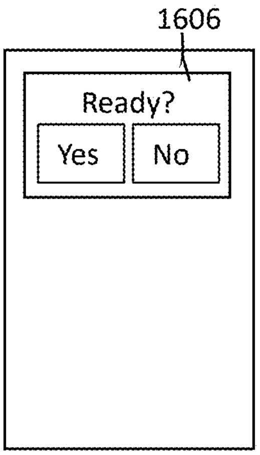

In some embodiments, as shown in FIG. 16D, in response to determining that passenger 202 and/or platform 200 is no longer ready for travel, prompt 1606 is provided to passenger 202 to confirm that passenger 202 and/or platform 200 is ready for departure. In some embodiments, prompt 1606 is provided on a display (e.g., a screen) of platform 200. In some embodiments, prompt 1606 is provided on a display (e.g., a screen) of a computer system associated with the user such as a smart phone, tablet, smart watch, and/or a laptop. In some embodiments, prompt 1606 is provided as an audio output from a speaker of platform 200 and/or a computer system associated with the user.

In some embodiments, after providing prompt 1606, platform 200 and/or a computer system associated with the user detects an input confirming that passenger 202 and/or platform 200 is ready for departure. In some embodiments, the input confirming that passenger 202 and/or platform 200 is ready for departure is an audio input such as "Yes, I'm ready to get going." In some embodiments, the input confirming that passenger 202 and/or platform 200 is ready for departure is a tap, press, and/or gesture on a "yes" affordance (e.g., button) displayed on a touch sensitive screen of platform 200 or the computer system associated with the user. In response to detecting the input confirming that passenger 202 and/or platform 200 is ready for departure, platform 200 begins moving again towards the destination.

In some embodiments, after providing prompt 1606, platform 200 and/or a computer system associated with the user detects an input confirming that passenger 202 and/or platform 200 is not ready for departure. In some embodiments, the input confirming that passenger 202 and/or platform 200 is not ready for departure is an audio input such as "No, something is wrong." In some embodiments, the input confirming that passenger 202 and/or platform 200 is not ready for departure is a tap, press, and/or gesture on a "no" affordance (e.g., button) displayed on a touch sensitive screen of platform 200 or the computer system associated with the user. In response to detecting the input confirming that passenger 202 and/or platform 200 is not ready for departure, platform 200 continues to remain stationary and may perform other actions such as determining how to help the passenger into a ready state.

Figure 17:
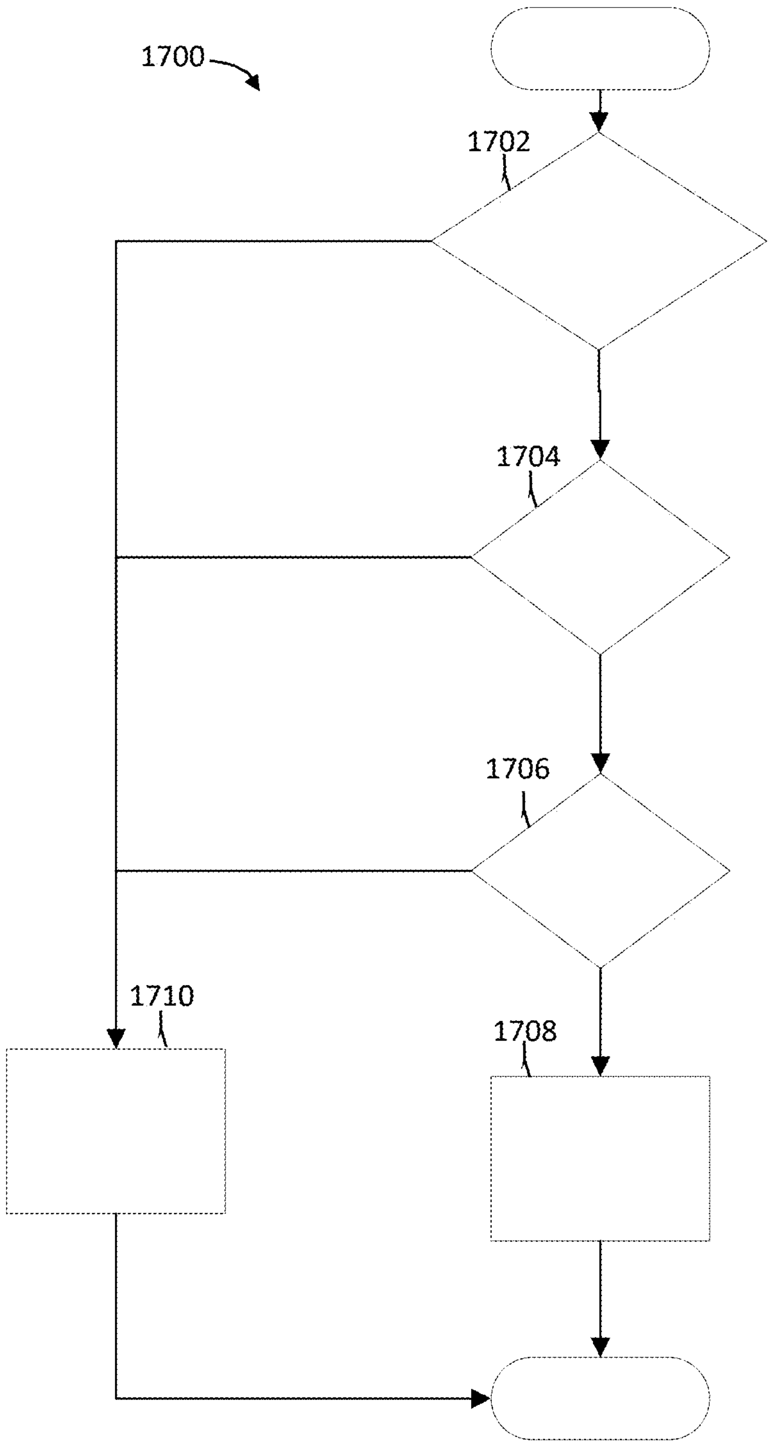
FIG. 17 is a flow diagram illustrating methods for a platform determining readiness for movement, in accordance with some embodiments.

FIG. 17 is a flow diagram illustrating method 1700 that can be performed by platform 200 and/or another computer system (e.g., a computer system of platform 200 and/or a computer system associated with a passenger). At block 1702, platform 200 determines whether an indication of a trip to be performed (e.g., an itinerary and/or a destination) has been received. When the indication of the trip to be performed is not received then platform 200 (e.g., the vehicle) does not depart, as shown in block 1710. When the indication of the trip to be performed is received, then platform 200 determines whether platform 200 is ready to depart, as shown at block 1704.

When platform 200 is not ready to depart, then platform 200 does not depart, as shown in block 1710. When platform 200 is ready to depart, then platform 200 determines whether passenger 202 is ready to depart, as shown at block 1706. When passenger 202 is not ready to depart, then platform 200 does not depart, as shown in block 1710. When passenger 202 is ready to depart, then platform 200 departs on the trip, as shown at block 1708. Accordingly, platform 200 intelligently determines when to depart on the trip based on the readiness of platform 200 and passenger 202.

It should be appreciated that method 1700 is exemplary and the steps of method 1700 may be combined and the order of the steps of method 1700 may be changed. For example, rather than determine whether the platform is ready to depart and then determine whether the passenger is ready to depart, platform 200 may first determine whether the passenger is ready to depart and then determine whether platform 200 is ready to depart. As another example, platform 200 may simultaneously determine whether platform 200 is ready to depart and whether passenger 202 is ready to depart.

A system (e.g., 100 and/or 152) associated with the platform (e.g., 150 and/or 200) is configured to perform a method in affordance with some embodiments. The system receives an indication of a trip to be performed by a platform (e.g., 150 and/or 200) (e.g., an address, an itinerary, and/or a point of interest). In some embodiments, the indication is received when the platform is stationary. In some embodiments, the indication is received when the platform is waiting for a user (e.g., 202) to enter the platform. In some embodiments, the indication is received when the platform is waiting for a user to become ready to depart (e.g., the user has entered the platform but has not been seated and/or buckled their seatbelt). In some embodiments, the indication is received by the platform prior to departing to a pick up point. In some embodiments, the indication is received by the platform with a pickup point. In some embodiments, the pickup point is based on a position of a computer system associated with the user.

In some embodiments, in response to receiving the indication of the trip: in accordance with a determination that a set of platform readiness criteria is satisfied (e.g., determining that all doors of the platform are closed, determining that the platform is capable of driving, and/or determining that the platform does not indicate any errors); and that a set of user readiness criteria is satisfied (e.g., determining that a seatbelt is buckled, determining that the user is seated, and/or determining that the user is not standing), the system (e.g., 100 and/or 152) causes the platform (e.g., 150 and/or 200) to depart according to the trip (e.g., automatically and/or without receiving user instructions to depart), wherein the set of platform readiness criteria includes a state of the platform, and wherein the set of user readiness criteria includes a state that is associated with a user of the platform.

In some embodiments, determining that the set of platform readiness criteria is satisfied is based on readings of one or more platform (e.g., 150 and/or 200) sensors. In some embodiments, platform sensors include sensors indicating a status of a door of the platform (e.g., is the door closed or open). In some embodiments, platform sensors include a camera capturing an exterior status of the platform (e.g., a video of the outside of the platform). In some embodiments, platform sensors include sensors indicating a proximity of the platform to an object exterior of the platform (e.g., how close the platform is to a tree, curb, person, and/or another platform). In some embodiments determining that the set of platform readiness criteria is satisfied includes determining that a platform readiness is above a predetermined threshold.

In some embodiments determining that the set of user readiness criteria is satisfied is based on readings of one or more sensors. In some embodiments, the sensor includes a camera. In some embodiments, the sensor includes a pressure sensor. In some embodiments, determining that the set of user readiness criteria is satisfied includes determining that a user readiness is above a predetermined threshold.

In some embodiments, the state of the platform (e.g., 150 and/or 200) is based on a sensor of the platform. In some embodiments, the state of the platform is based on a component of the platform. In some embodiments, the state of the platform is based on a state of the component of the platform (e.g., the position of a seat). In some embodiments, the state of the user is based on a sensor of the platform.

In some embodiments, the set of platform readiness criteria further includes a position (or in some embodiments a state, e.g., a travel position) of a component (e.g., a chair and/or a door) of the platform (e.g., 150 and/or 200). In some embodiments, the state of the platform is based on a position of a component of the platform. In some embodiments, the position of the component is detected with a sensor of the platform (e.g., a camera and/or a position sensor).

In some embodiments, the set of user readiness criteria further includes an action of the user (e.g., 202) (e.g., an input of the user indicating readiness and/or the user buckling their seatbelt). In some embodiments, the state that is associated with the user of the platform is based on an action of the user. In some embodiments, the action of the user is detected with a sensor of the platform (e.g., a camera and/or a proximity sensor).

In some embodiments, after causing the platform to depart according to the trip: the system (e.g., 100 and/or 152) detects a position of a component of the platform (e.g., 150 and/or 200) (e.g., automatically and/or without prompting by the user).

In some embodiments, in accordance with a determination that a component (e.g., a seatbelt) of the platform (e.g., 150 and/or 200) is in a state (e.g., unbuckled) that does not satisfy the set of platform readiness criteria, the system adjusts the state of the platform. (e.g., from a ready to state to an unready state) In some embodiments, adjusting the state of the platform includes causing the platform to stop moving. In some embodiments, adjusting the state of the platform includes changing a state of one or more components of the platform (e.g., turning the lights on, lightening the windows, and/or adjusting a seat). In some embodiments, in accordance with a determination that a component of the platform is in a state that does satisfy the set of platform readiness criteria, forgo adjusting the state of the platform. In some embodiments, after adjusting the state of the platform detecting a change in the state of the component and in accordance with a determination that the component of the platform is in a state that does satisfy the set of platform readiness criteria, adjusting the state of the platform (e.g., back to a ready state).

In some embodiments, the system (e.g., 100 and/or 152) detects a state (e.g., buckled) of a component (e.g., a seatbelt) of the platform (e.g., 150 and/or 200) using a camera (e.g., a sensor) of the platform; and confirming that the state of the component of the platform satisfies the set of platform readiness criteria (e.g., if the seatbelt is buckled then the set of platform readiness criteria is satisfied).

In some embodiments, the system (e.g., 100 and/or 152) detects that a component (e.g., a seatbelt) of the platform (e.g., 150 and/or 200) is in a state (e.g., unbuckled) that does not satisfy the set of platform readiness criteria; and in response to detecting that the component of the platform is in the state that does not satisfy the set of platform readiness criteria, prompting the user to confirm that the state of the component of the platform does satisfy the set of the platform readiness criteria. In some embodiments, detecting that the component (e.g., a seatbelt) of the platform is in the state (e.g., unbuckled) that does not satisfy the set of platform readiness criteria is performed with a camera of the platform. In some embodiments, detecting that the component (e.g., a seatbelt) of the platform is in the state (e.g., unbuckled) that does not satisfy the set of platform readiness criteria is performed with a proximity (or other) sensor of the platform. In some embodiments, prompting the user to confirm that the state of the component of the platform does satisfy the set of the platform readiness criteria includes providing a notification on a display of the platform including a prompt for confirmation. In some embodiments, confirm that the state of the component of the platform does satisfy the set of the platform readiness criteria includes providing an audio output including the prompt for confirmation. In some embodiments, the method further comprises detecting a response to the prompt for confirmation. In some embodiments the response to the prompt for confirmation is an input on a computer system associated with the user. In some embodiments the response to the prompt for confirmation is an audio input provided by the user. In some embodiments the response to the prompt for confirmation is an input on an input control of the platform.

A passenger controls whether the platform is on, controls a speed of the platform via a gas pedal and/or a brake pedal, and/or controls a trajectory, path, and/or route of the platform to a destination via a steering wheel. Passengers usually have to determine whether and/or how to modify a route of the platform and also control the platform to deviate from a current route. In some cases, the passenger can become distracted while figuring out how to adjust a current route of the platform in a manner consistent with their intent and/or needs. In addition, when the passenger is having an emergency, the passenger may not be in a state to adjust the route of the platform safely.

Thus, there is a need for a platform, such as a vehicle, that can adjust and/or modify a route of a trip based on information obtained about a person and/or passenger. For instance, there is a need for a platform that can quickly transition between routes in a manner that satisfies the needs of a person and/or passenger. In some embodiments, the platform transitions between routes based on user preferences, activity being performed by a person using the platform, a schedule and/or calendar of the person using the platform, and/or other contextual information about the person. In some embodiments, the platform determines how to modify a current route to best suit the needs of the person without requiring the person to request a change in route and/or without requiring user input. In some embodiments, the platform determines how to modify a current route based on a request from the person in a manner that is safe, quick, and/or most closely associated with the person's needs. Accordingly, the platform can enhance the safety, experience, and/or trip of the person by adjusting a route based on information about the person.

Figure 18A:
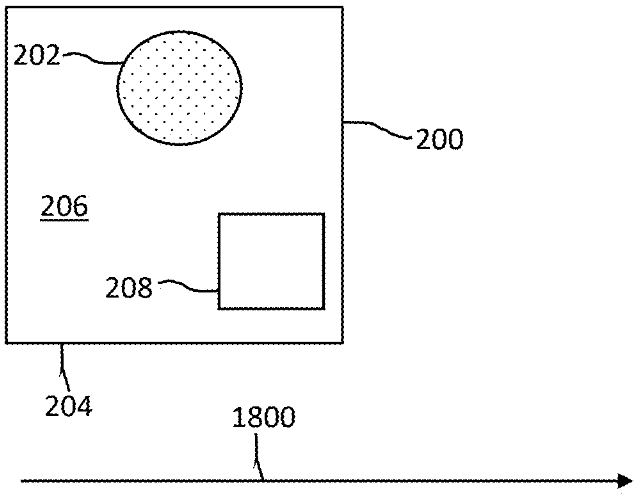
FIGS. 18A-18D illustrate examples of adjusting a route of a platform based on a set of criteria, in accordance with some embodiments.

Turning now to the drawings, FIG. 18A is a block diagram illustrating platform 200 performing a trip while person 202 is within interior portion 206 of platform 200. At FIG. 18A, platform 200 is performing the trip along first route 1800, as indicated by a straight arrow at FIG. 18A. First route 1800 is based on a context that is associated with person 202. For instance, at FIG. 18A, person 202 is associated with a first context, as indicated by first hatching of person 202.

In some embodiments, the context associated with person 202 includes information about person 202, such as a detected activity being performed by person 202, a schedule and/or calendar of person 202, an estimated, predicted, and/or determined mood and/or behavior of person 202, an intent of person 202, communications between person 202 and one or more second people (such as messages sent and/or received by person 202, a phone call between person 202 and the one or more second people, and/or an email sent and/or received by person 202), requests of person 202 (such as a request to prolong the trip and/or make a stop received via one or more input devices of platform 200 and/or an external device associated with person 202), traffic conditions, previous trips taken by person 202, and/or other metadata associated with person 202.

Figure 18B:
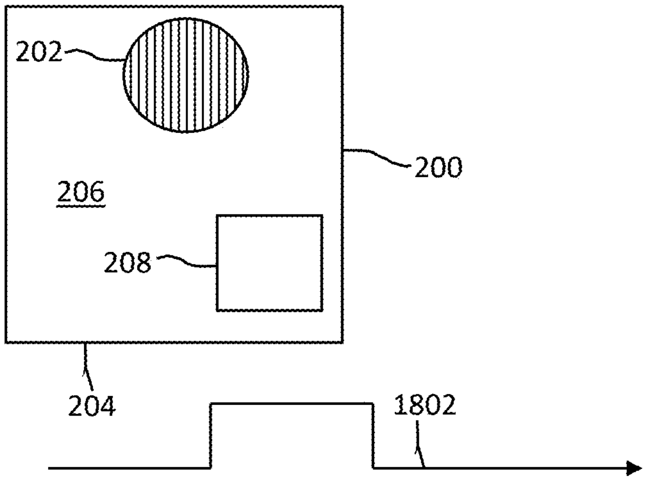

While platform 200 is performing the trip along first route 1800, platform 200 obtains and/or receives additional information that indicates that person 202 is associated with a second context, as indicated by second hatching of person 202 shown at FIG. 18B. For instance, in some embodiments, person 202 receives an urgent meeting request while platform 200 is performing the trip along first route 1800. In some embodiments, platform 200 obtains information about the urgent meeting request and transitions from performing the trip along first route 1800 to performing trip along second route 1802, as shown at FIG. 18B. In some embodiments, when the second context associated with person 202 includes the urgent meeting request, second route 1802 is a faster route and/or includes platform 200 moving at higher speeds when compared to first route 1800. Thus, platform 200 performs the trip along second route 1802 in order to best satisfy the needs of person 202.

Figure 18C:
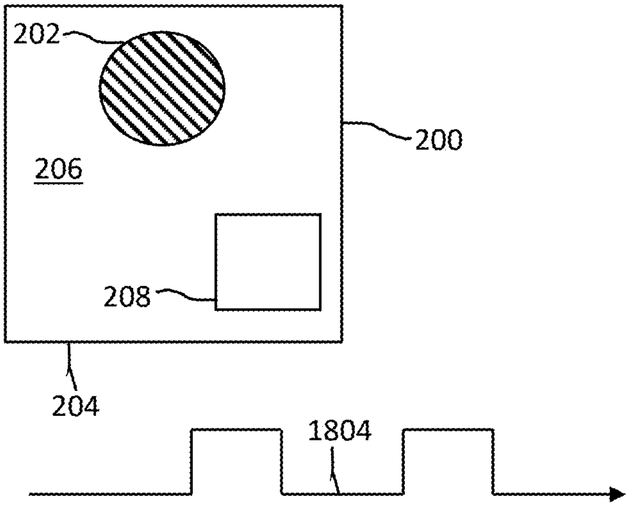

Similarly, while platform 200 is performing the trip along first route 1800, platform obtains and/or receives additional information that indicates that person 202 is associated with a third context, as indicated by third hatching of person 202 shown at FIG. 18C. In some embodiments, the third context includes a message received by person 202 (such as via an external device associated with person 202) that indicates that a family member of person 202 is requesting assistance from person 202. Based on determining that person 202 is associated with third context, platform 200 transitions from performing the trip along first route 1800 to performing the trip along third route 1804, as shown at FIG. 18C. In some embodiments, third route 1804 includes a stop at a location of the family member of person 202 before continuing to move toward the office and work location of person 202. In some embodiments, third route 1804 includes a change in the destination location of person 202, such that third route 1804 ends at the location of the family member instead of at the office and/or work location of person 202.

Figure 18D:
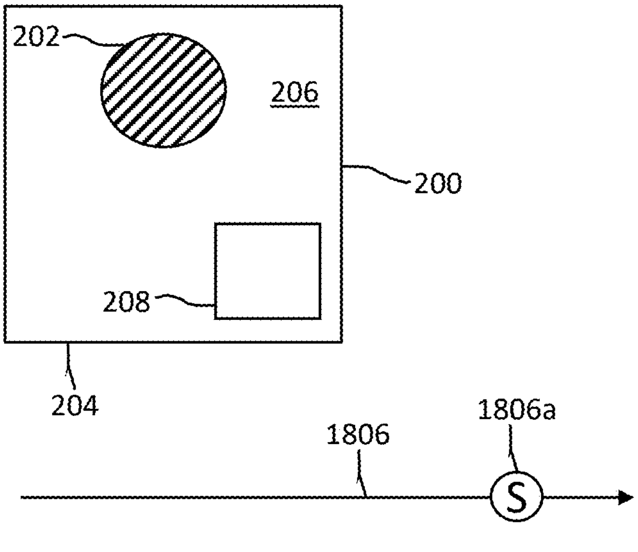

Further, while platform 200 is performing the trip along first route 1800, platform obtains and/or receives additional information that indicates that person 202 is associated with a fourth context, as indicated by fourth hatching of person 202 shown at FIG. 18D. In some embodiments, the fourth context includes information that indicates that person 202 needs to make a stop. In some embodiments, the fourth context includes a request by person 202 to stop at a particular location. In some embodiments, the fourth context includes information indicating that person 202 intends to prolong a duration of the trip, such that platform 200 makes a temporary stop before proceeding to the destination of the trip. Based on determining that person 202 is associated with the fourth context, platform 200 transitions from performing the trip along first route 1800 to performing the trip along fourth route 1806, as shown at FIG. 18D.

At FIG. 18D, fourth route 1806 includes stop 1806*a* indicating that platform 200 stops moving at a location that is along fourth route 1806 before platform 200 reaches the destination of the trip. In some embodiments, stop 1806*a* includes a staging location that allows person 202 to have sufficient time to finish a phone call and/or to finish a song, a movie, and/or a video. In some embodiments, stop 1806*a* includes a temporary parking location that prolongs a duration of the trip based on a user request (such as a request received via voice command). In some embodiments, stop 1806*a* includes a location of a third person that person 202 requested to pick up and join person 202 for at least a portion of the remainder of the trip.

In some embodiments, stop 1806*a* includes a stop location requested by person 202. In some embodiments, person 202 requests that platform 200 stop at the stop location for a requested duration. In some embodiments, platform 200 determines an estimated and/or predicted duration that platform 200 will be stopped at the stop location. In some embodiments, when the requested, estimated, and/or predicted duration of stop 1806*a* is less than a predetermined amount of time, platform 200 parks in a short-term location and maintains an original destination of the trip. In some embodiments, when the requested, estimated, and/or predicted duration of stop 1806*a* is more than a predetermined amount of time, platform 200 parks in a long-term location and maintains the original destination of the trip. In some embodiments, stop 1806*a* includes a request by person 202 to pull over and platform 200 determines a safe and suitable location for stop 1806*a* to occur. In some embodiments, stop 1806*a* includes an emergency stop 1806*a* requested by person 202. In some embodiments, the emergency stop includes a request to stop movement of platform 200 as quickly as possible. In some embodiments, platform 200 prompts person 202 to confirm the emergency stop before stopping movement of platform 200 in response to the emergency stop request.

In some embodiments, the stop location requested by person 202 includes a request to obtain a particular item, such as a cup of coffee, and/or to perform a particular activity, such as use the restroom. In some embodiments, platform 200 displays options for the stop location that are based on the request of person 202 so that person 202 can select a suitable location that fits the needs of person 202. In some embodiments, platform 200 outputs audio that includes options for the stop location that are based on the request of person 202 so that person 202 can select a suitable location that fits the needs of person 202.

In some embodiments, platform 200 determines that person 202 is having an emergency and performs stop 1806*a* based on the determination that person 202 is experiencing an emergency situation. In some embodiments, when platform 200 determines that person 202 is having an emergency, stop 1806*a* includes a medical location that allows person 202 to address the emergency situation.

In some embodiments, platform 200 transitions between routes based on a determination that person 202 would like the trip to last for a longer duration. For instance, when person 202 is listening to a song and the song is not determined to end before platform 200 will reach the destination of the trip, platform 200 transitions to a route that will add time to the trip. In some embodiments, platform 200 adds time to the trip so that the trip will end at a time that is proximate to an ending of the song and/or other media being enjoyed by person 202. In some embodiments, platform 200 asks person 202 whether they would like to add time to the trip when platform 200 approaches the destination of the trip.

In some embodiments, platform 200 transitions between routes based on preferences of person 202. For instance, in some embodiments, person 202 has previously selected and/or designated (such as via an application associated with platform) that person 202 prefers trips with the least amount of motion. In some embodiments, platform 200 transitions from a fastest route toward a destination to a route that incurs the fewest amount of turns and/or motion based on the preferences of person 202.

In some embodiments, configurable elements 208 of platform 200 can be adjusted while platform 200 is performing the trip. In some embodiments, configurable elements 208 can be adjusted via an external device associated with person 202, via physical input devices within interior portion 206 of platform 200, and/or via a display device within interior portion 206 of platform 200.

Figure 19:
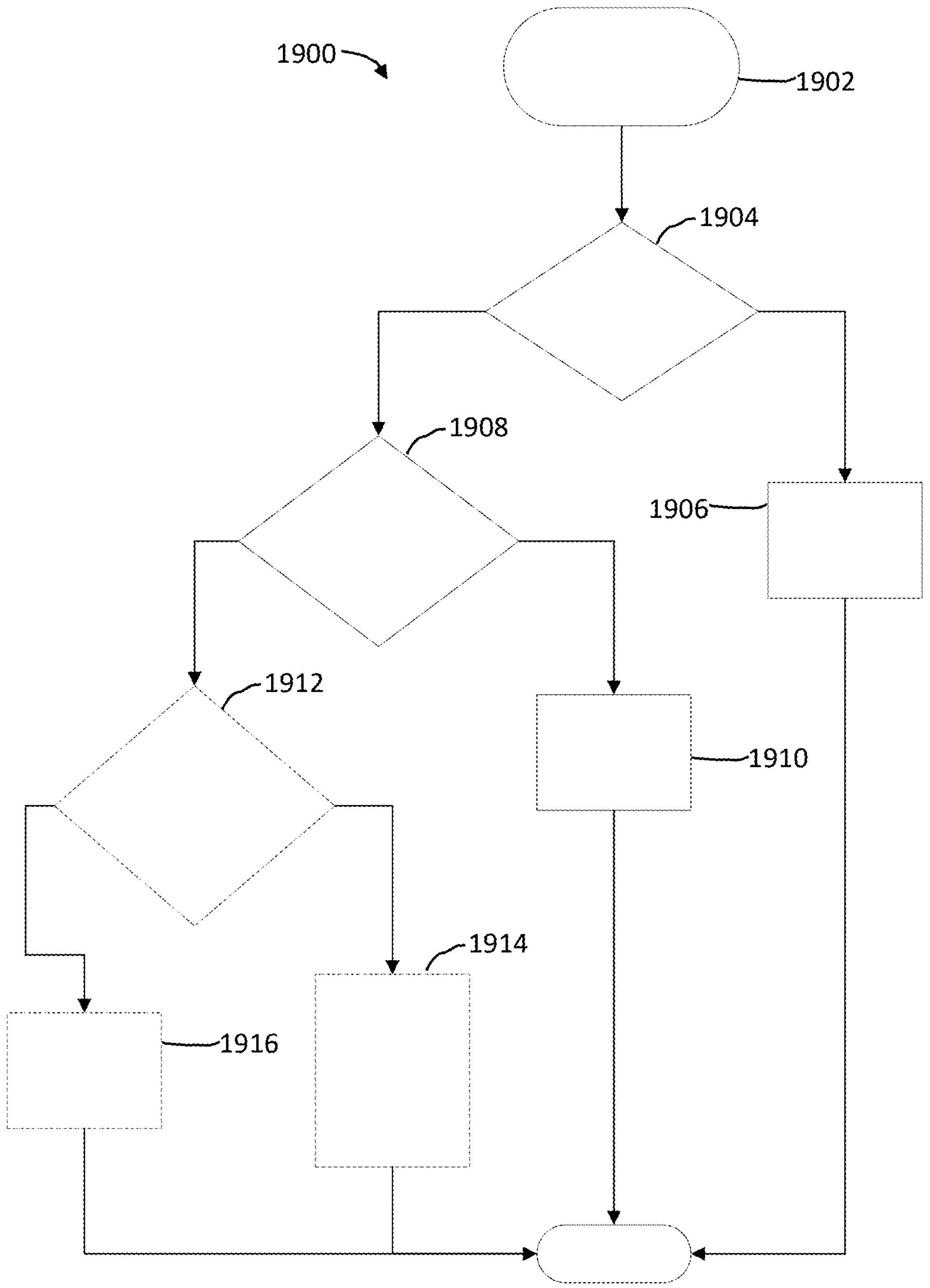
FIG. 19 is a flow diagram illustrating methods for adjusting a route of a platform based on a set of criteria, in accordance with some embodiments.

FIG. 19 is a flow diagram illustrating method 1900 that can be performed by platform 200, such as a computer system associated with platform 200. At FIG. 19, platform 200 receives and/or obtains information about person 202 while platform 200 is performing a trip along first route 1800, as shown at block 1902. As set forth above, the information about person 202 can include contextual information about person 202 and/or a request from person 202.

Platform 200 determines whether the information about person 202 includes a context that satisfies a first set of criteria for modifying first route 1800 and/or transitioning from performing the trip along first route 1800 to performing the trip along a different route, as shown at block 1904. When the information about person 202 includes a context that satisfies the first set of criteria, platform 200 transitions from performing the trip along first route 1800 to performing the trip along second route 1802, as shown at block 1906.

When the information about person 202 does not include a context that satisfies the first set of criteria, platform 200 determines whether the information about person 202 includes a context that satisfies a second set of criteria for modifying first route 1800 and/or transitioning from performing the trip along first route 1800 to performing the trip along a different route, as shown at block 1908. When the information about person 202 includes a context that satisfies the second set of criteria, platform 200 transitions from performing the trip along first route 1800 to performing the trip along third route 1804, as shown at block 1910.

When the information about person 202 does not include a context that satisfies the second set of criteria (and does not satisfy the first set of criteria), platform 200 determines whether the information about person 202 includes a context that satisfies a third set of criteria for modifying first route 1800 and/or transitioning from performing the trip along first route 1800 to performing the trip along a different route, as shown at block 1912. When the information about person 202 includes a context that satisfies the third set of criteria, platform 200 transitions from performing the trip along first route 1800 to performing the trip along fourth route 1806 that includes stop 1806*a*, as shown at block 1914.

When the information about person 202 does not include a context that satisfies the third set of criteria (and does not satisfy both the first set of criteria and the second criteria), platform 200 maintains performance of the trip along first route 1800, as shown at block 1916.

A system (e.g., 100 and/or 152) associated with a platform (e.g., 150 and/or 200) is configured to perform a method in accordance with some embodiments. While a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system) is configured to perform a trip (e.g., movement of the platform from a pick up location where a user enters an interior of the platform to a drop off location where the user exits the interior of the platform) along a first route (e.g., 1800) (e.g., a first path and/or course of movement of the platform from a starting and/or pick up location toward a destination and/or drop off location), the system (e.g., 100 and/or 152) receives information that includes a context (e.g., information indicating an activity being performed by the user, a schedule and/or calendar of the user, a mood and/or behavior of the user, an intent of the user, a phone call received and/or initiated by the user, a message received and/or sent by the user, an input performed by the user (such as an input requesting additional time for the trip, an input requesting to pick up another user, and/or an input requesting to make a stop), traffic conditions, habits and/or preferences of the user, and/or other metadata) associated with a user (e.g., 202) (e.g., a rider and/or passenger) of the platform (e.g., 150 and/or 200).

In response to receiving the context and in accordance with a determination that the context satisfies a first set of one or more criteria (e.g., the context includes a first indication and/or request for adjusting the first route, the context indicates that a second route, different from the first route, would complete the trip more quickly, the context indicates that a second route, different from the first route, is preferred by the user, and/or the context indicates that a second route, different from the first route, is requested by the user), the system (e.g., 100 and/or 152) causes the platform (e.g., 150 and/or 200) to perform the trip along a second route (e.g., 1802, 1804, and/or 1806) (e.g., a second path and/or course of movement of the platform from a starting and/or pick up location toward a destination and/or drop off location) different from the first route (e.g., 1800). In some embodiments, the platform transitions from performing the trip along the first route to performing the trip along the second route when the context satisfies the first set of one or more criteria. In some embodiments, the platform does not change a destination location of the trip when transitioning from performing the trip along the first route to performing the trip along the second route.

In response to receiving the context and in accordance with a determination that the context satisfies a second set of one or more criteria (e.g., the context includes a second indication and/or request for adjusting the first route, the context indicates that a third route, different from the first route, would complete the trip more quickly, the context indicates that a third route, different from the first route, is preferred by the user, and/or the context indicates that a third route, different from the first route, is requested by the user), the system (e.g., 100 and/or 152) causes the platform to perform the trip along a third route (e.g., 1802, 1804, and/or 1806) (e.g., a third path and/or course of movement of the platform from a starting and/or pick up location toward a destination and/or drop off location) different from the first route (e.g., 1800) and the second route (e.g., 1802, 1804, and/or 1806). In some embodiments, the platform transitions from performing the trip along the first route to performing the trip along the third route when the context satisfies the second set of one or more criteria. In some embodiments, the platform does not change a destination location of the trip when transitioning from performing the trip along the first route to performing the trip along the third route.

In some embodiments, the context is selected from the group consisting of: an activity of the user (e.g., a detected, estimated, and/or determined activity being performed by the user, such as the user using and/or interacting with an external device (such as a smart phone, a smart watch, a laptop computer, and/or a tablet computer), the user viewing, listening to, and/or otherwise experiencing content (such as a movie, a video, a song, a playlist, and/or a podcast), the user sleeping, and/or the user paying attention to their surroundings (such as based on a gaze of the person)), a schedule of the user (e.g., information that includes a schedule, timing and/or locations of meetings, and/or timing and/or locations of events), a mood of the user (e.g., a detected, estimated, and/or determined mood of the user that is based on contextual information associated with the user, such as content associated with messages sent and/or received by the user, physical characteristics of the user (such as heart rate and/or blood pressure), and/or one or more tones of speech output by the user), an intent of the user (e.g., a detected, estimated, and/or determined intent of the user that is based on content associated with messages sent and/or received by the user and/or previous trips of the user), a phone call of the user (e.g., speech detected during an active phone call between the user and one or more additional people), an electronic message of the user (e.g., content of one or more electronic messages (such as a text message, an electronic mail message, and/or a short message service message) that are sent by and/or received by the user), and metadata associated with the user (e.g., a current location of the user, previous trips taken by the user via the platform and/or another platform, a browser history of the user, and/or photographs taken and/or received by the user).

In some embodiments, in accordance with a determination that the context satisfies a third set of one or more criteria (e.g., the context includes a third indication and/or request for adjusting the first route and/or the context indicates that the user requested to perform the trip along a fourth route that includes one or more stopping locations prior to the platform reaching a destination location of the trip), the system (e.g., 100 and/or 152) causes the platform to perform the trip along a fourth route (e.g., 1806) (e.g., a fourth path and/or course of movement of the platform from a starting and/or pick up location toward a destination and/or drop off location), different from the second route (e.g., 1802, 1804, and/or 1806) and the third route (e.g., 1802, 1804, and/or 1806), wherein the fourth route (e.g., 1806) includes a stop (e.g., 1806*a*) at a staging location (e.g., a temporary parking spot and/or a temporary location in which the platform can remain stationary for a predetermined amount of time) that occurs prior to the platform (e.g., 150 and/or 200) reaching a destination location of the trip (e.g., a location at which the user has requested as a stopping location and/or an ending location for the trip). In some embodiments, the third set of one or more criteria includes a first criterion that is satisfied when an active phone call is ongoing between the user and one or more second people. In some embodiments, the fourth route includes the platform moving from the staging location toward the destination location after detecting that the active phone call is ended.

In some embodiments, in accordance with the determination that the context includes first user preference information (e.g., first information that indicates that the user would prefer particular types of routes (such as faster routes, scenic routes, and/or routes that include the least amount of turns and/or motion) and/or that the user would prefer that the trip be completed within a predetermined amount of time) that satisfies the first set of one or more criteria, the system (e.g., 100 and/or 152) determines the second route (e.g., 1802, 1804, and/or 1806) based on the first user preference information (e.g., the second route is determined and/or calculated based on the first user preference information). In accordance with the determination that the context includes second user preference information (e.g., second information that indicates that the user would prefer particular types of routes (such as faster routes, scenic routes, and/or routes that include the least amount of turns and/or motion) and/or that the user would prefer that the trip be completed within a predetermined amount of time) that satisfies the second set of one or more criteria, the system (e.g., 100 and/or 152) determines the third route (e.g., 1802, 1804, and/or 1806) based on the second user preference information (e.g., the third route is determined and/or calculated based on the second user preference information). In some embodiments, the first route is changed, adjusted, and/or modified based on various preferences designated by the user. In some embodiments, user preference information is designated by the user in an application associated with the platform (e.g., an application that provides an interface for controlling the platform). In some embodiments, user preference information is based on a parameter and/or setting of the application associated with the platform.

In some embodiments, the first set of one or more criteria includes a first criterion that is met when the context includes a user request (e.g., user input (such as tap gestures, press gestures, swipe gestures, air gestures, and/or voice commands) that is received via one or more input devices of the platform and/or via one or more input devices of an external device associated with the user) to prolong a duration of the trip (e.g., extend a duration of the first route so that the second route includes a longer duration than the first route).

In some embodiments, the system (e.g., 100 and/or 152) receives the user request to prolong the duration of the trip via a voice command (e.g., speech of the user that is detected via a microphone and/or audio detection device of the platform and/or of an external computer system associated with the user that requests that an extension of the duration of the trip).

In some embodiments, prior to (e.g., before) receiving the information that includes the context and in accordance with a determination that the platform (e.g., 150 and/or 200) is approaching a second destination location of the trip (e.g., a location at which the user has requested as a stopping location and/or an ending location for the trip), the system (e.g., 100 and/or 152) displays, via a display generation component (e.g., a display generation component of the platform and/or a display generation component of an external computer system associated with the user), a selectable option (e.g., a user interface object that is configured to be interacted with via user input) that, when selected via user input (e.g., a tap gesture, a press gesture, a swipe gesture, an air gesture, and/or a voice command), causes additional time to be added to the duration of the trip (e.g., causes the platform to perform the trip along a fourth route that includes a duration that is greater than a duration of the first route).

In some embodiments, the first set of one or more criteria includes a second criterion that is met when the context includes a user request (e.g., user input (such as tap gestures, press gestures, swipe gestures, air gestures, and/or voice commands) that is received via one or more input devices of the platform and/or via one or more input devices of an external device associated with the user) to pick up a second user (e.g., cause the platform to stop at a predetermined location so that the second user can access and/or enter an interior portion of the platform and perform the remainder of the trip with the user).

In some embodiments, the first set of one or more criteria includes a third criterion that is met when the context indicates that a first remaining duration (e.g., a first amount of time that is left before outputted content ends) of outputted content (e.g., a movie, a television show, a video, a song, and/or a podcast) exceeds a second remaining duration (e.g., a second amount of time that is determined, expected, and/or predicted to be left before the completion of the trip) of the trip.

In some embodiments, the second route (e.g., 1802, 1804, and/or 1806) includes a first duration (e.g., a first amount of time for which the second route is predicted, estimated, and/or determined to take to complete the trip) that is longer than (e.g., has a longer duration than) a second duration (e.g., a second amount of time for which the first route is predicted, estimated, and/or determined to take to complete the trip) of the first route (e.g., 1800), and wherein the first duration is configured to end at a first time (e.g., a time of day at which the second route is predicted, estimated, and/or determined to end so that the trip is completed) that is based on (e.g., the first time is within a predetermined amount of time from a time at which the outputted content is predicted, estimated, and/or determined to end) (in some embodiments, the first time is the same as a second time at which the outputted content is predicted estimated, and/or determined to end) the first remaining duration of the outputted content.

In some embodiments, the context includes a user request (e.g., user input (such as tap gestures, press gestures, swipe gestures, air gestures, and/or voice commands) that is received via one or more input devices of the platform and/or via one or more input devices of an external device associated with the user) to cause the platform (e.g., 150 and/or 200) to stop moving (e.g., stop moving along a current route of the trip). In some embodiments, the user request to cause the platform to stop moving is a request that the platform stop moving temporarily, such that the platform pauses and/or temporarily stops performing the trip along the current route. In some embodiments, the user request to cause the platform to stop moving is a request that the platform stop moving and end the trip and/or modify a destination location of the trip.

In some embodiments, in accordance with a determination that the user request includes a first request to cause the platform (e.g., 150 and/or 200) to stop moving for less than a predefined amount of time (e.g., less than one hour, less than 30 minutes, less than 20 minutes, less than 15 minutes, and/or less than 10 minutes before resuming the trip along a current route) (in some embodiments, the predefined amount of time is based on a current location of the platform when the user request is obtained and/or received, such as the platform being located in an area with limited parking and/or parking spots that can be used for a limited duration), the system (e.g., 100 and/or 152) causes the platform to stop moving at a first location (e.g., the platform parks at a short-term and/or temporary location (such as a loading and/or unloading zone and/or a short-term parking spot)) and the system (e.g., 100 and/or 152) maintains a destination location associated with the trip (e.g., a location at which the user has requested as a stopping location and/or an ending location for the trip).

In some embodiments, in accordance with a determination that the user request includes a second request to cause the platform (e.g., 150 and/or 200) to stop moving for more than a predefined amount of time (e.g., more than one hour, more than 30 minutes, more than 20 minutes, more than 15 minutes, and/or more than 10 minutes before resuming the trip along a current route) (in some embodiments, the predefined amount of time is based on a current location of the platform when the user request is obtained and/or received, such as the platform being located in an area with limited parking and/or parking spots that can be used for a limited duration), the system (e.g., 100 and/or 152) causes the platform to stop moving at a second location (e.g., the platform parks at a long-term location (such as a parking spot that allows parking for more than a predetermined amount of time)) and the system (e.g., 100 and/or 152) maintains a destination location associated with the trip (e.g., a location at which the user has requested as a stopping location and/or an ending location for the trip).

In some embodiments, in accordance with a determination that the user request includes a third request to cause the platform (e.g., 150 and/or 200) to stop moving and pull over (e.g., pull over along the side of a road, pull over at a location that does not include a designated parking spot, pull over at next closest business, and/or pull over at the next exit ramp and/or side road) while the platform (e.g., 150 and/or 200) is performing the trip (e.g., prior to the platform completing the trip and/or reaching a destination location of the trip), the system (e.g., 100 and/or 152) causes the platform (e.g., 150 and/or 200) to stop moving at a third location (e.g., a location on a shoulder of a road, a location on a side of a road, a business, a rest stop, and/or a parking spot) based on a set of one or more safety criteria (e.g., the third location is determined to be safe for the platform to stop moving based on an amount of traffic at a current location of the platform, a closest parking exit ramp, business, rest stop, and/or parking lot to the current location of the platform, an amount of people at the current location of the platform, the current location of the platform, road conditions, and/or weather conditions).

In some embodiments, in accordance with a determination that the user request includes a fourth request to cause the platform (e.g., 150 and/or 200) to stop moving within a predetermined amount of time (e.g., an amount of time that is based on an emergency situation experienced by and/or emergency conditions of the user, such as within 5 minutes, within 1 minute, and/or within 30 seconds) from a current time (e.g., a current time of day), the system (e.g., 100 and/or 152) prompts the user (e.g., 202) to confirm the fourth request (e.g., displaying a user interface, outputting audio output, outputting light, and/or outputting haptic output guiding the user to confirm the request to cause the platform to stop moving within the predetermined amount of time from the current time). After prompting the user (e.g., 202) to confirm the fourth request, the system (e.g., 100 and/or 152) obtains confirmation of the fourth request (e.g., obtaining and/or receiving user input via one or more input devices of the platform and/or via one or more input devices of an external computer system associated with the user). In response to obtaining confirmation of the fourth request, the system (e.g., 100 and/or 152) causes the platform to stop moving at a fourth location (e.g., an emergency stopping location and/or a location that is determined based on the fourth request and/or the predetermined amount of time).

In some embodiments, in accordance with a determination that the user request includes a fifth request to cause the platform (e.g., 150 and/or 200) to stop moving at a requested location (e.g., stop moving at a location at which the user can obtain and/or purchase an item (e.g., a requested item, such as coffee and/or a hamburger) and/or a location at which the user can perform an action (e.g., a requested action, such as use the restroom)), the system (e.g., 100 and/or 152) displays, via a display generation component (e.g., a display generation component of the platform (such as an augmented reality overlay on a windshield and/or windows of the platform) and/or a display generation component of an external computer system associated with the user), one or more first destination location options (e.g., one or more selectable options for locations that are along a current route of the platform and/or within a predetermined distance of the current route of the platform that correspond to (such as match) the requested location) (in some embodiments, the one or more first destination location options are displayed on a map user interface that includes one or more indications corresponding to the one or more destination location options relative to a current route of the platform) that are based on the requested location (e.g., the one or more first destination location options include a first characteristic that is based on a second characteristic of the requested location (such as the one or more first destination location options sell an item requested by the user, include an amenity requested by the user, and/or provide a service requested by the user)).

In some embodiments, in accordance with the determination that the user request includes the fifth request to cause the platform (e.g., 150 and/or 200) to stop moving at the requested location, the system (e.g., 100 and/or 152) outputs (e.g., concurrently with, or in lieu of, displaying the one or more destination location options), via one or more audio output devices (e.g., speakers, headsets, and/or headphones), audio output that includes speech (e.g., words and/or sentences that audibly describe one or more second destination locations) corresponding to one or more second destination location options (e.g., one or more selectable options for locations that are along a current route of the platform and/or within a predetermined distance of the current route of the platform that correspond to (such as match) the requested location) (in some embodiments, the one or more second destination location options are the same as the one or more first destination location options) that are based on the requested location (e.g., the one or more second destination location options include a third characteristic that is based on the second characteristic of the requested location (such as the one or more second destination location options sell an item requested by the user, include an amenity requested by the user, and/or provide a service requested by the user)).

In some embodiments, the first set of one or more criteria includes a fourth criterion that is met when the context includes an indication that the user (e.g., 202) is experiencing an emergency situation (e.g., the context indicates that the user is having a medical emergency and/or a safety emergency based on the information and/or additional information obtained from one or more external computer systems associated with the user (such as a wearable computer system and/or a smart watch)).

In some embodiments, the second route (e.g., 1802, 1804, and/or 1806) includes a medical location (e.g., a hospital, an emergency room, an urgent care clinic, and/or another medical facility) as a destination location (e.g., a location at which the user has requested as a stopping location and/or an ending location for the trip).

In some embodiments, the platform (e.g., 150 and/or 200) includes one or more configurable elements (e.g., 208) within an interior portion (e.g., 206) of the platform (e.g., 150 and/or 200). For instance, in some embodiments, the one or more configurable elements (e.g., 208) include furniture, lights, audio output devices, climate systems, and/or windows. In some embodiments, the one or more configurable elements (e.g., 208) are adjusted to a first state based on the platform (e.g., 150 and/or 200) (and/or a computer system of platform 200) obtaining information (such as via a computer system of the platform) indicating that an external computer system associated with the user (e.g., 202) received one or more user inputs requesting to adjust the one or more configurable elements (e.g., 208) to the first state. In some embodiments, the one or more configurable elements (e.g., 208) are adjusted to a first state based on the platform (e.g., 150 and/or 200) (and/or a computer system of platform 200) obtaining information that one or more input devices (such as physical buttons and/or dials) of the platform (e.g., 150 and/or 200) received one or more user inputs requesting to adjust the one or more configurable elements (e.g., 208) to the first state. In some embodiments, a current state of the one or more configurable elements (e.g., 208) are displayed via a display generation component of the platform (e.g., 150 and/or 200). In some embodiments, the display generation component of the platform (e.g., 150 and/or 200) is a touch screen and/or touch-sensitive display that enables a user to request to adjust the one or more configurable elements (e.g., 208) to the first state via user input corresponding to the display generation component of the platform (e.g., 150 and/or 200).

When more than one passenger is positioned within an interior, cabin, and/or seating area of the platform, the passengers can experience difficulties when exiting the platform due to limited space, positions of doors, and/or positions of furniture. Moreover, when multiple passengers have different destinations, passengers that do not intend to exit the platform can create obstructions for passengers exiting the platform.

Thus, there is a need for a platform, such as a vehicle, that can determine and/or predict which people and/or passengers will exit the platform at a particular destination and adjust components of the platform accordingly. For instance, in some embodiments, the platform is configured to adjust furniture, doors, and/or other components of the platform based on which people and/or a number of people that are determined and/or predicted to exit the platform at a stopping location and/or destination. In some embodiments, the platform adjusts the furniture, doors, and/or other components automatically so that one or more people can quickly exit the platform at their intended destination. Thus, people can prepare to exit the platform without having to spend additional time adjusting components of the platform, thereby reducing the amount of time needed for egress during a trip.

Figure 20A:
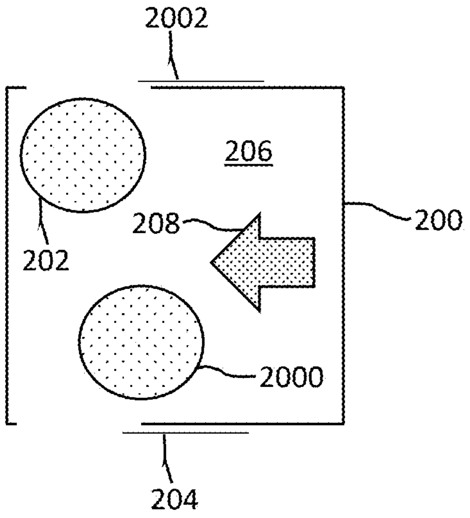
FIGS. 20A-20C illustrate examples of different arrival modes of a platform based on a set of criteria, in accordance with some embodiments.

Turning now to the drawings, FIG. 20A is a block diagram illustrating platform 200 approaching, arriving, and/or positioned at a first destination while person 202 and second person 2000 are positioned within interior portion 206 of platform 206. At FIG. 20A, the first destination is a destination of person 202, as indicated by first hatching of person 202, and the first destination is also a destination of second person 2000, as indicated by the first hatching of second person 2000. Thus, both person 202 and second person 2000 are determined and/or predicted to exit interior portion 206 of platform 200 at the first destination.

In some embodiments, platform 200 determines whether the first destination corresponds to a destination of person 202 based on a request of person 202 (such as person 202 directly requesting to be dropped off at the first destination). In some embodiments, platform 200 determines and/or predicts whether first destination corresponds to the destination of person 202 based on information about person 202 (such as information that indicates a schedule and/or an intent of person 202), a type of location associated with the first destination, and/or activity of person 202 (such as whether person 202 is preparing to exit platform 200 when platform 200 reaches the first destination). In some embodiments, platform 200 determines whether the first destination corresponds to a destination of second person 2000 based on a request of second person 2000 (such as second person 2000 directly requesting to be dropped off at the first destination). In some embodiments, platform 200 determines and/or predicts whether first destination corresponds to the destination of second person 2000 based on information about second person 2000 (such as information that indicates a schedule and/or an intent of second person 2000), a type of location associated with the first destination, and/or activity of second person 2000 (such as whether second person 2000 is preparing to exit platform 200 when platform 200 reaches the first destination).

In some embodiments, platform 200 determines a number of people (such as person 202 and second person 2000) positioned within interior portion 206 of platform 200 based on a number of external devices (such as external devices associated with person 202 and/or second person 2000) in communication with platform (such as computer system of platform). In some embodiments, platform 200 determines the number of people positioned within interior portion 206 of platform 200 and/or positions of particular people relative to interior portion 206 of platform 200 based on occupant monitoring (such as via cameras and/or sensors of platform 200).

At FIG. 20A, platform 200 moves closure 204 to an open position and moves second closure 2002 to the open position to facilitate an ability of both person 202 and second person 2000 to exit interior portion 206 of platform 200. In addition, at FIG. 20A, platform 200 adjusts configurable elements 208 to a first state, as indicated by first hatching of the arrow representing configurable elements 208. In some embodiments, the first state of configurable elements 208 includes a first seat associated with person 202 and a second seat associated with second person 2000 being in an egress position (such as an upright and/or non-reclined position). In some embodiments, platform 200 adjusts seats to the egress position that are occupied by people determined and/or predicted to exit platform 200 and does not adjust seats to the egress position that are occupied by people that are not determined and/or predicted to exit platform 200. In some embodiments, the first state includes other furniture (such as tables) of configurable elements 208 in the egress position.

In some embodiments, the first state of configurable elements 208 includes providing a communal notification to person 202 and second person 2000 to notify and/or alert both person 202 and second person 2000 that platform 200 is approaching their destination. In some embodiments, the communal notification includes a notification that can be perceived and/or noticed by all people positioned within interior portion 206 of platform 200. In some embodiments, the communal notification includes an audio notification and/or a visual notification. In some embodiments, the first state of configurable elements 208 includes providing the communal notification and/or other notifications to person 202 and second person 202 at a first time before reaching the first destination.

Figure 20B:
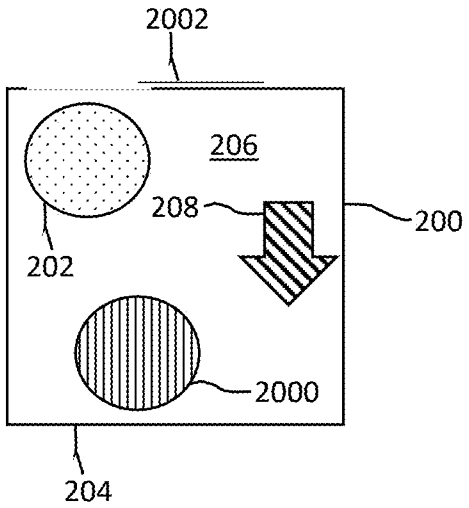

At FIG. 20B, platform 200 approaches, arrives, and/or is positioned at a second destination while person 202 and second person 2000 are positioned within interior portion 206 of platform 206. At FIG. 20B, platform 200 determines that the second destination is a destination of person 202, as indicated by first hatching of person 202, and determines that the second destination is not a destination of second person 2000, as indicated by second hatching of second person 2000. Thus, person 202 is determined and/or predicted to exit interior portion 206 of platform 200 at the second destination, while second person 2000 is determined and/or predicted to remain within interior portion 206 of platform 200 at the second destination.

At FIG. 20B, platform 200 moves second closure 2002 to the open position and maintains closure 204 in a closed position. In some embodiments, platform 200 determines which of closure 204 and second closure 2002 is positioned closest to person 202, who is determined and/or predicted to exit platform 200. As set forth above, in some embodiments, platform 200 determines a position of person 202 within interior portion 206 of platform 200 via occupant monitoring (such as a cameras and/or sensors of platform 200). Thus, platform 200 enables person 202 to exit from interior portion 206 of platform 200 without being obstructed and/or restricted by second person 2000. In addition, person 202 can quickly exit interior portion 206 of platform 200 via second closure 2002 without disrupting and/or disturbing second person 2000.

In addition, at FIG. 20B, platform 200 adjusts configurable elements 208 to a second state, as indicated by second hatching of the arrow representing configurable elements 208. In some embodiments, the second state of configurable elements 208 includes the first seat associated with person 202 being in the egress position and the second seat associated with second person 2000 being in a non-egress position (such as the second seat being maintained in a travel position). In some embodiments, the second state includes other furniture (such as tables) of the configurable elements 208 in the egress position to facilitate exit of person 202 from interior portion 206 of platform.

In some embodiments, the second state of configurable elements 208 includes providing a first type of notification to person 202 and providing a second type of notification to second person 2000. In some embodiments, the first type of notification notifies and/or alerts person 202 that platform 200 is approaching and/or getting close to the destination of person 202. As such, person 202 can begin to prepare to exit interior portion 206 of platform 200 to reduce the amount of time needed for person 202 to depart from platform 200. In some embodiments, the second type of notification notifies and/or alerts second person 2000 that platform 200 is approaching a stop, but that the stop is not the destination of second person 2000. As such, second person 2000 is aware that platform 200 is about to stop, but that second person 2000 does not need to prepare to exit and/or depart from platform 200.

In some embodiments, the second state of configurable elements 208 includes providing an individual notification to person 202 without providing a notification (such as an individual notification) to second person 2000. In some embodiments, the individual notification notifies and/or alerts person 202 that platform 200 is approaching the destination of person 202 without disturbing second person 2000. In some embodiments, the individual notification provided to person 202 includes a notification output by an external device associated with person 202. In some embodiments, the individual notification provided to person 202 includes a targeted notification, such as targeted spatial audio that can be perceived by person 202 while causing minimal disruption to second person 2000.

In some embodiments, the second state of configurable elements 208 includes providing the individual notification to person 202 and/or providing other notifications to person 202 and/or person 2000 at a second time before platform 200 reaches the second destination. In some embodiments, the second time at which a notification is provided to one or more people positioned within interior portion 206 of platform 200 when configurable elements 208 are in the second state is a different time from the first time at which a notification is provided to one or more people positioned within interior portion 206 of platform 200 when configurable elements are in the first state.

Figure 20C:
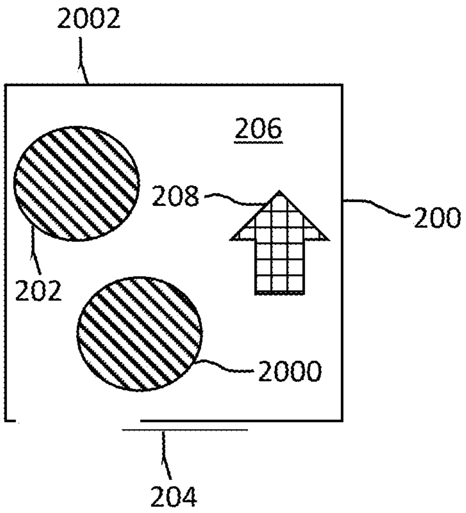

At FIG. 20C, platform 200 approaches, arrives, and/or is positioned at a third destination while person 202 and second person 2000 are positioned within interior portion 206 of platform 206. At FIG. 20C, platform 200 determines that it is uncertain whether the third destination is a destination of person 202, as indicated by third hatching of person 202, and determines that it is uncertain whether the third destination is a destination of second person 2000, as indicated by third hatching of second person 2000. In some embodiments, platform 200 determines that the third destination is not certain to be a destination of person 202 and/or second person 2000 when platform 200 has not received confirmation of a destination from person 202 and/or second person 2000. In some embodiments, platform 200 determines that the third destination is not certain to be a destination of person 202 and/or second person 2000 when platform 200 cannot estimate and/or predict a destination of person 202 and/or second person 2000.

At FIG. 20C, platform 200 moves closure 204 to the open position and maintains second closure 2002 in a closed position. In some embodiments, platform 200 opens a closure that is closest to a walkway and/or a safest location for person 202 and/or second person 2000 to exit interior portion 206 of platform 200 at the third destination. In some embodiments, platform 200 opens second closure 2002 and maintains closure 204 in the closed position. In some embodiments, platform 200 opens both closure 204 and second closure 2002 when platform 200 determines that it is uncertain whether the third destination corresponds to a destination of person 202 and determines that it is uncertain whether the third destination corresponds to a destination of second person 2000.

In addition, at FIG. 20C, platform 200 adjusts configurable elements 208 to a third state, as indicated by third hatching of the arrow representing configurable elements 208, based on the determination that it is uncertain whether the third destination is the destination of person 202 and the determination that it is uncertain whether the third destination is the destination of second person 2000. In some embodiments, the third state of configurable elements 208 includes the first seat associated with person 202 being in the egress position and the second seat associated with second person 2000 being in the egress position. In some embodiments, the third state of configurable elements 208 includes the first seat associated with person 202 being in the non-egress position and the second seat associated with second person 2000 being in the non-egress position. In some embodiments, the third state of configurable elements 208 includes adjusting a seat that is closest to a closure (such as closure 204) that is opened when platform 200 arrives at the third destination to the egress position. In some embodiments, the third state includes other furniture (such as tables) of configurable elements 208 in the egress position to facilitate exit of one or more people via a closure that is opened when platform 200 arrives at the third destination.

In some embodiments, after a predetermined amount of time has passed since platform 200 has arrived at a destination, platform 200 determines whether one or more people who are determined and/or predicted to exit platform 200 have exited. In some embodiments, platform 200 determines whether the one or more people determined and/or predicted to exit have exited based on whether the one or more people have unfastened and/or unbuckled their seat belts and/or whether the one or more people have moved at least a predetermined distance away from platform 200. In some embodiments, when platform 200 determines that one or more people who are determined and/or predicted to exit platform 200 have not exited platform 200, platform 200 provides a notification and/or guidance to the one or more people to exit platform 200.

In some embodiments, the first state, the second state, and/or the third state of configurable elements 208 includes causing a seat belt of person 202 and/or second person 2000 to constrict and/or tug to notify person 202 and/or second person 2000 that platform 200 is stopping.

Figure 21:
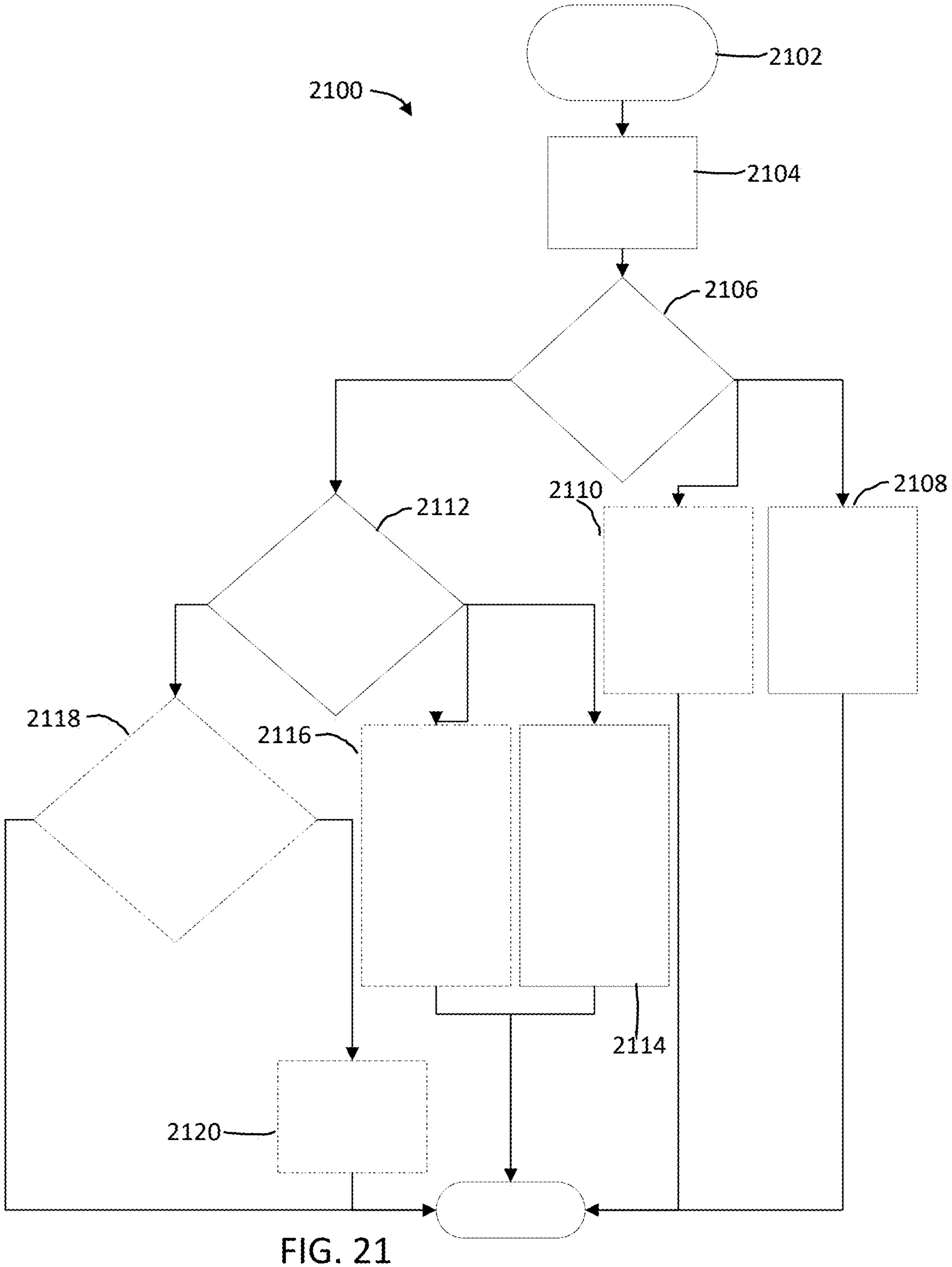
FIG. 21 is a flow diagram illustrating methods for adjusting between arrival modes of a platform based on a set of criteria, in accordance with some embodiments.

FIG. 21 is a flow diagram illustrating method 2100 that can be performed by platform 200, such as a computer system associated with platform 200. At FIG. 21, person 202 and second person 2000 are positioned within interior portion 206 of platform 200, as shown at block 2102. In some embodiments, platform 200 detects a number of people within interior portion 206 of platform 200 and performs method 2100 when at least two people are within interior portion 206 of platform 200, but does not perform method 2100 when one or fewer people are within interior portion 206 of platform 200.

While person 202 and second person 2000 are positioned within interior portion 206 of platform 200, platform 200 detects that platform 200 is approaching a location (such as a stopping location and/or a destination), as shown at block 2104. After detecting that platform 200 is approaching the location, platform 200 determines whether the location is a destination of person 202 and a destination of second person 2000, as shown at block 2106.

When platform 200 determines that the location is the destination of person 202 and that the location is the destination of second person 2000, platform 200 adjusts configurable elements 208 to a first state, as shown at block 2108. In some embodiments, when platform 200 determines that the location is the destination of person 202 and that the location is the destination of second person 2000, platform 200 also adjusts closure 204 and second closure 2002 to the open position and/or adjusts a first seat associated with person 202 and a second seat associated with second person 2000 to an egress position, as shown at block 2110.

When platform 200 determines that the location is not the destination of person 202 and/or that the location is not the destination of second person 2000, platform 200 determines whether the location is the destination of person 202 and not the destination of second person 2000 or whether the location is the destination of second person 2000 and not the destination of person 202, as shown at block 2112.

When platform 200 determines that the location is the destination of person 202 and not the destination of second person 2000 or that the location is the destination of second person 2000 and not the destination of person 202, platform 200 adjusts configurable elements 208 to a second state, as shown at block 2114. In some embodiments, when platform 200 determines that the location is the destination of person 202 and not the destination of second person 2000 or that the location is the destination of second person 2000 and not the destination of person 202, platform 200 adjusts one of closures 202 and 2002 and/or adjusts one of the seats of person 202 and second person 2000, as shown at block 2116. In some embodiments, when platform 200 determines that the location is the destination of person 202 and that the location is not the destination of second person 2000, platform 200 opens a closure (such as closure 204 and/or closure 2002) that is positioned closest to a position of person 202 within interior portion 206. In some embodiments, when platform 200 determines that the location is the destination of person 202 and that the location is not the destination of second person 2000, platform 200 adjusts a position of the first seat associated with person 202 to the egress position without adjusting the position of the second seat associated with second person 2000 to the egress position. In some embodiments, when platform 200 determines that the location is the destination of second person 2000 and that the location is not the destination of person 202, platform 200 opens a closure (such as closure 204 and/or closure 2002) that is positioned closest to a position of second person 2000 within interior portion 206. In some embodiments, when platform 200 determines that the location is the destination of second person 2000 and that the location is not the destination of person 202, platform 200 adjusts a position of the second seat associated with second person 2000 to the egress position without adjusting the position of the first seat associated with person 202 to the egress position.

When platform 200 determines that the location is not the destination of person 202 and not the destination of second person 2000, platform 200 determines whether it is uncertain whether the location is the destination of person 202 and/or whether it is uncertain whether the location is the destination of second person 2000, as shown at block 2118. When platform 200 determines that it is uncertain that the location is the destination of person 202 and/or that it is uncertain that the location is the destination of second person 2000, platform 200 adjusts configurable elements 208 to a third state, as shown at block 2120.

When platform 200 determines that it is not uncertain that the location is the destination of person 202 and that it is not uncertain that the location is the destination of second person 2000, method 2100 ends and platform 200 does not adjust configurable elements 208.

A system (e.g., 100 and/or 152) associated with a platform (e.g., 150 and/or 200) is configured to perform a method in accordance with some embodiments. While a first person (e.g., 202) (e.g., a first rider, user, and/or passenger) and a second person (e.g., 2000) (e.g., a second rider, user, and/or passenger) are positioned within (e.g., riding in and/or otherwise being transported by the platform) an interior portion (e.g., 206) (e.g., a cabin and/or interior area of the platform that is configured to transport and/or move a person between physical locations) of a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system), the system (e.g., 100 and/or 152) detects (or, in some embodiments, determining) that a location of the platform (e.g., 150 and/or 200) satisfies a set of destination criteria (e.g., the platform is moving at a first speed, velocity, and/or acceleration, the platform is located within a predetermined distance (such as a distance that is based on the first speed, velocity, and/or acceleration of the platform) from a destination location, the destination location is of a first type (such as a residence, a business, a commercial structure, a park, and/or an event venue), the first person and/or the second person are performing a first type of activity (such as sleeping, interacting with one or more devices of the platform, interacting with one or more external devices associated with the first person and/or the second person, watching content, listening to audio, and/or paying attention to surroundings of the platform), and/or a route of a trip being performed by the platform (such as a shortest route, a fastest route, a route with less turns and/or motion, and/or a scenic route)), wherein the set of destination criteria includes a criterion that is based on a distance between the platform (e.g., 150 and/or 200) and a destination location (e.g., a destination of one or more people positioned within the interior portion of the platform, a loading and/or unloading location, and/or a location at which the platform will be stopped and/or parked for at least a predetermined amount of time) (in some embodiments, the criterion is satisfied when a distance between the platform and the destination location is within a predetermined distance (such as within 1 mile, within 0.75 miles, within 0.5 miles, within 100 feet, within 50 feet, and/or within 20 feet of each other)) (in some embodiments, the predetermined distance between the platform and the destination location is based on a speed, velocity, and/or acceleration of the vehicle, a type of location of the destination location, activity of one or more people within the interior portion of the platform, and/or a route of a trip being performed by the platform).

In response to detecting (or, in some embodiments, determining) that the location of the platform (e.g., 150 and/or 200) satisfies the set of destination criteria and in accordance with a determination that the destination location corresponds to a destination (e.g., a first location at which the first user is predicted, estimated, and/or determined to exit from the interior portion of the platform) of the first person (e.g., 202) and that the destination location corresponds to a destination (e.g., a second location at which the second user is predicted, estimated, and/or determined to exit from the interior portion of the platform) of the second person (e.g., 2000), the system (e.g., 100 and/or 152) adjusts (e.g., sending and/or transmitting a communication to one or more external computer systems associated with the one or more configurable elements that cause the one or more configurable elements to be configured in a first state) one or more configurable elements (e.g., 208) (e.g., one or more lights, one or more speakers, one or more actuatable pieces of furniture, one or more climate systems, one or more display generation components, and/or one or more input devices) of the interior portion (e.g., 206) of the platform (e.g., 150 and/or 200) to a first state (e.g., a first brightness of the one or more lights, a first color temperature of the one or more lights, a first audio output via the one or more speakers, a first volume level of audio output via the one or more speakers, a first position of the one or more actuatable windows, a first opacity of the one or more actuatable windows, a first position of the one or more actuatable pieces of furniture, a first climate setting of the one or more climate systems, and/or a first user interface and/or media item displayed on the one or more display generation components).

In response to detecting (or, in some embodiments, determining) that the location of the platform (e.g., 150 and/or 200) satisfies the set of destination criteria and in accordance with a determination that the destination location corresponds to the destination of the first person (e.g., 202) and that the destination location does not correspond to the destination of the second person (e.g., 2000) (e.g., the destination location is a destination of the first user but not the destination of the second user, such that the second user is predicted, estimated, and/or determined to remain positioned in and/or to not exit from the interior portion of the platform at the location), the system (e.g., 100 and/or 152) adjusts (e.g., sending and/or transmitting a communication to one or more external computer systems associated with the one or more configurable elements that cause the one or more configurable elements to be configured in a second state) the one or more configurable elements (e.g., 208) of the interior portion (e.g., 206) of the platform (e.g., 150 and/or 200) to a second state (e.g., a second brightness of the one or more lights, a second color temperature of the one or more lights, a second audio output via the one or more speakers, a second volume level of audio output via the one or more speakers, a second position of the one or more actuatable windows, a second opacity of the one or more actuatable windows, a second position of the one or more actuatable pieces of furniture, a second climate setting of the one or more climate systems, and/or a second user interface and/or media item displayed on the one or more display generation components), wherein the second state is different from the first state.

In some embodiments, the system (e.g., 100 and/or 152) detects (e.g., via a computer system of the platform and/or via an external computer system (such as a server) that is in communication with the computer system of the platform) a number of people (e.g., 202 and/or 2000) (e.g., the first person, the second person, and/or additional people) that are positioned within the interior portion (e.g., 206) of the platform (e.g., 150 and/or 200) based on a number of external computer systems (e.g., smart phones, smart wearable devices (such as smart watches), laptop computers, and/or desktop computers) that are in communication with a computer system of the platform (e.g., 150 and/or 200) (e.g., a computer system that is positioned within a portion of the platform and controls one or more operations of the platform).

In some embodiments, the system (e.g., 100 and/or 152) detects a number of people (e.g., 202 and/or 2000) (e.g., the first person, the second person, and/or additional people) that are positioned within the interior portion (e.g., 206) of the platform (e.g., 150 and/or 200) based on information (e.g., feedback and/or data) captured via one or more sensors of the platform (e.g., 150 and/or 200) (e.g., infrared sensors, camera sensors, biometric sensors, motion sensors, pressure sensors, and/or seat belt sensors).

In some embodiments, in accordance with the determination that the destination location corresponds to the destination of the first person (e.g., 202) and that the destination location corresponds to the destination of the second person (e.g., 2000), the system (e.g., 100 and/or 152) moves a first closure (e.g., 2002) (e.g., a first door, hatch, trunk, and/or entry) of the platform (e.g., 150 and/or 200) from a closed position (e.g., a fully closed position that blocks access to the interior portion of the platform) to an open position (e.g., a fully open or partially open position that enables access to at least a portion of the interior portion of the platform) and the system (e.g., 100 and/or 152) moves a second closure (e.g., 204) (e.g., a second door, hatch, trunk, and/or entry that is different from the first closure) of the platform (e.g., 150 and/or 200) from the closed position to the open position. In some embodiments, the first closure is a closure of the platform that is determined to be closest in proximity to a position and/or location of the first person while the first person is within the interior portion of the platform. In some embodiments, the second closure is a closure of the platform that is determined to be closest in proximity to a position and/or location of the second person while the second person is within the interior portion of the platform. In accordance with a determination that the destination location corresponds to the destination of the first person (e.g., 202) and that the destination location does not correspond to the destination of the second person (e.g., 2000), the system (e.g., 100 and/or 152) moves the first closure (e.g., 2002) of the platform (e.g., 150 and/or 2000) from the closed position to the open position and the system (e.g., 100 and/or 152) maintains the second closure (e.g., 204) in the closed position (e.g., forgoing moving the second closure from the closed position to the open position so that the second closure remains in the closed position).

In some embodiments, in accordance with the determination that the destination location corresponds to the destination of the first person (e.g., 202) and that the destination location corresponds to the destination of the second person (e.g., 2000), the system (e.g., 100 and/or 152) adjusts a first seat (e.g., 208) (e.g., a first chair and/or a bench) associated with the first person (e.g., 202) (e.g., the first seat is determined to be a seat at which the first person is sitting in and/or occupying) to a first egress position (e.g., a position that facilitates an ability of the first person to exit the interior portion of the platform) and the system (e.g., 100 and/or 152) adjusts a second seat (e.g., 208) (e.g., a second chair and/or a bench) associated with the second person (e.g., the second seat is determined to be a seat at which the second person is sitting in and/or occupying) to a second egress position (e.g., a position that facilitates an ability of the second person to exit the interior portion of the platform). In accordance with a determination that the destination location corresponds to the destination of the first person (e.g., 202) and that the destination location does not correspond to the destination of the second person (e.g., 2000), the system (e.g., 100 and/or 152) adjusts the first seat (e.g., 208) associated with the first person (e.g., 202) to the first egress position and the system (e.g., 100 and/or 152) forgoes adjustment of the second seat (e.g., 208) associated with the second person (e.g., 2000) to the second egress position (e.g., maintaining a current position of the second seat associated with the second person because the second person is estimated, predicted, and/or determined to remain in the interior portion of the platform at the destination location).

In some embodiments, in accordance with a determination that it is uncertain whether the destination location corresponds to the destination of the first person (e.g., 202) (e.g., the platform and/or a computer system of the platform predicted and/or estimated that the destination location corresponds to the destination of the first person, but has not received confirmation from the first person that the destination location corresponds to the destination of the first person and/or the platform and/or a computer system of the platform has not been able to predict, estimate, and/or determine the destination of the first person) and that it is uncertain whether the destination location corresponds to the destination of the second person (e.g., 2000) (e.g., the platform and/or a computer system of the platform predicted and/or estimated that the destination location corresponds to the destination of the second person, but has not received confirmation from the second person that the destination location corresponds to the destination of the second person and/or the platform and/or a computer system of the platform has not been able to predict, estimate, and/or determine the destination of the second person), the system (e.g., 100 and/or 152) adjusts (e.g., sending and/or transmitting a communication to one or more external computer systems associated with the one or more configurable elements that cause the one or more configurable elements to be configured in a second state) the one or more configurable elements (e.g., 208) of the interior portion (e.g., 206) of the platform (e.g., 150 and/or 200) to a third state (e.g., a third brightness of the one or more lights, a third color temperature of the one or more lights, a third audio output via the one or more speakers, a third volume level of audio output via the one or more speakers, a third position of the one or more actuatable windows, a third opacity of the one or more actuatable windows, a third position of the one or more actuatable pieces of furniture, a third climate setting of the one or more climate systems, and/or a third user interface and/or media item displayed on the one or more display generation components), wherein the third state is different from the first state and the second state.

In some embodiments, in accordance with the determination that the destination location corresponds to the destination of the first person (e.g., 202) and that the destination location does not correspond to the destination of the second person (e.g., 2000), the system (e.g., 100 and/or 152) provides a first indicator (e.g., a first set of information, a first notification (such as a visual notification displayed on a display, an audio notification output via a speaker, a haptic notification, a seat belt tug, and/or a lighting notification), and/or a first alert that is output via a component (such as a display, a speaker, a light, a seat belt, and/or a window) of the interior portion of the platform and/or an external computer system associated with the first person) to the first person (e.g., 202) and the system (e.g., 100 and/or 152) provides a second indicator (e.g., a second set of information, a second notification (such as a visual notification displayed on a display, an audio notification output via a speaker, a haptic notification, a seat belt tug, and/or a lighting notification), and/or a second alert that is output via a component (such as a display, a speaker, a light, a seat belt, and/or a window) of the interior portion of the platform and/or an external computer system associated with the second person), different from the first indicator, to the second person (e.g., 2000). In some embodiments, the first indicator notifies, alerts, and/or provides guidance to the first person that the platform is nearing and/or approaching the first destination of the first person so that the first person can prepare to exit and/or depart from the platform. In some embodiments, the second indicator notifies, alerts, and/or provides guidance to the second person that the platform is nearing and/or approaching a location where the platform will stop and/or park temporarily before proceeding toward the destination of the second person, such that the second person is aware that the platform will stop and/or park and that the second person does not need to begin preparing to exit and/or depart the platform.

In some embodiments, in accordance with the determination that the destination location corresponds to the destination of the first person (e.g., 202) and that the destination location corresponds to the destination of the second person (e.g., 2000), the system (e.g., 100 and/or 152) provides a communal indicator (e.g., a set of information, a notification (such as a visual notification displayed on a communal display (such as a display that can be viewed by both the first person and the second person), an audio notification output via one or more speakers that can output audio configured to be heard by the first person and the second person, a haptic notification provided to both the first person and the second person, a seat belt tug provided to both the first person and the second person, and/or a lighting notification output by one or more lights that can be viewed and/or noticed by both the first person and the second person), and/or an alert that is output via one or more components (such as one or more displays, speakers, lights, seat belts, and/or windows) of the interior portion of the platform and/or respective external computer systems associated with the first person and the second person) to the first person (e.g., 202) and the second person (e.g., 2000) (e.g., the communal indicator is provided and/or output such that the first person and the second person can view and/or experience the communal indicator and prepare to exit and/or depart from the platform).

In some embodiments, the communal indicator includes audio output (e.g., audio output via one or more speakers of the interior portion of the platform that allows both the first person and the second person to hear and/or listen to the audio output).

In some embodiments, the communal indicator includes visual output (e.g., information that is displayed via one or more display generation components of the interior portion of the platform that allows both the first person and the second person to view to the visual output).

In some embodiments, in accordance with the determination that the destination location corresponds to the destination of the first person (e.g., 202) and that the destination location does not correspond to the destination of the second person (e.g., 2000), the system (e.g., 100 and/or 152) provides a first individual indicator (e.g., a first set of information, a first notification (such as a visual notification displayed on a display, an audio notification output via a speaker, a haptic notification, a seat belt tug, and/or a lighting notification), and/or a first alert that is output via a component (such as a display, a speaker, a light, a seat belt, and/or a window) of the interior portion of the platform and/or an external computer system associated with the first person and is not directed to, targeted toward, and/or sent to the second person) to the first person (e.g., 202) without providing (e.g., not providing) a second individual indicator (e.g., a second set of information, a second notification (such as a visual notification displayed on a display, an audio notification output via a speaker, a haptic notification, a seat belt tug, and/or a lighting notification), and/or a second alert that is output via a component (such as a display, a speaker, a light, a seat belt, and/or a window) of the interior portion of the platform and/or an external computer system associated with the second person and is not directed to, targeted toward, and/or sent to the first person) to the second person (e.g., 2000).

In some embodiments, the first individual indicator is configured to be output via an external computer system (e.g., a smart phone, a smart wearable device (such as a smart watch), a personal laptop computer, and/or a tablet computer) associated with the first person (e.g., 202) (e.g., in possession of the first person and/or linked to an account of the first person).

In some embodiments, the first individual indicator includes targeted audio output (e.g., spatial audio that is output in a direction and/or output so that the targeted audio output is perceived by the first person as output from a particular location in space (such as a location within the interior portion of the platform at which the first person is sitting and/or located)) directed to the first person (e.g., 202) (e.g., the targeted audio output is output so that the first person hears and/or perceives the targeted audio output clearly, whereas the second person cannot hear and/or perceive the targeted audio output clearly).

In some embodiments, after the platform (e.g., 150 and/or 200) has reached the destination location (e.g., the platform has stopped at the destination location and, optionally, moved one or more closures of the platform to an open position), the system (e.g., 100 and/or 152) obtains second information about the first person (e.g., 202) (e.g., information about a location of the person, information that indicates whether the first person is still positioned within the interior portion of the platform, and/or information captured via one or more sensors of the platform). After a predetermined amount of time (e.g., 5 minutes, 4 minutes, 3 minutes, 2 minutes, 1 minute, and/or 30 seconds) has passed since the platform (e.g., 150 and/or 200) reached the destination location (e.g., the predetermined amount of time begins to elapse once the platform has stopped at the destination location), in accordance with a determination that the destination location corresponds to the destination of the first person (e.g., 202), and in accordance with a determination that the second information indicates that the first person (e.g., 202) has not exited the interior portion (e.g., 206) of the platform (e.g., 150 and/or 200) (e.g., the second information indicates that the first person has not exited the interior portion of the platform and/or the first person is located and/or positioned within a predetermined distance of the platform), the system (e.g., 100 and/or 152) provides a third indicator (e.g., a third set of information, a third notification (such as a visual notification displayed on a display, an audio notification output via a speaker, a haptic notification, a seat belt tug, and/or a lighting notification), and/or a third alert that is output via a component (such as a display, a speaker, a light, a seat belt, and/or a window) of the interior portion of the platform and/or an external computer system associated with the first person) to the first person (e.g., 202), wherein the third indicator includes a reminder (e.g., a nudge and/or guidance to exit the interior portion of the platform) that the platform (e.g., 150 and/or 200) has reached the destination location.

In some embodiments, the second information indicates that the first person (e.g., 202) has not exited the interior portion (e.g., 206) of the platform (e.g., 150 and/or 200) when the second information indicates that the first person (e.g., 202) has not unbuckled their seat belt (e.g., the second information includes sensor information captured via an infrared sensor, a camera sensor, a pressure sensor, and/or a seat belt sensor that indicates that the first person remains in the interior portion of the platform with their seat belt fastened).

In some embodiments, the second information indicates that the first person (e.g., 202) has not exited the interior portion (e.g., 206) of the platform (e.g., 150 and/or 200) when the second information indicates that a second location (e.g., an estimated, predicted, and/or determined location of the first person that is based on location information of the first person and/or sensor information captured via one or more sensors of the platform) of the first person (e.g., 202) is within a predetermined distance (e.g., within 20 feet, within 15 feet, within 10 feet, and/or within 5 feet) of the platform (e.g., 150 and/or 200). In some embodiments, the first person has exited the interior portion of the platform, but has not moved far enough away from the platform so that the platform can begin moving toward another destination location. Accordingly, in some embodiments, the third indicator is provided to the first person so that the first person can move away from the platform so that the platform can continue moving toward another destination location.

In some embodiments, in accordance with the determination that the destination location corresponds to the destination of the first person (e.g., 202) and that the destination location corresponds to the destination of the second person (e.g., 2000), the system (e.g., 100 and/or 152) provides a fourth indicator (e.g., a fourth set of information, a fourth notification (such as a visual notification displayed on a display, an audio notification output via a speaker, a haptic notification, a seat belt tug, and/or a lighting notification), and/or a fourth alert that is output via a component (such as a display, a speaker, a light, a seat belt, and/or a window) of the interior portion of the platform and/or an external computer system associated with the first person and/or the second person) to the first person (e.g., 202) and/or the second person (e.g., 2000) at a first time (e.g., a time prior to the platform reaching the destination location that provides the first person and/or the second person sufficient time to prepare to exit the interior portion of the platform prior to reaching the destination location) (in some embodiments, the first time is at a time that is before the second time) before the platform (e.g., 150 and/or 200) reaches the destination location (e.g., the fourth indicator is provided while the platform is moving toward the destination location and/or before the platform stops at the destination location). In accordance with a determination that the destination location corresponds to the destination of the first person (e.g., 202) and that the destination location does not correspond to the destination of the second person (e.g., 2000), providing a fifth indicator (e.g., a fifth set of information, a fifth notification (such as a visual notification displayed on a display, an audio notification output via a speaker, a haptic notification, a seat belt tug, and/or a lighting notification), and/or a fifth alert that is output via a component (such as a display, a speaker, a light, a seat belt, and/or a window) of the interior portion of the platform and/or an external computer system associated with the first person and/or the second person) to the first person (e.g., 202) and/or the second person (e.g., 2000) at a second time (e.g., a time prior to the platform reaching the destination location that provides the first person sufficient time to prepare to exit the interior portion of the platform prior to reaching the destination location and/or provides the second person with enough notice that the destination location is not the destination of the second person prior to the platform reaching the destination location) (in some embodiments, the second time is at a time that is after the first time because less time is needed for a single person to exit the interior portion of the platform as compared to a time needed for multiple people to exit the interior portion of the platform) before the platform (e.g., 150 and/or 200) reaches the destination location (e.g., the fifth indicator is provided while the platform is moving toward the destination location and/or before the platform stops at the destination location), wherein the second time is different from the first time.

In some embodiments, adjusting the one or more configurable elements (e.g., 208) of the interior portion (e.g., 206) of the platform (e.g., 150 and/or 200) to the first state includes causing a first seat belt (e.g., a first safety belt, one or more straps, and/or harness that secures the first person to a seat and/or component of the interior portion of the platform) of the first person (e.g., 202) to contract (e.g., temporarily restrict, tighten, tug, and/or press inward toward the first person) and/or a second seat belt (e.g., a second safety belt, one or more straps, and/or harness that secures the second person to a seat and/or component of the interior portion of the platform) of the second person (e.g., 2000) to contract (e.g., temporarily restrict, tighten, tug, and/or press inward toward the second person).

In some embodiments, adjusting the one or more configurable elements (e.g., 208) of the interior portion (e.g., 206) of the platform (e.g., 150 and/or 200) to the second state includes causing a third seat belt (e.g., a third safety belt, one or more straps, and/or harness that secures the first person to a seat and/or component of the interior portion of the platform) of the first person (e.g., 202) to contract (e.g., temporarily restrict, tighten, tug, and/or press inward toward the second person). In some embodiments, adjusting the one or more configurable elements of the interior portion of the platform to the second state does not include causing a fourth seat belt (e.g., a fourth safety belt, one or more straps, and/or harness that secures the second person to a seat and/or component of the interior portion of the platform) of the second person to contract.

Confusion can arise when multiple passengers of a platform have different destinations. For instance, when the platform stops at a destination of a first passenger, a second passenger that is not paying attention to a location of the platform may inadvertently try to exit the platform at the wrong destination. In addition, passengers that are sleeping and/or watching a video may be unaware that the platform is approaching their destination, thereby increasing an amount of time that is needed to drop off passengers of the platform.

Thus, there is a need for a platform, such as a vehicle, that can provide different types of notifications based on whether the platform is approaching a destination of a respective person. In some embodiments, the platform determines and/or predicts which people and/or passengers will exit the platform at a particular destination. When a person is determined and/or predicted to exit the platform at a destination, the person is provided with a first type of notification, such as a notification that alerts the person that their destination is approaching. Accordingly, the person can prepare themselves to exit the platform as the platform is arriving at the destination. When a person is determined and/or predicted to not exit the platform at the destination, the person is provided with a second type of notification, such as a notification that informs the person that they do not need to prepare to exit and can remain in the platform at the destination. In some embodiments, when a determination is uncertain as to whether a person will exit the platform at the destination, the person is provided with a third type of notification, such as a notification that includes details about the upcoming stop so that the person can determine whether the upcoming stop and/or destination is where the person intends to exit the platform. Accordingly, people travelling via a platform can be alerted that their destination is approaching and prepare to exit the platform, thereby reducing an amount of time needed to drop off people during a trip of the platform.

Figure 22A:
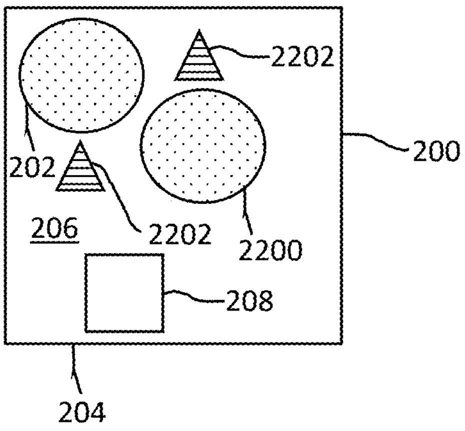
FIGS. 22A-22E illustrate examples of different notifications provided to people associated with a platform, in accordance with some embodiments.

Turning now to the drawings, FIG. 22A is a block diagram illustrating platform 200 approaching, arriving, and/or positioned at a first destination while person 202 and second person 2200 are positioned within interior portion 206 of platform 206. At FIG. 22A, the first destination is a destination of person 202, as indicated by first hatching of person 202, and the first destination is also a destination of second person 2200, as indicated by the first hatching of second person 2200. Thus, both person 202 and second person 2200 are determined and/or predicted to exit interior portion 206 of platform 200 at the first destination.

In some embodiments, platform 200 determines whether the first destination corresponds to a destination of person 202 based on a request of person 202 (such as person 202 directly requesting to be dropped off at the first destination). In some embodiments, platform 200 determines and/or predicts whether the first destination corresponds to the destination of person 202 based on information about person 202 (such as information that indicates a schedule and/or an intent of person 202), a type of location associated with the first destination, and/or activity of person 202 (such as whether person 202 is preparing to exit platform 200 when platform 200 reaches the first destination). In some embodiments, platform 200 determines whether the first destination corresponds to a destination of second person 2200 based on a request of second person 2200 (such as second person 2200 directly requesting to be dropped off at the first destination). In some embodiments, platform 200 determines and/or predicts whether the first destination corresponds to the destination of second person 2200 based on information about second person 2200 (such as information that indicates a schedule and/or an intent of second person 2200), a type of location associated with the first destination, and/or activity of second person 2200 (such as whether second person 2200 is preparing to exit platform 200 when platform 200 reaches the first destination).

In some embodiments, platform 200 determines a number of people (such as person 202 and second person 2200) positioned within interior portion 206 of platform 200 based on a number of external devices (such as external devices associated with person 202 and/or second person 2200) in communication with platform (such as computer system of platform). In some embodiments, platform 200 determines the number of people positioned within interior portion 206 of platform 200 and/or positions of particular people relative to interior portion 206 of platform 200 based on occupant monitoring (such as via cameras and/or sensors of platform 200).

At FIG. 22A, person 202 receives first notification 2202 and second person 2200 receives first notification 2202 because both person 202 and second person 2200 are determined to exit platform 200 at the first destination. In some embodiments, first notification 2202 includes text, images, symbols, audio output, haptic output, and/or other feedback that notifies person 202 and second person 2200 that platform 200 is approaching their destination. Accordingly, person 202 and second person 2200 can both prepare to exit from interior portion 206 of platform 200 and reduce the amount of time needed for drop off.

In some embodiments, person 202 and second person 2200 separately receive first notification 2202, such as person 202 and second person 2200 receive individual notifications on respective external devices associated with person 202 and second person 2200. In some embodiments, first notification 2202 provided to person 202 and first notification 2202 provided to second person 2200 are the same notification. For instance, in some embodiments, first notification 2202 is a communal notification that alerts both person 202 and second person 2200 that platform 200 is approaching their destination. In some embodiments, the communal notification includes a notification that can be perceived and/or noticed by all people positioned within interior portion 206 of platform 200. In some embodiments, the communal notification includes an audio notification and/or a visual notification. In some embodiments, first notification 2202 includes constricting (e.g., tugging and/or temporarily tightening) a first seat belt associated with person 202 and/or constricting a second seat belt associated with second person 2200.

In some embodiments, first notification 2202 is provided to person 202 and first notification 2202 is provided to second person 2200 at the same time. In some embodiments, first notification 2202 is provided to person 202 and first notification 2202 is provided to second person 2200 at a first time that is based on a current location of platform 200 relative to the first destination. In some embodiments, first notification 2202 is provided to person 202 and first notification 2202 is provided to second person 2200 at a first time that is based on the determination that the first destination is the destination of person 202 and the destination of second person 2200. In some embodiments, first notification 2202 is provided to person 202 and first notification 2202 is provided to second person 2200 at a first time that is based on a speed at which platform 200 is moving toward the first destination, a type of location of the first destination, an activity performed by person 202, an activity performed by second person 2202, and/or a route at which platform 200 is taking to reach the first destination.

Figure 22B:
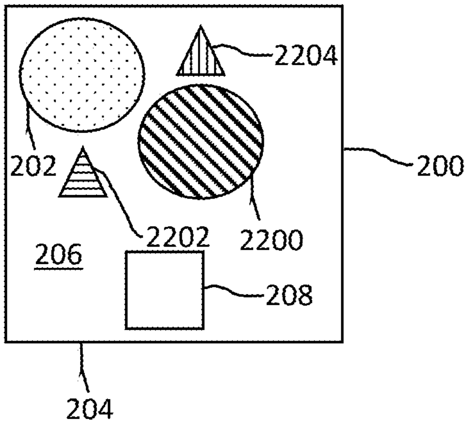

At FIG. 22B, platform 200 approaches, arrives, and/or is positioned at a second destination while person 202 and second person 2200 are positioned within interior portion 206 of platform 206. At FIG. 22B, platform 200 determines that the second destination is a destination of person 202, as indicated by first hatching of person 202, and determines that the second destination is not a destination of second person 2200, as indicated by second hatching of second person 2200. Thus, person 202 is determined and/or predicted to exit interior portion 206 of platform 200 at the second destination, while second person 2200 is determined and/or predicted to remain within interior portion 206 of platform 200 at the second destination.

At FIG. 22B, person 202 receives first notification 2202 and second person 2200 receives second notification 2204 because person 202 is determined to exit platform 200 at the second destination and second person 2200 is not determined to exit platform 200 at the second destination. In some embodiments, second notification 2204 includes text, images, symbols, audio output, haptic output, and/or other feedback that notifies second person 2200 that platform 200 is approaching a stopping location (i.e., the second destination), but that the stopping location is not the destination of second person 2200. In some embodiments, second notification 2204 informs second person 2200 that platform 200 will proceed to the destination of second person 2200 after stopping at the second destination. Accordingly, second person 2200 can be made aware of the stop at the second destination and avoid causing confusion that platform 200 is attempting to drop off second person 2200 at the wrong location.

At FIG. 22B, first notification 2202 provided to person 202 and second notification 2204 provided to second person 2200 are separate, distinct, and/or individual notifications. In some embodiments, first notification 2202 individually notifies and/or alerts person 202 that platform 200 is approaching the destination of person 202 without disturbing second person 2200. In some embodiments, first notification 2202 provided to person 202 includes a notification output by an external device associated with person 202. In some embodiments, first notification 2202 provided to person 202 includes a targeted notification, such as targeted spatial audio that can be perceived by person 202 while causing minimal disruption to second person 2200. In some embodiments, second notification 2204 individually notifies and/or alerts second person 2200 that platform 200 is approaching the destination of person 202 and that second person 2200 does not need to prepare to exit platform 200. In some embodiments, second notification 2204 provided to second person 2200 includes a notification output by an external device associated with second person 2200. In some embodiments, second notification 2204 provided to second person 2200 includes a targeted notification, such as targeted spatial audio that can be perceived by second person 2200 while causing minimal disruption to person 202. In some embodiments, first notification 2202 and/or second notification 2204 are provided to person 202 and second person 2200, respectively, as a communal notification (such as first notification 2202 and second notification 2204 are displayed on one or more displays of platform 200 that can be viewed by any person within interior portion 206 of platform 200).

In some embodiments, first notification 2202 is provided to person 202 and second notification 2204 is provided to second person 2200 at the same time. In some embodiments, first notification 2202 is provided to person 202 and second notification 2204 is provided to second person 2200 at different times. In some embodiments, first notification 2202 is provided to person 202 before second notification 2204 is provided to second person 2200 to provide person 202 with additional time to prepare to exit platform 200 prior to platform 200 stopping at the second destination.

Figure 22C:
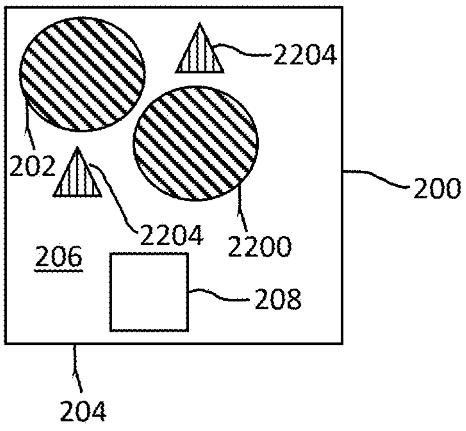

At FIG. 22C, platform 200 approaches, arrives, and/or is positioned at a third destination while person 202 and second person 2200 are positioned within interior portion 206 of platform 206. At FIG. 22C, platform 200 determines that the third destination is not a destination of person 202, as indicated by second hatching of person 202, and determines that the third destination is not a destination of second person 2200, as indicated by second hatching of second person 2200. Thus, both person 202 and second person 2200 are determined and/or predicted to remain within interior portion 206 of platform 200 at the third destination. In some embodiments, the third destination is a destination of a third person and/or is a temporary stopping location, such as a drive through of a restaurant.

At FIG. 22C, person 202 receives second notification 2204 and second person 2200 receives second notification 2204 because both person 202 and second person 2200 are determined to not exit platform 200 at the third destination. In some embodiments, person 202 and second person 2200 separately receive second notification 2204, such as person 202 and second person 2200 receive individual notifications on respective external devices associated with person 202 and second person 2200. In some embodiments, second notification 2204 provided to person 202 and second notification 2204 provided to second person 2200 are the same notification. For instance, in some embodiments, second notification 2204 is a communal notification that alerts both person 202 and second person 2200 that platform 200 is approaching a stopping location that is not their destination. In some embodiments, the communal notification includes a notification that can be perceived and/or noticed by all people positioned within interior portion 206 of platform 200. In some embodiments, the communal notification includes an audio notification and/or a visual notification. In some embodiments, second notification 2204 includes constricting (e.g., tugging and/or temporarily tightening) a first seat belt associated with person 202 and/or constricting a second seat belt associated with second person 2200.

In some embodiments, second notification 2204 is provided to person 202 and second notification 2204 is provided to second person 2200 at the same time. In some embodiments, second notification 2204 is provided to person 202 and second notification 2204 is provided to second person 2200 at a second time that is based on a current location of platform 200 relative to the third destination. In some embodiments, second notification 2204 is provided to person 202 and second notification 2204 is provided to second person 2200 at a second time that is based on the determination that the third destination is not the destination of person 202 and not the destination of second person 2200. In some embodiments, second notification 2204 is provided to person 202 and second notification 2204 is provided to second person 2200 at a second time that is based on a speed at which platform 200 is moving toward the third destination, a type of location of the third destination, an activity performed by person 202, an activity performed by second person 2202, and/or a route at which platform 200 is taking to reach the third destination.

Figure 22D:
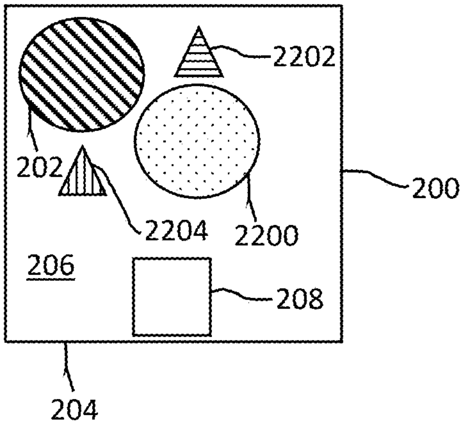

At FIG. 22D, platform 200 approaches, arrives, and/or is positioned at a fourth destination while person 202 and second person 2200 are positioned within interior portion 206 of platform 206. At FIG. 22D, platform 200 determines that the fourth destination is not a destination of person 202, as indicated by second hatching of person 202, and determines that the second destination is a destination of second person 2200, as indicated by first hatching of second person 2200. Thus, second person 2200 is determined and/or predicted to exit interior portion 206 of platform 200 at the fourth destination, while person 202 is determined and/or predicted to remain within interior portion 206 of platform 200 at the fourth destination.

At FIG. 22D, person 202 receives second notification 2204 and second person 2200 receives first notification 2202 because person 202 is determined to not exit platform 200 at the fourth destination and second person 2200 is determined to exit platform 200 at the fourth destination.

At FIG. 22D, second notification 2204 provided to person 202 and first notification 2202 provided to second person 2200 are separate, distinct, and/or individual notifications. In some embodiments, second notification 2204 individually notifies and/or alerts person 202 that platform 200 is approaching the destination of second person 2200 and that person 202 does not need to prepare to exit platform 200. In some embodiments, second notification 2204 provided to person 202 includes a notification output by an external device associated with person 202. In some embodiments, second notification 2204 provided to person 202 includes a targeted notification, such as targeted spatial audio that can be perceived by person 202 while causing minimal disruption to second person 2200. In some embodiments, first notification 2202 individually notifies and/or alerts second person 2200 that platform 200 is approaching the destination of second person 2200 without disturbing person 202. In some embodiments, first notification 2202 provided to second person 2200 includes a notification output by an external device associated with second person 2200. In some embodiments, first notification 2202 provided to second person 2200 includes a targeted notification, such as targeted spatial audio that can be perceived by second person 2200 while causing minimal disruption to person 202. In some embodiments, first notification 2202 and/or second notification 2204 are provided to second person 2200 and person 202, respectively, as a communal notification (such as first notification 2202 and second notification 2204 are displayed on one or more displays of platform 200 that can be viewed by any person within interior portion 206 of platform 200).

In some embodiments, second notification 2204 is provided to person 202 and first notification 2202 is provided to second person 2200 at the same time. In some embodiments, second notification 2204 is provided to person 202 and first notification 2202 is provided to second person 2200 at different times. In some embodiments, second notification 2204 is provided to person 202 after first notification 2202 is provided to second person 2200 to provide second person 2200 with additional time to prepare to exit platform 200 prior to platform 200 stopping at the second destination.

Figure 22E:
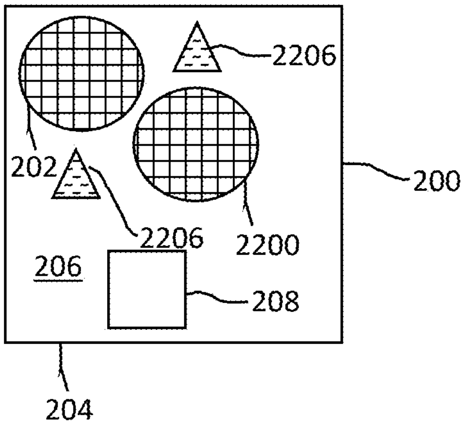

At FIG. 22E, platform 200 approaches, arrives, and/or is positioned at a fifth destination while person 202 and second person 2200 are positioned within interior portion 206 of platform 206. At FIG. 22E, platform 200 determines that it is uncertain whether the fifth destination is a destination of person 202, as indicated by third hatching of person 202, and determines that it is uncertain whether the fifth destination is a destination of second person 2200, as indicated by third hatching of second person 2200. In some embodiments, platform 200 determines that the fifth destination is not certain to be a destination of person 202 and/or second person 2200 when platform 200 has not received confirmation of a destination from person 202 and/or second person 2200. In some embodiments, platform 200 determines that the fifth destination is not certain to be a destination of person 202 and/or second person 2200 when platform 200 cannot estimate and/or predict a destination of person 202 and/or second person 2200.

At FIG. 22E, person 202 receives third notification 2206 and second person 2200 receives third notification 2206 because it is uncertain whether person 202 will exit platform 200 at the fifth destination and it is uncertain whether second person 2200 will exit platform 200 at the fifth destination. In some embodiments, third notification 2206 includes text, images, symbols, audio output, haptic output, and/or other feedback that notifies person 202 and second person 2200 that platform 200 is approaching a stopping location. In some embodiments, third notification 2206 includes information about the fifth destination so that person 202 and/or second person 2200 can determine whether the fifth destination is their intended destination.

In some embodiments, person 202 and second person 2200 separately receive third notification 2206, such as person 202 and second person 2200 receive individual notifications on respective external devices associated with person 202 and second person 2200. In some embodiments, third notification 2206 provided to person 202 and third notification 2206 provided to second person 2200 are the same notification. For instance, in some embodiments, third notification 2206 is a communal notification that alerts both person 202 and second person 2200 that platform 200 is approaching the fifth destination. In some embodiments, the communal notification includes a notification that can be perceived and/or noticed by all people positioned within interior portion 206 of platform 200. In some embodiments, the communal notification includes an audio notification and/or a visual notification. In some embodiments, third notification 2206 includes constricting (e.g., tugging and/or temporarily tightening) a first seat belt associated with person 202 and/or constricting a second seat belt associated with second person 2200.

In some embodiments, third notification 2206 is provided to person 202 and third notification 2206 is provided to second person 2200 at the same time. In some embodiments, third notification 2206 is provided to person 202 and third notification 2206 is provided to second person 2200 at a third time that is based on a current location of platform 200 relative to the first destination. In some embodiments, third notification 2206 is provided to person 202 and third notification 2206 is provided to second person 2200 at a third time that is based on the determination that it is uncertain whether the fifth destination is the destination of person 202 and that it is uncertain whether the fifth destination is the destination of second person 2200. In some embodiments, third notification 2206 is provided to person 202 and third notification 2206 is provided to second person 2200 at a third time that is based on a speed at which platform 200 is moving toward the fifth destination, a type of location of the fifth destination, an activity performed by person 202, an activity performed by second person 2202, and/or a route at which platform 200 is taking to reach the fifth destination.

In some embodiments, after a predetermined amount of time has passed since platform 200 has arrived at a destination, platform 200 determines whether one or more people who are determined and/or predicted to exit platform 200 have exited. In some embodiments, platform 200 determines whether the one or more people determined and/or predicted to exit have exited based on whether the one or more people have unfastened and/or unbuckled their seat belts and/or whether the one or more people have moved at least a predetermined distance away from platform 200. In some embodiments, when platform 200 determines that one or more people who are determined and/or predicted to exit platform 200 have not exited platform 200, platform 200 provides a fourth notification and/or guidance to the one or more people to exit platform 200.

Figure 23:
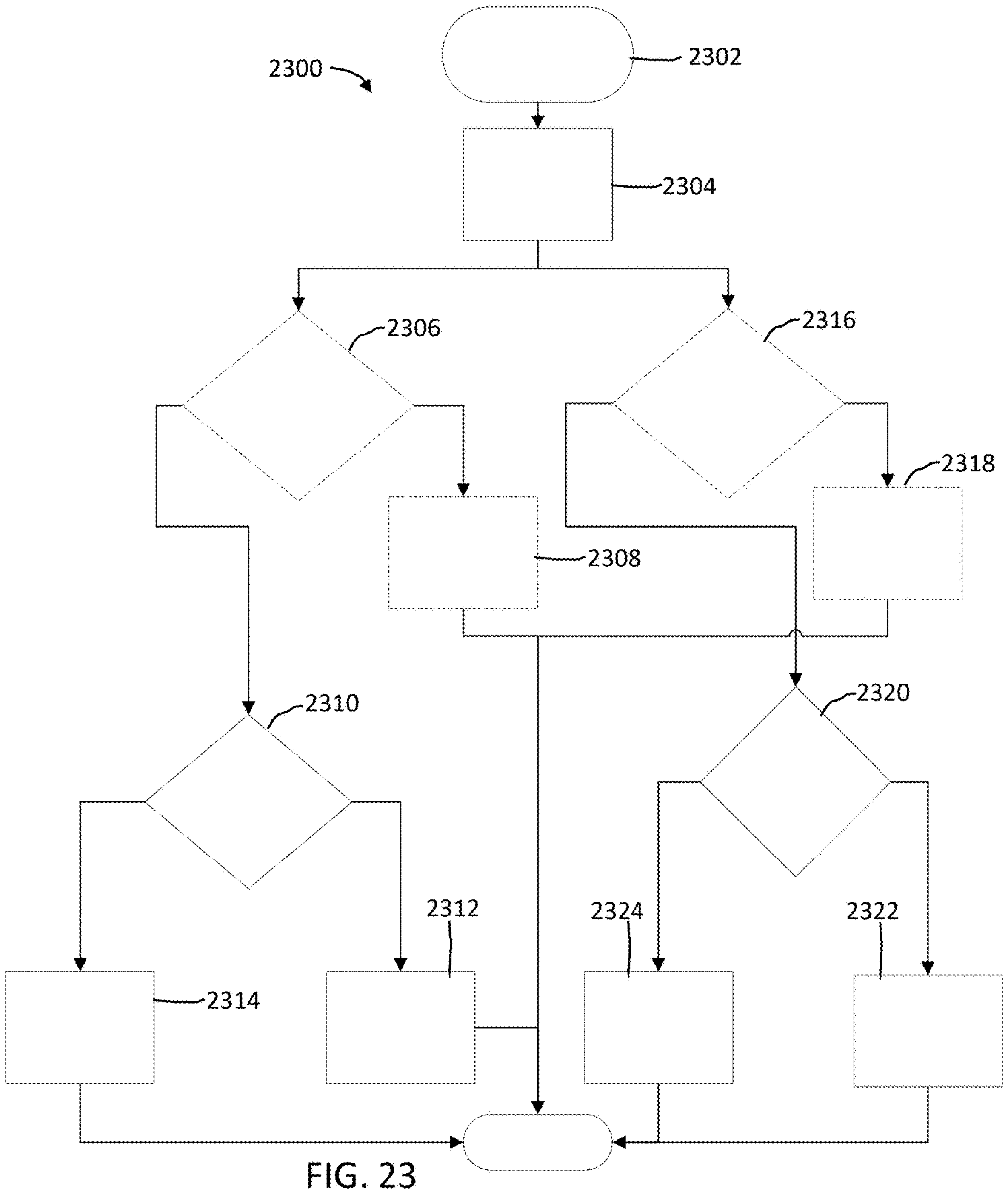
FIG. 23 is a flow diagram illustrating methods for providing different notifications to people associated with a platform, in accordance with some embodiments.

FIG. 23 is a flow diagram illustrating method 2300 that can be performed by platform 200, such as a computer system associated with platform 200. At FIG. 23, person 202 and second person 2200 are positioned within interior portion 206 of platform 200, as shown at block 2302. In some embodiments, platform 200 detects a number of people within interior portion 206 of platform 200 and performs method 2300 when at least two people are within interior portion 206 of platform 200, but does not perform method 2300 when one or fewer people are within interior portion 206 of platform 200.

While person 202 and second person 2200 are positioned within interior portion 206 of platform 200, platform 200 detects that platform 200 is approaching a location (such as a stopping location and/or a destination), as shown at block 2304. In some embodiments, after detecting that platform 200 is approaching the location, platform 200 determines whether it is uncertain that the location is a destination of person 202, as shown at block 2306.

In some embodiments, when platform 200 determines that it is uncertain whether the location is the destination of person 202, platform 200 provides third notification 2206 to person 202, as shown at block 2308. As set forth above, in some embodiments, third notification 2206 alerts person 202 that platform 200 is approaching a stopping location and, optionally, includes information about the location so that person 202 can determine whether the location is the destination of person 202. In some embodiments, when platform 200 determines that it is not uncertain whether the location is the destination of person 202, platform 200 determines whether the location is a destination of person 202, as shown at block 2310.

When platform 200 determines that the location is a destination of person 202, platform 200 causes first notification 2202 to be provided to person 202, as shown at block 2312. As set forth above, in some embodiments, first notification 2202 alerts person 202 that platform 200 is approaching their destination to provide person 202 with sufficient time to prepare to exit platform 200 before platform 200 reaches the location.

When platform 200 determines that the location is not the destination of person 202, platform 200 causes second notification 2204 to be provided to person 202, as shown at block 2314. As set forth above, in some embodiments, second notification 2204 alerts person 202 that platform 200 is stopping, but indicates that the location is not the destination of person 202 and that person 202 does not need to prepare to exit platform 200.

In some embodiments, after detecting that platform 200 is approaching the location, platform 200 determines whether it is uncertain that the location is a destination of second person 2200, as shown at block 2316.

In some embodiments, when platform 200 determines that it is uncertain whether the location is the destination of second person 2200, platform 200 provides third notification 2206 to second person 2200, as shown at block 2318. As set forth above, in some embodiments, third notification 2206 alerts second person 2200 that platform 200 is approaching a stopping location and, optionally, includes information about the location so that second person 2200 can determine whether the location is the destination of second person 2200. In some embodiments, when platform 200 determines that it is not uncertain whether the location is the destination of second person 2200, platform 200 determines whether the location is a destination of second person 2200, as shown at block 2320.

When platform 200 determines that the location is a destination of second person 2200, platform 200 causes first notification 2202 to be provided to second person 2200, as shown at block 2322. As set forth above, in some embodiments, first notification 2202 alerts second person 2200 that platform 200 is approaching their destination to provide second person 2200 with sufficient time to prepare to exit platform 200 before platform 200 reaches the location.

When platform 200 determines that the location is not the destination of second person 2200, platform 200 causes second notification 2204 to be provided to second person 2200, as shown at block 2324. As set forth above, in some embodiments, second notification 2204 alerts second person 2200 that platform 200 is stopping, but indicates that the location is not the destination of second person 2200 and that second person 2200 does not need to prepare to exit platform 200.

A system (e.g., 100 and/or 152) associated with a platform (e.g., 150 and/or 200) is configured to perform a method in accordance with some embodiments. While a first person (e.g., 202) (e.g., a first rider, user, and/or passenger) and a second person (e.g., 2200) (e.g., a second rider, user, and/or passenger) are positioned within (e.g., riding in and/or otherwise being transported by the platform) an interior portion (e.g., 206) (e.g., a cabin and/or interior area of the platform that is configured to transport and/or move a person between physical locations) of a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system), the system (e.g., 100 and/or 152) detects (or, in some embodiments, determining) that a location of the platform (e.g., 150 and/or 200) satisfies a set of destination criteria (e.g., the platform is moving at a first speed, velocity, and/or acceleration, the platform is located within a predetermined distance (such as a distance that is based on the first speed, velocity, and/or acceleration of the platform) from a destination location, the destination location is of a first type (such as a residence, a business, a commercial structure, a park, and/or an event venue), the first person and/or the second person are performing a first type of activity (such as sleeping, interacting with one or more devices of the platform, interacting with one or more external devices associated with the first person and/or the second person, watching content, listening to audio, and/or paying attention to surroundings of the platform), and/or a route of a trip being performed by the platform (such as a shortest route, a fastest route, a route with less turns and/or motion, and/or a scenic route)), wherein the set of destination criteria includes a criterion that is based on a distance between the platform (e.g., 150 and/or 200) and a destination location (e.g., a destination of one or more people positioned within the interior portion of the platform, a loading and/or unloading location, and/or a location at which the platform will be stopped and/or parked for at least a predetermined amount of time) (in some embodiments, the criterion is satisfied when a distance between the platform and the destination location is within a predetermined distance (such as within 1 mile, within 0.75 miles, within 0.5 miles, within 100 feet, within 50 feet, and/or within 20 feet of each another)) (in some embodiments, the predetermined distance between the platform and the destination location is based on a speed, velocity, and/or acceleration of the vehicle, a type of location of the destination location, activity of one or more people within the interior portion of the platform, and/or a route of a trip being performed by the platform).

In response to detecting (or, in some embodiments, determining) that the location of the platform (e.g., 150 and/or 200) satisfies the set of destination criteria and in accordance with a determination that the destination location corresponds to a destination (e.g., a first location at which the first person is predicted, estimated, and/or determined to exit from the interior portion of the platform) of the first person (e.g., 202), the system (e.g., 100 and/or 152) provides a first indicator (e.g., 2202) (e.g., a first set of information, a first notification (such as a visual notification displayed on a display, an audio notification output via a speaker, a haptic notification, a seat belt tug, and/or a lighting notification), and/or a first alert that is output via a component (such as a display, a speaker, a light, a seat belt, and/or a window) of the interior portion of the platform and/or an external computer system associated with the first person) to the first person (e.g., 202). In some embodiments, the first indicator notifies, alerts, and/or provides guidance to the first person that the platform is nearing and/or approaching the first destination of the first person so that the first person can prepare to exit and/or depart from the platform.

In response to detecting (or, in some embodiments, determining) that the location of the platform (e.g., 150 and/or 200) satisfies the set of destination criteria and in accordance with a determination that the destination location does not correspond to the destination of the first person (e.g., 202) (e.g., the platform is approaching a location that is a destination of another person positioned within the platform, but is not approaching the destination in which the first person is predicted, estimated, and/or determined to exit from the interior portion of the platform), the system (e.g., 100 and/or 152) provides a second indicator (e.g., 2204) (e.g., a second set of information, a second notification (such as a visual notification displayed on a display, an audio notification output via a speaker, a haptic notification, a seat belt tug, and/or a lighting notification), and/or a second alert that is output via a component (such as a display, a speaker, a light, a seat belt, and/or a window) of the interior portion of the platform and/or an external computer system associated with the first person), different from the first indicator (e.g., 2202), to the first person (e.g., 202). In some embodiments, the second indicator notifies, alerts, and/or provides guidance to the first person that the platform is nearing and/or approaching a location where the platform will stop and/or park temporarily before proceeding toward the destination of the first person, such that the first person is aware that the platform will stop and/or park and that the first person does not need to begin preparing to exit and/or depart the platform.

In response to detecting (or, in some embodiments, determining) that the location of the platform (e.g., 150 and/or 200) satisfies the set of destination criteria and in accordance with a determination that the destination location corresponds to a destination (e.g., a second location at which the second person is predicted, estimated, and/or determined to exit from the interior portion of the platform) of the second person (e.g., 2200), the system (e.g., 100 and/or 152) provides the first indicator (e.g., 2202) (e.g., a first set of information, a first notification (such as a visual notification displayed on a display, an audio notification output via a speaker, a haptic notification, a seat belt tug, and/or a lighting notification), and/or a first alert that is output via a component (such as a display, a speaker, a light, a seat belt, and/or a window) of the interior portion of the platform and/or an external computer system associated with the second person) to the second person (e.g., 2200).

In response to detecting (or, in some embodiments, determining) that the location of the platform (e.g., 150 and/or 200) satisfies the set of destination criteria and in accordance with a determination that the location does not correspond to the destination of the second person (e.g., 2200) (e.g., the platform is approaching a location that is a destination of another person positioned within the platform, but is not approaching the destination in which the second person is predicted, estimated, and/or determined to exit from the interior portion of the platform), the system (e.g., 100 and/or 152) provides the second indicator (e.g., 2204) (e.g., a second set of information, a second notification (such as a visual notification displayed on a display, an audio notification output via a speaker, a haptic notification, a seat belt tug, and/or a lighting notification), and/or a second alert that is output via a component (such as a display, a speaker, a light, a seat belt, and/or a window) of the interior portion of the platform and/or an external computer system associated with the second person), different from the first indicator (e.g., 2202), to the second person (e.g., 2200). In some embodiments, when the destination of the first person and the destination of the second person are the same and correspond to the destination location, both the first person and the second person are provided with the first indicator. In some embodiments, when both the destination of the first person and the destination of the second person do not correspond to the destination location, both the first person and the second person are provided with the second indicator.

In some embodiments, the system (e.g., 100 and/or 152) detects (e.g., via a computer system of the platform and/or via an external computer system (such as a server) that is in communication with the computer system of the platform) a number of people (e.g., 202 and/or 2200) (e.g., the first person, the second person, and/or additional people) that are positioned within the interior portion (e.g., 206) of the platform (e.g., 150 and/or 200) based on a number of external computer systems (e.g., smart phones, smart wearable devices (such as smart watches), laptop computers, and/or desktop computers) that are in communication with a computer system of the platform (e.g., 150 and/or 200) (e.g., a computer system that is positioned within a portion of the platform and controls one or more operations of the platform).

In some embodiments, the system (e.g., 100 and/or 152) detects a number of people (e.g., 202 and/or 2200) (e.g., the first person, the second person, and/or additional people) that are positioned within the interior portion (e.g., 206) of the platform (e.g., 150 and/or 200) based on information (e.g., feedback and/or data) captured via one or more sensors of the platform (e.g., 150 and/or 200) (e.g., infrared sensors, camera sensors, biometric sensors, motion sensors, pressure sensors, and/or seat belt sensors).

In some embodiments, in accordance with a determination that it is uncertain whether the destination location corresponds to the destination of the first person (e.g., 202) (e.g., the platform and/or a computer system of the platform predicted and/or estimated that the destination location corresponds to the destination of the first person, but has not received confirmation from the first person that the destination location corresponds to the destination of the first person and/or the platform and/or a computer system of the platform has not been able to predict, estimate, and/or determine the destination of the first person), the system (e.g., 100 and/or 152) provides a third indicator (e.g., 2206) (e.g., a third set of information, a third notification (such as a visual notification displayed on a display, an audio notification output via a speaker, a haptic notification, a seat belt tug, and/or a lighting notification), and/or a third alert that is output via a component (such as a display, a speaker, a light, a seat belt, and/or a window) of the interior portion of the platform and/or an external computer system associated with the first person), different from the first indicator (e.g., 2202) and the second indicator (e.g., 2204), to the first person (e.g., 202). In some embodiments, the third indicator notifies, alerts, and/or provides guidance to the first person that the platform is nearing and/or approaching a location that may be the destination of the first person so that the first person can confirm whether or not the first person needs to prepare to exit and/or depart the platform. In accordance with a determination that it is uncertain whether the destination location corresponds to the destination of the second person (e.g., 2200) (e.g., the platform and/or a computer system of the platform predicted and/or estimated that the destination location corresponds to the destination of the second person, but has not received confirmation from the second person that the destination location corresponds to the destination of the second person and/or the platform and/or a computer system of the platform has not been able to predict, estimate, and/or determine the destination of the second person), the system (e.g., 100 and/or 152) provides the third indicator (e.g., 2206) (e.g., a third set of information, a third notification (such as a visual notification displayed on a display, an audio notification output via a speaker, a haptic notification, a seat belt tug, and/or a lighting notification), and/or a third alert that is output via a component (such as a display, a speaker, a light, a seat belt, and/or a window) of the interior portion of the platform and/or an external computer system associated with the second person), different from the first indicator (e.g., 2202) and the second indicator (e.g., 2204), to the second person (e.g., 2200).

In some embodiments, providing the first indicator (e.g., 2202) to the first person (e.g., 202) includes causing a seat belt (e.g., a safety belt, one or more straps, and/or harness that secures the first person to a seat and/or component of the interior portion of the platform) of the first person (e.g., 202) to contract (e.g., temporarily restrict, tighten, tug, and/or press inward toward the second person).

In some embodiments, in accordance with a determination that the destination location corresponds to the destination of the first person (e.g., 202) and that the destination location corresponds to the destination of the second person (e.g., 2200), the system (e.g., 100 and/or 152) provides a communal indicator (e.g., 2202, 2204, and/or 2206) (e.g., a set of information, a notification (such as a visual notification displayed on a communal display (such as a display that can be viewed by both the first person and the second person), an audio notification output via one or more speakers that can output audio configured to be heard by the first person and the second person, a haptic notification provided to both the first person and the second person, a seat belt tug provided to both the first person and the second person, and/or a lighting notification output by one or more lights that can be viewed and/or noticed by both the first person and the second person), and/or an alert that is output via one or more components (such as one or more displays, speakers, lights, seat belts, and/or windows) of the interior portion of the platform and/or respective external computer systems associated with the first person and the second person) to the first person (e.g., 202) and the second person (e.g., 2200) (e.g., the communal indicator is provided and/or output such that the first person and the second person can view and/or experience the communal indicator and prepare to exit and/or depart from the platform).

In some embodiments, the communal indicator includes audio output (e.g., audio output via one or more speakers of the interior portion of the platform that allows both the first person and the second person to hear and/or listen to the audio output).

In some embodiments, the communal indicator includes visual output (e.g., information that is displayed via one or more display generation components of the interior portion of the platform that allows both the first person and the second person to view to the visual output).

In some embodiments, in accordance with a determination that the destination location corresponds to the destination of the first person (e.g., 202) and that the destination location does not correspond to the destination of the second person (e.g., 2200), providing a first individual indicator (e.g., 2202) (e.g., a first set of information, a first notification (such as a visual notification displayed on a display, an audio notification output via a speaker, a haptic notification, a seat belt tug, and/or a lighting notification), and/or a first alert that is output via a component (such as a display, a speaker, a light, a seat belt, and/or a window) of the interior portion of the platform and/or an external computer system associated with the first person and is not directed to, targeted toward, and/or sent to the second person) to the first person (e.g., 202) without providing (e.g., not providing) a second individual indicator (e.g., 2202) (e.g., a second set of information, a second notification (such as a visual notification displayed on a display, an audio notification output via a speaker, a haptic notification, a seat belt tug, and/or a lighting notification), and/or a second alert that is output via a component (such as a display, a speaker, a light, a seat belt, and/or a window) of the interior portion of the platform and/or an external computer system associated with the second person and is not directed to, targeted toward, and/or sent to the first person) to the second person (e.g., 2200).

In some embodiments, the first individual indicator (e.g., 2202) is configured to be output via an external computer system (e.g., a smart phone, a smart wearable device (such as a smart watch), a personal laptop computer, and/or a tablet computer) associated with the first person (e.g., 202) (e.g., in possession of the first person and/or linked to an account of the first person).

In some embodiments, the first individual indicator (e.g., 2202) includes targeted audio output (e.g., spatial audio that is output in a direction and/or output so that the targeted audio output is perceived by the first person as output from a particular location in space (such as a location within the interior portion of the platform at which the first person is sitting and/or located)) directed to the first person (e.g., 202) (e.g., the targeted audio output is output so that the first person hears and/or perceives the targeted audio output clearly, whereas the second person cannot hear and/or perceive the targeted audio output clearly).

In some embodiments, after the platform (e.g., 150 and/or 200) has reached the destination location (e.g., the platform has stopped at the destination location and, optionally, moved one or more closures of the platform to an open position), the system (e.g., 100 and/or 152) obtains information about the first person (e.g., 202) (e.g., information about a location of the person, information that indicates whether the first person is still positioned within the interior portion of the platform, and/or information captured via one or more sensors of the platform). After a predetermined amount of time (e.g., 5 minutes, 4 minutes, 3 minutes, 2 minutes, 1 minute, and/or 30 seconds) has passed since the platform (e.g., 150 and/or 200) reached the destination location (e.g., the predetermined amount of time begins to elapse once the platform has stopped at the destination location), in accordance with a determination that the destination location corresponds to the destination of the first person (e.g., 202), and in accordance with a determination that the information indicates that the first person (e.g., 202) has not exited the interior portion (e.g., 206) of the platform (e.g., 150 and/or 200) (e.g., the information indicates that the first person has not exited the interior portion of the platform and/or the first person is located and/or positioned within a predetermined distance of the platform), the system (e.g., 100 and/or 152) provides a fourth indicator (e.g., a fourth set of information, a third notification (such as a visual notification displayed on a display, an audio notification output via a speaker, a haptic notification, a seat belt tug, and/or a lighting notification), and/or a third alert that is output via a component (such as a display, a speaker, a light, a seat belt, and/or a window) of the interior portion of the platform and/or an external computer system associated with the first person) to the first person (e.g., 202), wherein the fourth indicator includes a reminder (e.g., a nudge and/or guidance to exit the interior portion of the platform) that the platform (e.g., 150 and/or 200) has reached the destination location.

In some embodiments, the information indicates that the first person (e.g., 202) has not exited the interior portion (e.g., 206) of the platform (e.g., 150 and/or 200) when the information indicates that the first person (e.g., 202) has not unbuckled their seat belt (e.g., the second information includes sensor information captured via an infrared sensor, a camera sensor, a pressure sensor, and/or a seat belt sensor that indicates that the first person remains in the interior portion of the platform with their seat belt fastened).

In some embodiments, the information indicates that the first person (e.g., 202) has not exited the interior portion (e.g., 206) of the platform (e.g., 150 and/or 200) when the information indicates that a second location (e.g., an estimated, predicted, and/or determined location of the first person that is based on location information of the first person and/or sensor information captured via one or more sensors of the platform) of the first person (e.g., 202) is within a predetermined distance (e.g., within 20 feet, within 15 feet, within 10 feet, and/or within 5 feet) of the platform (e.g., 150 and/or 200). In some embodiments, the first person has exited the interior portion of the platform, but has not moved far enough away from the platform so that the platform can begin moving toward another destination location. Accordingly, in some embodiments, the fourth indicator is provided to the first person so that the first person can move away from the platform so that the platform can continue moving toward another destination location.

In some embodiments, in accordance with the determination that the destination location corresponds to the destination of the first person (e.g., 202), the system (e.g., 100 and/or 152) provides the first indicator (e.g., 2202) to the first person (e.g., 202) at a first time (e.g., a time prior to the platform reaching the destination location that provides the first person sufficient time to prepare to exit the interior portion of the platform prior to reaching the destination location) (in some embodiments, the first time is at a time that is before the second time) before the platform (e.g., 150 and/or 200) reaches the destination location (e.g., the first indicator is provided while the platform is moving toward the destination location and/or before the platform stops at the destination location). In accordance with the determination that the destination location does not correspond to the destination of the first person (e.g., 202), the system (e.g., 100 and/or 152) provides the second indicator (e.g., 2204) to the first person (e.g., 202) at a second time (e.g., a time prior to the platform reaching the destination location that provides the first person with enough notice that the destination location is not the destination of the first person prior to the platform reaching the destination location) (in some embodiments, the second time is at a time that is after the first time because the first person needs less notice before reaching a destination location that is not a destination of the first person) before the platform (e.g., 150 and/or 200) reaches the destination location (e.g., the second indicator is provided while the platform is moving toward the destination location and/or before the platform stops at the destination location), wherein the second time is different from the first time.

Existing platforms typically require that the passenger manually control the one or more features so that the interior of the platform reaches a desired state of the passenger. In addition, when a platform arrives at a destination, a surrounding environment of the destination can include characteristics that are not apparent, visible, and/or perceptible by the passenger. For instance, the surrounding environment of the destination can include obstructions that are positioned within a blind spot of a view of the passenger. As another example, the surrounding environment of the destination can include a first temperature that varies significantly from a second temperature of an environment in which the passenger entered the platform. In some cases, when the passenger exits the platform at the destination and is unaware of the characteristics of the surrounding environment of the destination, the passenger can experience discomfort and/or safety concerns.

Thus, there is a need for a platform, such as a vehicle, that can adjust configurable elements within an interior portion of the platform based on characteristics of an environment of a destination. For instance, there is a need for a platform that can quickly modify a state of the configurable elements to resemble the environment of the destination to facilitate a transition between the interior portion of the platform and the environment of the destination. In addition, there is a need for a platform that can modify the state of the configurable elements to increase the safety and/or security of the person exiting the interior portion of the platform and entering the environment of the destination. In some embodiments, the platform adjusts the configurable elements when approaching the destination so that the person exiting the interior portion of the platform can comfortably and safely enter the environment of the destination.

Figure 24A:
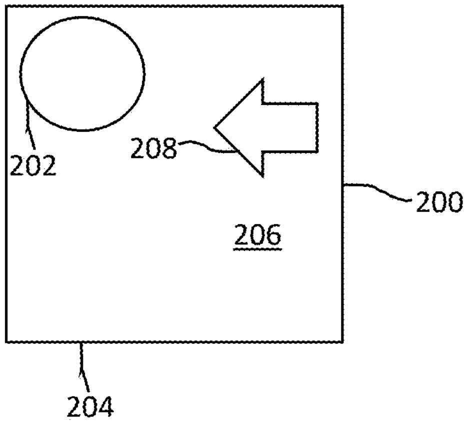
FIGS. 24A-24D illustrate examples of a state of an interior of a platform based on an environment in accordance with some embodiments.

Turning now to the drawings, FIG. 24A is a block diagram illustrating platform 200 performing a trip toward a destination location while person 202 is positioned within interior portion 206 of platform 206. At FIG. 24A, configurable elements 208 of interior portion 206 of platform 200 are in a first state, as indicated by no hatching and/or fill of the arrow representing configurable elements 208. In some embodiments, the first state of configurable elements 208 corresponds to a travel state that is based on preferences of person 202 and/or adjustments to configurable elements 208 requested by person 202. For instance, in some embodiments, when person 202 is sleeping during the trip toward the destination, the first state of configurable elements 208 includes a reduced brightness of one or more lights, a cooler color temperature of the one or more lights, an increased opacity of windows, a reduced volume of audio output via one or more speakers, calming and/or relaxing audio output via the one or more speakers, and/or a seat positioned in a reclined position.

At FIG. 24A, platform 200 is still travelling toward the destination location and is not within a predetermined distance of the destination location. Accordingly, in some embodiments, platform 200 maintains configurable elements 208 in the first state to allow person 202 to comfortably enjoy the trip toward the destination location. When platform 200 is within the predetermined distance of the destination location, platform 200 is configured to adjust configurable elements from the first state to a different state that is based on an environment of the destination location.

Figure 24B:
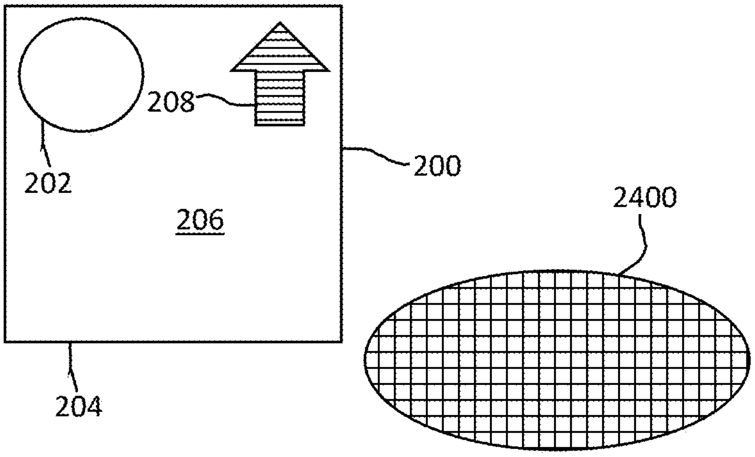

For instance, at FIG. 24B, platform 200 is within the predetermined distance of the destination location and the destination location includes first environment 2400. In some embodiments, platform 200 obtains information about first environment 2400 of the destination location via an external computer system (such as a server that includes weather information, traffic information, and/or physical characteristics of first environment 2400) and/or via a monitoring system (such as a system that includes one or more sensors and/or cameras) of platform 200. In some embodiments, the information about first environment 2400 includes weather conditions, traffic conditions, a brightness level, an amount of ambient noise, a presence and/or absence of obstructions, a curb height, an amount of people located within first environment 2400, and/or a type of location of the destination location.

At FIG. 24B, configurable elements 208 are adjusted to a second state, as indicated by first hatching of the arrow representing configurable elements 208, that is based on the information about first environment 2400. In some embodiments, the second state of configurable elements 208 causes interior portion 206 of platform 200 to resemble and/or simulate one or more characteristics of first environment 2400. For instance, in some embodiments, the second state of configurable elements 208 includes one or more lights having a brightness that is proportionate to a brightness of first environment 2400, one or more climate systems causing a temperature within interior portion 206 to increase or decrease toward a temperature of first environment 2400, and/or a display that displays a view of an exterior camera when first environment 2400 includes obstructions, heavy traffic, and/or a large amount of people. Accordingly, a state of configurable elements 208 is modified so that person 202 can comfortably and safely transition between interior portion 206 of platform 200 and first environment 2400 of the destination location.

In some embodiments, first environment 2400 includes a low brightness, a cool temperature, an obstruction, a high curb height, and a crowd of people present within first environment 2400. Therefore, in some embodiments, the second state of configurable elements 208 includes one or more lights having a reduced brightness, one or more windows having an increased opacity, one or more climate systems cooling and/or reducing a temperature within interior portion 206, furniture in a first egress position (to facilitate an ability of person 202 to exit platform 200 based on the obstruction in first environment 2400), a lift system causing interior portion 206 to be at a relatively high height (relative to the ground), a display that is displaying a view of an exterior camera, and/or one or more closures in a locked state (based on the crowd of people being present in first environment 2400).

In some embodiments, the second state of configurable elements 208 includes furniture, such as seats, benches, tables, and/or consoles, in a first position that is based on the information about first environment 2400. For instance, in some embodiments, first environment 2400 includes obstructions that limit an ability of person 202 to exit interior portion 206 of platform 200 via a preferred closure (such as closure 204). Thus, in some embodiments, the furniture of configurable elements 208 is adjusted to provide a clear path toward an alternate closure that is determined to be safer and/or easier for person 202 to exit platform 200.

Figure 24C:
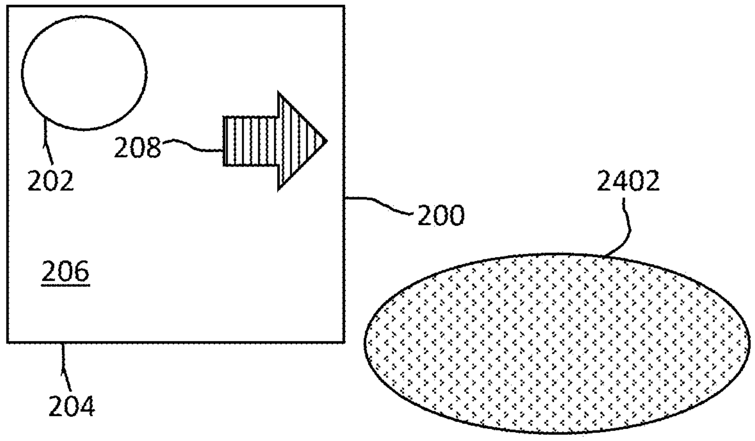

At FIG. 24C, platform 200 is within the predetermined distance of the destination location and the destination location includes second environment 2402 that is different from first environment 2400. In some embodiments, platform 200 obtains information about second environment 2402 of the destination location and configurable elements 208 are adjusted to a third state, as indicated by second hatching of the arrow representing configurable elements 208, that is based on the information about second environment 2402.

In some embodiments, the third state of configurable elements 208 causes interior portion 206 of platform 200 to resemble and/or simulate one or more characteristics of second environment 2402. For instance, in some embodiments, second environment 2402 includes a high brightness, a warm temperature, an absence of obstructions, a low curb height, and few people present within second environment 2402. Therefore, in some embodiments, the third state of configurable elements 208 includes one or more lights having an increased brightness, one or more windows having a reduced opacity, one or more climate systems warming and/or increasing a temperature within interior portion 206, furniture in a second egress position (to facilitate an ability of person 202 to exit platform 200 based on an absence of an obstruction in second environment 2402), a lift system causing interior portion 206 to be at a relatively low height (relative to the ground), a display that is not displaying a view of an exterior camera, and/or one or more closures in an unlocked state (based on few people being present in second environment 2402). Accordingly, a state of configurable elements 208 is modified so that person 202 can comfortably and safely transition between interior portion 206 of platform 200 and second environment 2402 of the destination location.

In some embodiments, the third state of configurable elements 208 includes furniture, such as seats, benches, tables, and/or consoles, in a second position that is based on the information about second environment 2402. For instance, in some embodiments, second environment 2402 does not include an obstruction that limits an ability of person 202 to exit interior portion 206 of platform 200 via a preferred closure (such as closure 204). Thus, in some embodiments, the furniture of configurable elements 208 is adjusted to provide a clear path toward the preferred closure of platform 200.

Figure 24D:
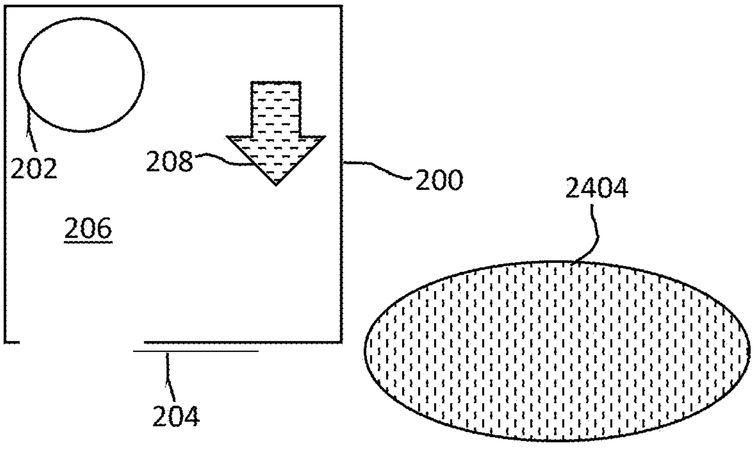

At FIG. 24D, platform 200 is within the predetermined distance of the destination location and the destination location includes third environment 2404 that is different from first environment 2400 and second environment 2402. In some embodiments, platform 200 obtains information about third environment 2404 of the destination location and configurable elements 208 are adjusted to a fourth state, as indicated by third hatching of the arrow representing configurable elements 208, that is based on the information about third environment 2404.

In some embodiments, the fourth state of configurable elements 208 causes interior portion 206 of platform 200 to resemble and/or simulate one or more characteristics of third environment 2404. In some embodiments, the fourth state of configurable elements 208 includes furniture, such as seats, benches, tables, and/or consoles, in a third position that is based on the information about second environment 2402.

At FIG. 24D, closure 204 is moved to an open position based on the information about third environment 2404. In some embodiments, closure 204 is also moved to the open position when the destination location includes first environment 2400 and/or second environment 2402. In some embodiments, a second closure that is different from closure 204 is moved to the open position when the destination location includes first environment 2400 and/or second environment 2402. In some embodiments, platform 200 causes closure 204 to be opened based on a determination that third environment 2404 does not include any obstructions proximate to closure 204, that low traffic conditions are present within an area of third environment 2404 proximate to closure 204, that relatively few people proximate to closure 204, and/or that a walkway and/or sidewalk is proximate to closure 204. Thus, in some embodiments, platform 200 causes closure 204 and/or additional closures to be opened when platform reaches the destination location and based on the information about an environment of the destination location.

In some embodiments, adjusting configurable elements 208 to a particular state based on the environment of the destination location includes adjusting an opacity of one or more windows of platform 200 based on a position of the sun and/or detection of light (such as via cameras and/or sensors of platform 200). For instance, in some embodiments, a first window of platform 200 includes an increased opacity as compared to a second window of platform 200 because the position of the sun is causing light to enter interior portion 206 of platform 200 via the first window.

In some embodiments, adjusting configurable elements 208 to a particular state based on the environment of the destination location includes adjusting one or more speakers to output audio at a volume level and/or sound transparency level based on the environment. For instance, in some embodiments, the environment of the destination includes a high amount of ambient noise and the one or more speakers are adjusted so that audio output includes an increased transparency level in a direction associated with the environment (so that person 202 can be aware of noise within the environment). In some embodiments, platform 200 adjusts a route of a trip and/or a speed at which platform 200 performs the trip so that currently playing audio (such as a song) is configured to end when platform 200 is estimated to arrive at the destination location.

In some embodiments, adjusting configurable elements 208 to a particular state based on the environment of the destination location includes adjusting furniture to a position that is based on manual adjustments made by person 202 during the trip to the destination location. In some embodiments, adjusting the furniture includes adjusting multiple pieces of furniture so that each piece of furniture being adjusted reaches a predetermined position (such as an egress position) at the same time. In some embodiments, the multiple pieces of furniture reach the predetermined position at a first time, where the first time is a time at which platform reaches, or is predicted to reach, the destination location and stops moving. In some embodiments, adjusting the furniture includes adjusting certain pieces of furniture and/or adjusting the furniture to particular positions based on a number of people positioned within interior portion 206 of platform 200. In some embodiments, adjusting the furniture includes adjusting the furniture to a predetermined position that is based on preferences of person 202 and/or another person positioned within interior portion 206 of platform 200. In some embodiments, adjusting the furniture includes adjusting the furniture to a particular position based on a type of location of the destination location (in addition to, or in lieu of, adjusting the furniture to a particular position based on the information about the environment of the destination location). For instance, in some embodiments, the furniture is adjusted to an egress position when the destination location is an office and/or place of employment of person 202 so that person 202 can quickly exit platform 200 and go to work. In some embodiments, the furniture is not adjusted to the egress position when the destination location is a residence of person 202 so that person 202 can relax and/or does not feel rushed to exit platform 200 at their home. In some embodiments, adjusting the furniture includes adjusting the furniture to a particular position based on activity of person 202 (such as whether person 202 is sleeping or whether person 202 is working). In some embodiments, adjusting the furniture includes adjusting the furniture to a particular position based on access limitations of person 202 (such as whether person 202 is in a wheelchair and/or has trouble walking). In some embodiments, adjusting the furniture includes adjusting the furniture to an egress position when the destination location is a loading and/or unloading location (such as for loading and/or unloading additional people and/or for loading and/or unloading items). In some embodiments, adjusting the furniture includes adjusting one or more pieces of furniture that are determined to be occupied by people without adjusting one or more pieces of furniture that are not determined to be occupied by people. In some embodiments, adjusting the furniture includes adjusting one or more pieces of furniture that are determined to not be occupied by people without adjusting one or more pieces of furniture that are determined to be occupied by people. In some embodiments, the furniture of configurable elements 208 is not adjusted when an adjustment setting is disabled (such as disabled via interaction with an application associated with platform 200).

In some embodiments, adjusting configurable elements 208 to a particular state based on the environment of the destination location includes adjusting one or more lights to a color temperature and/or a brightness that is based on the information about the environment of the destination location. In some embodiments, adjusting the one or more lights is based on activity of person 202 (in addition to, or in lieu of, being based on the information about the environment of the destination location).

In some embodiments, adjusting configurable elements 208 to a particular state based on the environment of the destination location includes adjusting configurable elements 208 further based on preferences of person 202 and/or another person positioned within interior portion 206 of platform 200. In some embodiments, adjusting configurable elements 208 to a particular state based on the environment of the destination location includes adjusting configurable elements 208 further based on access limitations of person 202 (such as whether person 202 is in a wheelchair and/or has trouble walking). In some embodiments, adjusting configurable elements 208 to a particular state based on the environment of the destination location includes adjusting configurable elements 208 further based on movement of platform 200 (such as whether platform 200 is currently in motion or stopped).

Figure 25:
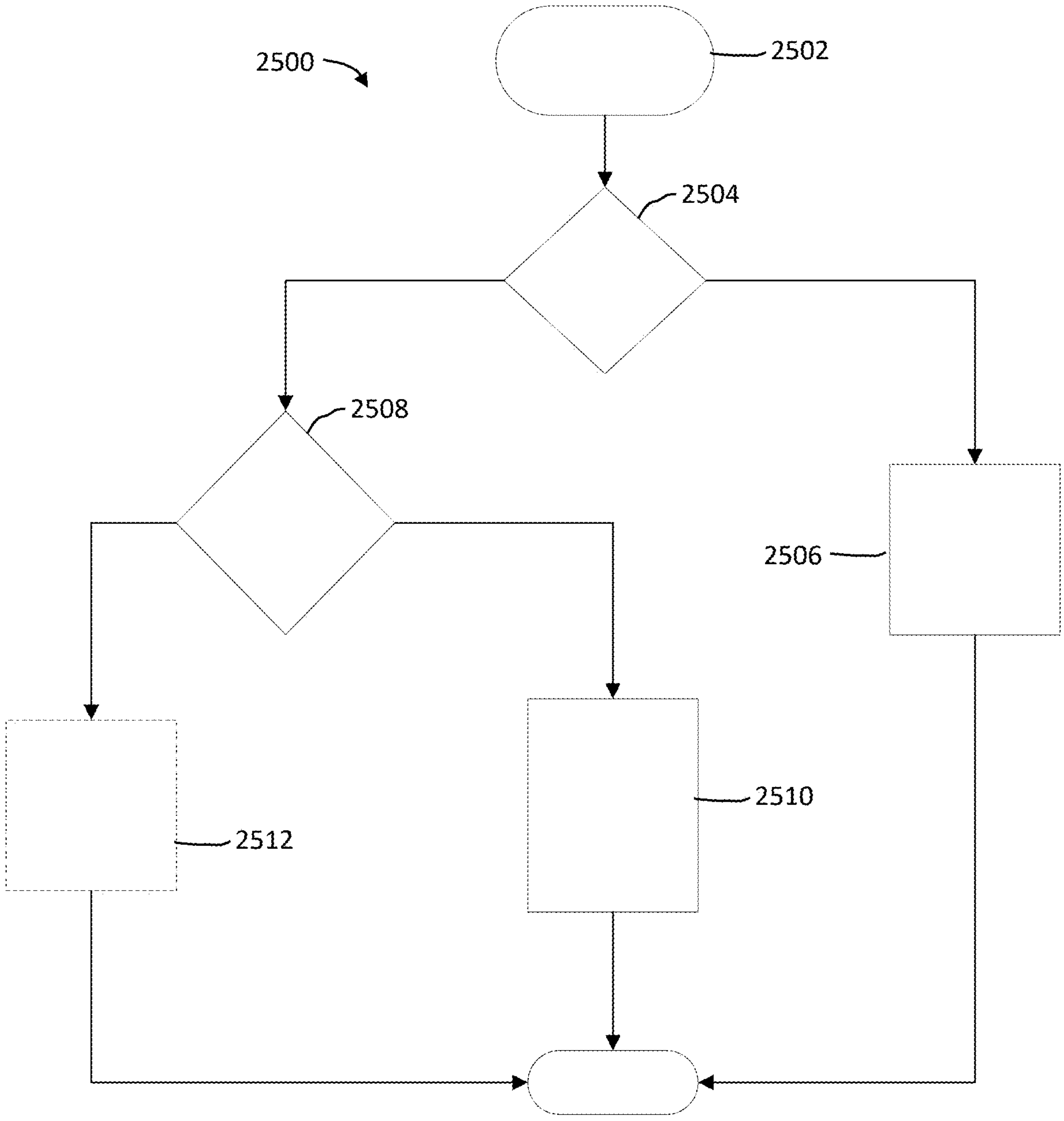
FIG. 25 is a flow diagram illustrating methods for adjusting a state of an interior of a platform based on an environment, in accordance with some embodiments.

FIG. 25 is a flow diagram illustrating method 2500 that can be performed by platform 200, such as a computer system associated with platform 200. At FIG. 25, platform 200 is detected to be within a predetermined distance of the destination location, as shown at block 2502.

After platform 200 is detected to be within the predetermined distance of the destination location, platform 200 determines whether an environment of the destination location is in a first condition (such as the destination location including first environment 2400), as shown at block 2504. When the environment of the destination location is in the first condition, configurable elements 208 are adjusted to a first state, such as the first state shown at FIG. 24B, as shown at block 2506.

When the environment of the destination location is not in the first condition, platform 200 determines whether the environment of the destination location is in a second condition (such as the destination location including second environment 2402), as shown at block 2508. When the environment of the destination location is in the second condition, configurable elements 208 are adjusted to a second state, such as the second state shown at FIG. 24C, as shown at block 2510.

In some embodiments, when the environment of the destination location is not in the second condition, configurable elements 208 are adjusted to a third state, such as the third state shown at FIG. 24D, as shown at block 2512. In some embodiments, the third state is based on characteristics of the environment of the destination location (an environment that is not in the first condition or the second condition).

A system (e.g., 100 and/or 152) associated with a platform (e.g., 150 and/or 200) is configured to perform a method in accordance with some embodiments. The system (e.g., 100 and/or 152) detects that a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system) is within a predetermined distance (e.g., within 1 mile, within 0.75 miles, within 0.5 miles, within 100 feet, within 50 feet, and/or within 20 feet) of a location (e.g., a destination of one or more users positioned within the interior portion of the platform, a loading and/or unloading location, and/or a location at which the platform will be stopped and/or parked for at least a predetermined amount of time).

In response to detecting that the platform (e.g., 150 and/or 200) is within the predetermined distance of the location and in accordance with a determination that an environment (e.g., 2400, 2402, and/or 2404) (e.g., an area, a space, and/or a zone that includes the location and/or a location at which the platform comes to a stop, where the area, the space, and/or the zone includes people, objects, obstructions, fixtures, and/or buildings) associated with the location includes a first set of one or more characteristics (e.g., a first set of weather conditions (such as temperature, humidity, precipitation, and/or wind), a first brightness level, a first amount of shade, a first amount of noise, a first amount of obstructions, a first amount of people, a first amount of traffic, a first height of a curb and/or platform, a first amount of space for a ramp to be deployed, and/or a first type of location (such as a residence, a business, an office, and/or a park)), the system (e.g., 100 and/or 152) adjusts (e.g., sending and/or transmitting a communication to one or more external computer systems associated with the one or more configurable elements that cause the one or more configurable elements to operate in a first state) one or more configurable elements (e.g., 208) (e.g., one or more lights, one or more speakers, one or more actuatable pieces of furniture, one or more climate systems, one or more display generation components, and/or one or more input devices) of an interior portion (e.g., 206) of the platform (e.g., 150 and/or 200) to a first state (e.g., a first brightness of the one or more lights, a first color temperature of the one or more lights, a first audio output via the one or more speakers, a first volume level of audio output via the one or more speakers, a first position of the one or more actuatable windows, a first opacity of the one or more actuatable windows, a first position of the one or more actuatable pieces of furniture, a first climate setting of the one or more climate systems, and/or a first user interface and/or media item displayed on the one or more display generation components) based on the first set of one or more characteristics (e.g., the one or more configurable elements of the interior portion of the platform are adjusted to the first state so that the interior portion of the platform resembles, matches, and/or imitates the environment associated with the location).

In response to detecting that the platform (e.g., 150 and/or 200) is within the predetermined distance of the location and in accordance with a determination that the environment (e.g., 2400, 2402, and/or 2404) associated with the location includes a second set of one or more characteristics (e.g., a second set of weather conditions (such as temperature, humidity, precipitation, and/or wind), a second brightness level, a second amount of shade, a second amount of noise, a second amount of obstructions, a second amount of people, a second amount of traffic, a second height of a curb and/or platform, a second amount of space for a ramp to be deployed, and/or a second type of location (such as a residence, a business, an office, and/or a park)), different from the first set of one or more characteristics, the system (e.g., 100 and/or 152) adjusts (e.g., sending and/or transmitting a communication to one or more external computer systems associated with the one or more configurable elements that cause the one or more configurable elements to operate in a second state) the one or more configurable elements (e.g., 208) of the interior portion (e.g., 206) of the platform (e.g., 150 and/or 200) to a second state (e.g., a second brightness of the one or more lights, a second color temperature of the one or more lights, a second audio output via the one or more speakers, a second volume level of audio output via the one or more speakers, a second position of the one or more actuatable windows, a second opacity of the one or more actuatable windows, a second position of the one or more actuatable pieces of furniture, a second climate setting of the one or more climate systems, and/or a second user interface and/or media item displayed on the one or more display generation components), different from the first state, based on the second set of one or more characteristics (e.g., the one or more configurable elements of the interior portion of the platform are adjusted to the second state so that the interior portion of the platform resembles, matches, and/or imitates the environment associated with the location).

In some embodiments, the one or more configurable elements (e.g., 208) of the interior portion (e.g., 206) of the platform (e.g., 150 and/or 200) include a climate control system (e.g., an air conditioning system, a heating system, a ventilation system, a fan, a furniture heating system, a furniture cooling system, a surface heating system, and/or a surface cooling system). In some embodiments, the climate control system is configured to adjust and/or control a temperature of the interior portion of the platform, a fan speed, an amount of air flow circulation through the interior portion of the platform, an amount of heating and/or cooling supplied to one or more pieces of furniture of the interior portion of the platform, and/or an amount of heating and/or cooling supplied to one or more surfaces of the interior portion of the platform.

In some embodiments, the one or more configurable elements (e.g., 208) of the interior portion (e.g., 206) of the platform (e.g., 150 and/or 200) include an opacity level (e.g., a tint, a haze, a light diffusion setting, an amount of frost, and/or an amount of glaze) of one or more windows (e.g., one or more openings within a frame of the platform that enable a person positioned within the platform to view an environment surrounding an exterior of the platform).

In some embodiments, the first set of one or more characteristics of the environment (e.g., 2400, 2402, and/or 2404) associated with the location includes a first set of light characteristics (e.g., a first position of the sun, a first brightness of sunlight, a first amount of cloud coverage, and/or a first amount of light detected (such as via cameras of the vehicle) within an interior portion of the platform and/or within the environment associated with the location). In some embodiments, adjusting the one or more configurable elements (e.g., 208) of the interior portion (e.g., 206) of the platform (e.g., 150 and/or 200) to the first state includes adjusting the one or more windows to a first opacity level (e.g., a first tint, haze, light diffusion setting, amount of frost, and/or amount of glaze) based on the first set of light characteristics (e.g., the first opacity level is determined based on the first set of light characteristics) (in some embodiments, when the first set of light characteristics includes a high level of brightness from the sun and/or another light source, the first opacity level is increased, whereas, in some embodiments, when the first set of light characteristics includes an indication that the sun has set (such as the current time of day is at nighttime), the first opacity level is reduced). In some embodiments, the second set of one or more characteristics of the environment (e.g., 2400, 2402, and/or 2404) associated with the location includes a second set of light characteristics (e.g., a second position of the sun, a second brightness of sunlight, a second amount of cloud coverage, and/or a second amount of light detected (such as via cameras of the vehicle) within an interior portion of the platform and/or within the environment associated with the location), different from the first set of light characteristics. In some embodiments, adjusting the one or more configurable elements (e.g., 208) of the interior portion (e.g., 206) of the platform (e.g., 150 and/or 200) to the second state includes adjusting the one or more windows to a second opacity level (e.g., a second tint, haze, light diffusion setting, amount of frost, and/or amount of glaze), different from the first opacity level, that is based on the second set of light characteristics (e.g., the second opacity level is determined based on the second set of light characteristics) (in some embodiments, when the second set of light characteristics includes a high level of brightness from the sun and/or another light source, the second opacity level is increased, whereas, in some embodiments, when the second set of light characteristics includes an indication that the sun has set (such as the current time of day is at nighttime), the second opacity level is reduced).

In some embodiments, the one or more configurable elements (e.g., 208) of the interior portion (e.g., 206) of the platform (e.g., 150 and/or 200) include audio settings (e.g., a volume level of audio output, an amount of transparency associated with audio output, a direction at which audio output is perceived by a person within the interior portion of the platform, and/or a left and right audio balance of audio output) associated with one or more audio output devices (e.g., speakers and/or headsets of the interior portion of the platform).

In some embodiments, the one or more configurable elements (e.g., 208) of the interior portion (e.g., 206) of the platform (e.g., 150 and/or 200) include one or more audio output devices (e.g., speakers and/or headsets of the interior portion of the platform). In response to detecting that the platform (e.g., 150 and/or 200) is within the predetermine distance of the location, the system (e.g., 100 and/or 152) causes the one or more audio output devices to output audio (e.g., sound and/or noise associated with content) corresponding to first content (e.g., a first movie, video, television show, song, playlist, album, and/or podcast), wherein the audio corresponding to the first content is configured to end (e.g., a playback duration of the first content and/or audio corresponding to the first content ends and/or ceases) when the platform (e.g., 150 and/or 200) is within a second predetermined distance (e.g., within 50 feet, within 20 feet, within 10 feet, and/or within 5 feet) of the location (e.g., the audio corresponding to the first content has a duration that ends at a first time and the platform is within the predetermined distance of the location at the first time).

In some embodiments, the one or more configurable elements (e.g., 208) of the interior portion (e.g., 206) of the platform (e.g., 150 and/or 200) include furniture (e.g., actuatable and/or adjustable pieces of furniture, such as seats, benches, tables, consoles, armrests, and/or headrests).

In some embodiments, in response to detecting that the platform (e.g., 150 and/or 200) is within the predetermined distance of the location and in accordance with a determination that the furniture was manually adjusted to a first position (e.g., a person positioned within the interior portion of the platform requested, moved, and/or caused one or more pieces of furniture to move to a first position) prior to the platform (e.g., 150 and/or 200) being within the predetermined distance of the location (e.g., the furniture was manually adjusted before the platform reaches a position that is within the predetermined distance of the location) (in some embodiments, the furniture was manually adjusted during a trip of the platform that includes movement of the platform toward the location) (in some embodiments, the furniture was manually adjusted during a previous trip of the platform that does not include movement of the platform toward the location), the system (e.g., 100 and/or 152) adjusts the furniture to a second position that is based on the first position of the furniture (e.g., the furniture is adjusted to an ingress and/or egress position that is based on the first position at which the person within the interior portion of the platform moved and/or caused the furniture to move).

In some embodiments, adjusting the furniture to the second position that is based on the first position of the furniture includes: adjusting a first seat (e.g., a first chair and/or a bench) of the furniture from the first position to the second position so that the first seat reaches the second position (e.g., the first seat stops moving and is positioned at the second position) at a first time (e.g., a first time of day and/or a first time relative to a duration of a trip of the platform that includes movement of the platform toward the location) and adjusting a second seat (e.g., a second chair and/or a bench) of the furniture from the first position to the second position so that the second seat reaches the second position (e.g., the second seat stops moving and is positioned at the second position) at the first time (e.g., the first seat and the second seat reach the second position at the same time so that movement of the first seat and the second seat are coordinated and/or movement of the first seat and the second seat occurs concurrently).

In some embodiments, in response to detecting that the platform (e.g., 150 and/or 200) is within the predetermined distance of the location and in accordance with a determination that a first number of people (e.g., 202) (e.g., riders, users, and/or passengers) are positioned within (e.g., seated and/or otherwise occupying) the interior portion (e.g., 206) of the platform (e.g., 150 and/or 200), the system (e.g., 100 and/or 152) adjusts the furniture to a third position (e.g., a position that is based on the first number of people). In response to detecting that the platform (e.g., 150 and/or 200) is within the predetermined distance of the location and in accordance with a determination that a second number of people (e.g., 202) (e.g., riders, users, and/or passengers), different from the first number of people, are positioned within (e.g., seated and/or otherwise occupying) the interior portion (e.g., 206) of the platform, the system (e.g., 100 and/or 152) adjusts the furniture to a fourth position (e.g., a position that is based on the second number of people), different from the third position. In some embodiments, the first number of people includes one person and the third position includes moving one or more pieces of the furniture that facilitate ingress and/or egress of the one person. In some embodiments, the second number of people includes two or more people and the fourth position includes moving one or more pieces of the furniture that facilitate ingress and/or egress of the two or more people.

In some embodiments, in response to detecting that the platform (e.g., 150 and/or 200) is within the predetermined distance of the location and in accordance with a determination that a first person (e.g., 202) (e.g., a first rider, user, and/or passenger) positioned within (e.g., seated and/or otherwise occupying) the interior portion (e.g., 206) of the platform (e.g., 150 and/or 200) is associated with a first set of user preferences (e.g., the first person has selected and/or designated (such as via an application associated with the platform and/or an account associated with the first person) preferences for a position of the furniture when entering, exiting, and/or otherwise being positioned within the interior portion of the platform), the system (e.g., 100 and/or 152) adjusts the furniture to a fifth position (e.g., a position that is based on and/or matches a preferred position of the first set of user preferences). In response to detecting that the platform (e.g., 150 and/or 200) is within the predetermined distance of the location and in accordance with a determination that a second person (e.g., 202) (e.g., a first rider, user, and/or passenger) positioned within (e.g., seated and/or otherwise occupying) the interior portion (e.g., 206) of the platform (e.g., 150 and/or 200) is associated with a second set of user preferences (e.g., the second person has selected and/or designated (such as via an application associated with the platform and/or an account associated with the second person) preferences for a position of the furniture when entering, exiting, and/or otherwise being positioned within the interior portion of the platform), different from the first set of user preferences, the system (e.g., 100 and/or 152) adjusts the furniture to a sixth position (e.g., a position that is based on and/or matches a preferred position of the second set of user preferences), different from the fifth position.

In some embodiments, in accordance with a determination that an adjustment setting (e.g., a setting configured to be enabled and/or disabled within an application associated with the platform and/or via user input corresponding to one or more input devices of the platform that, when enabled, causes the platform to automatically adjust the position of the furniture based on one or more factors) is disabled (e.g., not active such that the platform does not automatically adjust the position of the furniture based on one or more factors), the system (e.g., 100 and/or 152) maintains the furniture in a current position (e.g., forgoing adjusting the furniture to a different position from the current position even when the platform is within the predetermined distance of the location).

In some embodiments, the first set of user preferences designates the fifth position as a first preferred position (e.g., the fifth position is user-designated and/or user-selected as a position of the first seat that the first person prefers while entering, exiting, and/or riding within the interior portion of the platform) of the first person (e.g., 202) and the second set of user preferences designates the sixth position as a second preferred position (e.g., the sixth position is user-designated and/or user-selected as a position of the second seat that the second person prefers while entering, exiting, and/or riding within the interior portion of the platform) of the second person (e.g., 202).

In some embodiments, in response to detecting that the platform (e.g., 150 and/or 200) is within the predetermined distance of the location and in accordance with a determination that the location is of a first type (e.g., a business, a commercial establishment, an office, a home, a residence, a park, a gym, and/or a restaurant), the system (e.g., 100 and/or 152) adjusts the furniture to a seventh position (e.g., a position that is based on the first type of location) (in some embodiments, the location is an office building and the seventh position includes an egress position to facilitate an exit of a person from the interior portion of the platform). In response to detecting that the platform (e.g., 150 and/or 200) is within the predetermined distance of the location and in accordance with a determination that the location is of a second type (e.g., a business, a commercial establishment, an office, a home, a residence, a park, a gym, and/or a restaurant), different from the first type, the system (e.g., 100 and/or 152) adjusts the furniture to an eighth position (e.g., a position that is based on the second type of location) (in some embodiments, the location is a home of a person positioned within the interior portion of the platform and the seventh position includes a user-defined position that enables the person to relax and/or unwind before exiting the interior portion of the platform), different from the seventh position.

In some embodiments, the first type of location includes a business location (e.g., a place of employment of a person positioned within the interior portion of the platform) and the seventh position includes an egress position (e.g., a position that facilitates an ability of a person positioned within the interior portion of the platform to quickly exit and arrive at work).

In some embodiments, the first type of location includes a residential location (e.g., a home of a person positioned within the interior portion of the platform) and the seventh position does not include an egress position (e.g., the seventh position includes a position that enables a person within the interior portion of the platform to relax and/or a position that does not hurry and/or rush the person within the interior portion of the platform out of the interior portion of the platform).

In some embodiments, in response to detecting that the platform (e.g., 150 and/or 200) is within the predetermined distance of the location and in accordance with a determination that a third person (e.g., 202) (e.g., a third rider, user, and/or passenger) positioned within (e.g., seated and/or otherwise occupying) the interior portion (e.g., 206) of the platform (e.g., 150 and/or 200) is performing a first activity (e.g., a first detected, estimated, and/or determined activity being performed by the third person, such as the third person using and/or interacting with an external device (such as a smart phone, a smart watch, a laptop computer, and/or a tablet computer) and/or the third person paying attention to their surroundings (such as based on a gaze of the third person)), the system (e.g., 100 and/or 152) adjusts the furniture to a ninth position (e.g., a position that is based on the first activity being performed by the third person) (in some embodiments, the third person is sleeping and the ninth position includes a reclined position). In response to detecting that the platform is within the predetermined distance of the location and in accordance with a determination that the third person (e.g., 202) positioned within the interior portion (e.g., 206) of the platform (e.g., 150 and/or 200) is performing a second activity (e.g., a second detected, estimated, and/or determined activity being performed by the third person, such as the third person using and/or interacting with an external device (such as a smart phone, a smart watch, a laptop computer, and/or a tablet computer) and/or the third person paying attention to their surroundings (such as based on a gaze of the third person)), different from the first activity, the system (e.g., 100 and/or 152) adjusts the furniture to a tenth position (e.g., a position that is based on the second activity being performed by the third person) (in some embodiments, the third person is watching a movie and the ninth position includes a position that facilitates an ability of the third person to watch the movie), different from the ninth position.

In some embodiments, in response to detecting that the platform (e.g., 150 and/or 200) is within the predetermined distance of the location and in accordance with a determination that a set of one or more accessibility criteria is satisfied (e.g., a person that is positioned within and/or is estimated, predicted, and/or determined to enter and/or exit the interior portion of the platform has designated (such as via an application associated with the platform and/or an account associated with the person) one or more accessibility options, such as the person uses a wheelchair, the person has trouble walking, the person is handicapped, the person has trouble stepping into the interior portion of the platform, the person has vision problems, and/or the person uses a portable oxygen system), the system (e.g., 100 and/or 152) adjusts the furniture to an eleventh position based on the set of one or more accessibility criteria (e.g., the furniture is adjusted based on the accessibility limitations of a person that is positioned within and/or is estimated, predicted, and/or determined to enter and/or exit the interior portion of the platform) (in some embodiments, the eleventh position includes adjusting one or more pieces of furniture so that the interior portion of the platform includes sufficient space to accommodate a wheelchair).

In some embodiments, in response to detecting that the platform (e.g., 150 and/or 200) is within the predetermined distance of the location and in accordance with a determination that the location is a pickup location (e.g., a location at which one or more people associated with the platform are estimated, predicted, and/or determined to enter the interior portion of the platform), the system (e.g., 100 and/or 152) adjusts the furniture to an ingress position (e.g., a position that facilitates an ability of one or more people to enter the interior portion of the platform). In response to detecting that the platform (e.g., 150 and/or 200) is within the predetermined distance of the location and in accordance with a determination that the location is a drop off location (e.g., a location at which one or more people positioned within the interior portion of the platform are estimated, predicted, and/or determined to exit the interior portion of the platform), the system (e.g., 100 and/or 152) adjusts the furniture to an egress position (e.g., a position that facilitates an ability of one or more people to exit the interior portion of the platform).

In some embodiments, adjusting the one or more configurable elements (e.g., 208) of the interior portion (e.g., 206) of the platform (e.g., 150 and/or 200) to the first state based on the first set of one or more characteristics includes adjusting a third seat (e.g., a third chair and/or a bench) of the furniture so that the third seat reaches (e.g., the third seat stops moving and is positioned at the twelfth position) a twelfth position (e.g., an ingress position, an egress position, and/or a position based on the first set of one or more characteristics, based on the location, and/or based on preferences of a person positioned within the interior portion of the platform) at a first time (e.g., a first time of day) and adjusting a fourth seat (e.g., a fourth chair and/or a bench) of the furniture so that the fourth seat reaches (e.g., the fourth seat stops moving and is positioned at the thirteenth position) a thirteenth position (e.g., an ingress position, an egress position, and/or a position based on the first set of one or more characteristics, based on the location, and/or based on preferences of a person positioned within the interior portion of the platform) at the first time (e.g., the third seat reaches the twelfth position and the fourth seat reaches the thirteenth position at the same time, such that the third seat and the fourth seat are adjusted in conjunction with one another and/or concurrently with one another).

In some embodiments, the system (e.g., 100 and/or 152) causes the platform to arrive at the location and stop moving at the first time (e.g., the platform stops moving and is positioned at the location at the same time as the third seat and the fourth seat reach the twelfth and thirteenth positions, respectively).

In some embodiments, in response to detecting that the platform (e.g., 150 and/or 200) is within the predetermined distance of the location and in accordance with a determination that a fifth seat (e.g., a fifth chair and/or a bench) of the furniture is occupied by (e.g., a person is sitting on and/or otherwise occupying the fifth seat) a person (e.g., 202) (e.g., a rider, a user, and/or a passenger) positioned within the interior portion (e.g., 206) of the platform (e.g., 150 and/or 200), the system (e.g., 100 and/or 152) adjusts the fifth seat of the furniture to a fourteenth position (e.g., an ingress position and/or an egress position). In response to detecting that the platform (e.g., 150 and/or 200) is within the predetermined distance of the location and in accordance with a determination that the fifth seat of the furniture is not occupied by (e.g., a person is not sitting on and/or otherwise occupying the fifth seat) the person (e.g., 202) positioned within the interior portion (e.g., 206) of the platform (e.g., 150 and/or 200), the system (e.g., 100 and/or 152) forgoes adjusting the fifth seat of the furniture to the fourteenth position (e.g., maintaining a current position of the fifth seat and not adjusting the current position of the fifth seat to the fourteenth position). In some embodiments, the platform includes one or more sensors (such as infrared sensors, camera sensors, pressure sensors, and/or seat belt sensors) that capture information that indicates whether a seat of the furniture is occupied by a person.

In some embodiments, in response to detecting that the platform (e.g., 150 and/or 200) is within the predetermined distance of the location and in accordance with a determination that a sixth seat (e.g., a sixth chair and/or a bench) of the furniture is not occupied by (e.g., a person is not sitting on and/or otherwise occupying the sixth seat) a person (e.g., 202) (e.g., a rider, a user, and/or a passenger) positioned within the interior portion (e.g., 206) of the platform (e.g., 150 and/or 200), the system (e.g., 100 and/or 152) adjusts the sixth seat of the furniture to a fifteenth position (e.g., an ingress position and/or an egress position). In response to detecting that the platform (e.g., 150 and/or 200) is within the predetermined distance of the location and in accordance with a determination that the sixth seat of the furniture is occupied by (e.g., a person is sitting on and/or otherwise occupying the sixth seat) the person (e.g., 202) positioned within the interior portion (e.g., 206) of the platform (e.g., 150 and/or 200), the system (e.g., 100 and/or 152) forgoes adjusting the sixth seat of the furniture to the fifteenth position (e.g., maintaining a current position of the sixth seat and not adjusting the current position of the sixth seat to the fifteenth position).

In some embodiments, the one or more configurable elements (e.g., 208) of the interior portion (e.g., 206) of the platform (e.g., 150 and/or 200) include one or more lights (e.g., one or more lamps, light bulbs, and/or light emitting diodes).

In some embodiments, adjusting the one or more configurable elements (e.g., 208) of the interior portion (e.g., 206) of the platform (e.g., 150 and/or 200) to the first state includes adjusting the one or more lights to a first set of one or more color temperatures (e.g., a first set of one or more colors emitted via the one or more lights, where the first set of one or more colors are based on the first set of one or more characteristics of the environment associated with the location (such as the first set of one or more colors including colors present within the environment associated with the location)) and adjusting the one or more configurable elements (e.g., 208) of the interior portion (e.g., 206) of the platform (e.g., 150 and/or 200) to the second state includes adjusting the one or more lights to a second set of one or more color temperatures (e.g., a second set of one or more colors emitted via the one or more lights, where the second set of one or more colors are based on the second set of one or more characteristics of the environment associated with the location (such as the second set of one or more colors including colors present within the environment associated with the location)), different from the first set of one or more color temperatures.

In some embodiments, adjusting the one or more configurable elements (e.g., 208) of the interior portion (e.g., 206) of the platform (e.g., 150 and/or 200) to the first state includes adjusting the one or more lights to a first brightness (e.g., a first intensity and/or luminance emitted via the one or more lights, where the first brightness is based on the first set of one or more characteristics of the environment associated with the location (such as the first brightness being proportionate to a brightness of light within the environment associated with the location)) and adjusting the one or more configurable elements (e.g., 208) of the interior portion (e.g., 206) of the platform (e.g., 150 and/or 200) to the second state includes adjusting the one or more lights to a second brightness (e.g., a second intensity and/or luminance emitted via the one or more lights, where the second brightness is based on the second set of one or more characteristics of the environment associated with the location (such as the second brightness being proportionate to a brightness of light within the environment associated with the location)), different from the first brightness.

In some embodiments, in accordance with a determination that a person (e.g., 202) (e.g., a rider, a user, and/or a passenger) positioned within the interior portion (e.g., 206) of the platform (e.g., 150 and/or 200) is performing a first activity (e.g., a first detected, estimated, and/or determined activity being performed by the person, such as the person using and/or interacting with an external device (such as a smart phone, a smart watch, a laptop computer, and/or a tablet computer) and/or the person paying attention to their surroundings (such as based on a gaze of the person)), the system (e.g., 100 and/or 152) adjusts the one or more lights to a first set of one or more characteristics (e.g., a first brightness, a first set of one or more color temperatures, and/or a first state (such as an on state or an off state) based on the first activity of the person (e.g., 202) positioned within the interior portion (e.g., 206) of the platform (e.g., 150 and/or 200). In accordance with a determination that the person (e.g., 202) positioned within the interior portion (e.g., 206) of the platform (e.g., 150 and/or 200) is performing a second activity (e.g., a second detected, estimated, and/or determined activity being performed by the person, such as the person using and/or interacting with an external device (such as a smart phone, a smart watch, a laptop computer, and/or a tablet computer) and/or the person paying attention to their surroundings (such as based on a gaze of the person)), different from the first activity, the system (e.g., 100 and/or 152) adjusts the one or more lights to a second set of one or more characteristics (e.g., a second brightness, a second set of one or more color temperatures, and/or a second state (such as an on state or an off state), different from the first set of one or more characteristics, based on the second activity of the person (e.g., 202) positioned within the interior portion (e.g., 206) of the platform (e.g., 150 and/or 200). In some embodiments, the first activity of the person includes the person watching a movie and/or sleeping and the first set of one or more characteristics of the one or more lights includes a reduced brightness, cooler color temperatures, and/or the one or more lights being in an off state. In some embodiments, the second activity of the person includes the person reading and/or working and the second set of one or more characteristics of the one or more lights includes an increased brightness, warmer color temperatures, and/or the one or more lights being in an on state.

In some embodiments, the one or more configurable elements (e.g., 208) of the interior portion (e.g., 206) of the platform (e.g., 150 and/or 200) include one or more display generation components (e.g., a display controller, a touch-sensitive display system, a projector, a display screen, a display monitor, and/or a holographic display positioned within and/or included in the interior portion of the platform) that are configured to display a view (e.g., a representation of one or more images captured via one or more sensors (such as cameras)) of an exterior environment (e.g., an area surrounding an exterior of the platform) of the platform (e.g., 150 and/or 200). In some embodiments, the one or more display generation components display the view of the exterior environment of the platform in accordance with a determination that a set of criteria (such as the exterior environment including obstructions that block a view of a person positioned within the interior portion of the platform and/or the external environment creating blind spots for a person positioned within the interior portion of the platform) is satisfied.

In some embodiments, the one or more configurable elements (e.g., 208) of the interior portion (e.g., 206) of the platform (e.g., 150 and/or 200) include one or more closures (e.g., 204) (e.g., doors, trunks, hatches, and/or entries) that are configured to be adjusted between a first position (e.g., an open position and/or an unlocked position) and a second position (e.g., a closed position and/or a locked position). In some embodiments, a first closure of the one or more closures is adjusted from a closed position to an open position, or vice versa, based on the environment associated with the location, such as when a second closure of the one or more closures is blocked by an obstruction within the environment associated with the location. In some embodiments, the second closure of the one or more closures is adjusted from the closed position to the open position, or vice versa, based on the environment associated with the location, such as when the first closure of the one or more closures is blocked by an obstruction within the environment associated with the location.

In some embodiments, the first set of one or more characteristics of the environment (e.g., 2400, 2402, and/or 2404) associated with the location includes a first curb height (e.g., a first height of a step, platform, and surface at which a person associated with the platform is estimated, predicted, and/or determined to use (such as step onto) when exiting the interior portion of the platform and/or when entering the interior portion of the platform) and the second set of one or more characteristics of the environment (e.g., 2400, 2402, and/or 2404) associated with the location includes a second curb height (e.g., a second height of a step, platform, and surface at which a person associated with the platform is estimated, predicted, and/or determined to use (such as step onto) when exiting the interior portion of the platform and/or when entering the interior portion of the platform), different from the first curb height. In some embodiments, the one or more configurable elements of the interior portion of the platform include a lift system that is configured to adjust a height of an entry (such as an entry surface, an entry step, and/or an entry ramp) of the interior portion of the platform relative to a surface of the environment associated with the location (such as a curb, a sidewalk, a street, a road, and/or the ground). In some embodiments, the lift system adjusts the height of the entry of the interior portion of the platform to facilitate an ability of a person to enter and/or exit the interior portion of the platform.

In some embodiments, the first set of one or more characteristics of the environment (e.g., 2400, 2402, and/or 2404) associated with the location includes a first obstruction (e.g., a first physical object, fixture, entity, and/or article that is positioned within the environment associated with the location) and the second set of one or more characteristics of the environment (e.g., 2400, 2402, and/or 2404) associated with the location includes an absence of the first obstruction (e.g., the environment associated with the location does not include a physical object, fixture, entity, and/or article that is within a predetermined distance of the platform (such as within 20 feet, within 10 feet, and/or within 5 feet)). In some embodiments, the one or more configurable elements of the interior portion are adjusted based on the presence and/or absence of obstructions within the environment associated with the location. For instance, in some embodiments, one or more windows of the platform are adjusted to a reduced opacity level when an obstruction is present in the environment associated with the location so that a person positioned within the interior portion of the platform can easily view and/or notice the obstruction. In some embodiments, the one or more windows of the platform are adjusted to an increased opacity level when an obstruction is not present in the environment associated with the location because the person positioned within the interior portion of the platform does not need to be aware of an obstruction and so that the interior portion of the platform remains at comfortable brightness.

In some embodiments, the first set of one or more characteristics of the environment (e.g., 2400, 2402, and/or 2404) associated with the location includes a first type of location (e.g., a business, a commercial establishment, an office, a home, a residence, a park, a gym, and/or a restaurant) and the second set of one or more characteristics of the environment (e.g., 2400, 2402, and/or 2404) associated with the location includes a second type of location (e.g., a business, a commercial establishment, an office, a home, a residence, a park, a gym, and/or a restaurant), different from the first type of location. In some embodiments, the one or more configurable elements of the platform are adjusted based on the type of location so that one or more people within the interior portion of the platform can quickly exit the interior portion to go to work and/or remain within the interior portion of the platform when the one or more people are not in a rush.

In some embodiments, the first set of one or more characteristics of the environment (e.g., 2400, 2402, and/or 2404) associated with the location includes a first set of weather conditions (e.g., a first position of the sun, a first amount of cloud coverage, a first estimated and/or determined amount of precipitation, a first temperature, a first amount of wind, and/or a first amount of humidity) and the second set of one or more characteristics of the environment (e.g., 2400, 2402, and/or 2404) associated with the location includes a second set of weather conditions (e.g., a second position of the sun, a second amount of cloud coverage, a second estimated and/or determined amount of precipitation, a second temperature, a second amount of wind, and/or a second amount of humidity), different from the first set of weather conditions. In some embodiments, the one or more configurable elements of the platform, such as the climate control system, are adjusted so that the interior portion of the platform resembles and/or prepares a person positioned within the interior portion of the platform for the current weather conditions present within the environment associated with the location.

In some embodiments, in response to detecting that the platform (e.g., 150 and/or 200) is within the predetermined distance of the location and in accordance with a determination that a first set of user preference information (e.g., first user-selected and/or user-defined preferences for settings, states, and/or positions of the one or more configurable elements of the interior portion of the platform) has been obtained (e.g., via an application associated with the platform and/or via an account associated with a person that is predicted, estimated, and/or determined to be positioned within the interior portion of the platform), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to a third state (e.g., a third brightness of the one or more lights, a third color temperature of the one or more lights, a third audio output via the one or more speakers, a third volume level of audio output via the one or more speakers, a third position of the one or more actuatable windows, a third opacity of the one or more actuatable windows, a third position of the one or more actuatable pieces of furniture, a third climate setting of the one or more climate systems, and/or a third user interface and/or media item displayed on the one or more display generation components) based on the first set of user preference information (e.g., the third state of the one or more configurable elements includes one or more settings, states, and/or positions that are based on the first set of user preference information). In response to detecting that the platform (e.g., 150 and/or 200) is within the predetermined distance of the location and in accordance with a determination that a second set of user preference information (e.g., second user-selected and/or user-defined preferences for settings, states, and/or positions of the one or more configurable elements of the interior portion of the platform), different from the first set of user preference information, has been obtained (e.g., via an application associated with the platform and/or via an account associated with a person that is predicted, estimated, and/or determined to be positioned within the interior portion of the platform), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to a fourth state (e.g., a fourth brightness of the one or more lights, a fourth color temperature of the one or more lights, a fourth audio output via the one or more speakers, a fourth volume level of audio output via the one or more speakers, a fourth position of the one or more actuatable windows, a fourth opacity of the one or more actuatable windows, a fourth position of the one or more actuatable pieces of furniture, a fourth climate setting of the one or more climate systems, and/or a fourth user interface and/or media item displayed on the one or more display generation components) based on the second set of user preference information (e.g., the fourth state of the one or more configurable elements includes one or more settings, states, and/or positions that are based on the second set of user preference information).

In some embodiments, in response to detecting that the platform (e.g., 150 and/or 200) is within the predetermined distance of the location and in accordance with a determination that a first set of accessibility information (e.g., first information indicating that a person that is predicted, estimated, expected, and/or determined to be positioned within the interior portion of the platform has a disability, is handicapped, uses a wheelchair, has trouble walking, and/or requests additional assistance and/or accommodations) has been obtained (e.g., via an application associated with the platform and/or via an account associated with a person that is predicted, estimated, and/or determined to be positioned within the interior portion of the platform), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to a fifth state (e.g., a fifth brightness of the one or more lights, a fifth color temperature of the one or more lights, a fifth audio output via the one or more speakers, a fifth volume level of audio output via the one or more speakers, a fifth position of the one or more actuatable windows, a fifth opacity of the one or more actuatable windows, a fifth position of the one or more actuatable pieces of furniture, a fifth climate setting of the one or more climate systems, and/or a fifth user interface and/or media item displayed on the one or more display generation components) based on the first set of accessibility information (e.g., the fifth state of the one or more configurable elements includes one or more settings, states, and/or positions that are based on the first set of accessibility information). In response to detecting that the platform (e.g., 150 and/or 200) is within the predetermined distance of the location and in accordance with a determination that a second set of accessibility information (e.g., second information indicating that a person that is predicted, estimated, expected, and/or determined to be positioned within the interior portion of the platform has a disability, is handicapped, uses a wheelchair, has trouble walking, and/or requests additional assistance and/or accommodations), different from the first set of accessibility information, has been obtained (e.g., via an application associated with the platform and/or via an account associated with a person that is predicted, estimated, and/or determined to be positioned within the interior portion of the platform), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to a sixth state (e.g., a sixth brightness of the one or more lights, a sixth color temperature of the one or more lights, a sixth audio output via the one or more speakers, a sixth volume level of audio output via the one or more speakers, a sixth position of the one or more actuatable windows, a sixth opacity of the one or more actuatable windows, a sixth position of the one or more actuatable pieces of furniture, a sixth climate setting of the one or more climate systems, and/or a sixth user interface and/or media item displayed on the one or more display generation components) based on the second set of accessibility information (e.g., the sixth state of the one or more configurable elements includes one or more settings, states, and/or positions that are based on the second set of accessibility information).

In some embodiments, in response to detecting that the platform (e.g., 150 and/or 200) is within the predetermined distance of the location and in accordance with a determination that the platform (e.g., 150 and/or 200) is moving (e.g., the platform is in motion and/or is not at a complete stop) when the platform (e.g., 150 and/or 200) reaches the location (e.g., the platform is in motion and/or has not come to a complete stop when the platform arrives at the location), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to a seventh state (e.g., a seventh brightness of the one or more lights, a seventh color temperature of the one or more lights, a seventh audio output via the one or more speakers, a seventh volume level of audio output via the one or more speakers, a seventh position of the one or more actuatable windows, a seventh opacity of the one or more actuatable windows, a seventh position of the one or more actuatable pieces of furniture, a seventh climate setting of the one or more climate systems, and/or a seventh user interface and/or media item displayed on the one or more display generation components). In response to detecting that the platform (e.g., 150 and/or 200) is within the predetermined distance of the location and in accordance with a determination that the platform (e.g., 150 and/or 200) is not moving (e.g., the platform has come to a complete stop) when the platform (e.g., 150 and/or 200) reaches the location (e.g., the platform has come to a complete stop at the location), the system (e.g., 100 and/or 152) adjusts (e.g., sending and/or transmitting a communication to one or more external computer systems associated with the one or more configurable elements that cause the one or more configurable elements to operate in a first state) the one or more configurable elements (e.g., 208) of the interior portion (e.g., 206) of the platform (e.g., 150 and/or 200) to an eighth state (e.g., an eighth brightness of the one or more lights, an eighth color temperature of the one or more lights, an eighth audio output via the one or more speakers, an eighth volume level of audio output via the one or more speakers, an eighth position of the one or more actuatable windows, an eighth opacity of the one or more actuatable windows, an eighth position of the one or more actuatable pieces of furniture, an eighth climate setting of the one or more climate systems, and/or an eighth user interface and/or media item displayed on the one or more display generation components).

Existing platforms typically open and/or close access points, such as doors, trunks, and/or hatches, at a fixed rate and/or at a rate determined by a force applied by a passenger. Accordingly, existing platforms do not adjust a rate at which access points are opened and/or closed to accommodate an intent of a passenger and/or to make entry and/or exit from the platform more convenient for the passenger.

Thus, there is a need for a platform, such as a vehicle, that can adjust a rate, speed, and/or acceleration of one or more closures (such as one or more doors, trunks, and/or hatches) based on one or more factors. For instance, there is a need for a platform that can quickly open and close a closure when a person is in a hurry and entering the platform. In addition, there is a need for a platform that can slowly open a closure when a person entering the platform is a relatively far distance from the platform so that a temperature of an interior portion of the platform is not significantly changed (such as changed as a result of the closure being open for a longer period of time). In some embodiments, a platform adjusts an opening profile of one or more closures based on one or more factors, such as a speed of the platform, a location of the platform, an environment surrounding the platform, information about a person entering and/or exiting the platform, a time of day, and/or a day of the week. Accordingly, the platform moves one or more closures at different rates to better suit the needs of a person entering and/or exiting the platform and/or to conserve power of the platform.

Figure 26A:
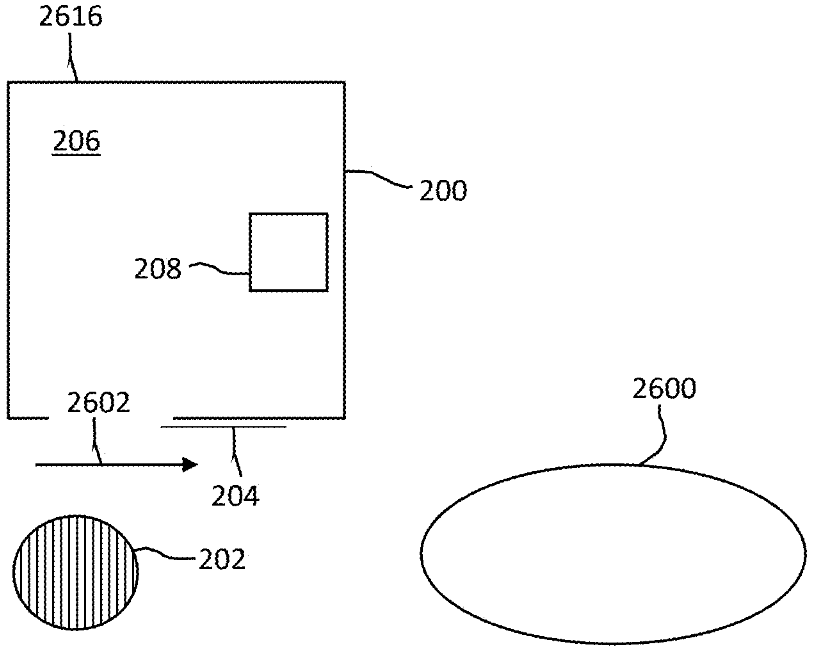
FIGS. 26A-26D illustrate examples of different motion profiles of a closure of a platform, in accordance with some embodiments.

Turning now to the drawings, FIG. 26A is a block diagram illustrating platform 200 approaching, arriving, and/or positioned at a first destination, such as a first pick up location of person 202. At FIG. 26A, the first destination includes first environment 2600 and person 202 is in a first state, as indicated by first hatching of person 202. When platform 200 is within a predetermined distance of the first destination, platform 200 moves closure 204 from a closed position to an open position using first motion profile 2602. As set forth below, first motion profile 2602 is based on one or more factors that facilitate an ability of person 202 to enter and/or exit platform 200, increase the comfort and/or convenience of person 202, and/or conserves power of platform 200.

In some embodiments, the one or more factors upon which first motion profile 2602 is based, include the first state of person 202, characteristics of first environment 2600, and/or a state of platform 200. For instance, in some embodiments, the first state of person 202 includes a trajectory and/or motion of person 202 (relative to platform), activity performed by person 202, and/or information about person 202 (such as preferences of person 202, access limitations of person 202, schedule and/or calendar information associated with person 202, and/or previous trips taken by person 202).

In some embodiments, when a walking speed at which person 202 approaches platform 200 increases, a speed at which closure 204 is opened increases. In some embodiments, after platform 200 is within the predetermined distance of the first destination, when a determined distance between person 202 and platform 200 increases, a speed at which closure 204 is opened decreases. In some embodiments, when an angle at which person 202 is approaching platform increases, a speed at which closure 204 is opened decreases.

In some embodiments, characteristics of first environment 2600 include weather conditions, a distance between the first destination and a door of a structure and/or point of interest, obstructions present within first environment 2600, and/or a curb height. In some embodiments, when weather conditions of first environment 2600 indicate that it is raining, a speed at which closure 204 is opened is increased (such as to keep interior portion 206 dry). In some embodiments, as the distance between the first destination and the door of a structure and/or point of interest increases, the speed at which closure 204 is opened decreases. In some embodiments, platform 200 includes a second closure (e.g., second closure 2616) that is different from closure 204. In some embodiments, first motion profile 2602 opens closure 204 without opening the second closure because an obstruction present in first environment 2600 blocks and/or restricts access to the second closure. In some embodiments, first motion profile 2602 opens closure 204 without opening the second closure based on a height of a curb in first environment 2600.

In some embodiments, the state of platform 200 includes a current speed, velocity, and/or acceleration of platform 200 and/or a location of platform 200. In some embodiments, first motion profile 2602 includes opening closure 204 at a velocity that is based on a velocity of platform 200. In some embodiments, first motion profile 2602 includes opening closure 204 at a velocity that is the same magnitude as, but is in an opposite direction of, the velocity of platform 200. In some embodiments, first motion profile 2602 includes varying a speed and/or velocity at which closure 204 is opened based on a deceleration profile of platform 200. In some embodiments, first motion profile 2602 includes initially opening closure 204 at a first speed, transitioning to opening closure 204 at a second speed that is greater than the first speed, and then transitioning to opening closure 204 at a third speed that is less than the second speed.

In some embodiments, first motion profile 2602 includes a rate, speed, velocity, and/or acceleration at which closure 204 is opened and/or which closure (such as closure 204 and/or second closure 2616) of platform 200 is opened. Accordingly, properties of first motion profile 2602 are determined based on the one or more factors, which facilitates an ability of person 202 to enter and/or exit platform 200, increases the comfort and/or convenience of person 202, and/or conserves power of platform 200.

Figure 26B:
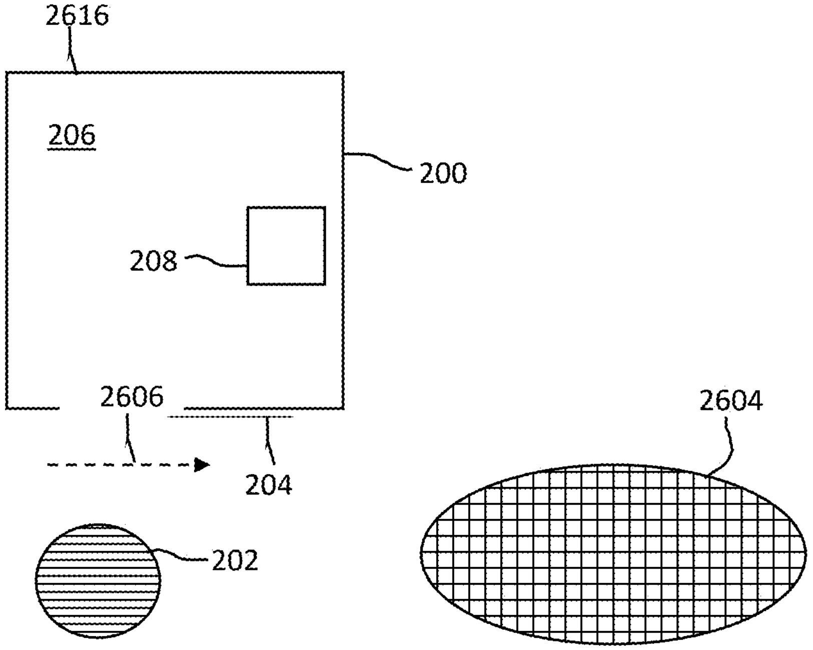

At FIG. 26B, platform 200 is approaching, arriving, and/or positioned at a second destination, such as a second pick up location of person 202. At FIG. 26B, the second destination includes second environment 2604 and person 202 is in a second state, as indicated by second hatching of person 202. When platform 200 is within the predetermined distance of the second destination, platform 200 moves closure 204 from a closed position to an open position using second motion profile 2606.

Second motion profile 2606 is based on one or more factors, such as the second state of person 202, characteristics of second environment 2604, and/or a state of platform 200. In some embodiments, second motion profile 2602 includes a rate, speed, velocity, and/or acceleration at which closure 204 is opened and/or which closure (such as closure 204 and/or second closure 2616) of platform 200 is opened.

At FIG. 26B, the second state of person 202 is different from the first state of person 202 and second environment 2604 is different from first environment 2600, such that second motion profile 2606 is different from first motion profile 2602. In some embodiments, second motion profile 2606 includes different rates, speeds, velocities, and/or accelerations at which closure 204 is opened as compared to the rates, speed, velocities, and/or accelerations at which closure 204 is opened using first motion profile 2602. In some embodiments, second motion profile 2606 includes opening a first closure (such as closure 204) that is different from a second closure (such as second closure 2616) that is opened when using first motion profile 2602. Therefore, platform 200 adjusts an opening profile of closure 204 based on the one or more factors, thereby facilitating an ability of person 202 to enter and/or exit platform 200, increasing the comfort and/or convenience of person 202, and/or conserving power of platform 200.

Figure 26C:
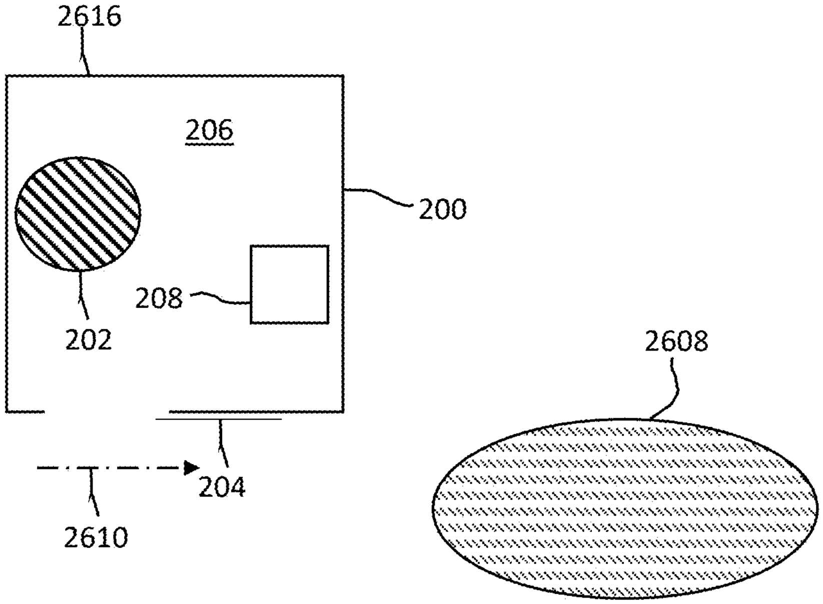

At FIG. 26C, platform 200 is approaching, arriving, and/or positioned at a third destination, such as a first drop off location of person 202, while person 202 is positioned within interior portion 206 of platform 200. At FIG. 26C, the third destination includes third environment 2608 and person 202 is in a third state, as indicated by third hatching of person 202. When platform 200 is within a predetermined distance of the third destination, platform 200 moves closure 204 from a closed position to an open position using third motion profile 2610. In some embodiments, platform 200 moves closure 204 from the closed position to the open position using third motion profile 2610 while platform 200 is still moving toward the third destination.

Third motion profile 2610 is based on one or more factors, such as the third state of person 202, characteristics of third environment 2608, and/or a state of platform 200. For instance, in some embodiments, the third state of person 202 includes activity performed by person 202 and/or information about person 202 (such as preferences of person 202, access limitations of person 202, schedule and/or calendar information associated with person 202, and/or previous trips taken by person 202).

In some embodiments, characteristics of third environment 2608 include weather conditions, a distance between the third destination and a door of a structure and/or point of interest, obstructions present within third environment 2608, and/or a curb height. In some embodiments, the state of platform 200 includes a current speed, velocity, and/or acceleration of platform 200 and/or a location of platform 200.

In some embodiments, third motion profile 2610 includes a rate, speed, velocity, and/or acceleration at which closure 204 is opened and/or which closure (such as closure 204 and/or second closure 2616) of platform 200 is opened. Accordingly, properties of third motion profile 2610 are determined based on the one or more factors, which facilitates an ability of person 202 to enter and/or exit platform 200, increases the comfort and/or convenience of person 202, and/or conserves power of platform 200.

Figure 26D:
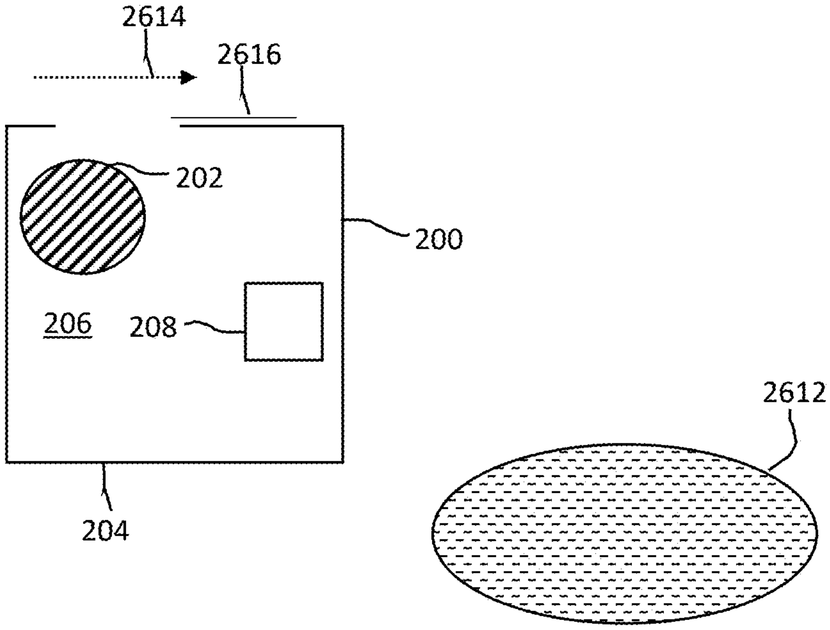

At FIG. 26D, platform 200 is approaching, arriving, and/or positioned at a fourth destination, such as a second drop off location of person 202, while person 202 is positioned within interior portion 206 of platform 200. At FIG. 26D, the fourth destination includes fourth environment 2612 and person 202 is in a fourth state, as indicated by fourth hatching of person 202. When platform 200 is within a predetermined distance of the fourth destination, platform 200 moves second closure 2616 from a closed position to an open position using fourth motion profile 2614. In some embodiments, platform 200 moves second closure 2616 from the closed position to the open position using fourth motion profile 2614 while platform 200 is still moving toward the fourth destination.

At FIG. 26D, fourth motion profile 2614 includes opening second closure 2616 without opening closure 204. In some embodiments, fourth environment 2612 includes an obstruction that blocks and/or restricts access to closure 204. As such, fourth motion profile 2614 includes opening second closure 2616 instead of closure 204. In some embodiments, when platform 200 arrives at the fourth destination, platform 200 parks and/or stops moving on a side of a street that is proximate to second closure 2616. As such, in some embodiments, fourth motion profile 2614 includes opening second closure 2616 instead of closure 204 based on where platform 200 stops at the fourth location. In some embodiments, the fourth state of person 202 is indicative of preferences of person 202 for entering and/or exiting platform 200 via second closure 2616, and thus, fourth motion profile 2614 includes opening second closure 2616 instead of closure 204.

In some embodiments, the motion profile at which a closure of platform 200 is opened is based on an ability of person 202 to access the platform 200, such as whether person 202 is in a wheelchair and cannot access platform 200 without a ramp. In some embodiments, the motion profile is based on factors that limit and/or restrict an ability of platform 200 to deploy a ramp that enables person 202 to access platform 200. In some embodiments, the motion profile includes opening a particular closure that includes a ramp. In some embodiments, the motion profile includes opening a particular closure that has a ramp and that is least restricted and/or blocked by obstructions within an environment of a destination.

In some embodiments, the motion profile includes which closure (such as closure 204 and/or closure 2616) of platform 200 is opened. In some embodiments, the one or more factors upon which the motion profile is based include obstructions within the environment of the destination, a curb height in the environment of the destination, and/or a location at which platform 200 stops moving at the destination (such as which side of the street platform 200 parks and/or stops moving).

In some embodiments, the motion profile is based on a time of day at which platform 200 arrives at the destination. For instance, in some embodiments, the time of day is indicative of whether person 202 is in a rush to enter and/or exit platform 200, such that the motion profile includes faster speeds at the time of day that indicates that person 202 is in a hurry. In some embodiments, the motion profile is based on a number of people located in the environment of the destination. For instance, in some embodiments, the motion profile includes slower speeds for opening a closure when less people are present within the environment of the destination because it is less likely that a person will inadvertently enter platform 200. In some embodiments, the motion profile is based on a gaze of person 202 while person 202 is approaching platform 200. For instance, in some embodiments, the motion profile includes faster speeds for opening a closure when the gaze of person 202 is directed at platform 200 because person 202 is likely paying attention and is prepared to enter platform 200.

Figure 27:
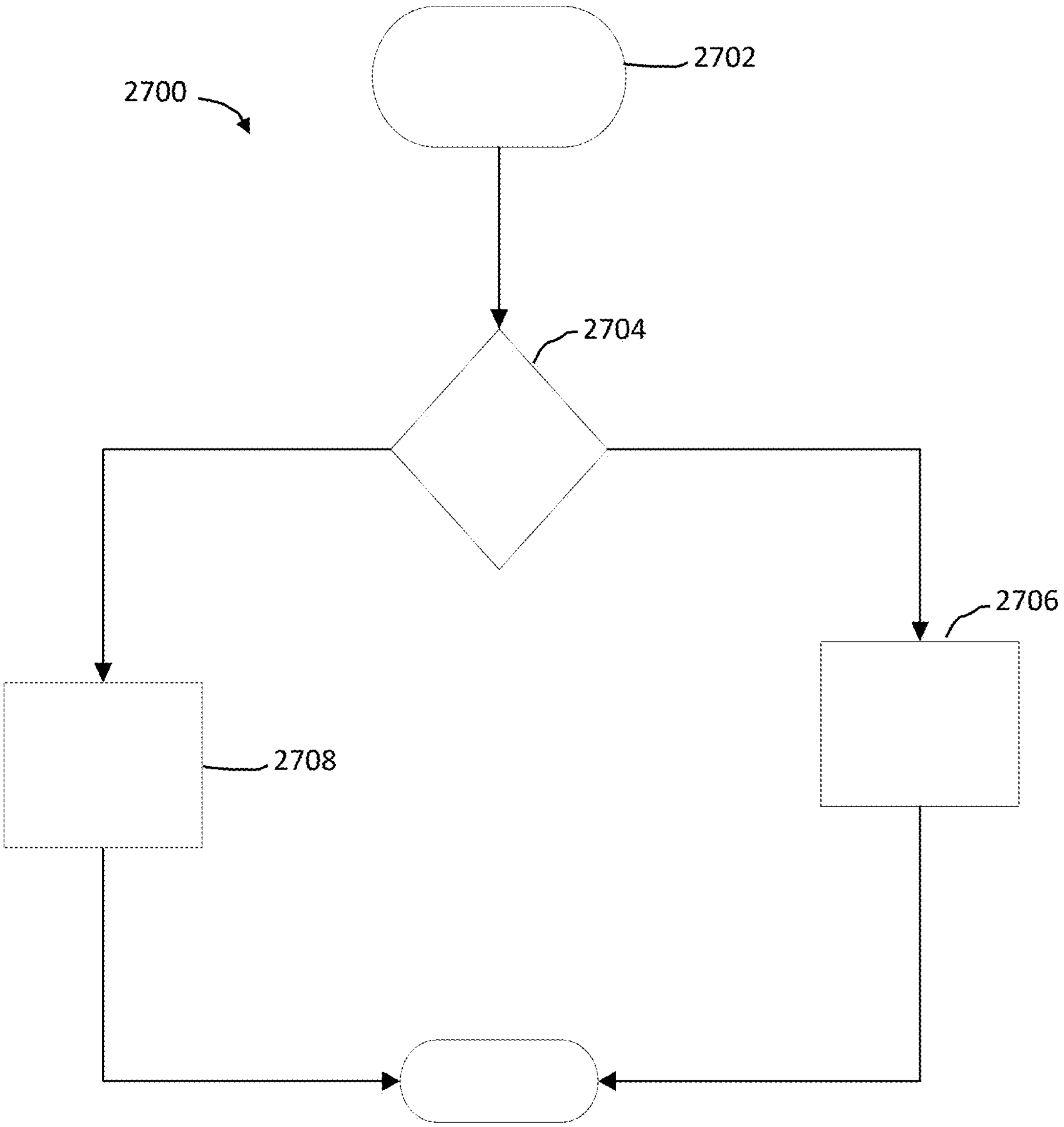
FIG. 27 is a flow diagram illustrating methods for determining a motion profile of a closure of a platform, in accordance with some embodiments.

FIG. 27 is a flow diagram illustrating method 2700 that can be performed by platform 200, such as a computer system associated with platform 200. At FIG. 27, platform 200 is detected to be within a predetermined distance of the destination location, as shown at block 2702.

After platform 200 is detected to be within the predetermined distance of the destination location, platform 200 determines whether a set of criteria is satisfied, such as whether the one or more factors indicate that one or more closures should be opened with first motion profile 2602 or second motion profile 2606, as shown at block 2704. When the set of criteria is satisfied, one or more closures of platform 200 are opened with a first opening profile, such as first motion profile 2602, as shown at block 2706. When the set of criteria is not satisfied, one or more closures of platform 200 are opened with a second opening profile, such as second motion profile 2606, as shown at block 2708.

A system (e.g., 100 and/or 152) associated with a platform (e.g., 150 and/or 200) is configured to perform a method in accordance with some embodiments. The system (e.g., 100 and/or 152) detects that a platform (e.g., 150 and/or 200) (e.g., a physical platform, a virtual platform, a simulated platform, a mobile platform, and/or a vehicle) (in some embodiments, the platform is controlled by and/or otherwise in communication with a computer system, such as a smartphone, a tablet, a watch, and/or a vehicle computer system) is within a predetermined distance (e.g., within 1 mile, within 0.75 miles, within 0.5 miles, within 100 feet, within 50 feet, within 20 fee, within 10 feet, and/or within 5 feet) of a location (e.g., a destination of one or more users positioned within the interior portion of the platform, a loading and/or unloading location, and/or a location at which the platform will be stopped and/or parked for at least a predetermined amount of time).

In response to detecting that the platform (e.g., 150 and/or 200) is within the predetermined distance of the location, the system (e.g., 100 and/or 152) causes one or more closures (e.g., 204 and/or 2616) of the platform to open with an opening profile (e.g., 2602, 2606, 2610, and/or 2614) based on a set of one or more criteria.

Causing the one or more closures (e.g., 204 and/or 2616) of the platform (e.g., 150 and/or 200) to open with the opening profile (e.g., 2602, 2606, 2610, and/or 2614) includes, in accordance with a determination that a first set of one or more criteria is met (e.g., the platform is reaching the location at a first speed, the location is a first distance from an entrance to a building, structure, and/or home, an environment associated with the location includes a first set of conditions (such as a first set of weather conditions, obstructions, traffic, and/or an amount of people in the environment), a user of the platform is in a first state (such as the user is viewing content on a display of the platform and/or on an external device associated with the user and/or the user is paying attention to the surroundings and/or environment of the platform), a first set of safety conditions associated with a user of the platform, a first set of user preferences of a user of the platform (such as a preferred height of the platform, a preferred opening speed of a closure of the platform, and/or a preferred closure to open), a first set of accessibility settings associated with a user of the platform (such as the user being in a wheelchair and/or the user having trouble walking, sitting up, and/or sitting down), a user associated with the platform is approaching the platform at a first speed, a first distance, and/or a first angle, the location is a first type of location, a schedule of a user associated with the platform includes first information, and/or the platform is within the predetermined distance of the location at a first time of a day and/or a first day of the week), causing (e.g., sending and/or transmitting a communication to one or more external computer systems associated with the one or more closures that cause the one or more closures to open) the one or more closures (e.g., 204 and/or 2616) of the platform (e.g., 150 and/or 200) to open with a first opening profile (e.g., 2602, 2606, 2610, and/or 2614) (e.g., opening the one or more closures at a first speed, a first rate, and/or a first velocity, opening a first closure of the one or more closures, opening the one or more closures in a first direction, and/or opening the one or more closures to a first position).

Causing the one or more closures (e.g., 204 and/or 2616) of the platform (e.g., 150 and/or 200) to open with the opening profile (e.g., 2602, 2606, 2610, and/or 2614) includes, in accordance with a determination that a second set of one or more criteria is met (e.g., the platform is reaching the location at a second speed, the location is a second distance from an entrance to a building, structure, and/or home, an environment associated with the location includes a second set of conditions (such as a second set of weather conditions, obstructions, traffic, and/or an amount of people in the environment), a user of the platform is in a second state (such as the user is viewing content on a display of the platform and/or on an external device associated with the user and/or the user is paying attention to the surroundings and/or environment of the platform), a second set of safety conditions associated with a user of the platform, a second set of user preferences of a user of the platform (such as a preferred height of the platform, a preferred opening speed of a closure of the platform, and/or a preferred closure to open), a second set of accessibility settings associated with a user of the platform (such as the user being in a wheelchair and/or the user having trouble walking, sitting up, and/or sitting down), a user associated with the platform is approaching the platform at a second speed, a second distance, and/or a second angle, the location is a second type of location, a schedule of a user associated with the platform includes second information, and/or the platform is within the predetermined distance of the location at a second time of a day and/or a second day of the week), different from the first set of one or more criteria, causing the one or more closures (e.g., 204 and/or 2616) of the platform (e.g., 150 and/or 200) to open with a second opening profile (e.g., 2602, 2606, 2610, and/or 2614) (e.g., opening the one or more closures at a second speed, a second rate, and/or a second velocity, opening a second closure of the one or more closures, opening the one or more closures in a second direction, and/or opening the one or more closures to a second position), different from the first opening profile (e.g., 2602, 2606, 2610, and/or 2614).

In some embodiments, the set of one or more criteria (e.g., the first set of one or more criteria and/or the second set of one or more criteria) is based on one or more factors selected from the group consisting of: a condition of an environment (e.g., 2600, 2604, 2608, and/or 2612), a state of a person (e.g., 202) (e.g., a person in the platform and/or a person that the platform is scheduled to pick up), safety of a person (e.g., 202) (e.g., a person in the platform and/or a person that the platform is scheduled to pick up), a user preference (e.g., of a person in the platform and/or a person that the platform is scheduled to pick up), and an ability to access the platform (e.g., an ability to exit the platform and/or an ability to enter the platform).

In some embodiments, the environment includes a physical environment in which the platform is located, an environment within a threshold distance of the platform, an environment in a direction relative to the platform (such as in front of the platform, to a side of the platform, and/or behind the platform), and/or an environment surrounding the platform. In some embodiments, conditions of an environment include weather conditions (e.g., current weather conditions and/or forecasted weather conditions), an urban environment, a rural environment, a number of people (e.g., within a threshold distance of the platform), a density of people (e.g., within a threshold distance of the platform), a distance from a curb, a number of vehicles (e.g., within a threshold distance of the platform), a density of vehicles (e.g., within a threshold distance of the platform), an existence of an object (e.g., within a threshold distance of the platform), a number of objects (e.g., within a threshold distance of the platform), a density of objects (e.g., within a threshold distance of the platform), type (e.g., animal, person, vehicle, pole, static, and/or dynamic) of one or more objects (e.g., within a threshold distance of the platform), and/or a distance of one or more objects.

In some embodiments, the state of the person includes sitting, standing, awake, asleep, talking, not talking, on a call, walking, stationary, a position of the person, a velocity of the person, an acceleration of the person, orientation of the person, a posture of the person, a gesture by the person, an awareness state of the person, a gaze of the person, and/or an activity the person is performing.

In some embodiments, the safety of the person is based on a state of the person and/or a potential opening profile (e.g., a level of safety for a particular opening profile or a level of risk to the person associated with a particular opening profile). In some embodiments, a level of safety or level of risk is determined for a potential opening profile and, if the level of safety does not satisfy a threshold level of safety (e.g., is not safe enough) or the level of risk does not satisfy a threshold level of risk (e.g., is too risky), then a different opening profile is used.

In some embodiments, the user preference is a preference and/or setting selected and/or designated by the user. In some embodiments, the user preference includes a personality setting or an attitude setting for the platform (e.g., happy, sad, mellow, relaxed, rushed, and/or urgent).

In some embodiments, an ability to access the platform includes an amount of time needed to enter and/or exit the platform, an amount of space needed to enter and/or exit the platform, and/or an object used to enter and/or exit the platform such as a ramp, stairs, and/or railing of the platform and/or a ramp, stairs, and/or railing external to the platform. In some embodiments, the ability to access the platform is based on a person (e.g., a person in the platform and/or a person that the platform is scheduled to pick up).

In some embodiments, the opening profile is selected and/or determined based on a condition of the environment, a state of a person, safety of a person, a user preference, and/or an ability to access the platform.

In some embodiments, the ability to access the platform (e.g., 150 and/or 200) includes deploying (e.g., putting down and/or raising) a ramp (e.g., of the platform).

In some embodiments, the first opening profile (e.g., 2602, 2606, 2610, and/or 2614) includes opening (e.g., moving from a closed position to an open position and/or a partially open position) a first closure (e.g., 204) (e.g., a first door, trunk, hatch, and/or entry of the platform) without opening (e.g., forgoing moving from a closed position to an open position and/or a partially open position and/or maintaining in the closed position) a second closure (e.g., 2616) (e.g., a second door, trunk, hatch, and/or entry of the platform) that is different from the first closure (e.g., 204) and the second opening profile (e.g., 2602, 2606, 2610, and/or 2614) includes opening (e.g., moving from a closed position to an open position and/or a partially open position) the second closure (e.g., 216) without opening (e.g., forgoing moving from a closed position to an open position and/or a partially open position and/or maintaining in the closed position) the first closure (e.g., 204).

In some embodiments, the first set of one or more criteria is based on one or more first factors selected from the group consisting of: a first obstruction (e.g., a first physical object, fixture, entity, and/or article that is positioned within an environment associated with the location) positioned within a predetermined distance (e.g., within 10 feet, within 5 feet, and/or within 1 foot) of the second closure (e.g., 2616) (e.g., the first obstruction blocks, limits, and/or restricts an ability of a person to enter and/or exit an interior portion of the platform via the second closure), a first curb height (e.g., a first height of a step, platform, and surface at which a person associated with the platform is estimated, predicted, and/or determined to use (such as step onto) when entering and/or exiting an interior portion of the platform) relative to the first closure (e.g., 204) (e.g., relative to a height of the first closure), and a location of the platform (e.g., 150 and/or 200) (e.g., whether the platform is parked and/or stopped proximate to a sidewalk and/or walkway that is closer to the first closure as compared to the second closure). In some embodiments, the second set of one or more criteria is based on one or more second factors selected from the group consisting of: a second obstruction (e.g., a second physical object, fixture, entity, and/or article that is positioned within an environment associated with the location) positioned within a predetermined distance (e.g., within 10 feet, within 5 feet, and/or within 1 foot) of the first closure (e.g., 204) (e.g., the second obstruction blocks, limits, and/or restricts an ability of a person to enter and/or exit an interior portion of the platform via the first closure), a second curb height (e.g., a second height of a step, platform, and surface at which a person associated with the platform is estimated, predicted, and/or determined to use (such as step onto) when entering and/or exiting an interior portion of the platform) relative to the second closure (e.g., 2616) (e.g., relative to a height of the first closure), and the location of the platform (e.g., 150 and/or 200) (e.g., whether the platform is parked and/or stopped proximate to a sidewalk and/or walkway that is closer to the second closure as compared to the first closure).

In some embodiments, the opening profile (e.g., 2602, 2606, 2610, and/or 2614) (e.g., the first opening profile and/or the second opening profile) includes opening a third closure (e.g., 204 and/or 2616) (e.g., a third door, trunk, hatch, and/or entry of the platform) of the one or more closures (e.g., 204 and/or 2616) at a first velocity (e.g., a vector that includes a speed and a direction) that is based on a speed profile (e.g., a current speed, velocity, and/or acceleration at which the platform is moving) of the platform (e.g., 150 and/or 200).

In some embodiments, the first velocity includes a first magnitude (e.g., a first speed) and a first direction (e.g., a direction at which the third closure is moved at a first speed associated with the first velocity) and the speed profile of the platform (e.g., 150 and/or 200) includes a second velocity (e.g., a vector that includes a speed and a direction) that includes the first magnitude and a second direction (e.g., a direction at which the platform is moving at a speed that is associated with the second velocity) that is opposite the first direction (e.g., the second direction is in the opposite direction as the first direction along a first axis).

In some embodiments, the opening profile (e.g., 2602, 2606, 2610, and/or 2614) (e.g., the first opening profile and/or the second opening profile) includes a variable speed profile (e.g., an opening of a closure of the one or more closures that includes a sequence of different speeds at which the closure moves toward an open position) that is based on a deceleration of the platform (e.g., 150 and/or 200) (e.g., a slowing of the platform as the platform comes to a stop and/or ceases moving at the location). In some embodiments, the variable speed profile includes opening a closure of the one or more closures at a first speed, increasing the speed at which the closure is opening to a second speed, greater than the first speed, and reducing the speed at which the closure is opening to a third speed, less than the second speed. In some embodiments, the variable speed profile includes multiple speeds that are based on one or more speeds of the platform as the platform decelerates to stop at the location.

In some embodiments, the opening profile (e.g., 2602, 2606, 2610, and/or 2614) (e.g., the first opening profile and/or the second opening profile) is based on one or more environmental conditions (e.g., conditions in environments 2600, 2604, 2608, and/or 2612) (e.g., conditions within an environment that is associated with the location, such as weather, type of location, distance to a structure and/or point of interest, obstructions, traffic conditions, and/or an amount of people present in the environment). In some embodiments, a speed at which a closure is opened, which closure of the one or more closures is opened, and/or a position at which a closure is opened is based on the one or more environmental conditions.

In some embodiments, the one or more environmental conditions include weather conditions (e.g., a position of the sun, an amount of cloud coverage, an estimated and/or determined amount of precipitation, a temperature, an amount of wind, and/or an amount of humidity). In some embodiments, the one or more closures are opened once the vehicle has come to a complete stop at the location when the weather conditions include precipitation. In some embodiments, the one or more closures are opened (or partially opened) prior to the vehicle coming to a complete stop at the location when the weather conditions do not include precipitation, but do include a mild temperature (such as between 65° and 80° Fahrenheit).

In some embodiments, the one or more environmental conditions include a distance between the platform (e.g., 150 and/or 200) and a predetermined location (e.g., a door of a structure at which a person is estimated, predicted, and/or determined to enter and/or exit and/or a point of interest at which a person is estimated, predicted, and/or determined to move toward and/or away from). In some embodiments, when the distance between the platform and the predetermined location is greater and a person is determined to be entering an interior portion of the platform, the one or more closures are opened at a later time. In some embodiments, when the distance between the platform and the predetermined location is reduced and a person is determined to be entering an interior portion of the platform, the one or more closures are opened at an earlier time.

In some embodiments, the one or more environmental conditions include one or more obstructions (e.g., one or more physical objects, fixtures, entities, and/or articles that are positioned within the environment associated with the location) within an environment (e.g., 2600, 2604, 2608, and/or 2612) associated with the location. In some embodiments, a first closure is opened when the environment associated with the location includes an obstruction blocking, restricting, and/or limiting access to a second closure. In some embodiments, the second closure is opened when the environment associated with the location includes an obstruction blocking, restricting, and/or limiting access to the first closure.

In some embodiments, the opening profile (e.g., 2602, 2606, 2610, and/or 2614) (e.g., the first opening profile and/or the second opening profile) includes a first speed (e.g., a first speed at which the one or more closures are opened, where the first speed varies based on the distance between the platform and the person associated with the platform) that is based on (e.g., varies based on) a distance between the platform (e.g., 150 and/or 200) and a person (e.g., 202) associated with the platform (e.g., 150 and/or 200) (e.g., a person that is estimated, predicted, and/or determined to enter an interior portion of the platform while the platform is at the location). In some embodiments, when the distance between the platform and the person increases, the first speed decreases. In some embodiments, when the distance between the platform and the person decreases, the first speed increases.

In some embodiments, the opening profile (e.g., 2602, 2606, 2610, and/or 2614) (e.g., the first opening profile and/or the second opening profile) includes a second speed (e.g., a second speed at which the one or more closures are opened, where the second speed varies based on a third speed of a person associated with the platform) that is based on (e.g., varies based on) a third speed of a person (e.g., 202) associated with the platform (e.g., 150 and/or 200) (e.g., the person associated with the platform is moving (such as walking, running, and/or otherwise moving) toward the platform at the third speed). In some embodiments, when the third speed of the person increases, the second speed increases. In some embodiments, when the third speed of the person decreases, the second speed decreases.

In some embodiments, the opening profile (e.g., 2602, 2606, 2610, and/or 2614) (e.g., the first opening profile and/or the second opening profile) includes a fourth speed (e.g., a fourth speed at which the one or more closures are opened, where the fourth speed varies based on one or more third factors) that is based on (e.g., varies based on) one or more third factors (e.g., an angle at which a person associated with the platform is approaching the platform, a walking speed of the person associated with the platform, a distance between the person associated with the platform and the platform, a time of day, a location, a schedule of the person associated with the platform, an amount of people positioned in an environment associated with the location, and/or a gaze of the person associated with the platform).

In some embodiments, the one or more third factors include an angle (e.g., an angle formed between a first axis along which a person is moving toward the platform and a second axis along which the platform is moving and/or is configured to move) formed between a person (e.g., 202) (e.g., a rider, a user, and/or a passenger) approaching the platform (e.g., 150 and/or 200) (e.g., movement of the person toward the platform along the first axis) and the platform (e.g., 150 and/or 200) (e.g., the platform is moving and/or configured to move along the second axis). In some embodiments, the fourth speed increases as the angle formed between the person approaching the platform and the platform decreases (e.g., the person is moving toward the platform in a more direct trajectory). In some embodiments, the fourth speed decreases as the angle formed between the person approaching the platform and the platform increases (e.g., the person is moving toward the platform in a less direct trajectory).

In some embodiments, the one or more third factors include a fifth speed of a person (e.g., 202) associated with the platform (e.g., 150 and/or 200) (e.g., the person associated with the platform is moving (such as walking, running, and/or otherwise moving) toward the platform at the third speed). In some embodiments, when the fifth speed of the person increases, the fourth speed increases. In some embodiments, when the fifth speed of the person decreases, the fourth speed decreases.

In some embodiments, the one or more third factors include a distance between the platform (e.g., 150 and/or 200) and a person (e.g., 202) associated with the platform (e.g., 150 and/or 200) (e.g., a person that is estimated, predicted, and/or determined to enter an interior portion of the platform while the platform is at the location). In some embodiments, when the distance between the platform and the person increases, the fourth speed decreases. In some embodiments, when the distance between the platform and the person decreases, the fourth speed increases.

In some embodiments, the one or more third factors include a time of day (e.g., a current time of day at which the platform is detected to be within the predetermined distance of the location). In some embodiments, when the time of day indicates that a person associated with the platform is in a hurry, the fourth speed increases. In some embodiments, when time of day indicates that the person associated with the platform is not in a hurry, the fourth speed decreases.

In some embodiments, the one or more third factors include a type of location (e.g., a business, a commercial establishment, an office, a home, a residence, a park, a gym, and/or a restaurant) of the location. In some embodiments, when the location is an office and/or a business, the fourth speed increases because a person associated with the platform is estimated, predicted, and/or determined to be in a hurry. In some embodiments, when the location is a residence of the person associated with the platform, the fourth speed decreases because the person associated with the platform is not estimated, predicted, and/or determined to be in a hurry.

In some embodiments, the one or more third factors include a schedule (e.g., information that includes a calendar, timing and/or locations of meetings, and/or timing and/or locations of events) of a person (e.g., 202) (e.g., a rider, a user, and/or a passenger) associated with the platform (e.g., 150 and/or 200). In some embodiments, when the schedule of the person associated with the platform indicates that the person is in a hurry, the fourth speed increases. In some embodiments, when the schedule of the person associated with the platform indicates that the person is not in a hurry, the fourth speed decreases.

In some embodiments, the one or more third factors include a number of people (e.g., a number of pedestrians and/or a number of people gathered, walking, moving, and/or otherwise located within a predetermined distance of the location) positioned in an environment (e.g., 2600, 2604, 2608, and/or 2612) (e.g., an area, a space, and/or a zone that includes the location and/or a location at which the platform comes to a stop, where the area, the space, and/or the zone includes people, objects, obstructions, fixtures, and/or buildings) associated with the location. In some embodiments, when the number of people positioned in the environment associated with the location increases, the fourth speed increases so that people that are not associated with the platform have less time to inadvertently enter an interior portion of the platform. In some embodiments, when the number of people positioned in the environment associated with the location decreases, the fourth speed decreases because it is less likely that a person that is not associated with the platform will inadvertently enter an interior portion of the platform.

In some embodiments, the one or more third factors include a gaze (e.g., a direction of a gaze and/or a focus position of a gaze) of a person (e.g., 202) (e.g., a rider, a user, and/or a passenger) associated with the platform (e.g., 150 and/or 200). In some embodiments, the gaze of the person is determined based on a position (e.g., location and/or orientation) of one or more eyes of the person, a head of the person, shoulders of the person, one or more arms of the person, and/or a torso of the person. In some embodiments, the fourth speed is based on whether or not a gaze of the person is directed to (e.g., toward or on) the platform (e.g., whether or not the person is looking at the platform). For example, in some embodiments, the fourth speed is faster if the person is looking at the platform than if the person is not looking at the platform because looking at the platform can indicate that the person is ready and/or preparing to enter an interior portion of the platform. For example, in some embodiments, the fourth speed is slower if the person is not looking at the platform than if the user is looking at the platform because not looking at the platform can indicate that the person is not paying attention and/or otherwise prepared to enter an interior portion of the platform.

Existing platforms do not have the capability to automatically prepare a the next trip and further are not able to intelligently adjust how the platform prepares based on the departing passenger and/or the environment outside the platform.

Thus, there is need for a platform, such as a vehicle, that can intelligently adjust components of the platform based on a passenger's distance from the platform as well as other factors of the environment outside of the platform. For example, the platform may open or close an opening, dim or turn off a light, increase a tint of a window, or increase the air conditioner when a passenger exits the platform, and perform these adjustments more quickly or slowly when the weather outside of the platform requires it. Thus, when a passenger leaves the platform when the weather outside is pleasant, the platform may close the door more slowly, maintain that output of the air conditioner, and keep the tint of the window moderate while when the passenger leaves when the weather outside is sunny and hot the platform may close the door more quickly, increase the output of the air condition, and increase the tint of the window.

Figure 28A:
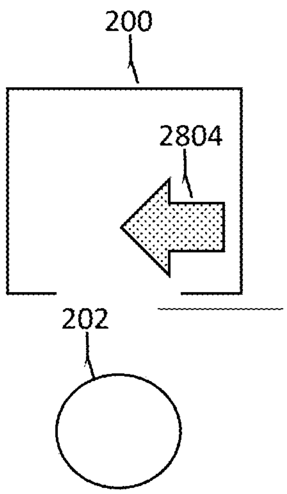
FIGS. 28A-28C illustrate examples of a platform adjusting components during user departure, in accordance with some embodiments.
Figure 28B:
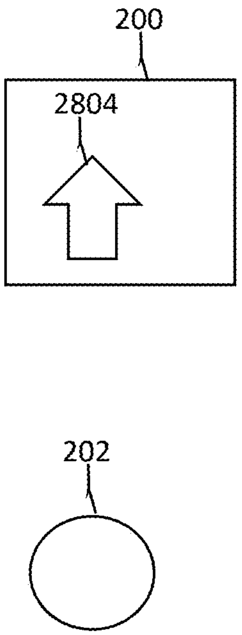

Turning now to the drawings, FIG. 28A illustrates passenger 202 departing from platform 200. As passenger 202 moves away from platform 200, platform 200 detects the distance of passenger 202 from platform 200. Once the distance of passenger 202 from platform 200 exceeds a threshold, platform 200 adjusts component 2804. Thus, once passenger 202 moves further away from platform 200, platform 200 will adjust the position and/or state of component 2804, as shown in FIG. 28B.

Exemplary adjustments of components 2804 include activating (e.g., opening or closing) an opening such as a door, hood, roof, and/or window, activating (e.g., turning on or off, dimming, and/or brightening) a light, increasing or decreasing the tint of a window, increasing or decreasing a haze level of a window, and increasing or decreasing the output of the heater, air conditioner, and/or fan. Accordingly, once passenger 202 has moved away from platform 200, platform 200 may perform one or more of the adjustments above. For example, as shown in FIG. 28B, platform 200 changes the position of component 2804 (e.g., a fan) and changes the state of component 2804 (e.g., the fan) from on to off once passenger 202 has moved past the threshold distance.

In some embodiments, while passenger 202 moves away from platform 200, platform 200 maintains output of content from a speaker of the platform. For example, while passenger 202 moves away from platform 200, platform 200 continues to play music from a speaker of platform 200. In some embodiments, this output continues while platform 200 adjusts one or more of the components discussed above. For example, while platform 200 closes a door, increases the tint of a window, and decreases the output of an air conditioner, platform 200 continues to provide the music through a speaker.

Figure 28C:
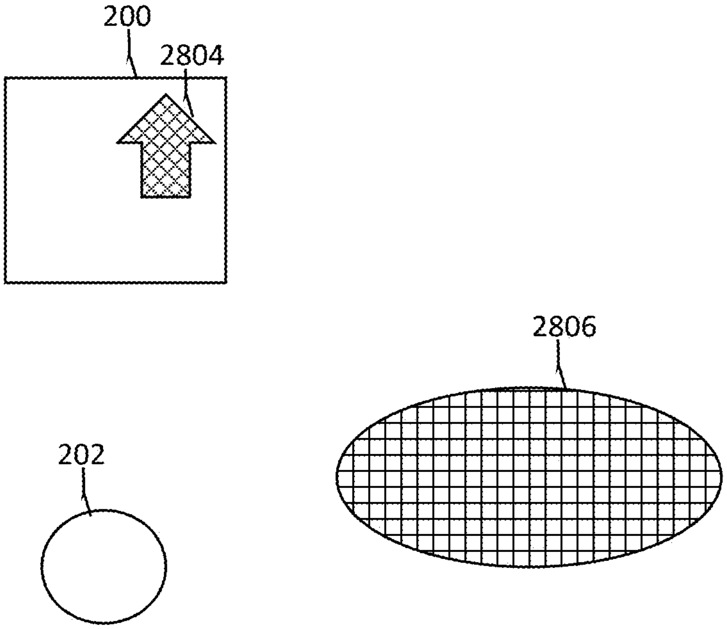

At FIG. 28C, platform 200 detects environmental condition 2806 and varies the threshold distance that passenger 202 cross prior to platform 200 adjusting component 2804. Exemplary conditions of the environment include the weather outside of the platform, the distance from the platform to a destination location, obstructions outside of the platform, the time of day, and/or the number of people detected outside of the platform. For example, when platform 200 detects inclement weather such as rain or snow outside of platform 200, the threshold distance is decreased such that platform 200 will adjust components when passenger 202 is closer to platform 200 than when the weather is nice. As another example, when platform 200 is very close to a door of the destination location or an obstruction such as a light pole or curb, the threshold distance is increased such that platform 200 will adjust components when passenger 202 is further way from platform 200, allowing passenger 202 greater flexibility to move around obstructions or towards the destination.

In some embodiments, the threshold distance that passenger 202 crosses prior to platform 200 adjusting components varies based on the state of the user, the level of user safety, user preferences, user accessibility, and/or user gaze. For example, platform 200 can detect a walking speed of passenger 202 and an angle of passenger 202 to determine that passenger 202 is moving slowly at a shallow angle away from platform 200 and thus, it will take passenger 202 a longer time to move away from platform 200. Thus, platform 200 may adjust the threshold distance to be lower when platform 200 determines the components should be adjusted more quickly and adjust the threshold distance to be higher when the platform 200 determines that the components should be adjust more slowly. In particular, when inclement weather is detected platform 200 can determine that components should be adjusted quickly, even when the user is walking slowly and moving at a shallow angle and thus may lower the threshold distance.

As another example, platform 200 can determine that passenger 202 requires accessibility considerations because passenger 202 requires a wheelchair and that passenger 202 moving away from platform 200 at a steep angle would be unsafe. Accordingly, platform 200 can adjust the threshold distance higher so that the components adjust more slowly as passenger 202 moves away from platform 200 to encourage passenger 202 to move slowly and carefully and avoid any possible mishaps. As another example, platform 200 can determine that passenger 202 prefers for platform 200 to act with an aggressive personality and that passenger 202 looks back at platform 200 several times while passenger 202 walks away quickly. Accordingly, platform 200 can lower the threshold distance so that component 2804 is adjusted more quickly to match passenger 202's preference for aggressive personality and actions.

As another example, platform 200 can determine that the time of day is night and that based on passenger 202's schedule they are heading into a work building. Accordingly, platform 200 can adjust the threshold distance higher so that components such as a door of platform 200 remain open and a light of platform 200 remain on to provide passenger 202 with adequate light to help passenger 202 find a safe path from platform 200 to the door of the work building.

In some embodiments, adjusting the components or settings of platform 200 is based on a user preference of passenger 202. For example, passenger 202 may indicate that passenger 202 does not wish for the tint of the windows of platform 200 to be adjusted. Accordingly, platform 200 refrains from adjusting the tint of the windows when passenger 202 departs platform 200.

Figure 29:
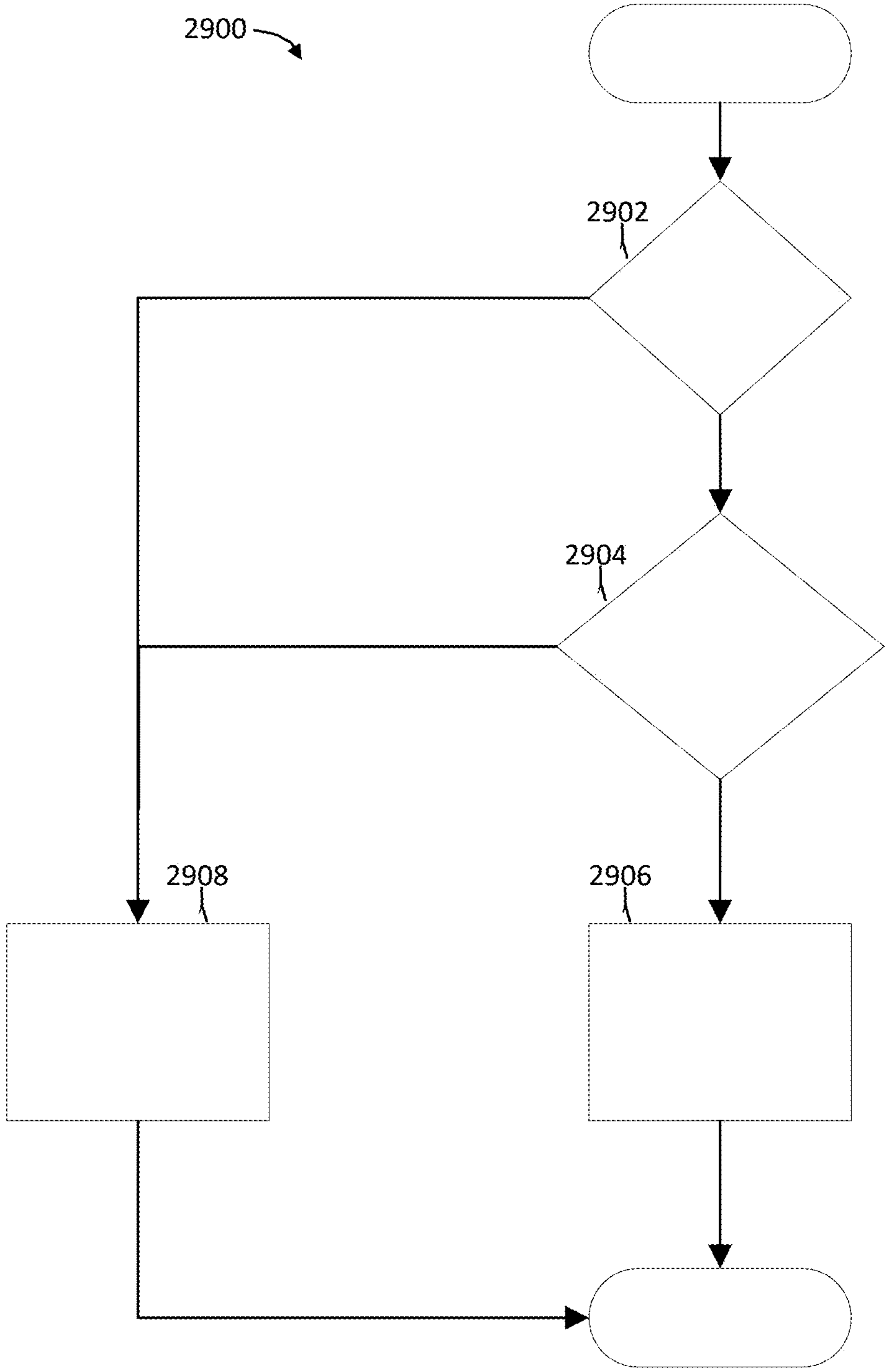
FIG. 29 is a flow diagram illustrating methods for a platform adjusting components during user departure, in accordance with some embodiments.

FIG. 29 is a flow diagram illustrating method 2900 that can be performed by platform 200 and/or a computer system of platform 200. At block 2902, platform 200 and/or a computer system of platform 200 determines whether passenger 202 (e.g., the user) is moving away from platform 200. When passenger 202 is not moving away from platform 200, the settings of platform 200 are not adjusted, as shown in block 2908. When passenger 202 is moving away from platform 200, platform 200 and/or a computer system of platform 200 determines whether passenger 202 is a predetermined distance away from platform 200, as shown at block 2904.

When passenger 202 is not a predetermined distance away from platform 200, the settings of platform 200 are not adjusted, as shown in block 29008. When passenger 202 is a predetermined distance away from platform 200, the settings of platform 200 are adjusted, as shown in block 2906. Accordingly, platform 200 and/or a computer system of platform 200 can intelligently determine when passenger 202 is moving away from platform 200 and adjust the components of platform 200 accordingly.

A system (e.g., 100 and/or 152) associated with the platform (e.g., 150 and/or 200) is configured to perform a method in affordance with some embodiments. The system after a user (e.g., 202) (e.g., a person, a rider, and/or a passenger) has disembarked (e.g., left and/or exited) a platform (e.g., platform 150) (e.g., a mobile platform, a physical platform, a virtual platform, and/or a vehicle) (or, in some embodiments, in response to detecting that a person has disembarked the platform): detecting a state (e.g., location, distance, direction, velocity, speed, and/or acceleration) of the user relative to the platform (e.g., detecting a user that is leaving the platform); in response to detecting the state of the user: in accordance with a determination that the state of the user meets a set of adjustment criteria, the set of adjustment criteria including a criterion that is met when a distance of the user relative to the platform satisfies (e.g., is equal to, greater than, less than, greater than or equal to, or less than or equal to) a threshold distance (e.g., a threshold distance from the vehicle), adjusting one or more settings of the platform (e.g., automatically adjust the setting of the vehicle without further input from the user); and in accordance with a determination that the state of the user does not meet the set of adjustment criteria, forgoing adjusting the one or more settings of the platform.

In some embodiments, detecting the state of the user (e.g., 202) is performed in response to detecting a door of the platform (e.g., 150 and/or 200) opening. In some embodiments, detecting the state of the user is performed in response to detecting a change in a state of the interior of the platform (e.g., detecting movement with a proximity sensor and/or a camera). In some embodiments, the platform detects multiple disembarking users. In some embodiments, detecting the state of the user relative to the platform is based on data and/or a signal detected by one or more sensors (e.g., one or more sensors including a camera and/or a proximity sensor);

In some embodiments, the threshold distance is based on a vector of the user (e.g., 202) (e.g., a position vector between the platform and the user and/or a velocity vector of the user). In some embodiments, the threshold distance is based on a speed of the user. In some embodiments, the threshold distance is based on a vector and a speed of the user. In some embodiments, the set of adjustment criteria is based on a determination of a plurality of user distances corresponding to a plurality of detected users. In some embodiments, in accordance with a determination that the plurality of detected states of the plurality of users meet the set of adjustment criteria, one or more settings of the platform are adjusted (e.g., automatically). In some embodiments, the threshold distance is based on one or more factors (e.g., conditions of environment, state of user, user preferences, vehicle settings, weather, time of day, rider gaze, number of users, and/or schedule (of the platform and/or the user)).

In some embodiments, the threshold distance is based on a vector of the user (e.g., 202) (e.g., a position vector between the platform and the user and/or a velocity vector of the user). In some embodiments, the threshold distance is based on a speed of the user. In some embodiments, the threshold distance is based on a vector and a speed of the user. In some embodiments, the set of adjustment criteria is based on a determination of a plurality of user distances corresponding to a plurality of detected users. In some embodiments, in accordance with a determination that the plurality of detected states of the plurality of users meet the set of adjustment criteria, one or more settings of the platform are adjusted (e.g., automatically). In some embodiments, the threshold distance is based on one or more factors (e.g., conditions of environment, state of user, user preferences, vehicle settings, weather, time of day, rider gaze, number of users, and/or schedule (of the platform and/or the user)).

In some embodiments, in accordance with a determination that the state of the user (e.g., 202) does not meet the set of adjustment criteria, the platform determines whether user distance is decreasing and, in accordance with a determination that user distance is decreasing, a setting of the platform is adjusted (e.g., a setting is adjusted to the user preference as the user returns to the vehicle). In some embodiments, in accordance with a determination that the state of the user meets the set of adjustment criteria, the platform detects (or, in some embodiments, receives) an indication that the user is returning to the platform (e.g., the user indicates they still the need the platform). In some embodiments, in response to detecting the indication that the user is returning to the platform, the setting of the platform is adjusted. In some embodiments, adjusting the setting of the platform includes returning the setting to a previous state. In some embodiments, adjusting the setting of the platform includes adjusting the setting to a default state. In some embodiments, a default state is determined based on a user preference.

In some embodiments, adjusting one or more settings of the platform (e.g., 150 and/or 200) includes performing an action selected from a group consisting of: activating (e.g., opening and/or closing) a closure (e.g., a door, trunk, hood, roof, and/or window) of the platform; adjusting (e.g., activating, turning on, turning off, dimming, decreasing a brightness of, brightening, and/or increasing a brightness of) a lighting element (e.g., an exterior lighting element and/or an interior lighting element) of the platform; adjusting (e.g., increasing or decreasing) a tint (e.g., opacity) of a window of the platform (e.g., causing the window to be more or less opaque); adjusting (e.g., increasing or decreasing) a haze level (e.g., diffusion level) of a window of the platform; and adjusting a climate control (e.g., heater, air conditioner, and/or fan) of the platform.

In some embodiments, the system (e.g., 100 and/or 152) in response to detecting the state of the user (e.g., 202): in accordance with a determination that the state of the user meets the set of adjustment criteria, maintaining (e.g., continuing) output (e.g., display, audio output, and/or haptic output) of content (e.g., audio content, such as music, a song, a phone call, an audio call, and/or a podcast, video content, such as a video, movie, and/or show, and/or displayed content, such as a graphical user interface that includes information about the platform, information about a trip, weather information, and/or calendar information) by the platform (e.g., on an internal display or monitor and/or by an internal speaker). In some embodiments, the platform continues to output content that is being output at the time the user disembarks the platform (e.g., in case the user decides to return to the platform) after the set of adjustment criteria is met and other settings of the platform are adjusted.

In some embodiment, the threshold distance is based on one or more factors (e.g., conditions, circumstances, and/or scenarios). In some embodiments, the threshold distance is dynamic (e.g., changes over time) and/or has different values under different conditions. In some embodiments, in accordance with a determination that the one or more factors have a first state (e.g., a first value or a first set of values), the threshold distance is (e.g., is set to) a first distance; and in accordance with a determination that the one or more factors have a second state (e.g., a second value or a second set of values) that is different from the first state, the threshold distance is (e.g., is set to) a second distance that is different from (e.g., greater than or less than) the first distance.

In some embodiments, the threshold distance is based on one or more conditions of an environment (e.g., the physical environment outside, within a threshold distance of, and/or surrounding the platform). In some embodiments, conditions of an environment include weather conditions (e.g., current weather conditions and/or forecasted weather conditions), an urban environment, a rural environment, a number of people (e.g., within a threshold distance of the platform), a density of people (e.g., within a threshold distance of the platform), a distance from a curb, a number of vehicles (e.g., within a threshold distance of the platform), a density of vehicles (e.g., within a threshold distance of the platform), an existence of an object (e.g., within a threshold distance of the platform), a number of objects (e.g., within a threshold distance of the platform), a density of objects (e.g., within a threshold distance of the platform), type (e.g., animal, person, vehicle, pole, static, and/or dynamic) of one or more objects (e.g., within a threshold distance of the platform), and/or a distance of one or more objects. In some embodiments, in accordance with a determination that a first set of one or more conditions exist, the threshold distance is (e.g., is set to) a first distance; and in accordance with a determination that a second set of one or more conditions exist that is different from the first set of one or more conditions, the threshold distance is (e.g., is set to) a second distance that is different from the first distance.

In some embodiments, the threshold distance is based on a state (e.g., location, distance, direction, velocity, speed, and/or acceleration) of the user (e.g., 202). In some embodiments, in accordance with a determination that the user is in a first state, the threshold distance is (e.g., is set to) a first distance; and in accordance with a determination that the user is in a second state that is different from the first state, the threshold distance is (e.g., is set to) a second distance that is different from the first distance.

In some embodiments, the threshold distance is based on a determination of a level of safety of the user (e.g., 202) (or, in some embodiments, a determination of a level of risk to the user). In some embodiments, in accordance with a determination of a first level of safety, the threshold distance is (e.g., is set to) a first distance; and in accordance with a determination of a second level of safety that is different from the first level of safety (e.g., the user is more safe or less safe), the threshold distance is (e.g., is set to) a second distance that is different from (e.g., greater than or less than) the first distance. In some embodiments, the level of safety of the user is determined based on, e.g., a proximity, trajectory, and/or velocity of a vehicle. In some embodiments, the level of safety of the user is determined based on, e.g., a time of day (e.g., the threshold distance can be different during daylight hours than during nighttime hours.

In some embodiments, the threshold distance is based on a user preference (e.g., a preference and/or setting selected and/or designated by the user). In some embodiments, the user preference includes a personality setting or an attitude setting for the platform (e.g., happy, sad, mellow, relaxed, rushed, and/or urgent). In some embodiments, in accordance with a determination of a first user preference (e.g., that the user preference has a first state or first value), the threshold distance is (e.g., is set to) a first distance; and in accordance with a determination of a second user preference (e.g., that the user preference has a second state or second value) that is different from the first user preference, the threshold distance is (e.g., is set to) a second distance that is different from (e.g., greater than or less than) the first distance. For example, in accordance with a determination that the user has selected an urgent setting for the platform, a door of the platform is closed more quickly and when the user is closer to the platform (e.g., the threshold distance is shorter) than when the user has selected a relaxed setting for the platform.

In some embodiments, the threshold distance is based on an ability to disembark the platform (e.g., 150 and/or 200) (e.g., an amount of time needed to disembark, an amount of space needed to disembark, and/or an object used to disembark such as a ramp, stairs, and/or railing of the platform and/or a ramp, stairs, and/or railing external to the platform). In some embodiments, in accordance with a determination of a first ability to disembark the platform, the threshold distance is (e.g., is set to) a first distance; and in accordance with a determination of a second ability to disembark the platform that is different from the first ability to disembark the platform, the threshold distance is (e.g., is set to) a second distance that is different from (e.g., greater than or less than) the first distance.

In some embodiments, the threshold distance is based on a weather condition (e.g., a current weather condition, a forecasted weather condition, a weather condition at a location of the platform, temperature, precipitation, humidity level, sunny, cloudy, lighting, raining, snowing, and/or hailing). In some embodiments, in accordance with a determination of a first weather condition, the threshold distance is (e.g., is set to) a first distance; and in accordance with a determination of a second weather condition that is different from the first weather condition, the threshold distance is (e.g., is set to) a second distance that is different from (e.g., greater than or less than) the first distance. For example, in some embodiments, the threshold distance is shorter when there is rain than when there is no rain such that a door of the platform will close sooner when it is raining than when it is not raining.

In some embodiments, the threshold distance is based on a distance (e.g., from the user or the platform) to a destination location (e.g., a street, a corner, a building, an event, a park, a destination address, a door or other entrance of a destination location, and/or a point of interest). In some embodiments, the user disembarks at a location (e.g., a drop off location) that is different from a destination location. In some embodiments, in accordance with a determination of a first distance to a destination location, the threshold distance is (e.g., is set to) a first distance; and in accordance with a determination of a second distance to the destination location that is different from the first distance to the destination location, the threshold distance is (e.g., is set to) a second distance that is different from (e.g., greater than or less than) the first distance.

In some embodiments, the threshold distance is based on (e.g., the presence or absence of) an obstruction (e.g., a curb, pole, building, wall, vehicle, and/or other object) in an environment (e.g., the physical environment outside, within a threshold distance of, and/or surrounding the platform). In some embodiments, the threshold distance is based on a type of obstruction (e.g., static, dynamic, permanent, and/or temporary). In some embodiments, the threshold distance is based on a distance (e.g., from the platform or the user) to the obstruction. In some embodiments, in accordance with a determination that an obstruction exists, the threshold distance is (e.g., is set to) a first distance; and in accordance with a determination that an obstruction does not exist (e.g., that there is no obstruction), the threshold distance is (e.g., is set to) a second distance that is different from (e.g., greater than or less than) the first distance. For example, in some embodiments, the threshold distance is longer when there is an obstruction so that the user has more time and/or space to navigate the obstruction before the platform departs or begins preparing to depart.

In some embodiments, the threshold distance is based on a direction (e.g., angle and/or orientation) of the user (e.g., 202) relative to the platform (e.g., 150 and/or 200). In some embodiments, the direction of the user relative to the platforms includes (e.g., is based on) a location of the user, a location of the platform, an orientation of the user, an orientation of the platform, direction of motion of the platform, and/or a direction of motion of the user. In some embodiments, in accordance with a determination of a first direction of the user relative to the platform, the threshold distance is (e.g., is set to) a first distance; and in accordance with a determination of a second direction of the user relative to the platform that is different from the first direction of the user relative to the platform, the threshold distance is (e.g., is set to) a second distance that is different from (e.g., greater than or less than) the first distance.

In some embodiments, the threshold distance is based on a speed (e.g., a walking speed, running speed, or bicycling speed) of the user (e.g., 202). In some embodiments, the speed of the user is determined based on a current speed of the user and/or a previous speed of the user (e.g., a speed at which the user typically moves). In some embodiments, in accordance with a determination of a first speed of the user, the threshold distance is (e.g., is set to) a first distance; and in accordance with a determination of a second speed of the user that is different from the first speed of the user, the threshold distance is (e.g., is set to) a second distance that is different from (e.g., greater than or less than) the first distance.

In some embodiments, the threshold distance is based on a time of day (e.g., an hour, minute, and/or second of the day, daytime (between sunrise and sunset at a location of the platform or user), nighttime (between sunset and sunrise at a location of the platform or user), dusk, dawn, sunrise, and/or sunset). In some embodiments, in accordance with a determination of a first time of day, the threshold distance is (e.g., is set to) a first distance; and in accordance with a determination of a second time of day that is different from the first time of day, the threshold distance is (e.g., is set to) a second distance that is different from (e.g., greater than or less than) the first distance.

In some embodiments, the threshold distance is based on a location (e.g., a location of the platform, a location of the user, a drop off location (such as, e.g., where the user disembarked), a destination location, and/or a type of location (such as, e.g., a rural location, an urban location, home, work, school, and/or an event)). In some embodiments, in accordance with a determination of a first location, the threshold distance is (e.g., is set to) a first distance; and in accordance with a determination of a second location that is different from the first location, the threshold distance is (e.g., is set to) a second distance that is different from (e.g., greater than or less than) the first distance.

In some embodiments, the threshold distance is based on a schedule (e.g., a schedule of the user, a schedule of the platform, and/or a schedule associated with a destination location). In some embodiments, the schedule is determined based on an event (e.g., a time and/or location of an event) in a calendar application of the user. In some embodiments, the schedule is based on prior behavior and/or a routine of the user (e.g., a time that the user typically arrives at work). In some embodiments, the schedule is determined based on a trip and/or activity planned for the platform to be performed after the user disembarked. In some embodiments, the schedule is based on a schedule (e.g., starting time and/or location) of an event at the destination location. In some embodiments, in accordance with a determination of a first schedule, the threshold distance is (e.g., is set to) a first distance; and in accordance with a determination of a second schedule that is different from the first schedule, the threshold distance is (e.g., is set to) a second distance that is different from (e.g., greater than or less than) the first distance.

In some embodiments, the threshold distance is based on a number of people detected exterior to the platform (e.g., 150 and/or 200) (e.g., outside of the platform, around the platform, and/or within a person-threshold distance of the platform). In some embodiments, in accordance with a determination of a first number of people, the threshold distance is (e.g., is set to) a first distance; and in accordance with a determination of a second number of people that is different from (e.g., greater than or less than) the first number of people, the threshold distance is (e.g., is set to) a second distance that is different from (e.g., greater than or less than) the first distance.

In some embodiments, the threshold distance is based on a gaze (e.g., eye gaze) of the user (e.g., 202) (e.g., a direction of a gaze and/or a focus position of a gaze). In some embodiments, the gaze of the user is determined based on a position (e.g., location and/or orientation) of one or more eyes of the user, a head of the user, shoulders of the user, one or more arms of the user, and/or a torso of the user. In some embodiments, the threshold distance is based on whether or not a gaze of the user is directed to (e.g., toward or on) the platform (e.g., whether or not the user is looking at the platform). For example, in some embodiments, the threshold distance is longer if the user is looking at the platform than if the user is not looking at the platform because looking at the platform can indicate that the user intends to re-enter the platform. For example, in some embodiments, the threshold distance is shorter if the user is looking at the platform than if the user is not looking at the platform because looking at the platform can indicate that the user is waiting for the platform to adjust settings (e.g., to depart and/or initiate a departure process). In some embodiments, in accordance with a determination of a first gaze of the user, the threshold distance is (e.g., is set to) a first distance; and in accordance with a determination of a second gaze of the user that is different from the first gaze of the user, the threshold distance is (e.g., is set to) a second distance that is different from (e.g., greater than or less than) the first distance.

In some embodiments, adjusting one or more settings of the platform includes adjusting one or more settings of the platform (e.g., 150 and/or 200) based on a user preference (e.g., a preference and/or setting selected and/or designated by the user). In some embodiments, a user (e.g., 202) can select which setting(s) are adjusted (and/or, optionally, which settings are not adjusted). In some embodiments, a user can select a state (e.g., on, off, and/or a value) for a setting (e.g., the user can select a state to which a setting is adjusted). In some embodiments, the user preference is selected via a user interface of a computer system, such as a personal device of the user (e.g., a smartphone, smartwatch, laptop computer, tablet computer, and/or desktop computer) and/or a computer system of the platform. In some embodiments, the user preference is selected via a user interface of an application that provides information about the platform (e.g., make, model, identification number, a current state of the platform, a location of the platform, a charge level of the platform, and/or a planned trip of the platform) and/or selectable controls for causing the platform to perform respective functions (e.g., turn on, turn off, move, pick up, drop off, and/or perform a trip).

Existing platforms do not provide passengers with continued directions to the passengers desired drop off location after the passenger leaves the platform.

Thus, there is a need for a platform, such as a vehicle, that can provide follow up directions after a passenger leaves the platform that will help the passenger reach their desired end location. For example, the platform can provide directions from the drop off location to the passengers desired location on a computer system (e.g., a cell phone, smart watch, tablet, and/or laptop) associated with the passenger. In some embodiments, the platform provides these directions when the passenger's drop off location is at an uncommon destination location and/or an uncommon drop off location. For example, when the passenger has been to the destination location only one or two times, the platform can determine that the destination location is uncommon and thus provide directions. Similarly, when the passenger has never been to the drop off location, the platform can determine that the drop off location is uncommon and provide directions.

In some embodiments, the platform provides these directions when the passenger's drop off location is far away from the destination location or is due to the inability of the platform to reach the destination location. For example, when the drop off location is far away from a preferred entry door of the user because the platform is impeded by another parked car, the platform can provide directions to the passenger. In some embodiments, providing the directions includes changing a mode of directions from a mode associated with the platform (e.g., driving) to a mode associated with the passenger (e.g., walking). In some embodiments, the instructions are based on a characteristic of the passenger including physical characteristics, capabilities, and/or an accessibility requirement of the passenger.

Figure 30A:
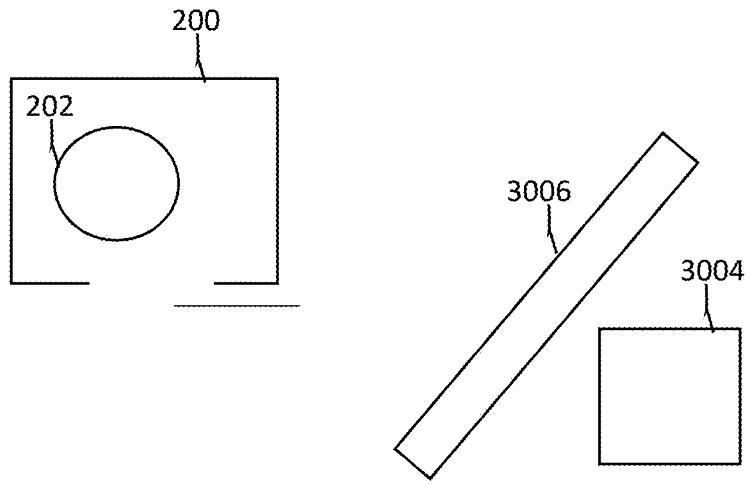
FIGS. 30A-30B illustrate examples of a platform providing instructions to a final destination, in accordance with some embodiments.
Figure 30B:
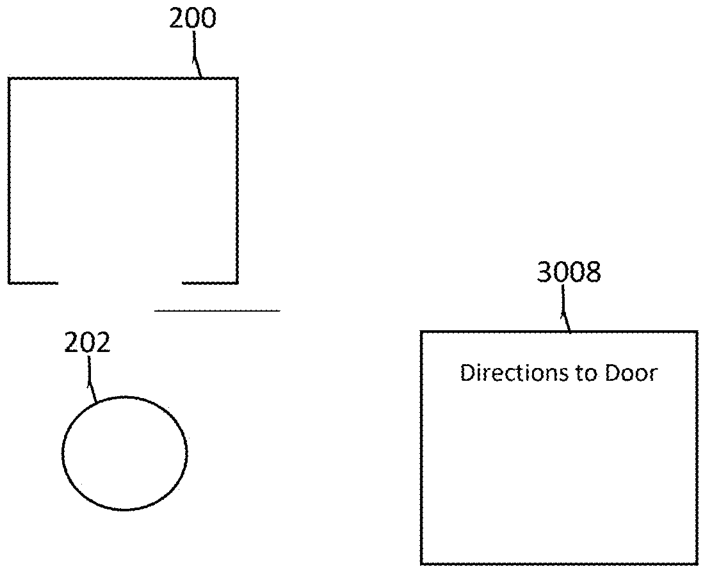

Turning now to the figures, FIG. 30A illustrates platform 200 arriving at a drop off point. Platform 200 cannot reach destination point 3004 requested by passenger 202 due to barrier 3006. Accordingly, platform 200 drops passenger 202 off at a drop off point as close to destination point 3004 as possible. When passenger 202 leaves platform 200, platform 200 determines that directions 3008 would help passenger 202 reach destination point 3004 and thus, provides directions 3008 on computer system 3010, as shown in FIG. 30B. As discussed above, in some embodiments platform 200 provides directions 3008 when the drop off point is unknown to passenger 202 or is a drop off point that passenger 202 has not been to often. Similarly, platform 200 provides directions 3008 when destination point 3004 is a destination that passenger 202 has not been to frequently.

In some embodiments, directions 3008 are provided on a display of computer system 3010. For example, step by step directions from the drop off point to the destination of passenger 202 can be displayed on computer system 3010 so that passenger 202 may view each step of the instructions. In some embodiments, directions 3008 are provided as an audio output from computer system 3010. For example, computer system 3010 may provide an audio output of the first step of directions 3008, followed by the next step of directions 3008 when the first step is completed.

In some embodiments, when destination point 3004 is a common destination point or when the drop off location is a common drop off location, platform 200 does not provide directions 3008. Thus, when passenger 202 has been to the drop off location and/or destination point 3004 several times previously, platform 200 does not provide directions 3008.

In some embodiments, directions 3008 are based on location information of platform 200. For example, platform 200 may determine the location of platform 200 through the use of a global positioning system (GPS) and thus may further determine directions from the location of platform 200 to destination point 3004 (e.g., directions 3008) based on the location determined with GPS. In some embodiments, directions 3008 are provided in a mode that the passenger will be using, such as a walking mode. In some embodiments, directions 3008 are a continuation of directions that were previously provided in a mode different from the mode that the passenger will be using. For example, the directions may transition from a driving mode associated with platform 200 to the walking mode.

In some embodiments, directions 3008 are based on a characteristic of passenger 202. For example, passenger 202 may require the use of a wheelchair and thus may need directions to a door that has a ramp or other wheelchair accessible entrance. Accordingly, platform 200 can provide directions 3008 that take the requirements of passenger 202 into account so that directions 3008 lead to a door that passenger 202 can access.

In some embodiments, directions 3008 are provided when the behavior of platform 200 is unexpected and/or different from the typical behavior of platform 200. For example, when an entry point preferred by passenger 202 is closed off or the typical drop off location of passenger 202 is in a construction zone, platform 200 may drop passenger 202 off in a different and/or unusual location. Thus, platform 200 may recognize that the drop off point and behavior is unusual and provide directions 3008 to computer system 3010 to help passenger 202 reach their destination.

Figure 31:
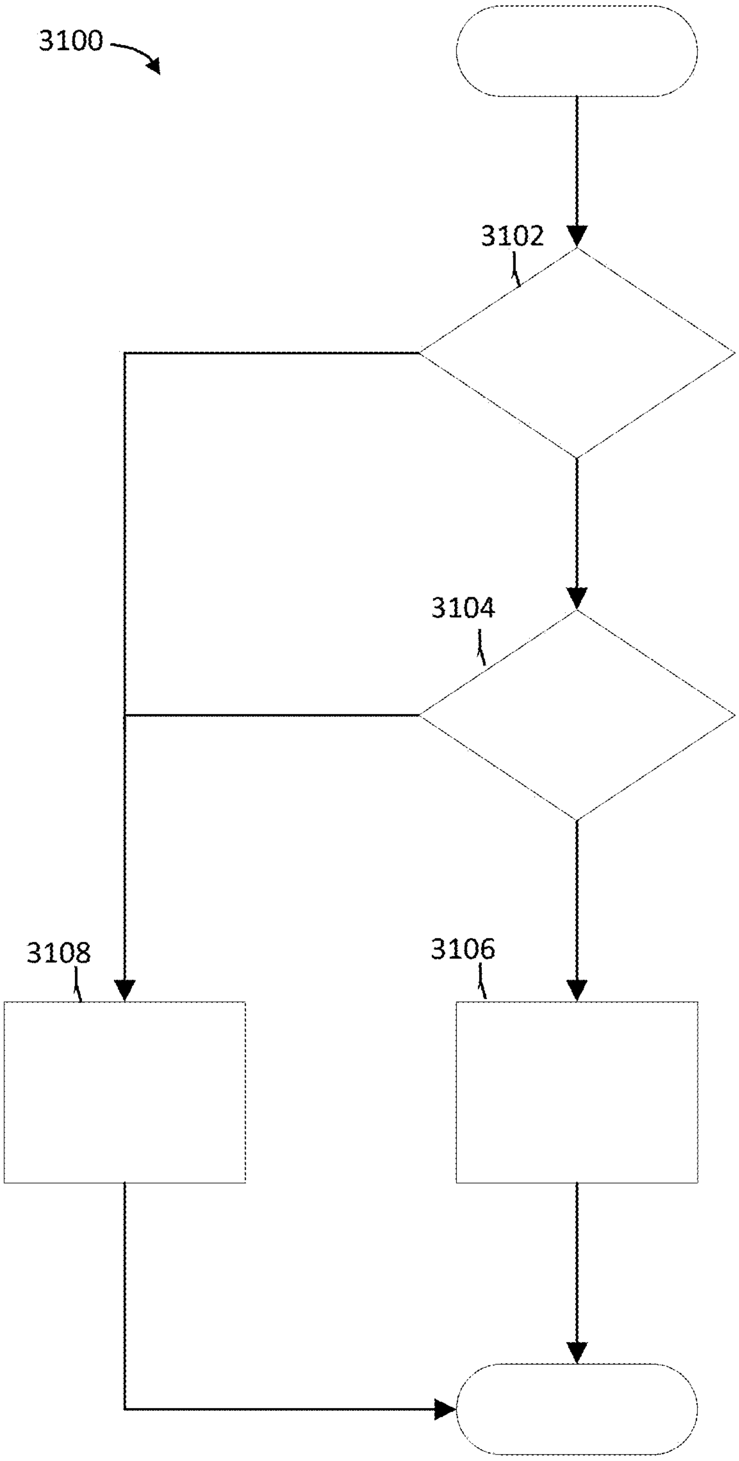
FIG. 31 is a flow diagram illustrating methods for a platform providing instructions to a final destination, in accordance with some embodiments.

FIG. 31 is a flow diagram illustrating method 3100 that can be performed by platform 200 and/or a computer system of platform 200. At block 3102, whether platform 200 has arrived at the drop off location is determined. When platform 200 has not arrived at the drop off location, platform 200 does not provide directions 3008 to computer system 3010, as shown in block 3108. When platform 200 has arrived at the drop off location, platform 200 and/or a computer system of platform 200 determines whether directions 3008 are request to reach the final destination, as shown at block 3104.

At block 3104, platform 200 and/or a computer system of platform 200 determines whether directions 3008 are required for passenger 202 to reach the final destination of passenger 202. When directions 3008 are not required to reach the final destination of passenger 202, platform 200 does not provide directions 3008 to computer system 3010, as shown in block 3108. When directions 3008 are required to reach the final destination of passenger 202, platform 200 does provide directions 3008 to computer system 3010, as shown in block 3106. Accordingly, platform 200 provides instructions that direct passenger 202 from the drop off location to the final destination of passenger 202.

A system (e.g., 100 and/or 152) associated with the platform (e.g., 150 and/or 200) is configured to perform a method in affordance with some embodiments. The system detects that a platform has arrived at a drop off location associated with a user (e.g., 202) (e.g., where the platform has stopped and/or the platform stopping at a destination requested by the user); in response to detecting that the platform has arrived at the drop off location: in accordance with a determination that a destination location associated with the user satisfies a set of instruction criteria (e.g., an uncommon drop off location, a greater than typical distance from entrance to location, an unfamiliar drop off location for the user, and/or data indicates that typical drop off location (or entrance) is unavailable), the system provides instructions (e.g., directions) associated with the destination location (e.g., the final destination), wherein the instructions are provided to (e.g., for display by) a computer system (e.g., a user's phone, watch, tablet, smart headphones, and/or wearable device) that is separate from the platform; and in accordance with a determination that the destination location associated with the user does not satisfy the set of instruction criteria, forgoing providing the instructions associated with the destination location to the computer system.

In some embodiments, detecting that the platform (e.g., 150 and/or 200) has arrived at the drop off location is based on a speed of the platform. In some embodiments, detecting the platform has arrived at the drop off location is based on whether directions to the drop off location have completed. In some embodiments, detecting that the platform has arrived at the drop off location is based on properties of vehicle (e.g., speed, door opening, engine turning off, and/or seatbelt being removed). In some embodiments, the drop off location is associated with a destination location associated with the user.

In some embodiments, the determination that the destination location associated with the user (e.g., 202) satisfies the set of instruction criteria is based at least in part on the drop off location (e.g., a determination that the drop off location associated with the user satisfies the set of instruction criteria, such as, e.g., the drop off location is a greater than a predetermined or previous distance from the destination location). In some embodiments, the determination that the destination location associated with the user satisfies the set of instruction criteria includes a determination that the drop off location associated with the user is a new drop off location (e.g., is unfamiliar to the user).

In some embodiments, providing the instructions includes changing an instruction mode (e.g., from one application to another application). In some embodiments, the instructions are a continuation of previous directions and/or itinerary. In some embodiments, the instructions are based on requirements of a user (e.g., the user needs a special access point for a ramp).

In some embodiments, the set of instruction criteria is based on a number of times that (and/or, in some embodiments, how recently) the user (e.g., 202) has been to the destination location (e.g., a number of trips that the user has made to the destination location, whether the destination location is an uncommon destination for the user, and/or whether the destination is an unfamiliar destination for the user). In some embodiments, the number of times that the user has been to the destination location (and/or the user's familiarity with the destination location) is based on previous trip information (e.g., trips using the platform and/or an application associated with the platform), calendar events at the destination location, and/or a number and/or familiarity designated by the user.

In some embodiments, the destination location does not satisfy the set of instruction criteria when the number of times that the user (e.g., 202) has been to the destination location does not satisfy (e.g., is less than or is less than or equal to) a threshold number of times (e.g., zero times, one time, or two times). In some embodiments, the instructions are not provided if the user is determined to have been to the destination location at least one time or at least one time in a threshold duration of time (e.g., at least one time in the past week, month, or year).

In some embodiments, the set of instruction criteria is based on a number of times that (and/or, in some embodiments, how recently) the user (e.g., 202) has been dropped off (e.g., by the platform) at the drop off location (e.g., a number of trips in which that the user has been dropped off at the drop off location, whether the drop off location is an uncommon drop off location for the user, and/or whether the drop off location is an unfamiliar drop off location for the user). In some embodiments, the number of times that the user has been dropped off at the drop off location (and/or the user's familiarity with the drop off location) is based on previous trip information (e.g., trips using the platform and/or an application associated with the platform), calendar events that include the drop off location, and/or a number and/or familiarity designated by the user.

In some embodiments, the instructions provided to the computer system (e.g., directions from the drop off location to the destination location) are based on location information of the platform (e.g., a location of the platform determined by GPS and/or other sensors of the platform).

In some embodiments, providing the instructions includes providing the instructions in a first mode (e.g., a first mode of transportation, such as walking, bicycling, and/or public transportation) that is different from a second mode (e.g., a second mode of transportation, such as driving) associated with the platform. In some embodiments, providing the instructions includes changing instructions on the computer system from the second mode to the first mode (e.g., from driving directions to walking directions).

In some embodiments, the instructions are based on a characteristic (e.g., a physical characteristic, a capability, a mobility characteristic, an accessibility requirement, and/or an accessibility characteristic) of the user (e.g., 202). For example, in some embodiments, in accordance with a determination that the user requires an accessibility ramp to access the destination location from the drop off location, the instructions include directions to an accessibility ramp (e.g., instead of directions that require use of stairs).

In some embodiments, the set of instruction criteria includes a criterion that is based on a distance (e.g., from the drop off location, a location of the platform, and/or a location of the user) to the destination location (e.g., to a front door of the destination location). For example, in some embodiments, in accordance with a determination that the drop off location is within a threshold distance of the destination location, the instructions include directions to a particular area (e.g., a front door) of the destination location (e.g., the directions are more specific); and in accordance with a determination that the drop off location is not within the threshold distance of the destination location, the instructions do not include directions to a particular area of the destination location (e.g., the directions are more general and/or less specific).

In some embodiments, the set of instruction criteria includes a criterion that is based on a behavior of the platform (e.g., 150 and/or 200) (e.g., a position of the platform, a movement of the platform, a route taken by the platform, changing a planned route of the platform, and/or a function performed by the platform). In some embodiments, the behavior of the platform includes an unexpected behavior and/or a behavior that deviates from a planned route and/or behavior (e.g., an initial planned route, a previous planned route, an initial planned behavior, and/or a previous planned behavior). In some embodiments, the destination location satisfies the set of instruction criteria if the platform performs a behavior that was not expected by the user and/or was not previously planned to be performed.

In some embodiments, the behavior of the platform (e.g., 150 and/or 200) includes arriving (e.g., dropping the user off) at the drop off location (e.g., an entry point of the destination location) in accordance with a determination that a respective drop off location (e.g., a preferred drop off location and/or preferred entry point) is not available (e.g., closed off and/or otherwise not accessible). In some embodiments, the instructions are provided in accordance with a determination that the actual drop off location is different from a preferred drop off location, such as a drop off location that was specified by the user or is closer to the destination location than the actual drop off location (e.g., directions are provided because the actual drop off location is not what the user is expecting). In some embodiments, the platform drops off the user at an entry point of the destination location that is different from a preferred entry point because the preferred entry point is closed.

In some embodiments, the behavior of the platform (e.g., 150 and/or 200) includes arriving (e.g., dropping the user off) at the drop off location (e.g., an entry point of the destination location) in accordance with a determination that the drop off location is different from a respective drop off location (and/or, optionally, that the respective drop off location is in a construction zone). In some embodiments, the respective drop off location is a preferred drop off location, a typical drop off location, and/or a previous drop off location used one or more times for the destination location. In some embodiments, the instructions are provided in accordance with a determination that a preferred and/or typical drop off location is in a construction zone (e.g., there is determined to be construction at, or within a threshold distance of, the preferred and/or typical drop off location). In some embodiments, the platform drops off the user at drop off location that is different from a typical drop off location (e.g., a previously used drop off location) because the typical drop off location is in a construction zone.

Existing platforms do not include a way to notify passengers.

Thus, there is need for a platform, such as a vehicle, that can notify passengers of the platforms behavior and/or status while the passenger is not in the platform. For example, the platform can notify the passenger when the platform is charging or waiting at an unusual or uncommon location so that the passenger does not look for the platform in a location that the platform is not currently occupying. Further, the platform can provide a current status to the passenger on demand when the passenger requests it. For example, the passenger can use an application on a personal computer system (e.g., a cell phone, smart watch, tablet, and/or laptop) to determine the current location and/or status of the platform. In this way, the passenger can determine how much time the platform needs to reach the passenger and the passenger can better plan for a future pick up by the platform.

Figure 32A:
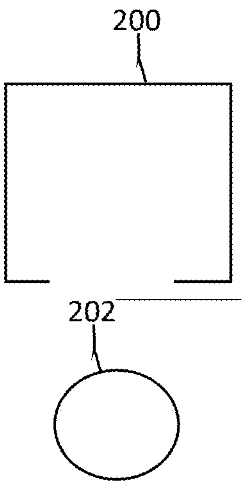
FIGS. 32A-32E illustrate examples of a platform providing location notifications, in accordance with some embodiments.
Figure 32B:
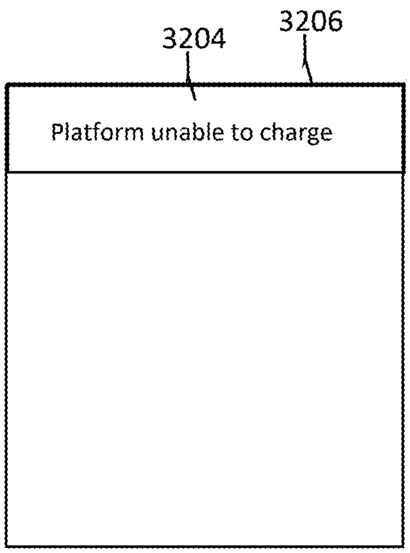

Turning now to the drawings, FIG. 32A illustrates platform 200 completing a drop off action. In particular, passenger 202 is egressing from platform 200 and moving away from platform 200. After passenger 202 has egressed from platform 200, platform 200 moves to another location and/or performs an action such as searching for a charging station, searching for a location to park, and/or performs another trip. Platform 200 or another computer system detects (e.g., determines) a status of platform 200 and when the status of the platform is atypical, causes delivery of notification 3204 on computer system 3206 associated with passenger 202, as shown in FIG. 32B. For example, platform 200 typically travels to a nearby charging station after dropping off passenger 202 to charge and wait until passenger 202 is ready for a pickup, but when platform 200 is unable to charge because the charging station is full, platform 200 causes delivery of notification 3204 that platform 200 is unable to charge. In contrast, when platform 200 is able to charge at the typical charge station and waits for passenger 202 as platform 200 typically does, platform 200 does not cause delivery of notification 3204.

In some embodiments, notification 3204 is delivered to computer system 3206 when a desired action (e.g., a normal or typical action) is not possible. In some embodiments, the desired action is based on the actions performed by platform 200 on one or more previous trips. For example, when platform 200 has parked in the same spot on the previous two trips that passenger 202 took to the current location of passenger 202, then parking in that spot is considered a desired and/or normal (e.g., typical) action. As another example, when platform 200 has parked in a different spot on the previous two trips that passenger 202 took to the current location of passenger 202, then parking in either of the two spots is considered a desired and/or normal action.

In some embodiments, notification 3204 includes information about the status and/or the action of platform 200 such as that platform 200 is parked beyond a threshold distance from the location of passenger 202, that platform 200 could not part in a predetermined location, or that a charging station is unavailable and/or not operating. For example, when platform 200 cannot park in a typical parking spot or garage, platform 200 can cause delivery of a notification of "Parking spot unavailable, waiting three miles from your current location" to computer system 3206. Thus, passenger 202 is provided with the current location of platform 200 as well as the reasons why platform 200 was unable to park where passenger 202 expected platform 200 to be.

Figure 32C:
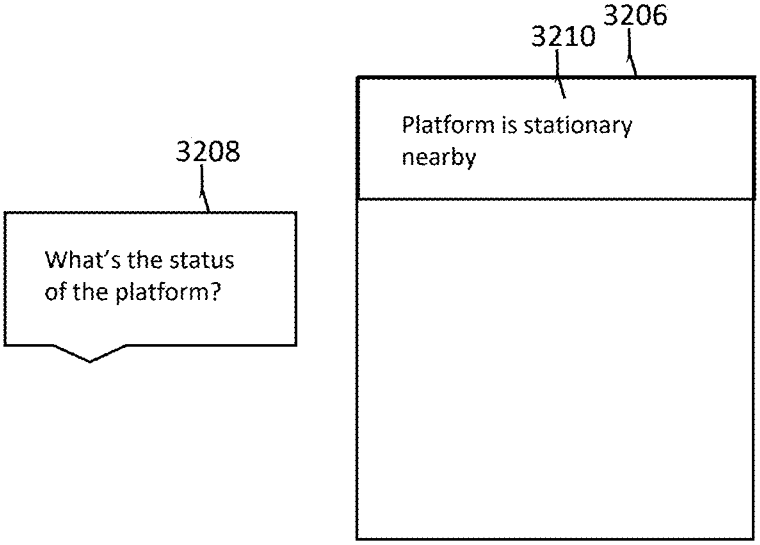

In FIG. 32C, passenger 202 provides voice input 3208 requesting a current status of platform 200. In response, platform 200 causes delivery of notification 3210 to computer system 3206 including the current status of platform 200. For example, passenger 202 provides voice input 3208 of "what is the status of the platform?" and in response, platform 200 causes deliver of notification 3210 including "platform is stationary nearby." In some embodiments, notification 3210 includes a location of platform 200 such as nearby and/or a distance away from passenger 202. In some embodiments, notification 3210 includes a current action of platform 202 such as parked and/or charging. In some embodiments, notification 3210 is displayed on a display of computer system 3206, as shown in FIG. 32C. In some embodiments, notification 3210 is provided as an audio output from computer system 3206.

Figure 32D:
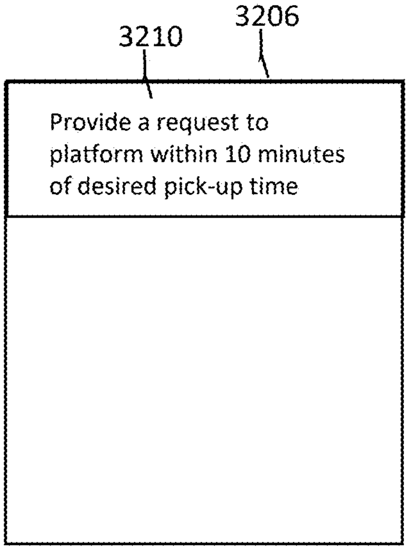

In FIG. 32D, platform 200 causes delivery of notification 3210 including an amount of time platform 200 needs to get to passenger 202. In particular, the status of platform 200 includes that platform 200 is currently ten minutes away from passenger 202 and/or the current location of passenger 202. Accordingly, platform 200 advises passenger 202 so that passenger 202 can provide a request for pickup with enough time for platform 200 to reach passenger 202. In some embodiments, information indicating the amount of time platform 200 needs to reach passenger 202 is provided in response to a request for the status of platform 200. In some embodiments, information indicating the amount of time platform 200 needs to reach passenger 202 is provided when platform 200 has performed an atypical action or is waiting in an atypical location.

Figure 32E:
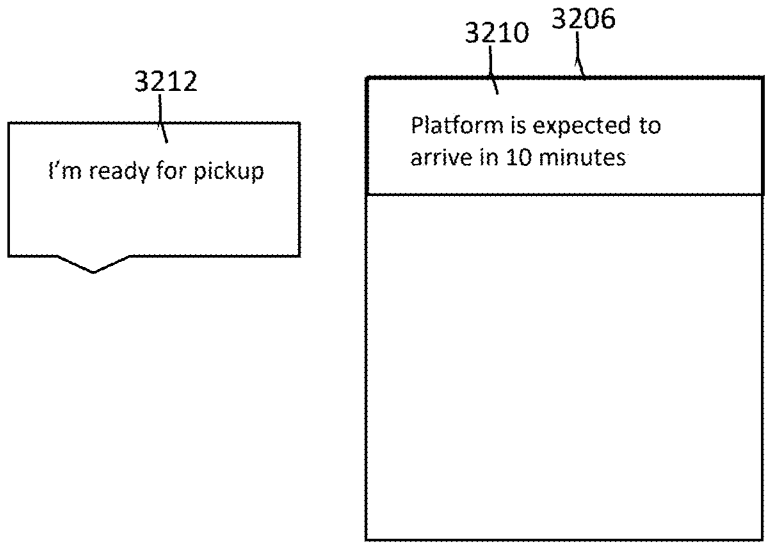

In FIG. 32E, passenger 202 provides request 3212 including a request for pick up. In response, platform 200 causes delivery of notification 3210 including the amount of time platform 200 determines it will take platform 200 to reach passenger 202. In some embodiments, notification 3210 includes information about the amount of time, such as the current location of platform 200 or a delay that is affecting platform 200 (e.g., construction, traffic, and/or completing another task). In this way, information about the status of platform 200 can be intelligently provided to passenger 202 when the behavior of platform 200 is atypical and also whenever passenger 202 provides a request to platform 200. This allows platform 200 to keep passenger 202 informed with the latest information so that passenger 202 can make educated and appropriate decisions about calling and using platform 200.

Figure 33:
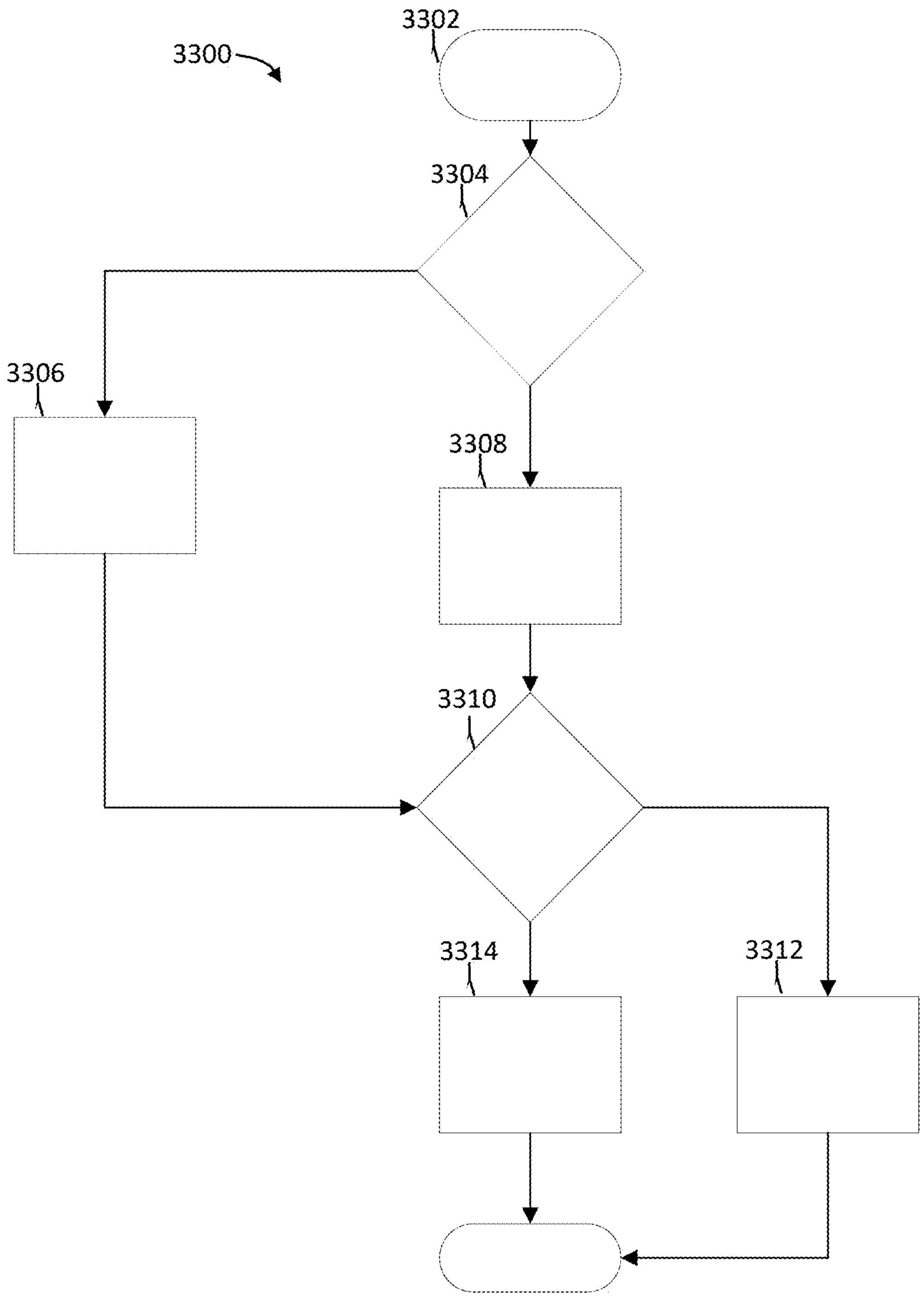
FIG. 33 is a flow diagram illustrating methods for a platform providing location notifications, in accordance with some embodiments.

FIG. 33 is a flow diagram illustrating method 3100 that can be performed by platform 200 and/or a computer system of platform 200. At block 3302, platform 200 completes the drop off of passenger 202. At block 3304, after completing the drop off, platform 200 and/or a computer system of platform 200 determines whether the status of platform 200 is atypical. When the status of platform 200 is not atypical, platform 200 and/or a computer system of platform 200 does not cause the delivery of the notification to computer system 3206, as shown at block 3306. When the status of platform 200 is atypical, platform 200 and/or a computer system of platform 200 causes delivery of the notification to computer system 3206, as shown at block 3308.

At block 3310, platform 200 and/or a computer system of platform 200 determines whether passenger 202 requested the status of platform 200. When passenger 202 does not request the status of platform 200, platform 200 and/or a computer system of platform 200 does not cause the delivery of the current status of platform 200 and/or a notification including the current status of platform 200 to computer system 3206, as shown at block 3312. When passenger 202 does request the status of platform 200, platform 200 and/or a computer system of platform 200 causes the delivery of the current status of platform 200 and/or a notification including the current status of platform 200 to computer system 3206, as shown at block 3314. Accordingly, platform 200 and/or a computer system of platform 200 intelligently provides computer system 3206 and passenger 202 with the status of platform 200.

A system (e.g., 100 and/or 152) associated with the platform (e.g., 150 and/or 200) is configured to perform a method in affordance with some embodiments. After a platform has completed a drop off action (e.g., after a determination that the platform has arrived at a destination and/or drop off location and that one or more people have departed the platform; and/or after the platform has started to depart from a destination and/or drop off location): the system detects (or, in some embodiments, determines) a status of the platform (or, in some embodiments, a behavior of the platform); in response to detecting the status of the platform: in accordance with a determination that the status of the platform satisfies a set of atypical status criteria (e.g., does not perform normal operations), causing delivery of (e.g., transmitting) a notification (e.g., 3204 and/or 3210) to a computer system of a person (e.g., 202) associated with the drop off action (e.g., a person that departed the platform during the drop off action), wherein the notification includes content that is based on (e.g., includes an indication of) the status (and/or the behavior) of the platform (e.g., automatically and/or without the user requesting the platform behavior and/or status); and in accordance with a determination that the status of the platform does not satisfy the set of atypical status criteria, forgoing causing delivery of the notification; receiving a request to provide a current status of the platform to the computer system (e.g., a person requesting the status in a control center and/or an application associated with the platform); and in response to receiving the request to provide the current status of the platform, causing delivery of the current status of the platform (or, in some embodiments, information that represents the current status of the platform) to the computer system. In some embodiments, the request is a touch input. In some embodiments, the request is an audio input.

In some embodiments, the status of the platform (e.g., 150 and/or 200) includes a location of the platform, an action of the platform, and/or a readiness of the platform. In some embodiments, the status of the platform includes whether the platform is able to pick up a user. In some embodiments, the status of the platform includes whether the platform is moving away from or towards a location of the user. In some embodiments, the status of the platform includes whether the platform is not moving. In some embodiments, the status of the platform includes a location where the platform has stopped. In some embodiments, the status of the platform includes a charging state of the platform (e.g., the platform is recharging and/or is looking for a place to recharge)

In some embodiments, the set of atypical status criteria is based on previous platform behavior in a context (e.g., after drop off). In some embodiments, the set of atypical status criteria is based on user preferences (e.g., what the user has asked the vehicle to do). In some embodiments, typicality is based on default values.

In some embodiments, the notification (e.g., 3204 and/or 3210) includes (e.g., displays) a location of the platform (e.g., 150 and/or 200). In some embodiments, the notification includes (e.g., displays) directions to the platform. In some embodiments, the notification includes (e.g., displays) a movement pattern of the platform (e.g., the path the platform has driven). In some embodiments, the notification includes (e.g., displays) an error encountered. In some embodiments, the notification includes (e.g., displays) further information related to the platform for follow up by the person (e.g., how to request a vehicle when the person is ready).

In some embodiments, the notification (e.g., 3204 and/or 3210) is provided by an application associated with the platform (e.g., 150 and/or 200). In some embodiments, the notification is provided by an application associated with the platform and other electronic devices (e.g., the command center). In some embodiments, the notification is provided on a lock screen of a computer system. In some embodiments, the notification is provided over (e.g., on top) of a user interface of the computer system. In some embodiments, the notification is provided as an audio output. In some embodiments, the notification is provided at a computer system (e.g., phone, watch, tablet, headphones, laptop, desktop, and/or a smart speaker) separate from the vehicle. In some embodiments, the notification is delivered to multiple computer systems associated with the user. In some embodiments, further comprising, after delivery of the current status of the platform to the computer system, causing the current status (and/or information representing the current status) of the platform to be provided as an output of the computer system (e.g., as a notification).

In some embodiments, the set of atypical status criteria includes a criterion that is satisfied in accordance with a determination that a desired action (e.g., a normal action and/or a typical action) is not possible. For example, in some embodiments, a desired action is determined and then the notification is displayed if the platform is unable to perform the desired action (e.g., the desired action is not physically possible and/or the desired action is not feasible). In some embodiments, the desired action is an action that the platform has previously performed (e.g., normally performs or typically performs) after completing a drop off action (e.g., after the platform arrives at a location and a person disembarks the platform).

In some embodiments, the desired action is based on one or more previous trips (e.g., one or more previous trips of the person associated with the drop off action). For example, if the person is dropped off at a coffee shop, the desired action can be for the platform to park in a nearby location because the person has requested to be picked up by the platform a short time (e.g., 5 minutes to 10 minutes) after drop off during previous trips by the user to the coffee shop. As another example, if the person is dropped off at work, the desired action can be for the platform to go to a charging station, perform another task, pick up and/or drop off another person, and/or other action that requires a longer amount of time (e.g., 1 hour, 2, hours, 4 hours, or 8 hours).

In some embodiments, the desired action is based on a preference designated by the person (e.g., 202) associated with the drop off action. In some embodiments, the preference is designated in an application associated with the platform (e.g., an application that provides an interface for controlling the platform). In some embodiments, the preference is based on a parameter and/or setting of the application associated with the platform.

In some embodiments, the notification (e.g., 3204 and/or 3210) includes a prompt (e.g., a visual prompt, a haptic prompt, and/or an audio prompt) for the person associated with the drop off action to perform a traveler action.

In some embodiments, the traveler action includes providing an input within a predetermined range of time an expected time of entering (e.g., re-entering) the platform. For example, the notification prompts the person to notify the platform (e.g., request to be picked up) within a respective amount of time (e.g., 2 minutes, 5 minutes, 10 minutes, 15 minutes, or 30 minutes) of a desired pick up time (e.g., within 5 minutes of when the person wants to be picked up; and/or not too long before the person wants to be picked up).

In some embodiments, the notification (e.g., 3204 and/or 3210) includes information about a condition (e.g., situation and/or circumstance) that caused the set of atypical status criteria to be satisfied (e.g., a reason for the notification)

and/or information about the status of the platform (e.g., an indication of the status of the platform).

In some embodiments, the notification (e.g., 3204 and/or 3210) includes information about the status of the platform (e.g., 150 and/or 200), and wherein the information about the status of the platform includes that that the platform is parked at a location that is beyond a threshold distance from a location of the person associated with the drop off action (e.g., "the platform is parked more than 500 feet away"). In some embodiments, in accordance with a determination that a parking location of the platform (e.g. a location at which the platform is parked or will be parked) satisfies (e.g., is greater than or is greater than or equal to) a threshold distance, the notification includes the parked location and/or a distance between the parked location and a location of the person (or the computer system of the person). In some embodiments, the set of atypical status criteria includes a criterion that is satisfied (e.g., the set of atypical status criteria is satisfied) when the platform is parked at a location that is beyond a threshold distance from a location of the person associated with the drop off action.

In some embodiments, the notification (e.g., 3204 and/or 3210) includes information about a condition that caused the set of atypical status criteria to be satisfied, and wherein the condition that caused the set of atypical status criteria to be satisfied includes that the platform could not park at a predetermined location (e.g., a predetermined parking spot, such as a spot reserved for people with disabilities or a reserved parking spot, or a predetermined parking lot). In some embodiments, in accordance with a determination that a predetermined parking location is occupied, the notification includes information that indicates that the predetermined parking location is occupied. In some embodiments, the set of atypical status criteria includes a criterion that is satisfied (e.g., the set of atypical status criteria is satisfied) when a determination is made that the platform cannot (or could not) park at a predetermined location.

In some embodiments, the notification (e.g., 3204 and/or 3210) includes information about a condition that caused the set of atypical status criteria to be satisfied, and wherein the condition that caused the set of atypical status criteria to be satisfied includes that a charging station (e.g., a charging station that is compatible with the platform) is not available (e.g., there is no charging station within a threshold distance of the platform) and/or that a charging station is not operating (e.g., a charging station is within a threshold range of the platform but is out of service or not currently operating). In some embodiments, the platform is configured to be electrically charged by a charging station (e.g., the platform is an electric vehicle). In some embodiments, in accordance with a determination that a charging station is not available or that a charging station is not operating, the notification includes information that indicates that a charging station is not available or that a charging station is not operating. In some embodiments, the set of atypical status criteria includes a criterion that is satisfied (e.g., the set of atypical status criteria is satisfied) when a determination is made that a charging station is not available or that a charging station is not operating.

The present disclosure contemplates that information about one or more people and/or users of a platform can be obtained, collected, and/or used in order to generate a unique and personal experience for the one or more people and/or users of the platform. In some embodiments, such collection/use of user information occurs after receiving the informed consent and/or authorization of the users. The present disclosure also contemplates embodiments in which users selectively block the use of, or access to, user information. That is, the present disclosure contemplates that hardware and/or software elements can be provided to prevent or block access to such user information. For example, the present technology can be configured to allow users to select to "opt in" or "opt out" of participation in the collection of and/or use of user information with respect to operation of a platform.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the techniques and their practical applications. Others skilled in the art are thereby enabled to utilize the techniques and various embodiments with various modifications as are suited to the particular use contemplated.

Although the disclosure and embodiments have been fully described with reference to the accompanying drawings, it is to be noted that various changes and modifications will become apparent to those skilled in the art. Such changes and modifications are to be understood as being included within the scope of the disclosure and embodiments as defined by the claims.

What is claimed is:

1. A system, comprising:

one or more processors; and memory storing one or more programs configured to be executed by the one or more processors, the one or more programs including instructions for:

detecting that a set of ingress criteria is met, the set of ingress criteria including a criterion that is met when a user is detected within a threshold proximity of a structure corresponding to a platform; and in response to detecting that the set of ingress criteria is met and in accordance with a determination that a set of content transfer criteria is met, the set of content transfer criteria including a condition that is met when a computer system associated with the user is currently performing playback of media content, initiating playback of the media content on a media output device of the platform, wherein the system initiates playback of the media content on the media output device of the platform without receiving user input.

2. The system of claim 1, wherein the media content includes a video output and/or an audio output.

3. The system of claim 1, wherein the one or more programs further include instructions for:

detecting the presence of another user in the structure corresponding to the platform; and in response to detecting the presence of another user in the structure corresponding to the platform, forgoing initiating playback of the media content on a media output device of the platform.

4. The system of claim 1, wherein the one or more programs further include instructions for:

in accordance with a determination that the computer system associated with the user is providing playback of the media content through an accessory device communicatively coupled to the computer system associated with the user, forgoing initiating playback of the media content on the media output device of the platform.

5. The system of claim 1, wherein the one or more programs further include instructions for:

causing the computer system associated with the user to provide a notification including a request to initiate playback of the media content on the media output device of the platform.

6. The system of claim 1, wherein initiating playback of the media content on the media output device of the platform includes transferring a first subset of the media content prior to transferring a second subset of the media content.

7. The system of claim 1, wherein the one or more programs further include instructions for:

detecting that a set of egress criteria is met, the set of egress criteria including a criterion that the user has left the platform; and in response to detecting that the set of egress criteria is met and in accordance with a determination that a set of content transfer criteria is met, the set of content transfer criteria including a condition that the media output device of the platform is performing playback of media content, initiating playback of the media content on the computer system associated with the user.

8. A non-transitory computer-readable storage medium storing one or more programs configured to be executed by one or more processors of a system, the one or more programs including instructions for:

detecting that a set of ingress criteria is met, the set of ingress criteria including a criterion that is met when a user is detected within a threshold proximity of a structure corresponding to a platform; and in response to detecting that the set of ingress criteria is met and in accordance with a determination that a set of content transfer criteria is met, the set of content transfer criteria including a condition that is met when a computer system associated with the user is currently performing playback of media content, initiating playback of the media content on a media output device of the platform, wherein the system initiates playback of the media content on the media output device of the platform without receiving user input.

9. A method, comprising:

detecting that a set of ingress criteria is met, the set of ingress criteria including a criterion that is met when a user is detected within a threshold proximity of a structure corresponding to a platform; and in response to detecting that the set of ingress criteria is met and in accordance with a determination that a set of content transfer criteria is met, the set of content transfer criteria including a condition that is met when a computer system associated with the user is currently performing playback of media content, initiating playback of the media content on a media output device of the platform, wherein the system initiates playback of the media content on the media output device of the platform without receiving user input.

10. The non-transitory computer-readable storage medium of claim 8, wherein the media content includes a video output and/or an audio output.

11. The non-transitory computer-readable storage medium of claim 8, wherein the one or more programs further include instructions for:

detecting the presence of another user in the structure corresponding to the platform; and in response to detecting the presence of another user in the structure corresponding to the platform, forgoing initiating playback of the media content on a media output device of the platform.

12. The non-transitory computer-readable storage medium of claim 8, wherein the one or more programs further include instructions for:

in accordance with a determination that the computer system associated with the user is providing playback of the media content through an accessory device communicatively coupled to the computer system associated with the user, forgoing initiating playback of the media content on the media output device of the platform.

13. The non-transitory computer-readable storage medium of claim 8, wherein the one or more programs further include instructions for:

causing the computer system associated with the user to provide a notification including a request to initiate playback of the media content on the media output device of the platform.

14. The non-transitory computer-readable storage medium of claim 8, wherein initiating playback of the media content on the media output device of the platform includes transferring a first subset of the media content prior to transferring a second subset of the media content.

15. The non-transitory computer-readable storage medium of claim 8, wherein the one or more programs further include instructions for:

detecting that a set of egress criteria is met, the set of egress criteria including a criterion that the user has left the platform; and in response to detecting that the set of egress criteria is met and in accordance with a determination that a set of content transfer criteria is met, the set of content transfer criteria including a condition that the media output device of the platform is performing playback of media content, initiating playback of the media content on the computer system associated with the user.

16. The method of claim 9, wherein the media content includes a video output and/or an audio output.

17. The method of claim 9, further comprising:

detecting the presence of another user in the structure corresponding to the platform; and in response to detecting the presence of another user in the structure corresponding to the platform, forgoing initiating playback of the media content on a media output device of the platform.

18. The method of claim 9, further comprising:

in accordance with a determination that the computer system associated with the user is providing playback of the media content through an accessory device communicatively coupled to the computer system associated with the user, forgoing initiating playback of the media content on the media output device of the platform.

19. The method of claim 9, further comprising:

causing the computer system associated with the user to provide a notification including a request to initiate playback of the media content on the media output device of the platform.

20. The method of claim 9, wherein initiating playback of the media content on the media output device of the platform includes transferring a first subset of the media content prior to transferring a second subset of the media content.

21. The method of claim 9, further comprising:

detecting that a set of egress criteria is met, the set of egress criteria including a criterion that the user has left the platform; and in response to detecting that the set of egress criteria is met and in accordance with a determination that a set of content transfer criteria is met, the set of content transfer criteria including a condition that the media output device of the platform is performing playback of media content, initiating playback of the media content on the computer system associated with the user.

* * * * *